US012607000B2

(12) United States Patent
Luettgen et al.

(10) Patent No.: US 12,607,000 B2
(45) Date of Patent: Apr. 21, 2026

(54) CLEAN TOILET AND ACCESSORIES

(71) Applicant: Kohler Co., Kohler, WI (US)

(72) Inventors: Michael Luettgen, Grafton, WI (US); William Kuru, Plymouth, WI (US); Clayton Garrels, Sheboygan, WI (US); Peter W. Denzin, Glenbeulah, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/429,169

(22) Filed: Jan. 31, 2024

(65) Prior Publication Data

US 2024/0167261 A1 May 23, 2024

Related U.S. Application Data

(63) Continuation of application No. 18/390,863, filed on Dec. 20, 2023, now Pat. No. 12,320,110, which is a
(Continued)

(51) Int. Cl.
*E03D 9/05* (2006.01)
*A47K 13/30* (2006.01)
(Continued)

(52) U.S. Cl.
CPC .............. *E03D 9/05* (2013.01); *A47K 13/307* (2013.01); *A47K 17/00* (2013.01); *C11D 7/04* (2013.01); *E03D 1/36* (2013.01); *E03D 5/10* (2013.01); *E03D 9/005* (2013.01); *E03D 9/031* (2013.01); *E03D 9/032* (2013.01); *E03D 9/033* (2013.01); *E03D 9/038* (2013.01); *G08B 5/36* (2013.01);
(Continued)

(58) Field of Classification Search
CPC .... A47K 13/30; A47K 13/302; A47K 13/307; E03D 9/005; E03D 9/032
USPC .............................................................. 4/384
See application file for complete search history.

(56) References Cited

U.S. PATENT DOCUMENTS 120,979 A 11/1871 Jordan
149,195 A 3/1874 Burns et al.
(Continued)

FOREIGN PATENT DOCUMENTS

CN 201908349 U 7/2011
DE 7905670 U1 10/1979
(Continued)

OTHER PUBLICATIONS

Chinese Office Action for Chinese Application No. 201810593664.1 dated May 15, 2020.
(Continued)

*Primary Examiner* — Huyen D Le
(74) *Attorney, Agent, or Firm* — Lempia Summerfield Katz LLC

(57) ABSTRACT

A toilet that includes a tank configured to hold water from a water supply; a reservoir fluidly connected to the tank and configured to hold a cleaning compound comprising a chemical compound and water from the water supply; and an actuator configured to control a flush cycle of the toilet upon a first activation, the actuator including at least one nozzle fluidly connected to the reservoir and configured to discharge an amount of the cleaning compound external to the tank upon at least one of the first activation or a second activation.

18 Claims, 88 Drawing Sheets

Related U.S. Application Data continuation of application No. 18/141,779, filed on May 1, 2023, now Pat. No. 12,104,366, which is a continuation of application No. 17/388,582, filed on Jul. 29, 2021, now Pat. No. 11,674,298, which is a continuation of application No. 16/564,311, filed on Sep. 9, 2019, now Pat. No. 11,105,082, which is a continuation of application No. 15/900,933, filed on Feb. 21, 2018, now Pat. No. 10,450,733, which is a continuation of application No. PCT/US2016/048419, filed on Aug. 4, 2016.

(60) Provisional application No. 62/209,198, filed on Aug. 24, 2015.

(51) Int. Cl.

| | |
|---|---|
| ***A47K 17/00*** | (2006.01) |
| ***C11D 7/04*** | (2006.01) |
| ***E03D 1/36*** | (2006.01) |
| ***E03D 5/10*** | (2006.01) |
| ***E03D 9/00*** | (2006.01) |
| ***E03D 9/03*** | (2006.01) |
| ***G08B 5/36*** | (2006.01) |
| ***G08B 21/18*** | (2006.01) |
| *E03D 9/02* | (2006.01) |

(52) U.S. Cl.

CPC ........ *G08B 21/182* (2013.01); *C11D 2111/14* (2024.01); *C11D 2111/24* (2024.01); *E03D 2009/024* (2013.01); *E03D 2009/028* (2013.01)

(56) References Cited

U.S. PATENT DOCUMENTS

| | | | | |
|---|---|---|---|---|
| 156,978 | A | 11/1874 | Burns | |
| 507,656 | A | 10/1893 | Kato | |
| 1,091,265 | A | 3/1914 | Wohlander | |
| 1,142,249 | A | 6/1915 | Griffiths | |
| 1,643,286 | A | 9/1927 | John | |
| 1,688,098 | A | 10/1928 | Turner | |
| 2,479,842 | A | 8/1949 | Kirwan | |
| 2,558,469 | A | 6/1951 | Travis | |
| 2,620,486 | A | 12/1952 | Addlesburger | |
| 3,105,245 | A | 10/1963 | Finkbiner | |
| 3,194,628 | A | 7/1965 | Peter | |
| 3,228,040 | A | 1/1966 | Currie | |
| 3,417,410 | A | 12/1968 | Tietema | |
| 3,781,923 | A | 1/1974 | Maisch et al. | |
| 3,810,260 | A * | 5/1974 | Lodi | A47K 7/08 4/420.4 |
| 3,890,657 | A | 6/1975 | Gray | |
| 3,913,151 | A | 10/1975 | Keimig | |
| 3,943,960 | A | 3/1976 | Syrenne | |
| 4,056,228 | A | 11/1977 | Rosenkrantz | |
| 4,153,956 | A | 5/1979 | Fischer, Jr. et al. | |
| 4,166,298 | A | 9/1979 | Pearson | |
| 4,318,192 | A | 3/1982 | Williams et al. | |
| 4,319,973 | A | 3/1982 | Porta et al. | |
| 4,326,308 | A | 4/1982 | Silver | |
| 4,350,575 | A | 9/1982 | Porta et al. | |
| 4,429,423 | A | 2/1984 | Syrenne | |
| 4,434,938 | A | 3/1984 | Rosenkrantz | |
| 4,455,203 | A | 6/1984 | Stucki | |
| 4,467,480 | A | 8/1984 | Keller | |
| 4,551,865 | A | 11/1985 | Waters | |
| 4,617,687 | A | 10/1986 | Wadsworth | |
| 4,780,913 | A | 11/1988 | Williams | |
| 4,876,748 | A | 10/1989 | Chun | |
| 4,982,454 | A | 1/1991 | Saltel et al. | |
| 5,042,095 | A | 8/1991 | Schoepe et al. | |
| 5,054,130 | A | 10/1991 | Wilson | |
| 5,073,992 | A | 12/1991 | Herring | |
| 5,123,124 | A | 6/1992 | Brower | |
| 5,125,119 | A | 6/1992 | Munoz | |
| 5,152,015 | A | 10/1992 | Fourman | |
| 5,305,472 | A | 4/1994 | Eger | |
| 5,325,544 | A | 7/1994 | Busch | |
| 5,369,810 | A | 12/1994 | Warren | |
| 5,454,122 | A | 10/1995 | Bergeron | |
| 5,487,788 | A | 1/1996 | Kamiya et al. | |
| 5,488,788 | A | 2/1996 | Durbin | |
| 5,491,847 | A | 2/1996 | Shaffer | |
| 5,493,737 | A | 2/1996 | Chu | |
| 5,505,382 | A | 4/1996 | Sealy et al. | |
| 5,505,921 | A | 4/1996 | Lueckoff et al. | |
| 5,522,093 | A | 6/1996 | Schaffer | |
| 5,570,477 | A | 11/1996 | Rodriguez | |
| 5,575,019 | A | 11/1996 | Kijewski | |
| 5,606,747 | A | 3/1997 | Dupont | |
| 5,611,088 | A | 3/1997 | Almon | |
| 5,635,039 | A | 6/1997 | Cisar et al. | |
| 5,645,700 | A | 7/1997 | White et al. | |
| 5,715,860 | A | 2/1998 | Horad | |
| 5,778,459 | A | 7/1998 | Guerin | |
| 5,850,638 | A | 12/1998 | Her | |
| 5,881,396 | A | 3/1999 | Rivera | |
| 5,987,659 | A | 11/1999 | Cannizzaro | |
| 6,151,722 | A | 11/2000 | Lubrano | |
| 6,240,572 | B1 | 6/2001 | Van et al. | |
| 6,279,174 | B1 | 8/2001 | Candusso | |
| 6,282,732 | B1 | 9/2001 | Krvavica | |
| 6,319,390 | B1 | 11/2001 | Kono | |
| 6,321,392 | B1 | 11/2001 | Sim | |
| 6,339,850 | B1 | 1/2002 | Gore | |
| 6,387,238 | B1 | 5/2002 | Merk | |
| 6,432,376 | B1 | 8/2002 | Choudhary | |
| 6,449,779 | B1 | 9/2002 | Nguyen | |
| 6,491,797 | B1 | 12/2002 | Locke | |
| 6,555,055 | B1 | 4/2003 | Cisar | |
| 6,620,210 | B2 | 9/2003 | Murphy | |
| 6,641,739 | B2 | 11/2003 | Dresty, Jr. | |
| 6,651,260 | B1 | 11/2003 | Dodson | |
| 6,662,379 | B2 | 12/2003 | Nguyen et al. | |
| 6,675,405 | B1 | 1/2004 | Harm | |
| 6,712,949 | B2 | 3/2004 | Gopal | |
| 6,761,815 | B2 | 7/2004 | Nakajima | |
| 6,767,447 | B2 | 7/2004 | Uno | |
| 6,772,450 | B1 | 8/2004 | Saylor et al. | |
| 6,773,575 | B2 | 8/2004 | Nakajima | |
| 6,785,915 | B1 | 9/2004 | Daugherty | |
| 6,823,535 | B2 | 11/2004 | Tomita | |
| 6,928,666 | B1 | 8/2005 | Schaffer | |
| 6,944,890 | B1 | 9/2005 | Sim | |
| 6,973,679 | B1 | 12/2005 | Schad | |
| 7,007,312 | B1 | 3/2006 | Sim | |
| 7,155,751 | B2 | 1/2007 | Antunez | |
| 7,195,747 | B2 | 3/2007 | Vanden | |
| 7,214,537 | B2 | 5/2007 | Stevens | |
| 7,442,283 | B1 | 10/2008 | Gandhi | |
| 7,549,181 | B1 | 6/2009 | Davis et al. | |
| 7,603,726 | B2 | 10/2009 | Sawalski | |
| 7,604,719 | B2 | 10/2009 | Vanden | |
| 7,661,153 | B2 | 2/2010 | Nakamura | |
| 7,754,064 | B2 | 7/2010 | Buschmann | |
| 7,959,773 | B2 | 6/2011 | Hou | |
| 8,015,628 | B2 | 9/2011 | Campau et al. | |
| 8,032,956 | B2 | 10/2011 | Prokopenko | |
| 8,079,095 | B2 | 12/2011 | Jensen | |
| 8,095,997 | B2 | 1/2012 | Harris | |
| 8,226,899 | B2 | 7/2012 | Woodbridge | |
| 8,453,272 | B2 | 6/2013 | Sim | |
| 8,591,719 | B2 | 11/2013 | Faita | |
| 8,631,519 | B1 | 1/2014 | Belliard et al. | |
| 8,806,669 | B2 | 8/2014 | Halloran et al. | |
| 8,925,119 | B2 | 1/2015 | Burt | |
| 9,714,507 | B1 | 7/2017 | Snell | |
| 9,993,124 | B2 * | 6/2018 | Poleki | A47K 13/302 |
| 10,450,733 | B2 | 10/2019 | Luettgen et al. | |
| 10,544,574 | B2 | 1/2020 | Kuru et al. | |
| 11,419,464 | B2 * | 8/2022 | Thorne | E03D 9/005 |
| 11,596,281 | B2 * | 3/2023 | Tamura | E03D 9/005 |
| 2002/0119136 | A1 | 8/2002 | Johansen | |

(56) References Cited

U.S. PATENT DOCUMENTS

| | | | |
|---|---|---|---|
| 2002/0194670 | A1 | 12/2002 | Hashemi |
| 2004/0181865 | A1 | 9/2004 | Egeresi |
| 2004/0194196 | A1 | 10/2004 | Muderlak |
| 2004/0216221 | A1 | 11/2004 | Chen |
| 2005/0072665 | A1 | 4/2005 | Gomez |
| 2006/0065542 | A1 | 3/2006 | Nemeth et al. |
| 2006/0150311 | A1 | 7/2006 | Chang |
| 2007/0039087 | A1 | 2/2007 | Bringmann |
| 2007/0119699 | A1 | 5/2007 | Chambers et al. |
| 2007/0151013 | A1 | 7/2007 | Pace |
| 2007/0197388 | A1 | 8/2007 | Vunk et al. |
| 2007/0240252 | A1 | 10/2007 | Leonard et al. |
| 2008/0060947 | A1 | 3/2008 | Kitsuka et al. |
| 2008/0245684 | A1 | 10/2008 | Yeatman |
| 2008/0251373 | A1 | 10/2008 | Oke |
| 2008/0301866 | A1 | 12/2008 | Allard et al. |
| 2009/0074611 | A1 | 3/2009 | Monzyk et al. |
| 2009/0165823 | A1 | 7/2009 | Brown et al. |
| 2009/0212132 | A1 | 8/2009 | Simmonds et al. |
| 2009/0272654 | A1 | 11/2009 | Brown et al. |
| 2009/0311395 | A1 | 12/2009 | Cervin et al. |
| 2010/0006122 | A1 | 1/2010 | Brown et al. |
| 2010/0010285 | A1 | 1/2010 | Ebron et al. |
| 2011/0277227 | A1 | 11/2011 | Nonnenmacher |
| 2011/0318610 | A1 | 12/2011 | Rabaey et al. |
| 2012/0048744 | A1 | 3/2012 | Kim et al. |
| 2012/0058709 | A1 | 3/2012 | Fukushima et al. |
| 2012/0311775 | A1 | 12/2012 | Li et al. |
| 2013/0175373 | A1 | 7/2013 | Morgan et al. |
| 2013/0305445 | A1 | 11/2013 | Stammel et al. |
| 2014/0020164 | A1 | 1/2014 | Berry |
| 2015/0013057 | A1 | 1/2015 | Bucher et al. |
| 2015/0013058 | A1 | 1/2015 | Bucher et al. |
| 2015/0345123 | A1 | 12/2015 | Grover et al. |
| 2015/0354189 | A1 | 12/2015 | Kim |
| 2016/0280422 | A1 | 9/2016 | Dorrance |
| 2017/0058500 | A1 | 3/2017 | Garrels et al. |
| 2018/0028797 | A1* | 2/2018 | Schwab ................. A61M 11/08 |
| 2019/0360188 | A1 | 11/2019 | Moshe |
| 2020/0377288 | A1* | 12/2020 | Sylvia .................. B65D 83/386 |
| 2021/0361125 | A1 | 11/2021 | Racioppi et al. |
| 2023/0069531 | A1* | 3/2023 | Chen .................... A47K 13/302 |

FOREIGN PATENT DOCUMENTS

| | | | |
|---|---|---|---|
| DE | 80000249 | U1 | 6/1980 |
| DE | 19752069 | A1 | 6/1999 |
| EP | 0526077 | A1 | 2/1993 |
| EP | 2336434 | A1 | 6/2011 |
| EP | 3009573 | A1 | 4/2016 |
| FR | 2699572 | A1 | 6/1994 |
| GB | 264364 | A | 1/1927 |
| GB | 507908 | A | 6/1939 |
| WO | 0033716 | A1 | 6/2000 |
| WO | 03079955 | A1 | 10/2003 |
| WO | 03085214 | A1 | 10/2003 |
| WO | 2005038091 | A2 | 4/2005 |
| WO | 2005045145 | A1 | 5/2005 |
| WO | 2007149996 | A2 | 12/2007 |
| WO | 2008034633 | A2 | 3/2008 |
| WO | 2009068496 | A1 | 6/2009 |
| WO | 2010040164 | A1 | 4/2010 |
| WO | 2010139584 | A1 | 12/2010 |
| WO | 2010140471 | A1 | 12/2010 |
| WO | 2011016206 | A1 | 2/2011 |
| WO | 2011114105 | A1 | 9/2011 |
| WO | 2012058709 | A1 | 5/2012 |
| WO | 2013045895 | A1 | 4/2013 |

OTHER PUBLICATIONS

Chinese Office Action for Chinese Application No. 201810593842.0 dated Jun. 2, 2020.

European Office Action for European Application No. 18 168 653.6-1002 dated May 20, 2020.

European Office Action for European Application No. 18 168 655.1-1002 dated Mar. 9, 2020.

European Office Action for European Application No. 18 168 664.3-1002 dated Mar. 26, 2021.

European Office Action from European Patent Application No. 18168653.6, dated May 24, 2022, 5 pages.

European Office Action from European Patent Application No. 18168664.3, dated Jul. 8, 2022, 4 pages.

European Search Report re Application No. 18168653; 9 pages.

European Search Report re Application No. 18168655 dated Aug. 29, 2018; 9 pages.

European Search Report re Application No. 18168662.7 dated Sep. 5, 2018; 9 pages.

European Search Report re Application No. 18168664; 9 pages.

Extended European Search Report from European Patent Application No. 23185389.6, dated Oct. 25, 2023, 8 pages.

International Search Report and Written Opinion Issued in Application No. PCT/US2016/048419.

European Office Action for European Application No. 23 185 389.6 mailed Feb. 6, 2026 (5 pages).

* cited by examiner 3054
3053
3091
3062
3096
3061
3052
3093
3095
3092
3075
3055
3094
3063

3051
3072
3054
3081
56D
3071
3075
3055
56D 3051
3057
3058
3073
3082
3053
3054
3052

3051
3057
3054
3052

FIG. 78
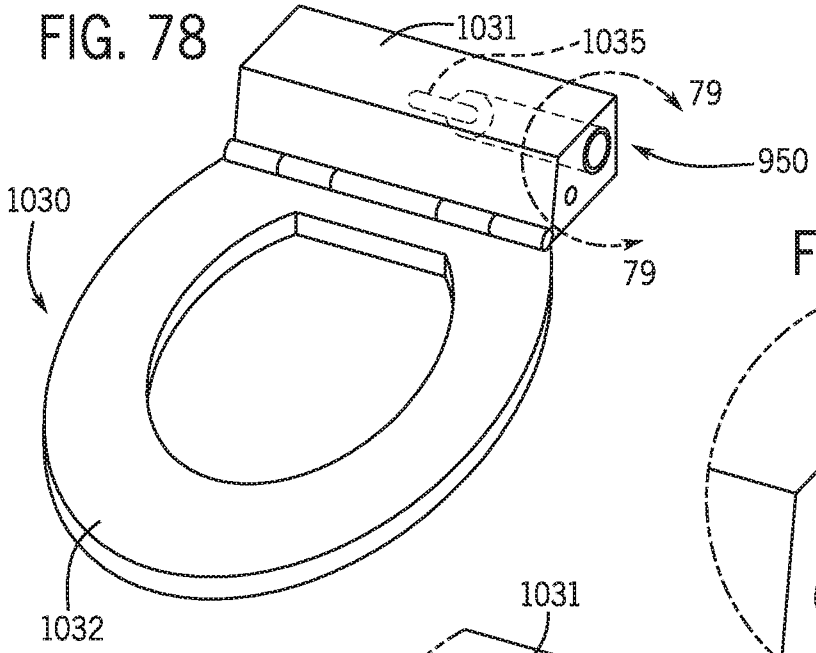
FIG. 79A
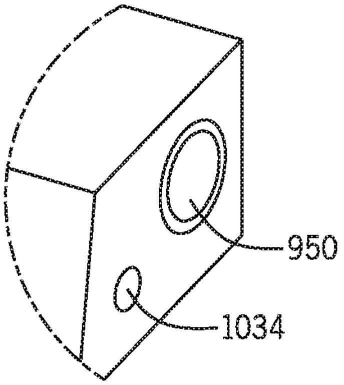
FIG. 79B
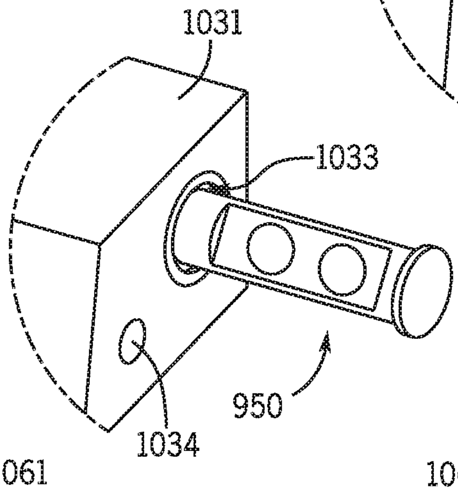
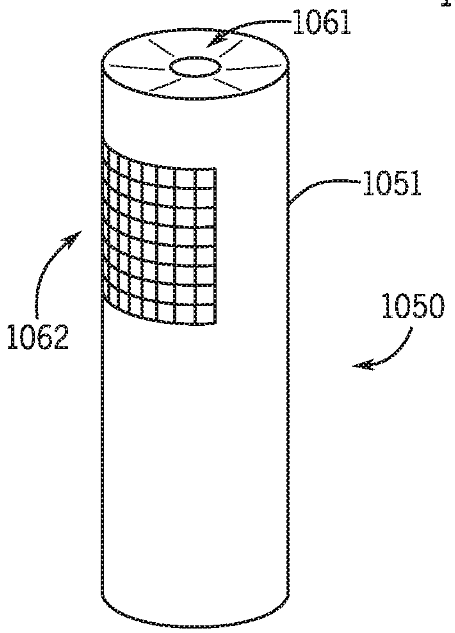
FIG. 80A
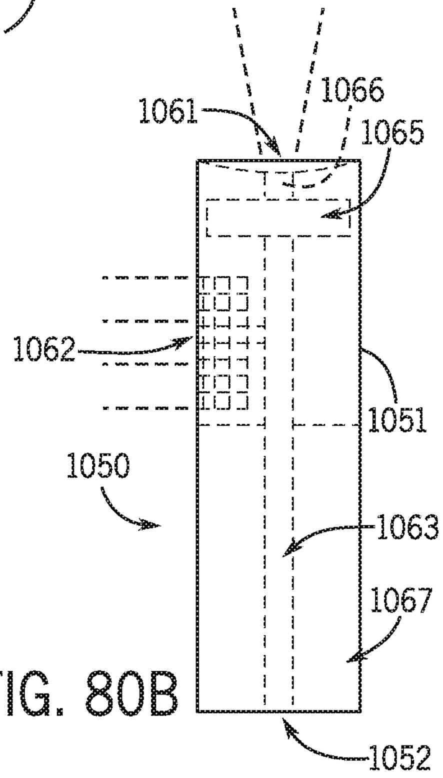
FIG. 80B FIG. 82
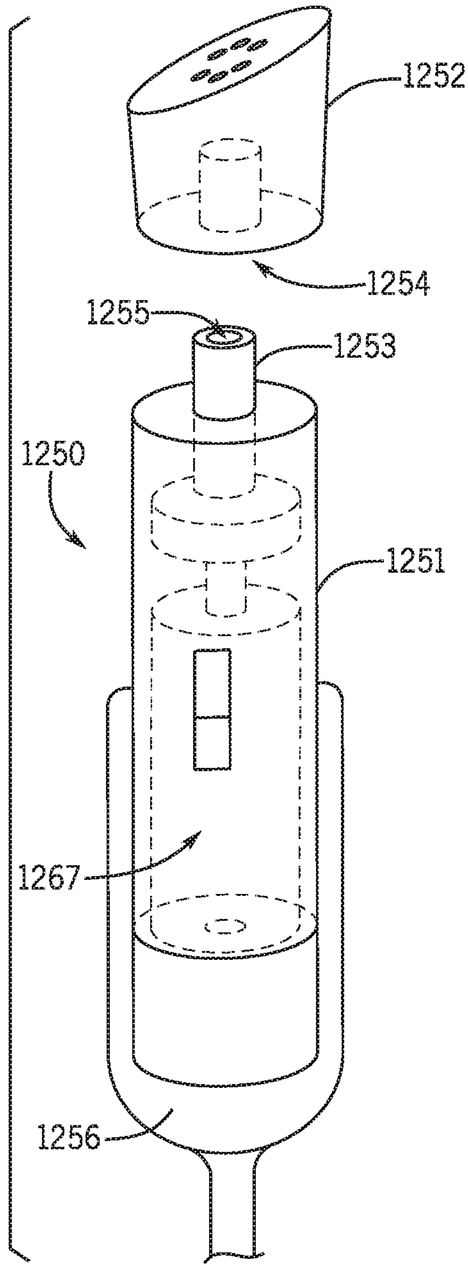
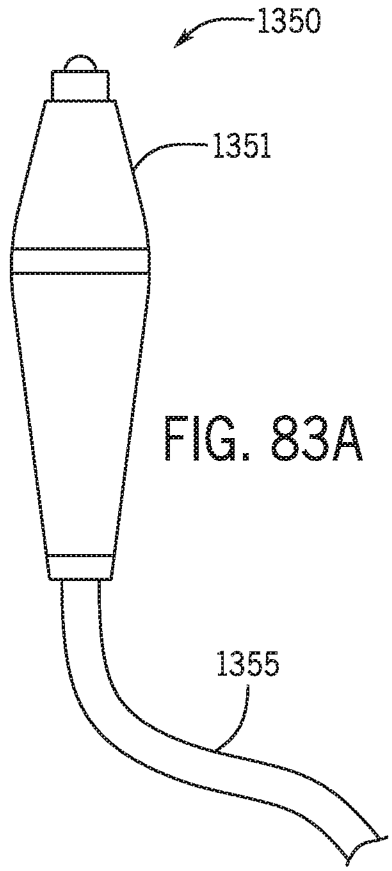
FIG. 83A
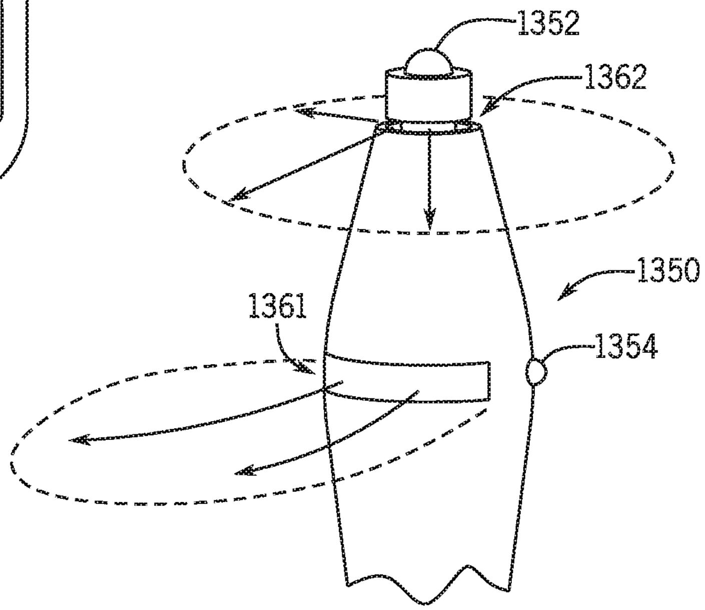
FIG. 83B

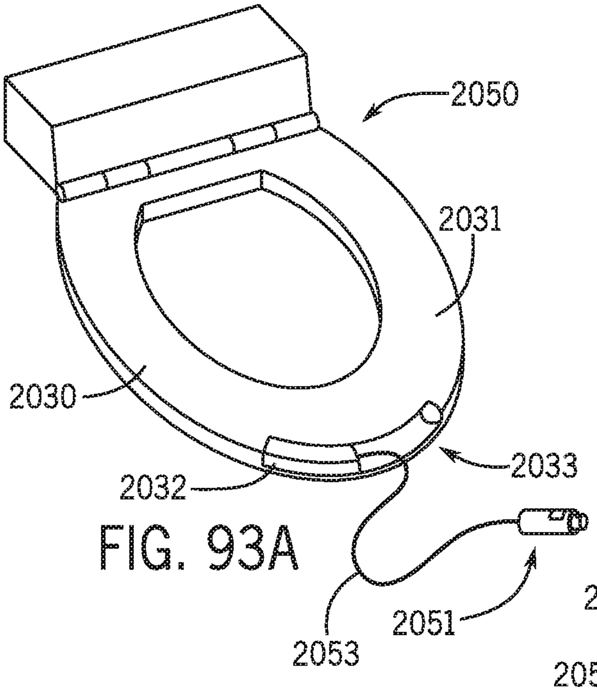
FIG. 93A
FIG. 93B
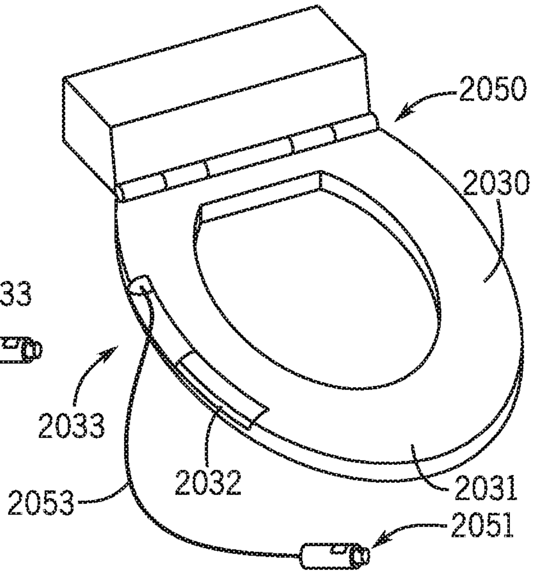
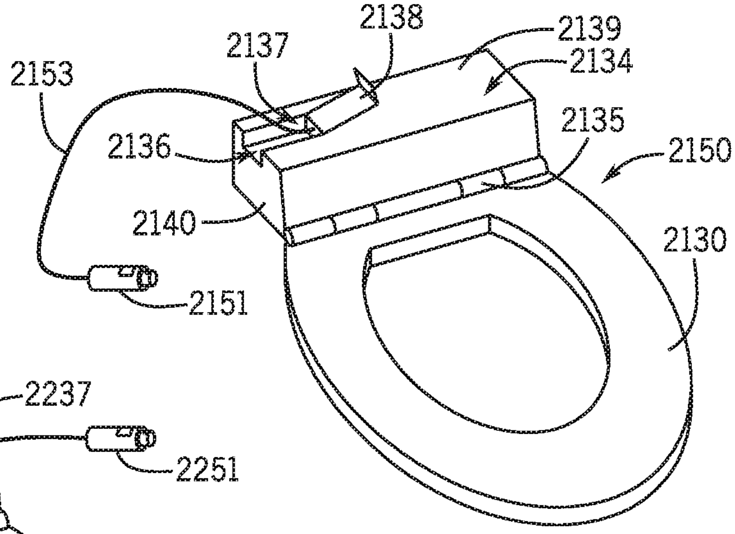
FIG. 94
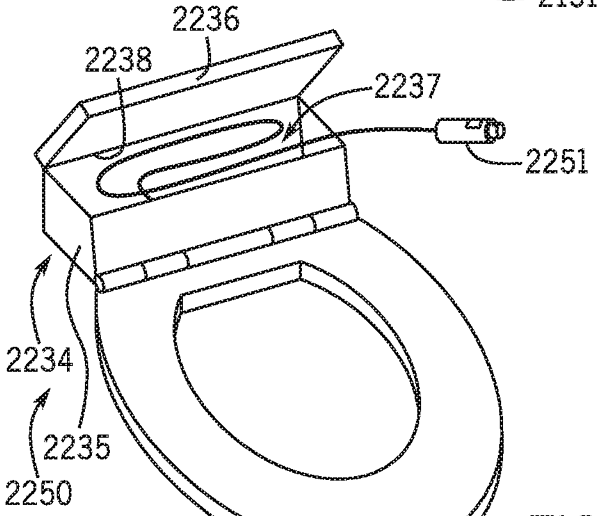
FIG. 95

CLEAN TOILET AND ACCESSORIES

CROSS-REFERENCE TO RELATED PATENT APPLICATIONS

This application is a Continuation of U.S. patent application Ser. No. 18/390,863 filed Dec. 20, 2023, which is a Continuation of U.S. patent application Ser. No. 18/141,779 filed May 1, 2023, which is a Continuation of U.S. patent application Ser. No. 17/388,582 filed Jul. 29, 2021, which is a Continuation of U.S. patent application Ser. No. 16/565,311 filed Sep. 9, 2019, which is a Continuation of U.S. patent application Ser. No. 15/900,933, filed on Feb. 21, 2018, which is a Continuation of International (PCT) Application No. PCT/US2016/048419, filed on Aug. 24, 2016, which claims the benefit of and priority to U.S. Provisional Patent Application No. 62/209,198, filed on Aug. 24, 2015. The foregoing applications are incorporated by reference herein in their entireties.

BACKGROUND

This application relates generally to the field of cleaning systems for use with toilets and accessories thereof. More specifically, this application relates to cleaning systems configured to dispense cleaning compounds for use in and around toilets and accessories thereof to improve the cleanliness in and around the toilets.

Overtime from use, scale (e.g., urine scale), minerals, bacteria, and other undesirable deposits (e.g., biofilm) build-up on the surfaces of toilets and, in particular, on the inner surfaces of the bowl and trapway. Moreover, these deposits may become lodged in small imperfections in the inner surfaces of the toilet, which may be a vitreous material. These built-up deposits can lead to undesirable odors and stains, as well as harbor germs and bacteria. It would be advantageous to provide a toilet having cleaning systems (e.g., internal, external) that provide improved cleanliness to address the aforementioned problems, such as prohibiting or reducing scale and/or providing odor abatement.

Additionally, external surfaces of toilets, accessories for use with toilets (e.g., toilet paper holders), and users of toilets come into contact with germs and bacteria, such as through contact with the toilet and use thereof. It would be advantageous to provide a toilet and/or accessory that includes a cleaning system to provide improved cleanliness for the toilet, accessory, and/or user.

SUMMARY

At least one embodiment relates to a toilet that includes a bowl, a tank configured to hold water, and a flush valve within the tank. The flush valve includes a valve body fluidly connecting the tank and the bowl, a float moveable relative to the valve body to open and close the flush valve, and a guide member coupled to the valve body for guiding movement of the float, where the guide member includes a chamber that is configured to hold a cleaning compound including a chemical compound and water. The cleaning compound is configured to be dispensed into the bowl through the valve body with the flush valve open.

An end of the guide member may be directly coupled to the valve body and the chamber of the guide member is fluidly connected to an inner chamber of the valve body.

The flush valve may include a dispenser fluidly connected to the chamber of the guide member that is configured to selectively dispense the cleaning compound toward the bowl through an inner chamber of the valve body. The dispenser may include a body, at least one nozzle through which the cleaning compound is dispensed, and a fluid passage through the body fluidly connecting the at least one nozzle and the chamber of the guide member.

The toilet may include a fill valve that is disposed in the tank. The fill valve may include an inlet for receiving water from a source and a fluid conduit supplying water to the flush valve. The chamber of the guide member may be a longitudinal bore extending through an end of the guide member that is opposite the valve member, where the fluid conduit supplies the water to a supply ring that is coupled to the end of the guide member, and the supply ring supplies water to the chamber of the guide member.

The toilet may include a sensor, which may be disposed in the flush valve to measure a concentration of the cleaning compound and communicates the measured concentration to a controller. The toilet may include an indicator having a light source, where the light source is illuminated by a signal from the controller based on the concentration of the cleaning compound. The light source may be illuminated upon the concentration of the cleaning compound falling below a threshold concentration. The toilet may include a lid that is configured to be removably coupled to the tank for concealing the contents of the tank. The light source may be disposed on the lid. The controller may be coupled to the lid and may communicate with the sensor wirelessly. The lid may include a user interface for adjusting the concentration of the cleaning compound.

At least one embodiment relates to a toilet that is configured to receive water from a water supply. The toilet includes a bowl; a tank configured to retain the water; a fill valve disposed in the tank and configured to receive the water; a container disposed in the tank and fluidly connected to the fill valve to receive the water, where the container is configured to contain a chemical compound; a flush valve that is connected to the container to receive the chemical compound and the water. The flush valve includes a movable member and a valve body fluidly connecting the bowl and the tank. The movable member is configured to move relative to the valve body to open the flush valve to dispense an amount of the chemical compound and the water to the bowl through the valve body.

The container may be supported by a wall of the tank. The toilet may include a housing mounted to the wall and configured to retain the container; an inlet line fluidly connecting the fill valve with an inlet of the container; and an outlet line fluidly connecting an outlet of the container with the flush valve. The toilet may include a diffusing tube that is fluidly connected to the inlet line and the outlet line, where the diffusing tube includes a plurality of spaced apart openings fluidly connecting an inside of the tube to a reservoir of the container containing the chemical compound. The toilet may include a strainer that is disposed in the reservoir of the container, where the strainer is configured to contain the chemical compound and where the strainer includes at least one hole to fluidly communicate the chemical compound with the water in the reservoir. The toilet may include a cap that couples to and decouples from an inlet of the container through an attachment feature, where the strainer is removable from the container with the cap decoupled from the inlet. The toilet may include a removable shroud covering an opening in the tank to conceal the fill valve and the flush valve in the tank, the shroud including an opening for accessing the cap without removing the shroud from the tank; and a removable lid covering the shroud.

The toilet may include a controller that is configured to control the volume of the cleaning compound. The controller may be configured to control a concentration of the cleaning compound by controlling at least one of a volume in a reservoir of the container, a flow rate of the chemical compound and the water from the container, or a volume of the chemical compound in the reservoir.

BRIEF DESCRIPTION OF THE DRAWINGS

FIG. 74 is a partial cross-sectional view of another exemplary embodiment of a dispenser for use with a dispensing system.

FIG. 75 is a perspective view of another exemplary embodiment of a dispenser of a dispensing system with a toilet.

FIG. 76 is a perspective view of the dispenser of the dispensing system shown in FIG. 75.

FIG. 77A is another perspective view of the dispenser shown in FIG. 76.

FIG. 77B is a plan view of the dispenser shown in FIG. 76 showing the dual dispensing capability of the dispenser.

FIG. 78 is a perspective view of another exemplary embodiment of a dispenser of a dispensing system integrated with a toilet.

FIG. 79A is a detail view of a portion of the system shown in FIG. 78 showing the dispenser in a retracted position.

FIG. 79B is a detail view of a portion of the system shown in FIG. 78 showing the dispenser in an extracted position.

FIG. 80A is a perspective view of another dispenser, such as for use in the system shown in FIG. 78.

FIG. 80B is a side view of the dispenser shown in FIG. 80A.

FIG. 81A is a perspective view of another exemplary embodiment of a dispenser for use with a dispensing system.

FIG. 81B is a perspective view of the dispenser shown in FIG. 81A.

Figure 81A:
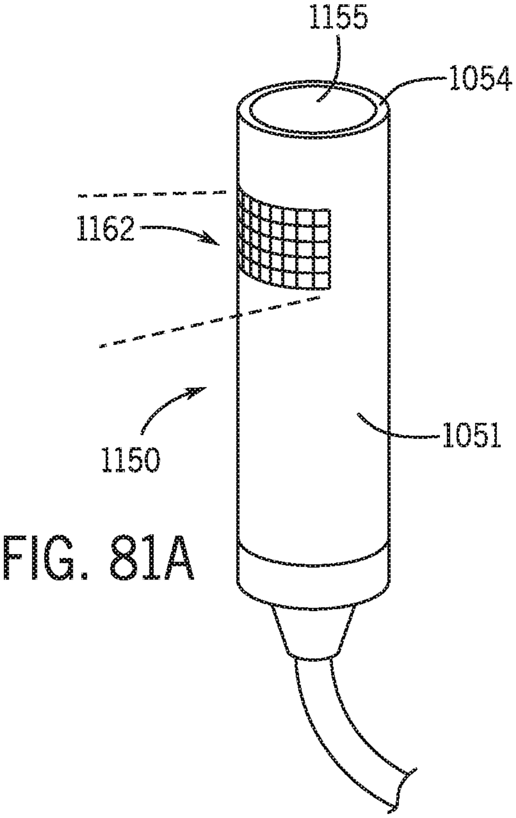
Figure 81B:
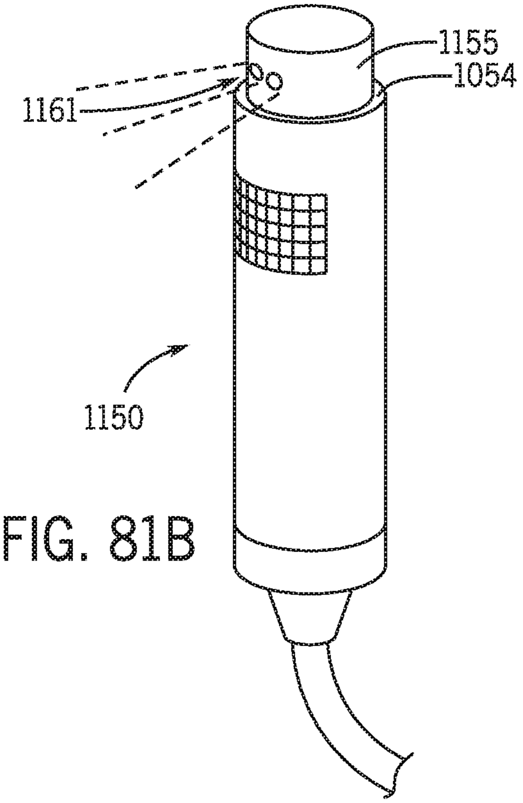
Figure 81C:
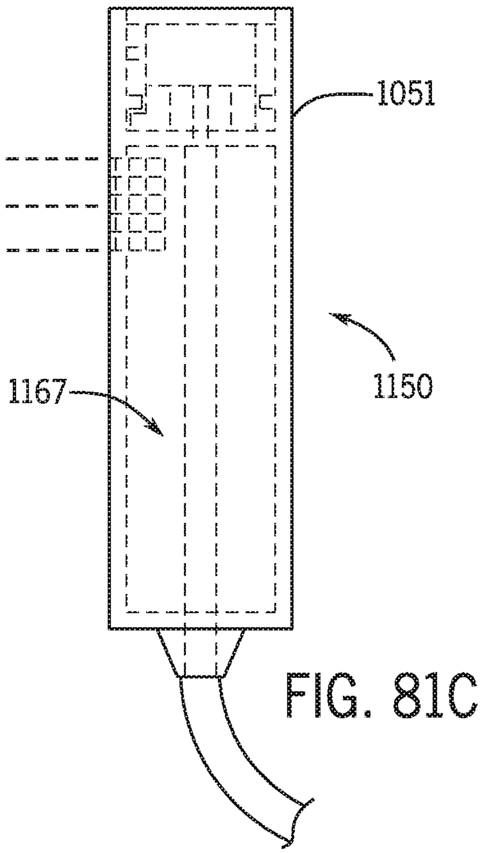

FIG. 81C is a side view of the dispenser shown in FIG. 81A.

Figure 81D:
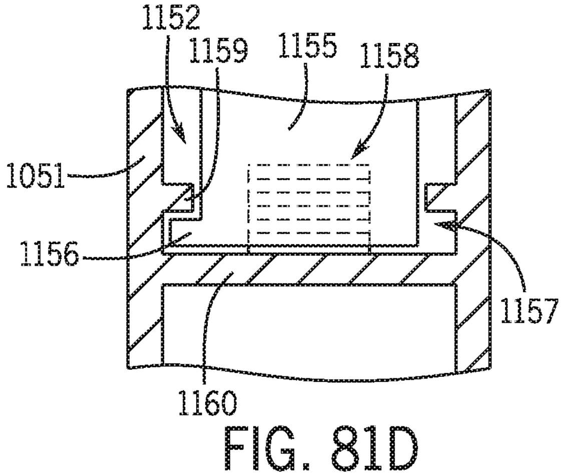

FIG. 81D is a detail view of a portion of the dispenser shown in FIG. 81C.

FIG. 82 is a perspective view of another exemplary embodiment of a dispenser for use with a dispensing system.

FIG. 83A is a side view of another exemplary embodiment of a dispenser for use with a dispensing system.

FIG. 83B is a perspective view of the dispenser shown in FIG. 83A.

Figure 84A:
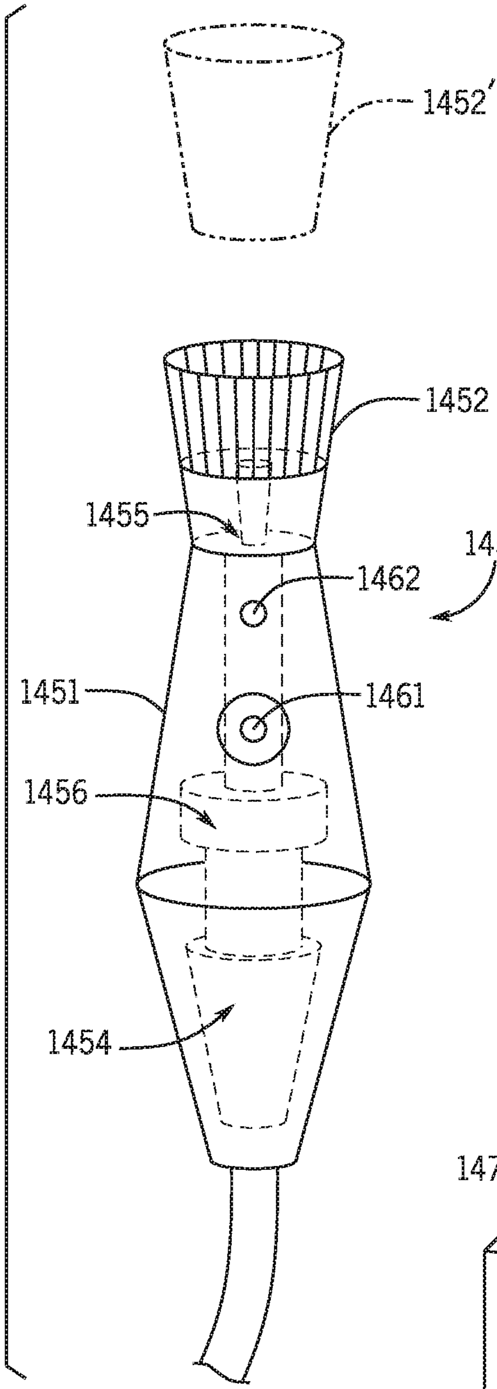

FIG. 84A is a perspective view of another exemplary embodiment of a dispenser for use with a dispensing system.

Figure 84B:
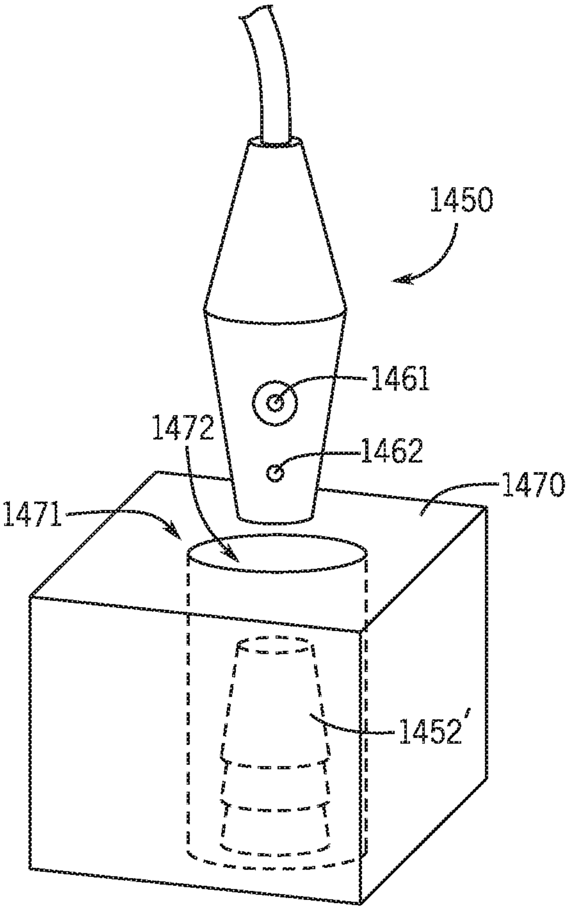

FIG. 84B is a perspective view of the dispensing system shown in FIG. 84A.

Figure 85:
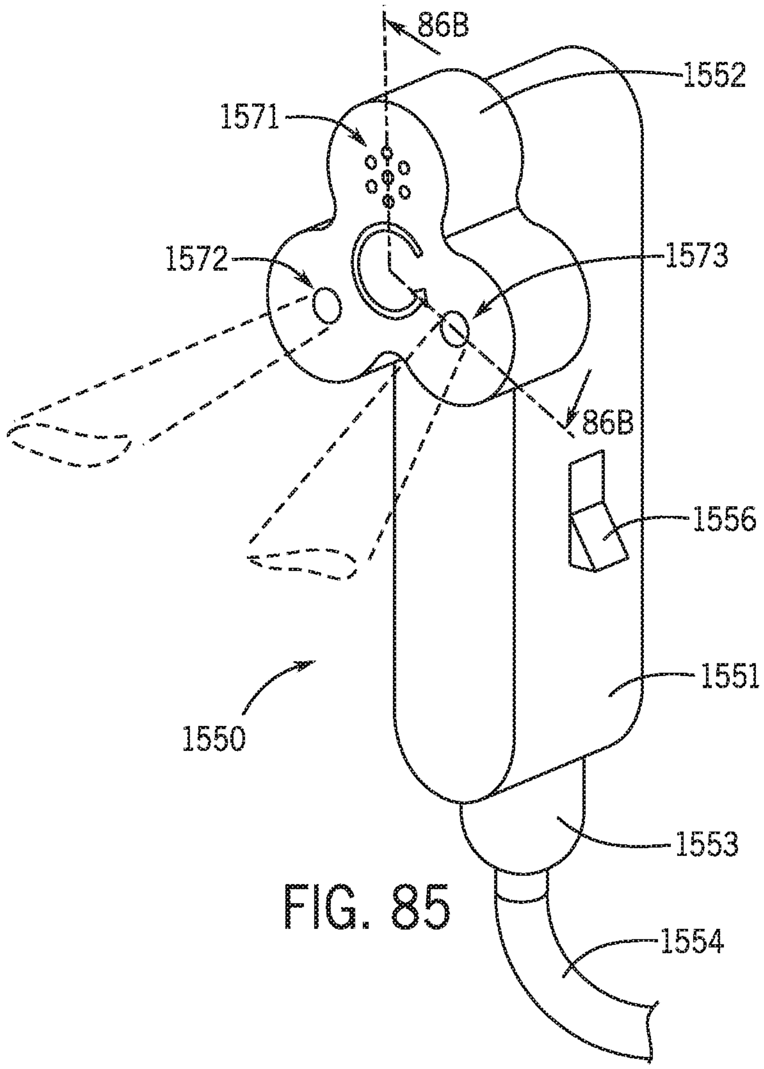

FIG. 85 is a perspective view of another exemplary embodiment of a dispenser for use with a dispensing system.

Figure 86A:
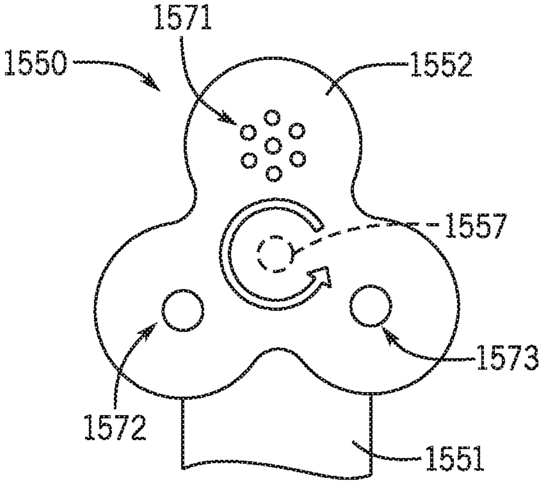

FIG. 86A is a front view of a portion of the dispenser shown in FIG. 85.

Figure 86B:
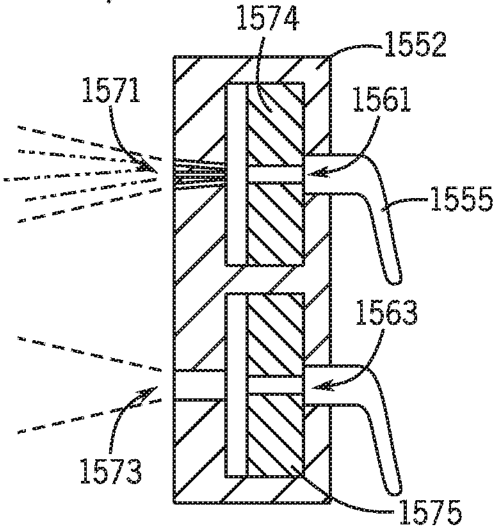

FIG. 86B is a cross-sectional view of the dispenser shown in FIG. 85.

Figure 87A:
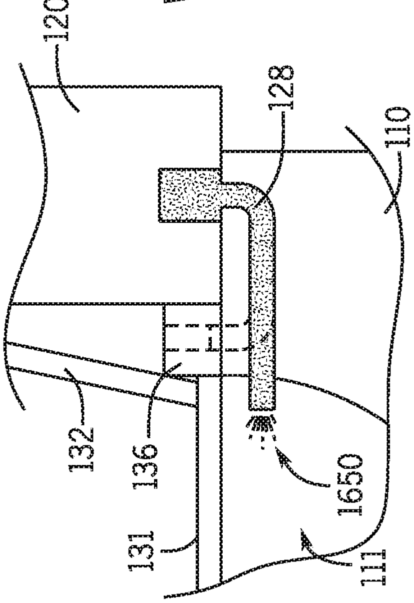

FIG. 87A illustrates a mode of operation of a dispensing system integrated with a toilet.

Figure 87B:
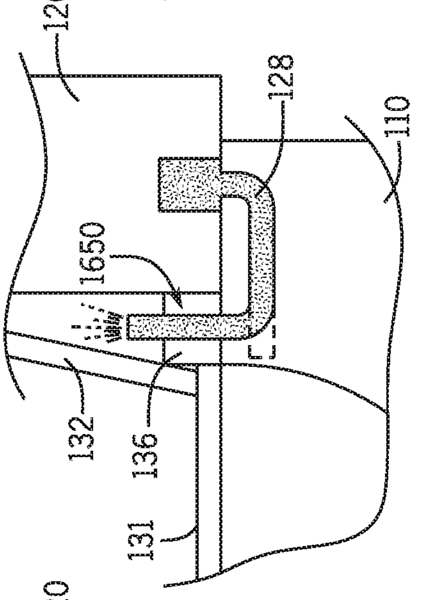

FIG. 87B illustrates a mode of operation of the dispensing system integrated with the toilet shown in FIG. 87A.

Figure 87C:
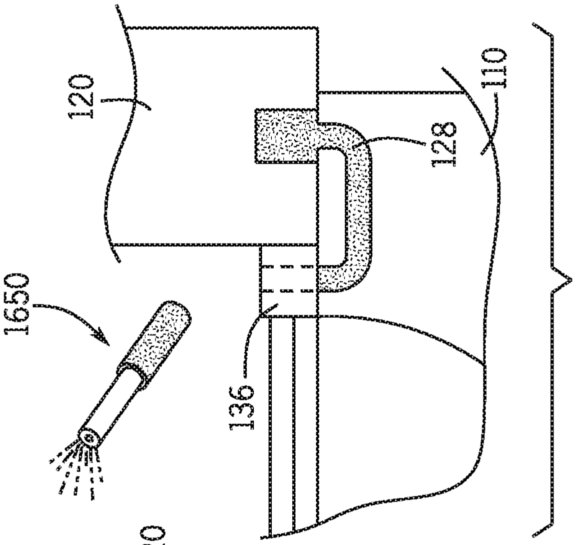

FIG. 87C illustrates a mode of operation of the dispensing system integrated with the toilet shown in FIG. 87A.

Figure 88:
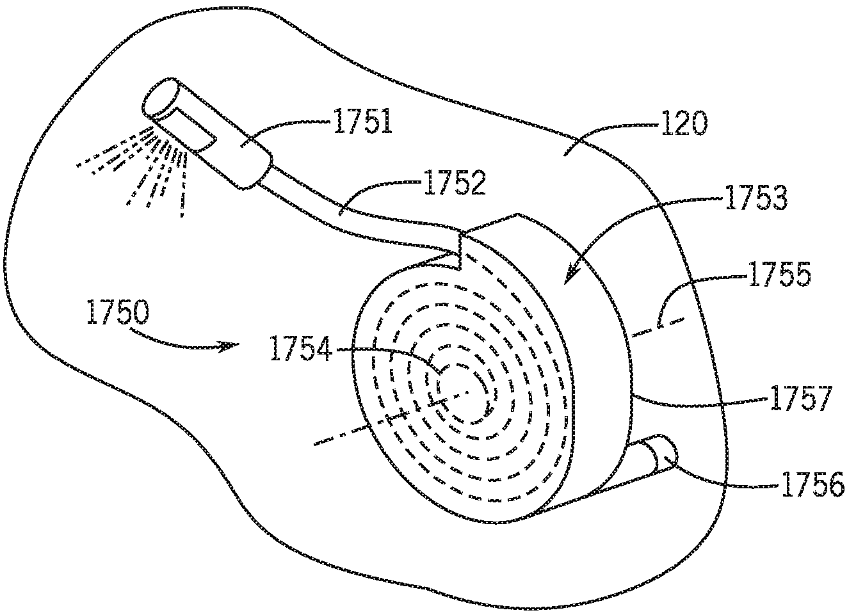

FIG. 88 includes several views of another exemplary embodiment of a dispensing system for use with a toilet.

Figure 89:
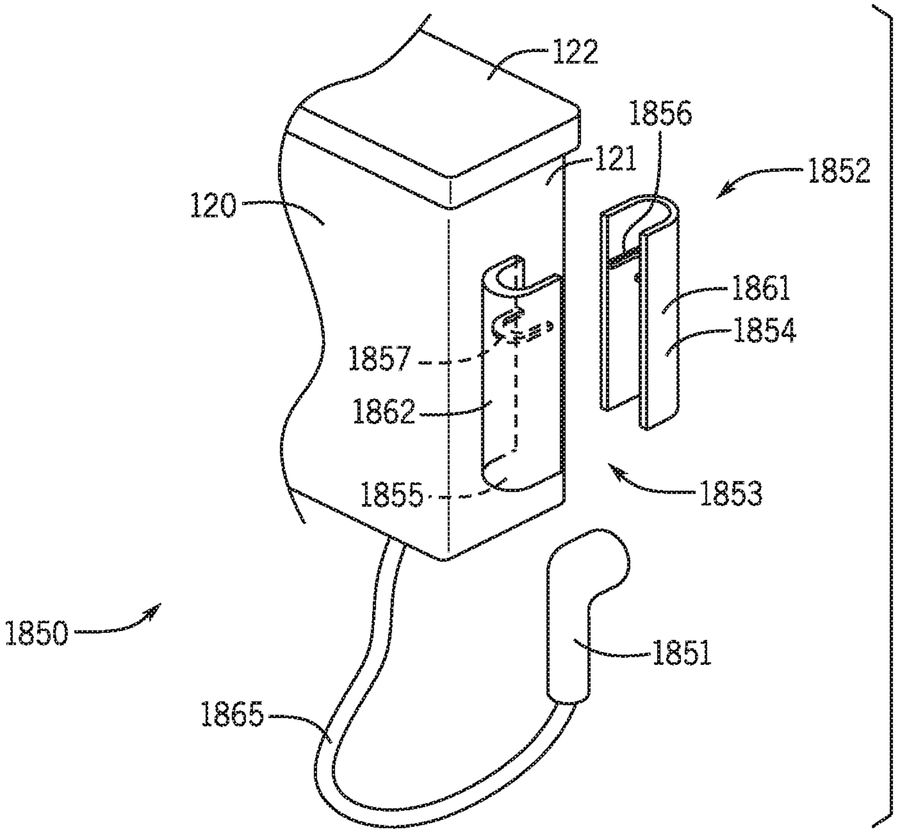

FIG. 89 is a perspective view of another exemplary embodiment of a dispensing system integrated with a toilet.

Figure 90:
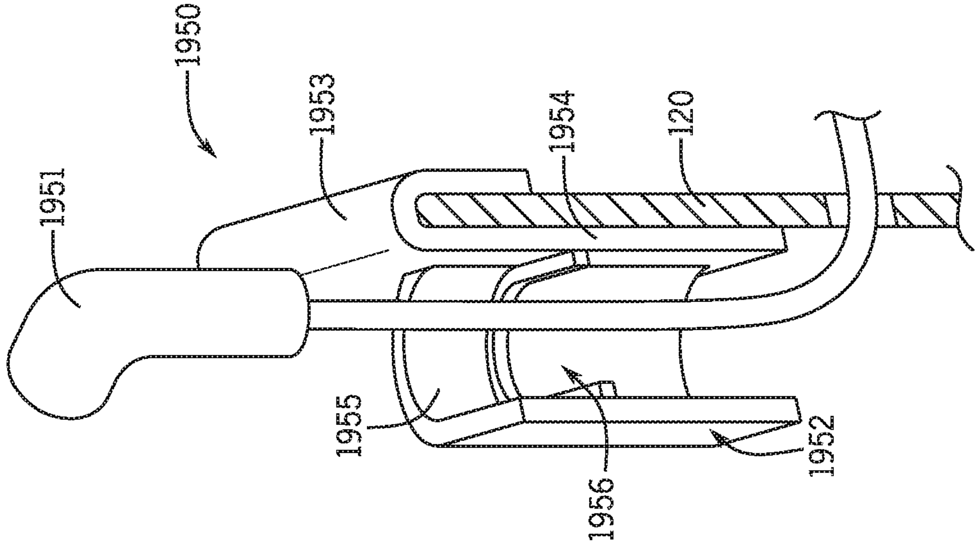

FIG. 90 is a perspective view of another exemplary embodiment of a dispensing system integrated with a toilet.

Figure 91:
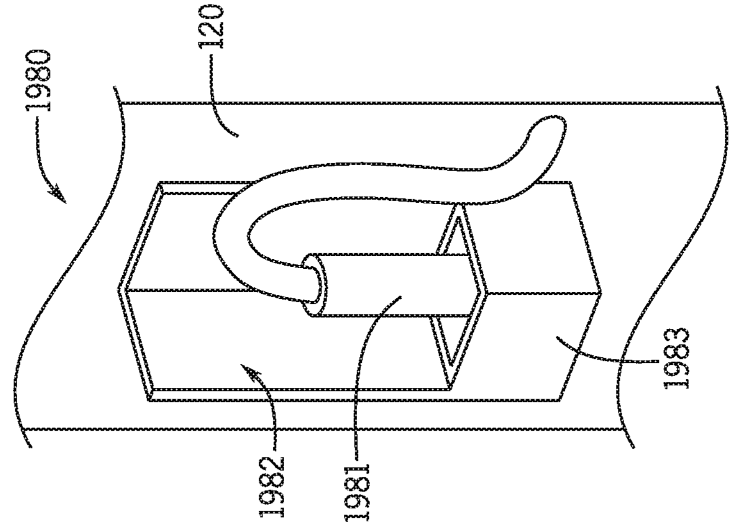

FIG. 91 is a perspective view of another exemplary embodiment of a dispensing system integrated with a toilet.

Figure 92:
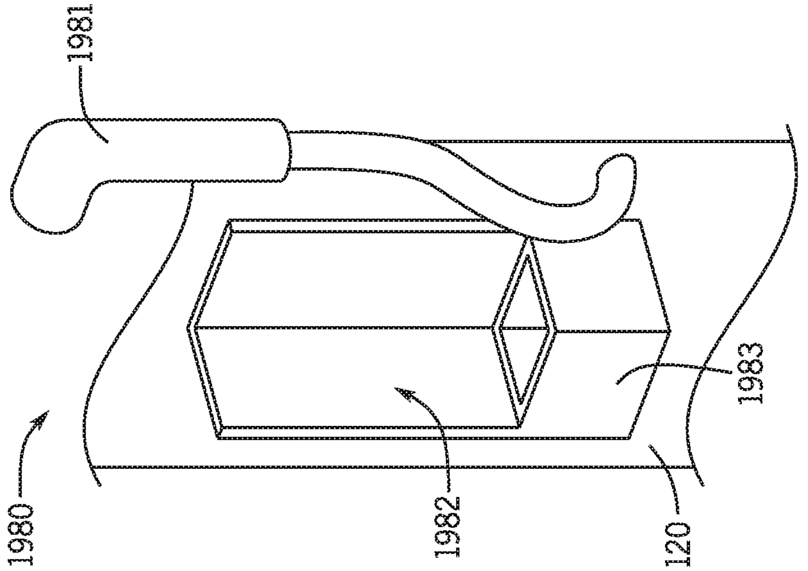

FIG. 92 is another perspective view of the system shown in FIG. 91.

FIG. 93A is a perspective of another exemplary embodiment of a dispensing system integrated with a toilet seat assembly.

FIG. 93B is a perspective view of another dispensing system integrated with a toilet assembly.

FIG. 94 is a perspective view of another exemplary embodiment of a dispensing system integrated with a toilet seat assembly.

FIG. 95 is a perspective view of yet another exemplary embodiment of a dispensing system integrated with a toilet seat assembly.

Figure 96A:
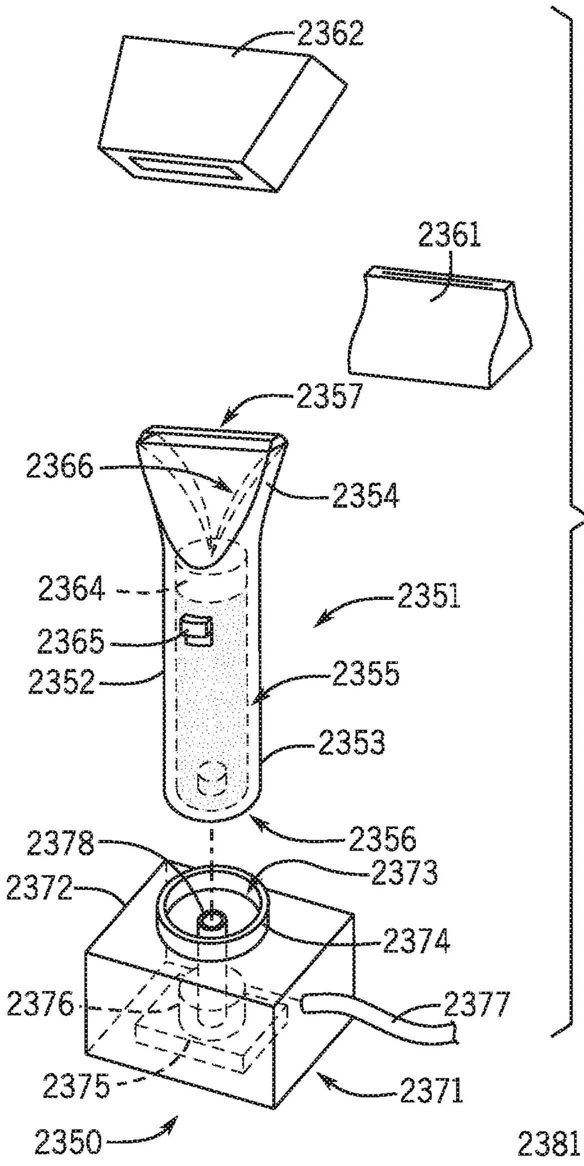

FIG. 96A is a partially exploded perspective view of an exemplary embodiment of a dispensing system including a dispenser and a chemical generator.

Figure 96B:
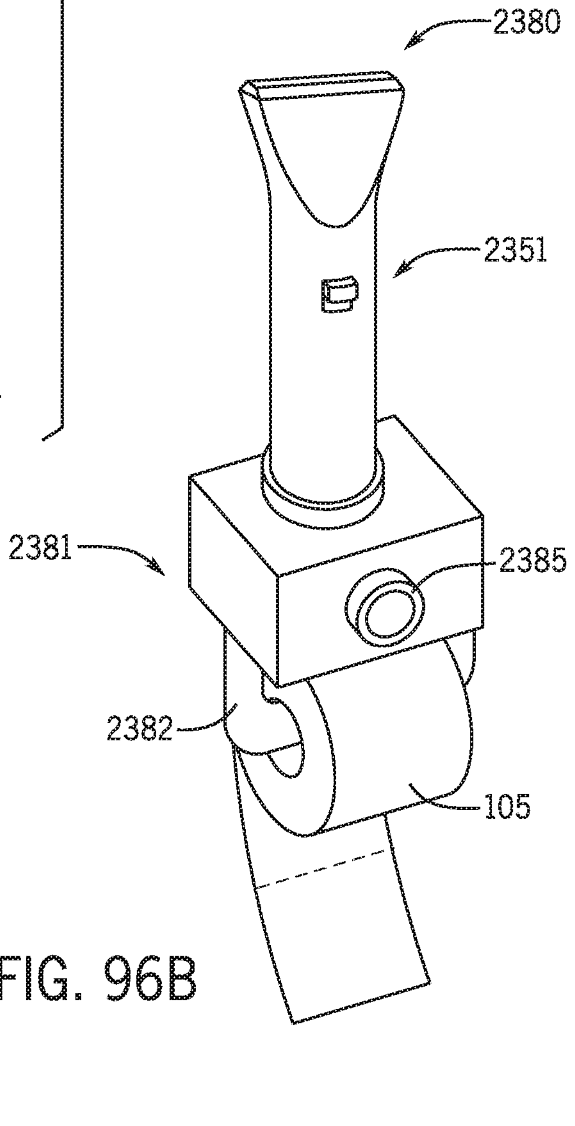

FIG. 96B is a perspective view of the dispenser shown in FIG. 96A integrated with a paper dispenser.

Figure 97A:
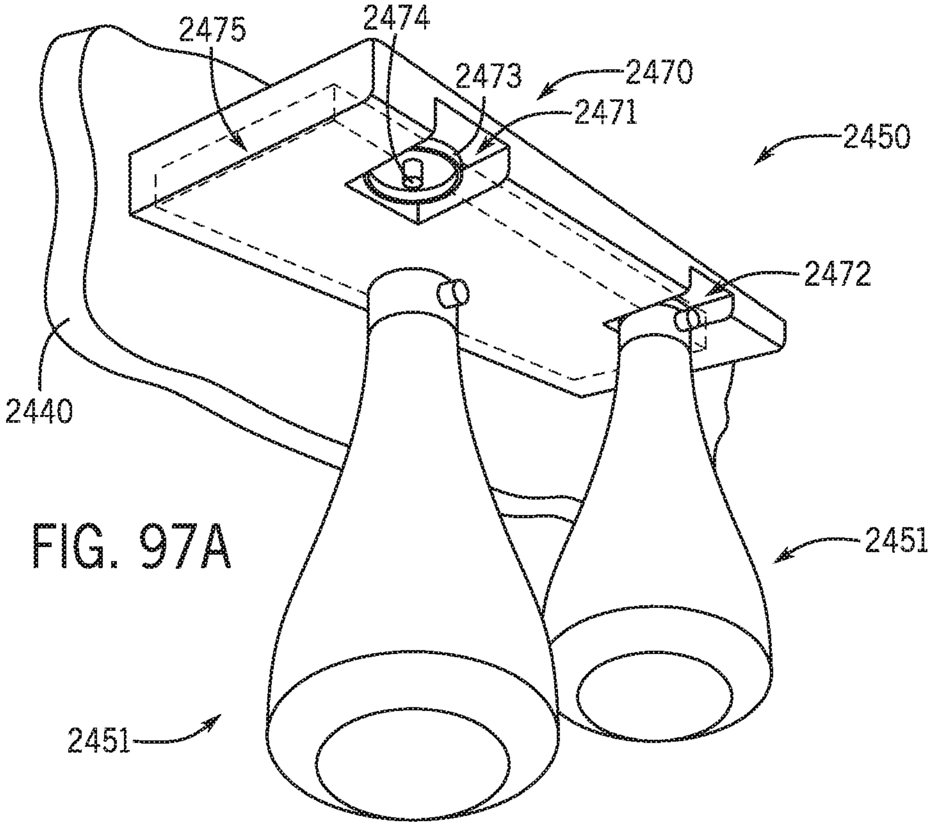

FIG. 97A is a perspective view of another exemplary embodiment of a dispensing system including a dispenser and a chemical generator.

Figure 97B:
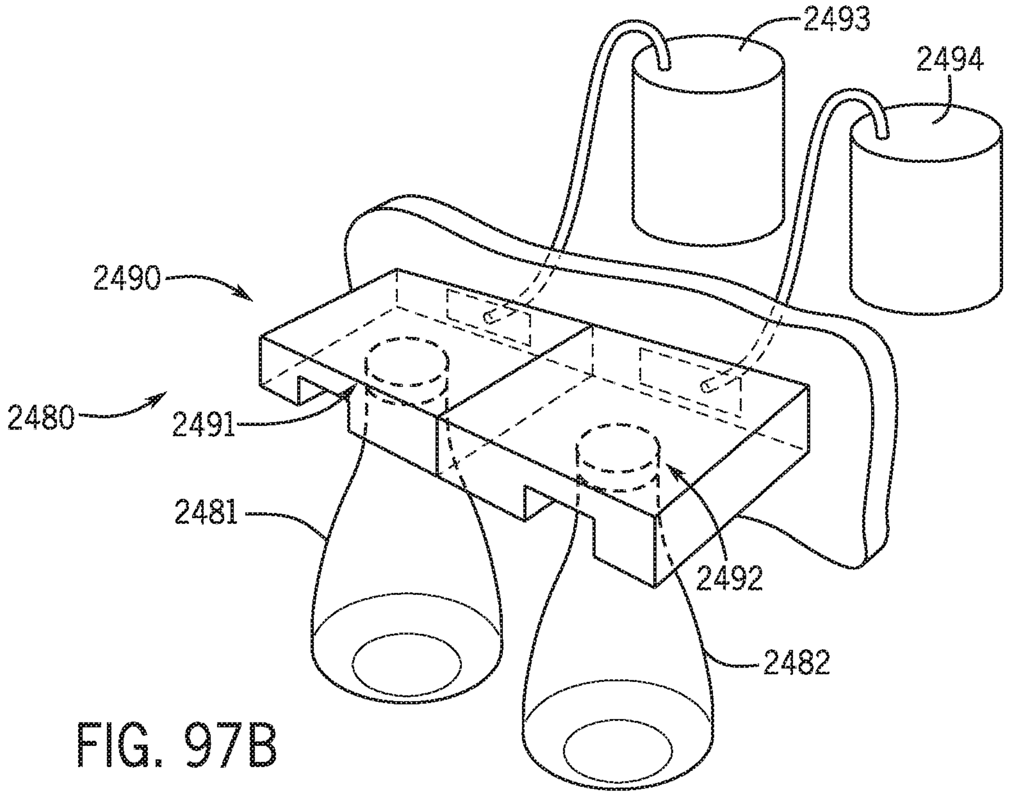

FIG. 97B is a perspective view of another exemplary embodiment of a dispensing system including a dispenser and a chemical generator.

Figure 98A:
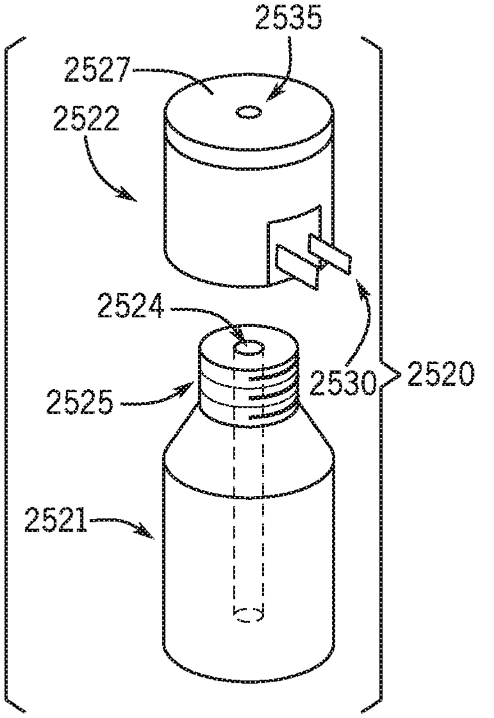

FIG. 98A is a partially exploded perspective view of another exemplary embodiment of a dispenser with a chemical generator.

Figure 98B:
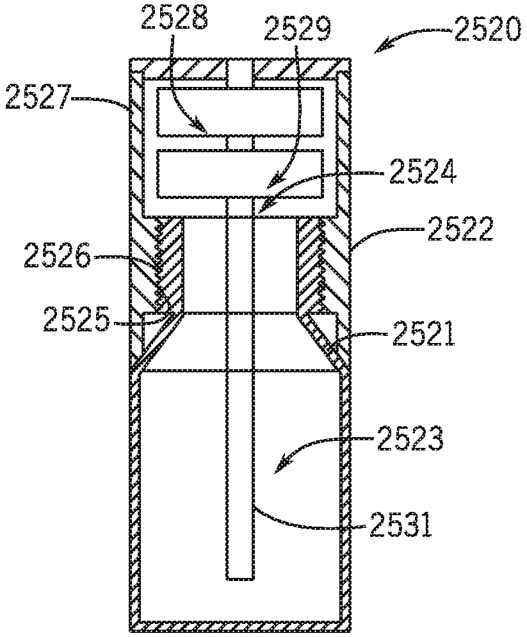

FIG. 98B is a cross-sectional view of the dispenser shown in FIG. 98A.

Figure 99A:
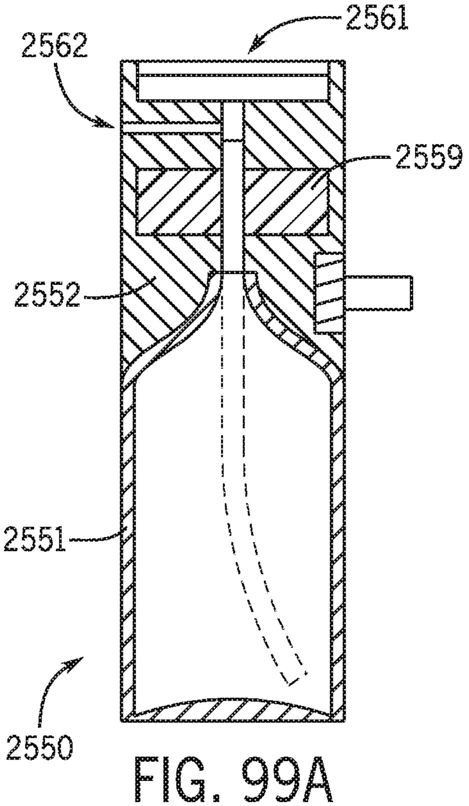

FIG. 99A is a side cross-sectional view of another exemplary embodiment of a dispenser with a chemical generator.

Figure 99B:
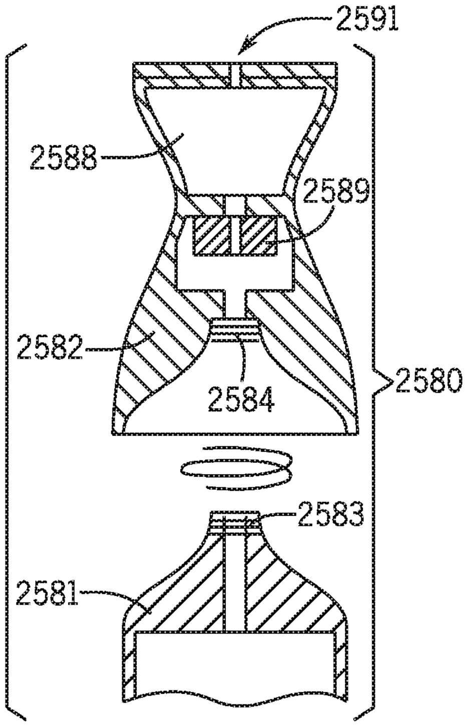

FIG. 99B is a partially exploded side cross-sectional view of another dispenser including a chemical generator.

Figure 100:
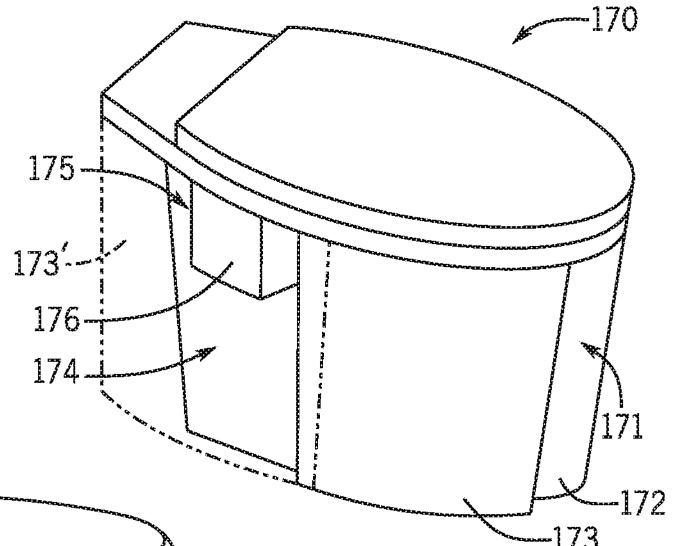

FIG. 100 is a perspective view of an exemplary embodiment of toilet including a system configured to use a cleaning compound, such as flow beads.

Figure 101:
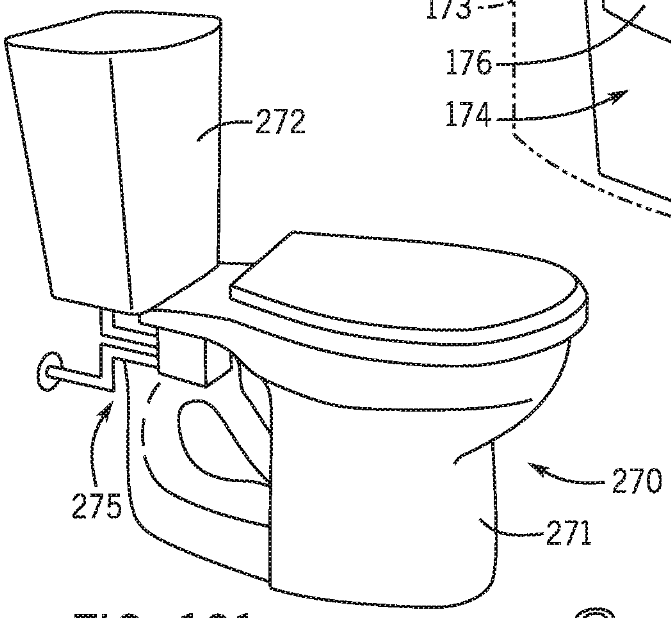

FIG. 101 is a perspective view of another exemplary embodiment of a toilet including a flow bead system configured to use a cleaning compound.

Figure 102:
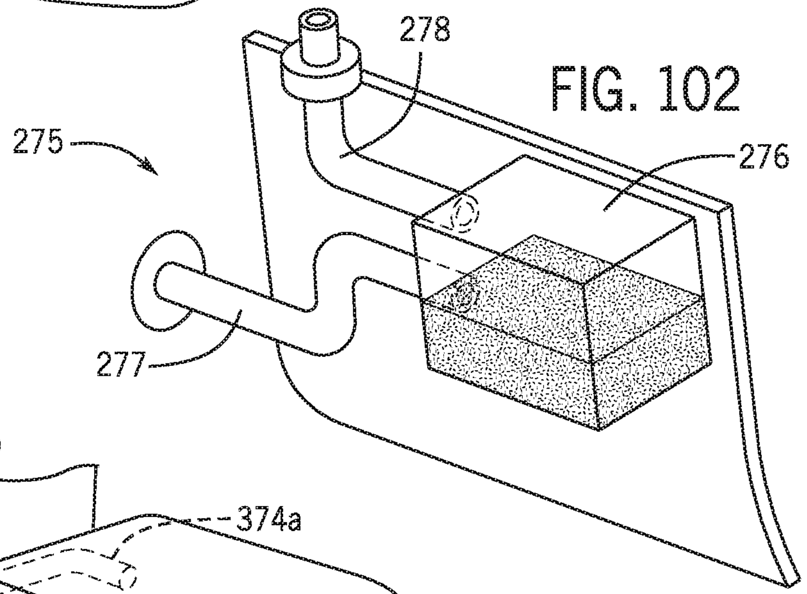

FIG. 102 is a perspective view of the flow bead assembly shown in FIG. 101.

Figure 103:
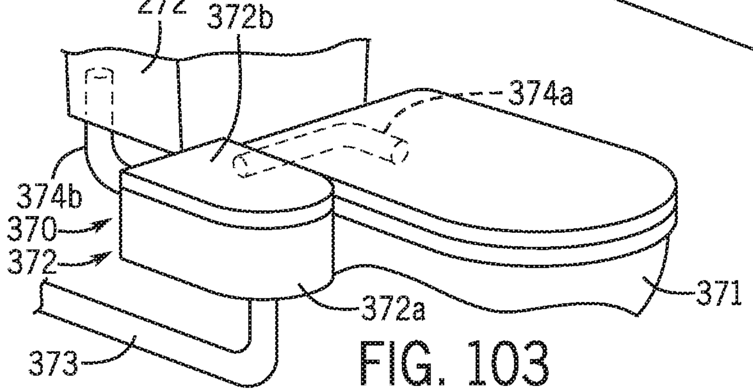

FIG. 103 includes perspective views of another exemplary embodiment of a system configured to use a cleaning compound, such as flow beads.

Figure 104:
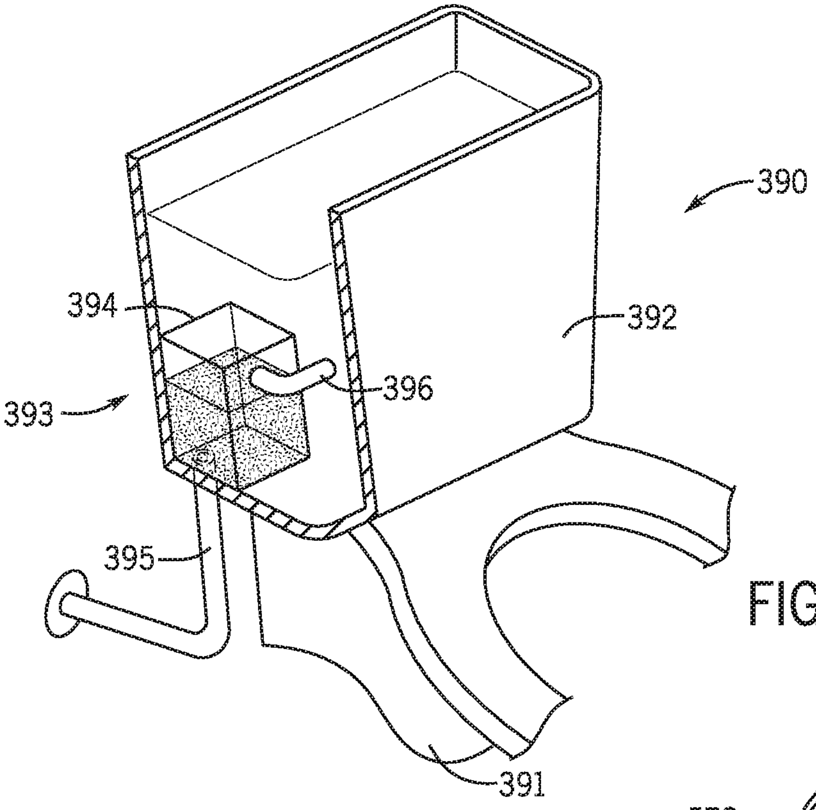

FIG. 104 is a perspective view of another exemplary embodiment of a flow bead assembly for a toilet and configured to use a cleaning compound.

Figure 105A:
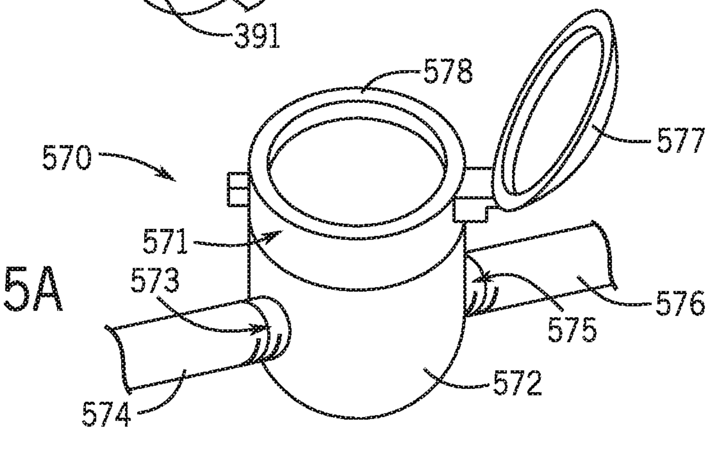

FIG. 105A is a perspective view of another exemplary embodiment of a system configured to use a cleaning compound, such as flow beads.

Figure 105B:
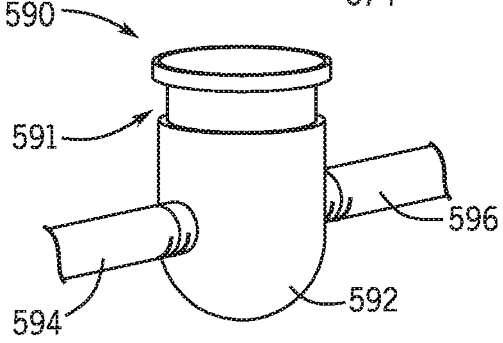

FIG. 105B is another perspective view of the system shown in FIG. 105A.

Figure 105C:
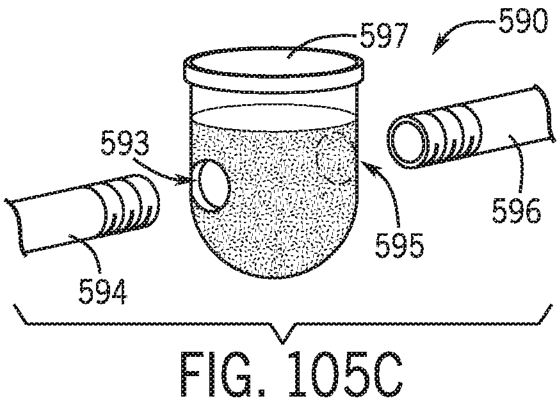

FIG. 105C is a partially exploded perspective view of the system shown in FIG. 105A.

Figure 106A:
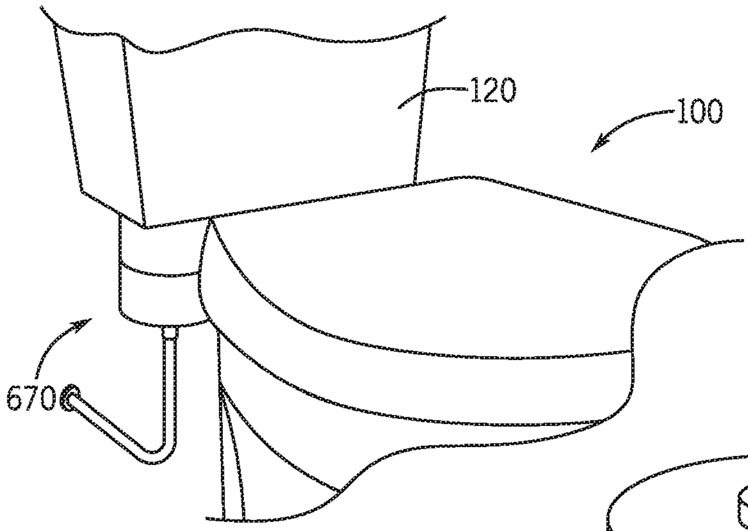

FIG. 106A is a perspective view of another exemplary embodiment of a toilet including a system configured to use a cleaning compound, such as flow beads.

Figure 106B:
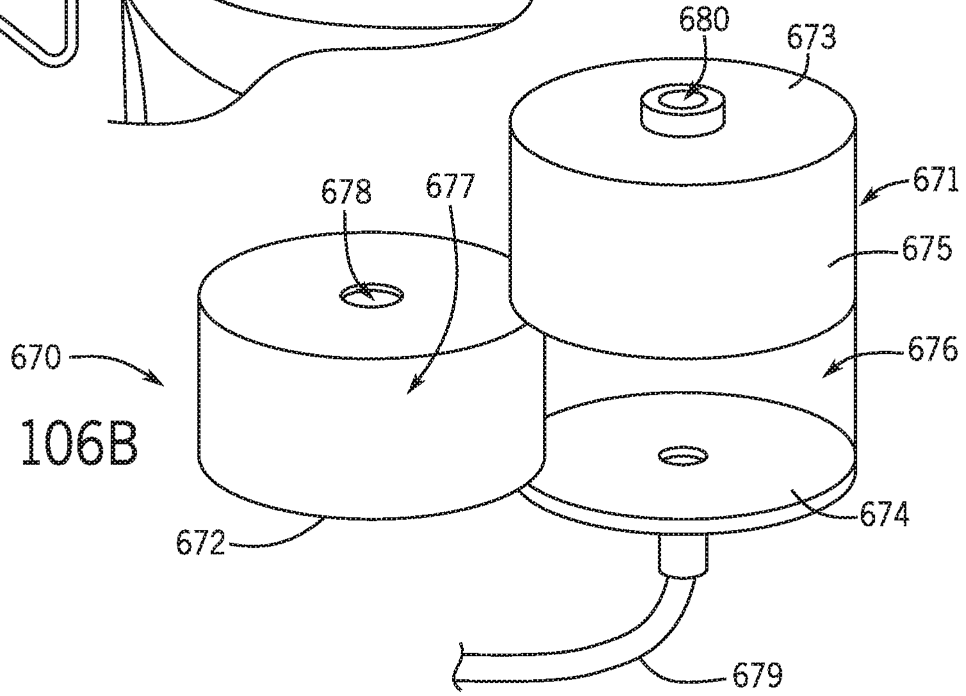

FIG. 106B is a perspective view of the system shown in FIG. 106A.

Figure 107A:
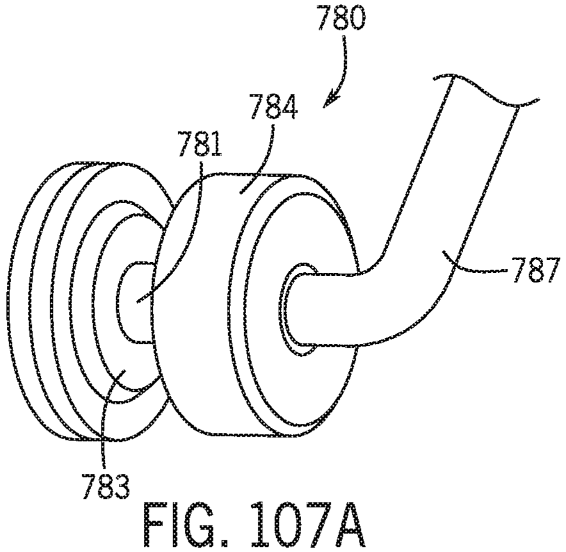

FIG. 107A is a perspective view of another exemplary embodiment of a system configured to use a cleaning compound, such as flow beads.

Figure 107B:
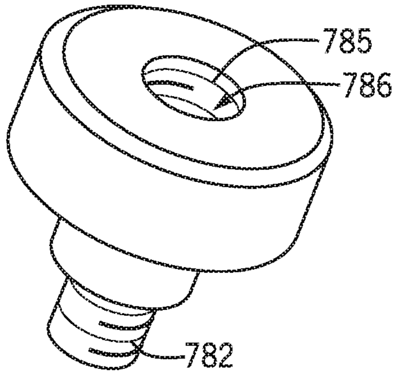

FIG. 107B is a perspective view of the system shown in FIG. 107A.

Figure 108A:
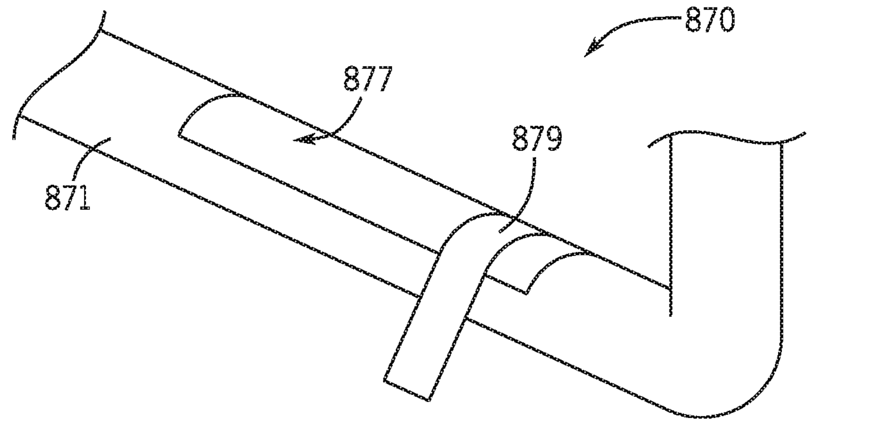

FIG. 108A is a perspective view of another exemplary embodiment of a system configured to use a cleaning compound, such as flow beads.

Figure 108B:
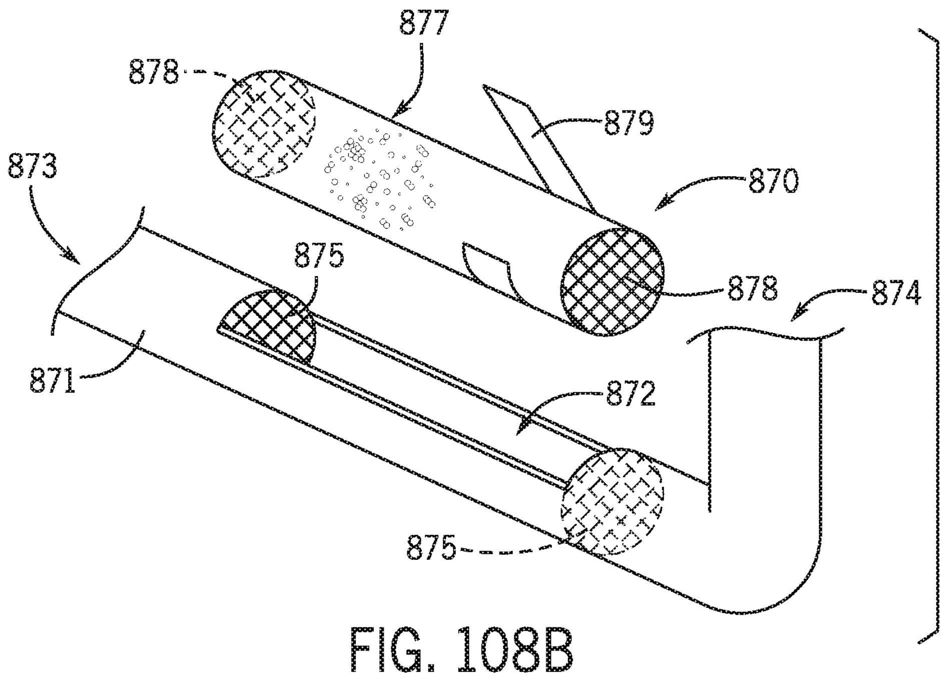

FIG. 108B is a partially exploded perspective view of the system shown in FIG. 108A.

Figure 109A:
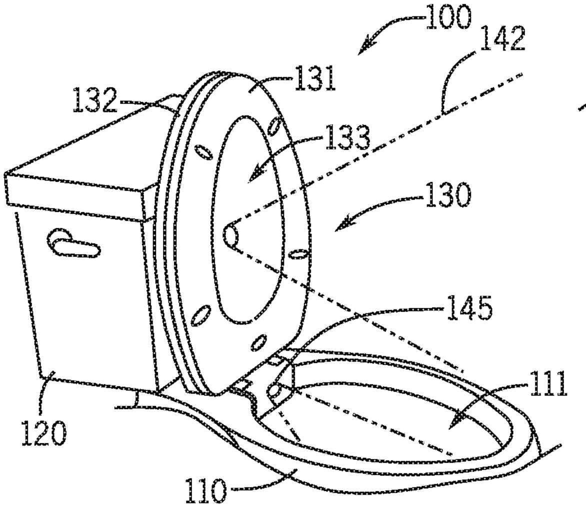

FIG. 109A is a perspective view of an exemplary embodiment of a toilet system with integrated sensors for use with systems, such as cleaning systems.

Figure 109B:
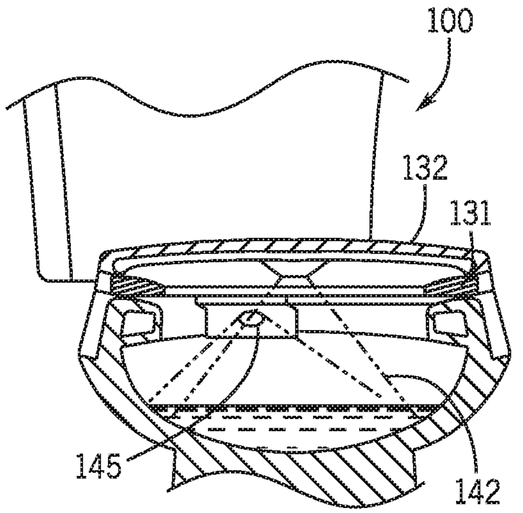

FIG. 109B is a front-perspective partial cross-sectional view of the toilet system shown in FIG. 109A.

Figure 110A:
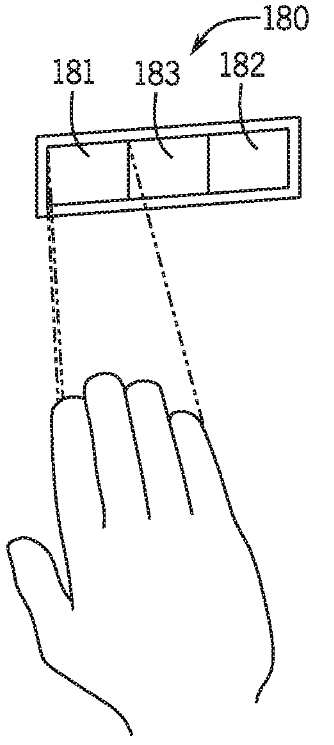

FIG. 110A is a perspective view of sensors for use with cleaning systems.

Figure 110B:
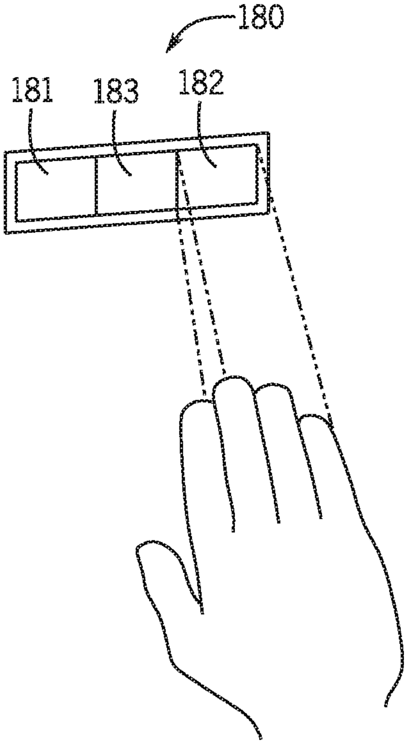

FIG. 110B is another perspective view of sensors for use with cleaning systems.

Figure 111:
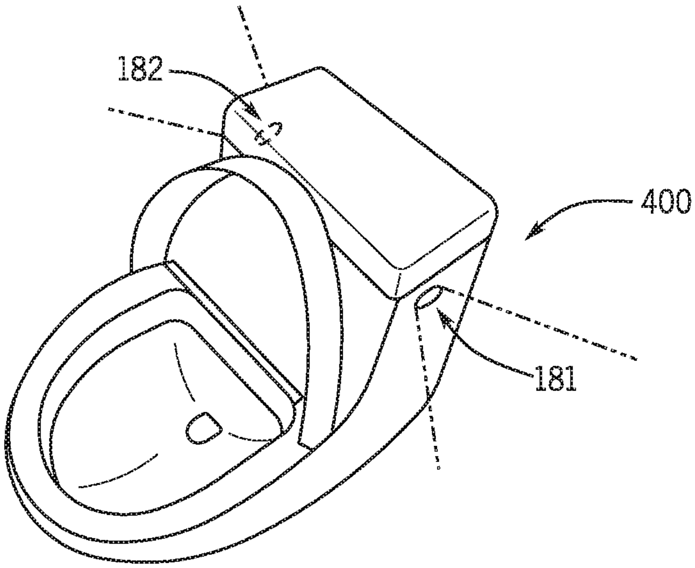

FIG. 111 is a perspective view of an exemplary embodiment of a toilet with integrated sensors for use with cleaning systems.

Figure 112:
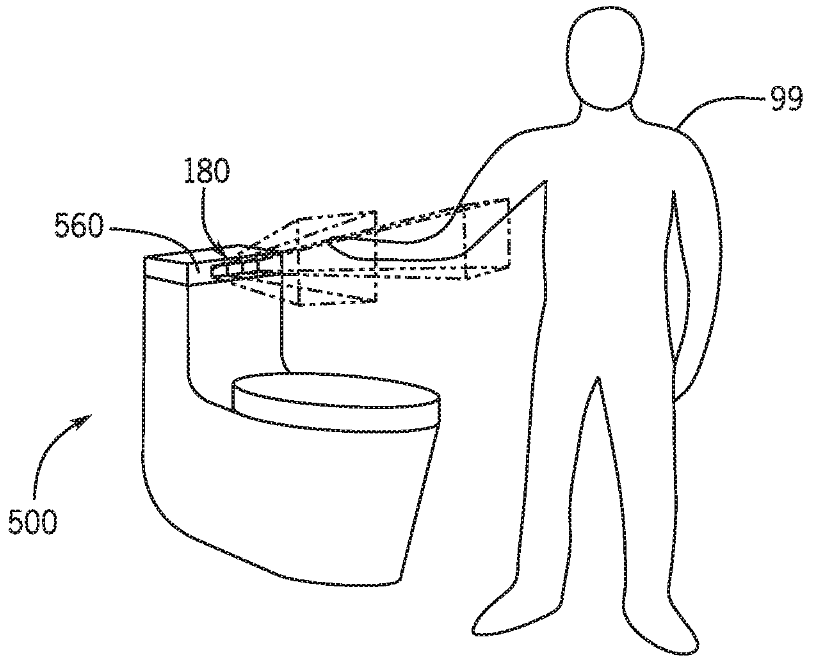

FIG. 112 is a perspective view of an exemplary embodiment of a toilet with an integrated sensor for use with cleaning systems.

Figure 113B:
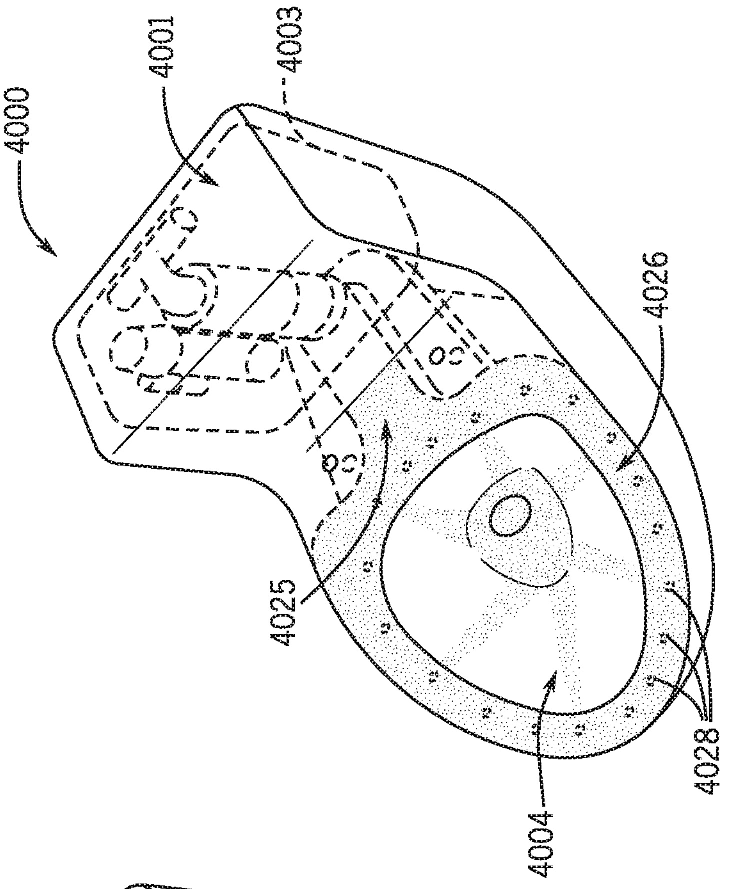
Figure 113A:
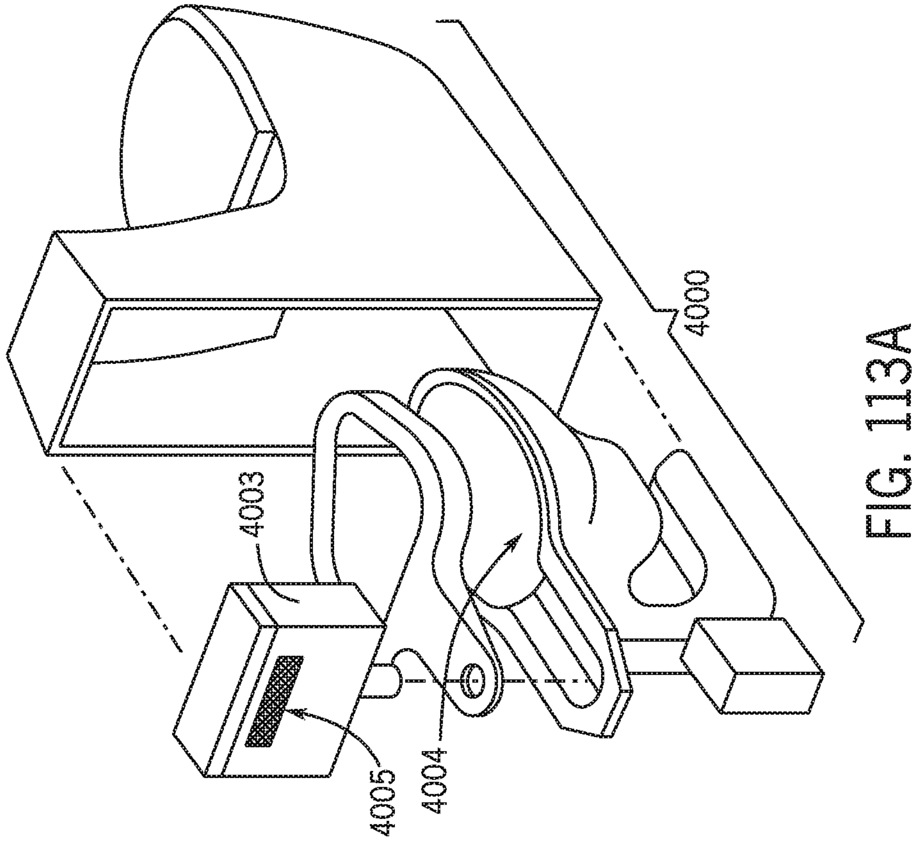

FIG. 113A is an exploded perspective view of a toilet including an exemplary embodiment of a cleaning system.

FIG. 113B is another perspective view of the toilet shown in FIG. 113A.

Figure 113D:
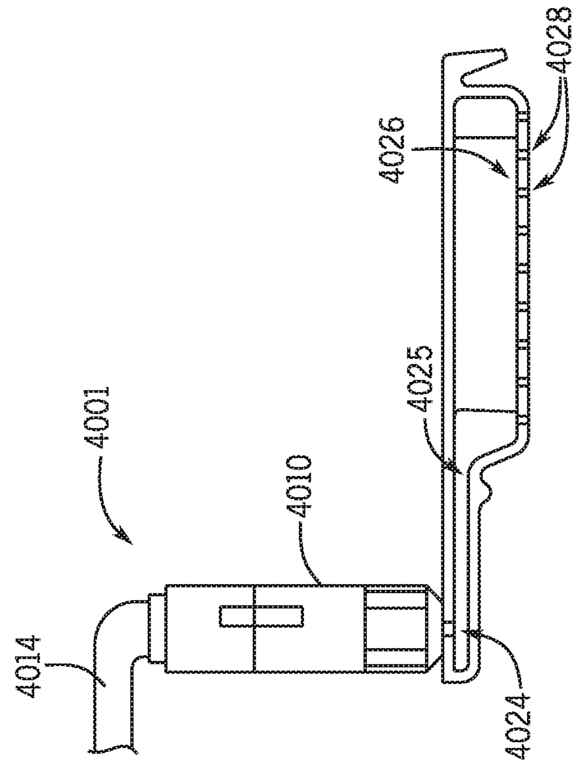
Figure 113C:
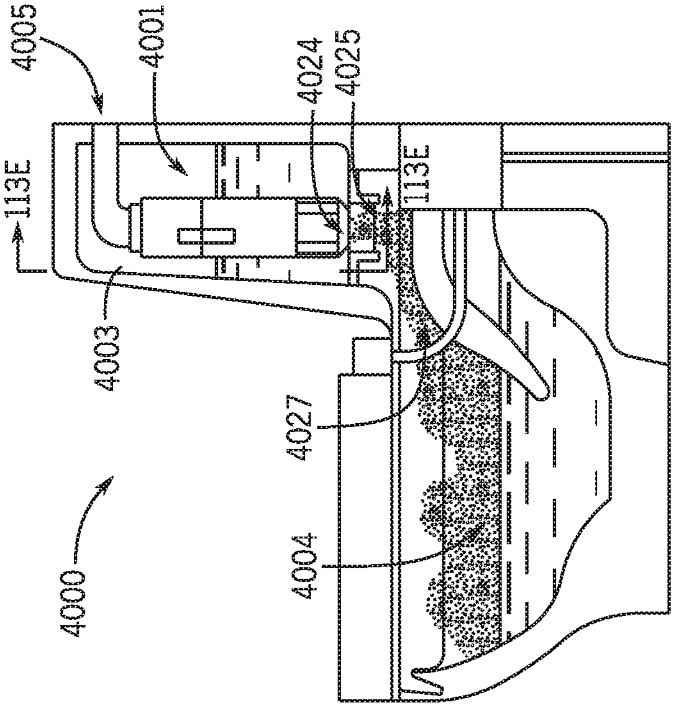

FIG. 113C is a side view of the toilet shown in FIGS. 113A and 113B.

FIG. 113D is another side view of the toilet shown in FIGS. 113A and 113B.

Figure 113F:
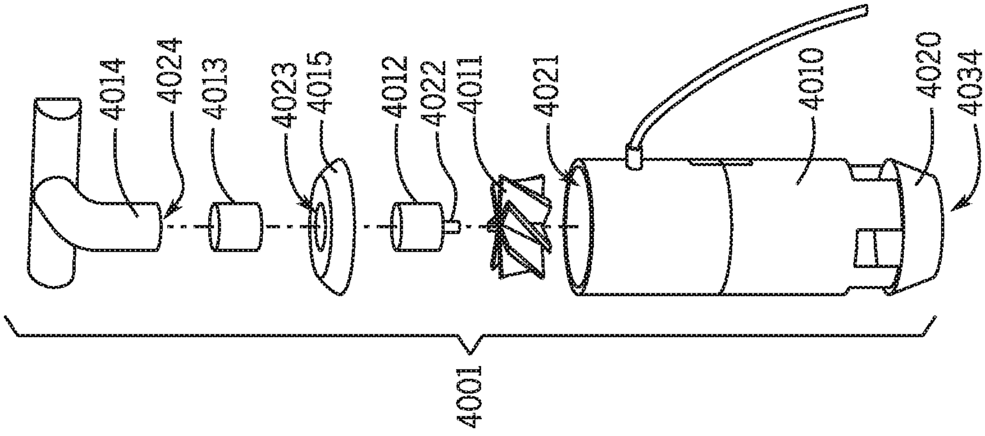
Figure 113E:
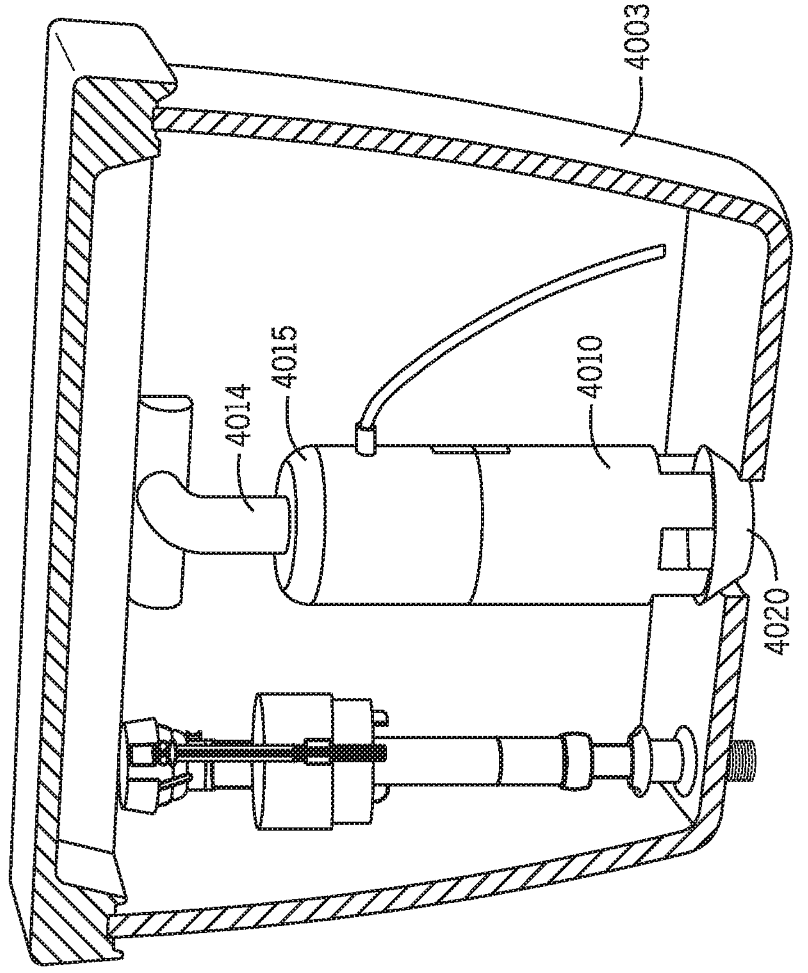

FIG. 113E is a perspective cross-sectional view of a portion of the toilet shown in FIGS. 113A and 113B.

FIG. 113F is an exploded perspective view of a portion of the toilet shown in FIGS. 113A and 113B.

Figure 114:
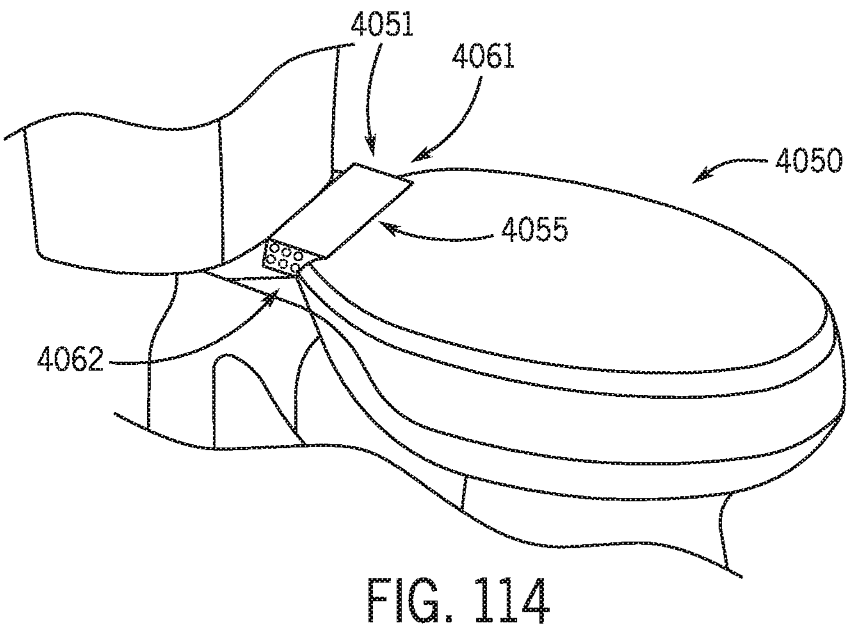

FIG. 114 is a perspective view of a toilet including another exemplary embodiment of a cleaning system.

Figure 115:
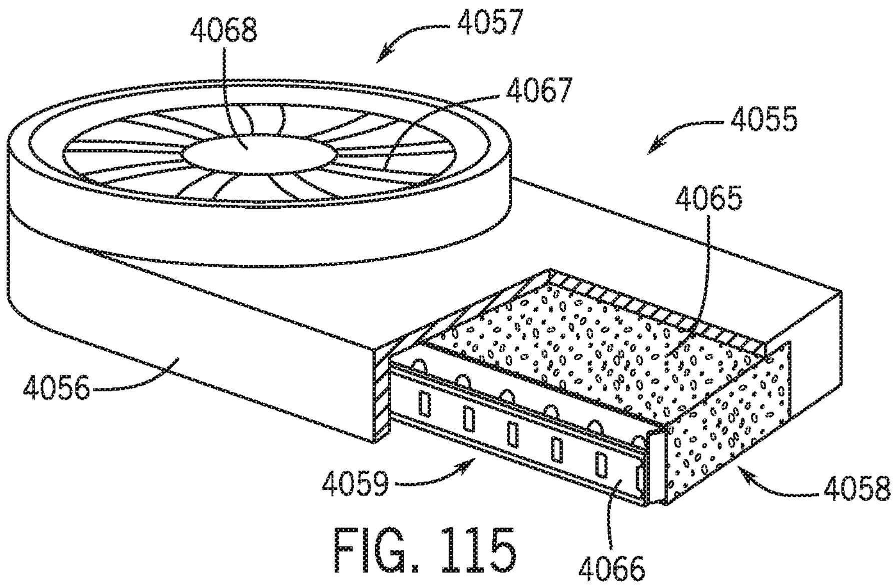

FIG. 115 is a perspective view of a cleaning system for use with a toilet.

Figure 116:
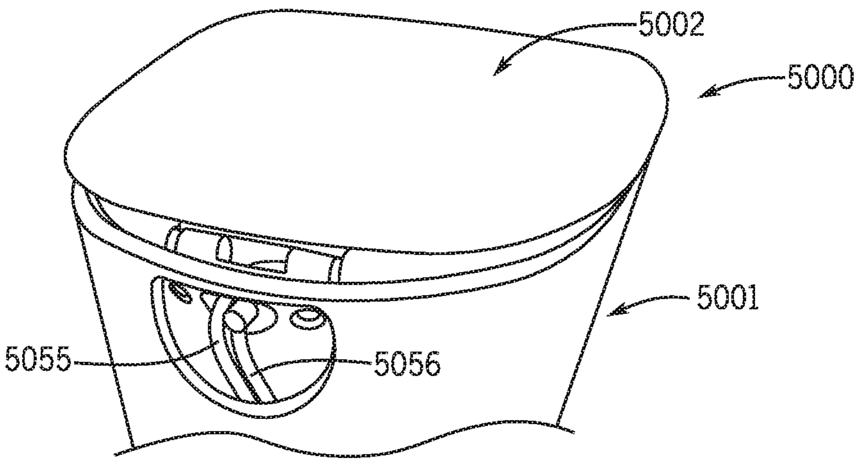

FIG. 116 is a perspective view of an exemplary embodiment of a clean toilet having a seat assembly with integrated dispensing system.

Figure 117:
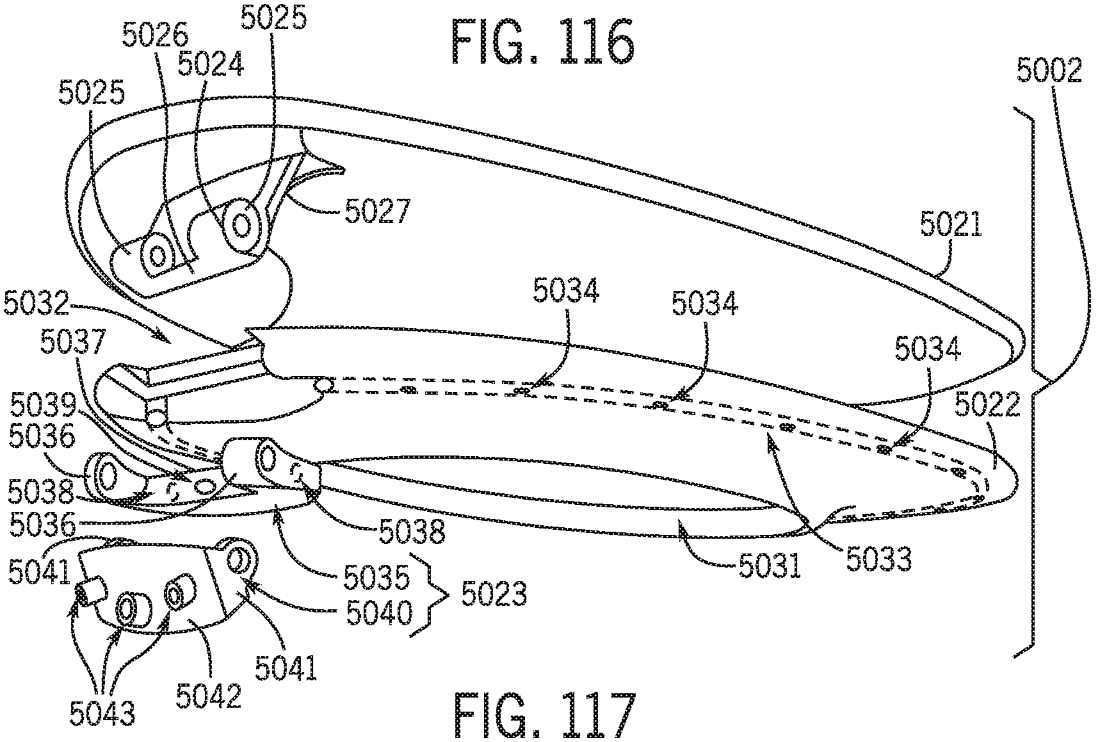

FIG. 117 is an exploded perspective view of the seat assembly shown in FIG. 116.

Figure 118:
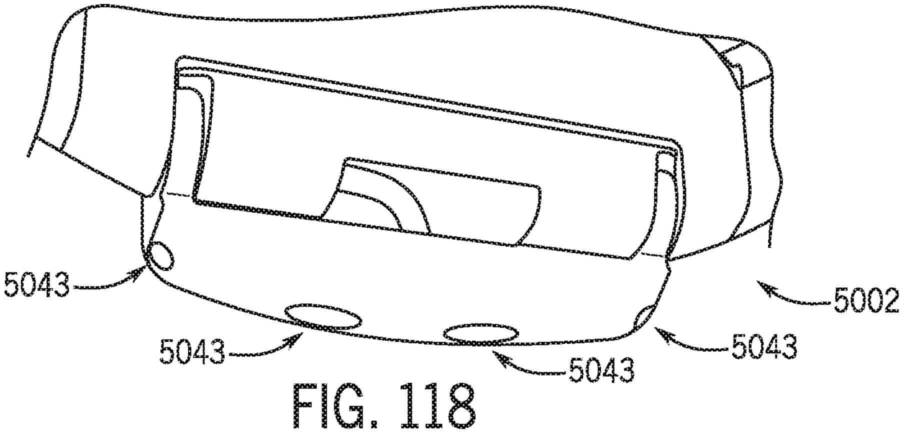

FIG. 118 is a perspective view of a portion of the seat assembly shown in FIG. 116.

Figure 119:
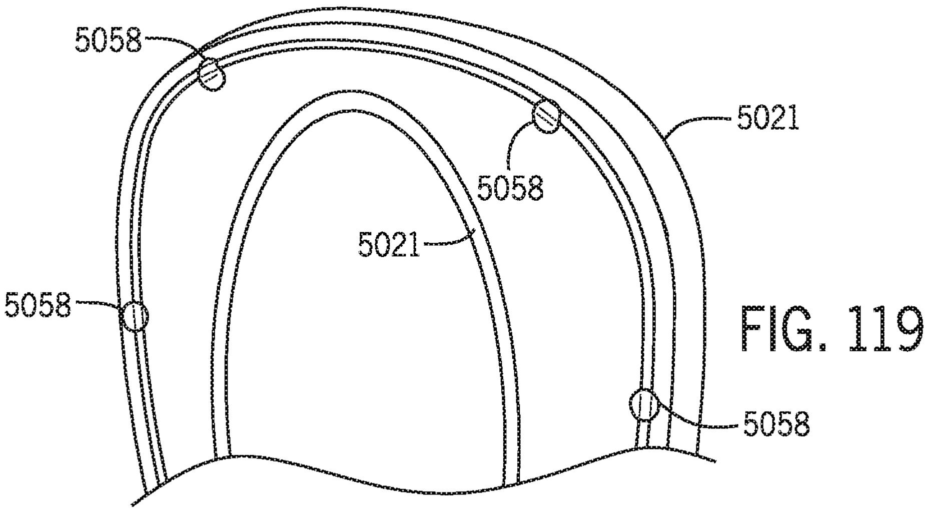

FIG. 119 is a perspective view of another portion of the seat assembly shown in FIG. 116.

Figure 120A:
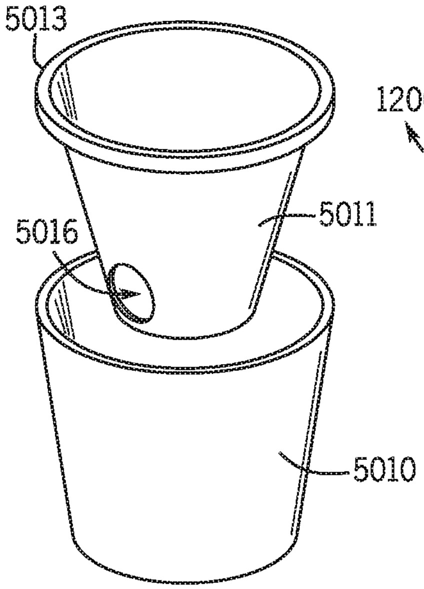

FIG. 120A is a partially exploded view of the base assembly of the toilet shown in FIG. 116.

Figure 120B:
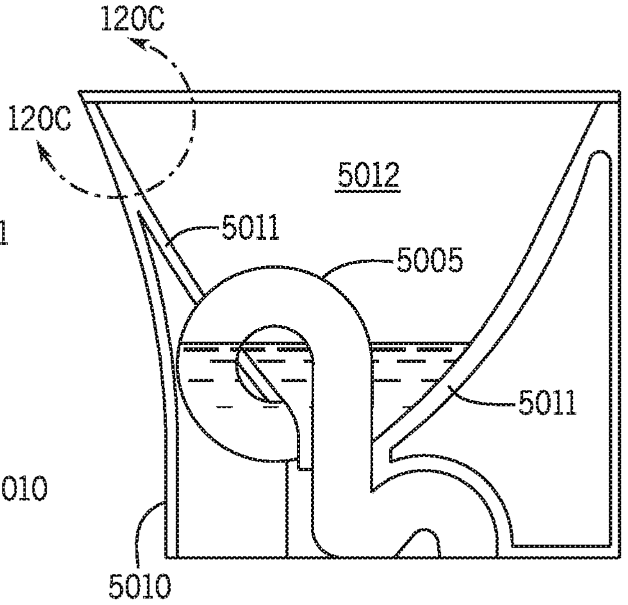

FIG. 120B is a side view of the toilet shown in FIG. 116.

Figure 120C:
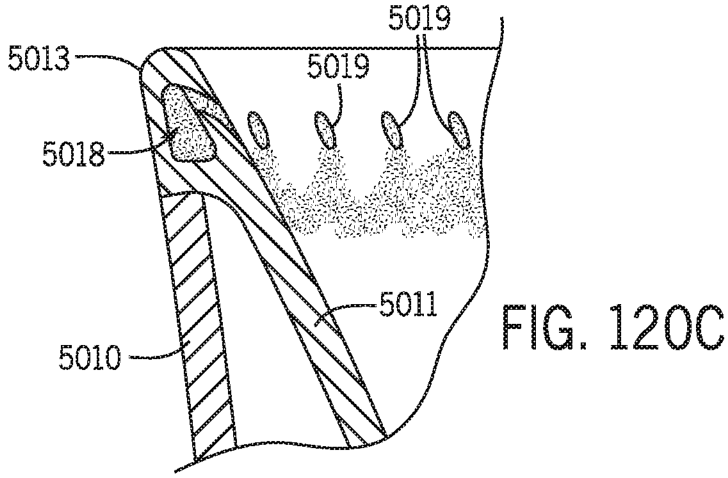

FIG. 120C is an alternative cross-section of that shown in FIG. 120B.

Figure 121:
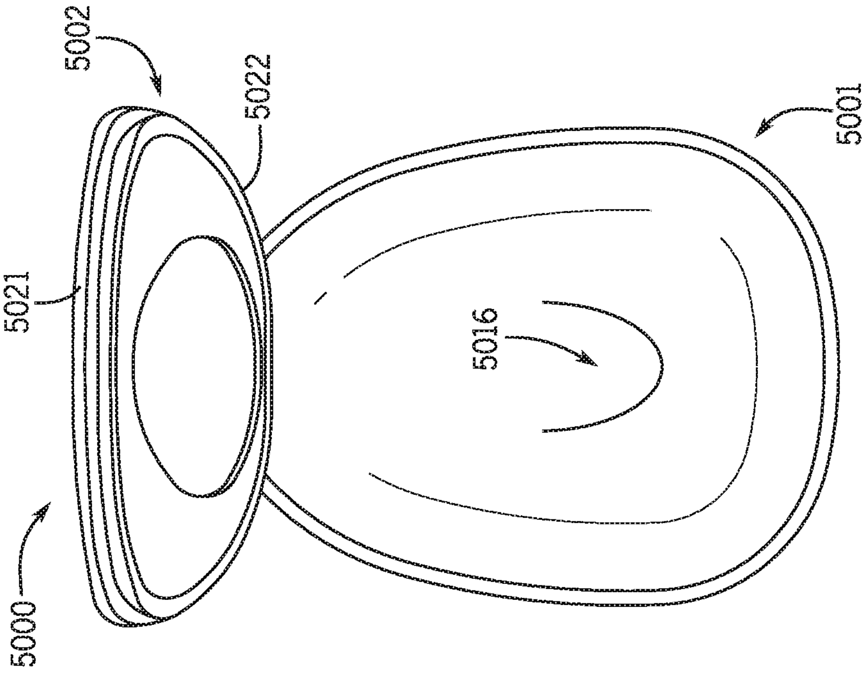

FIG. 121 is a top view of the toilet shown in FIG. 116.

Figure 122:
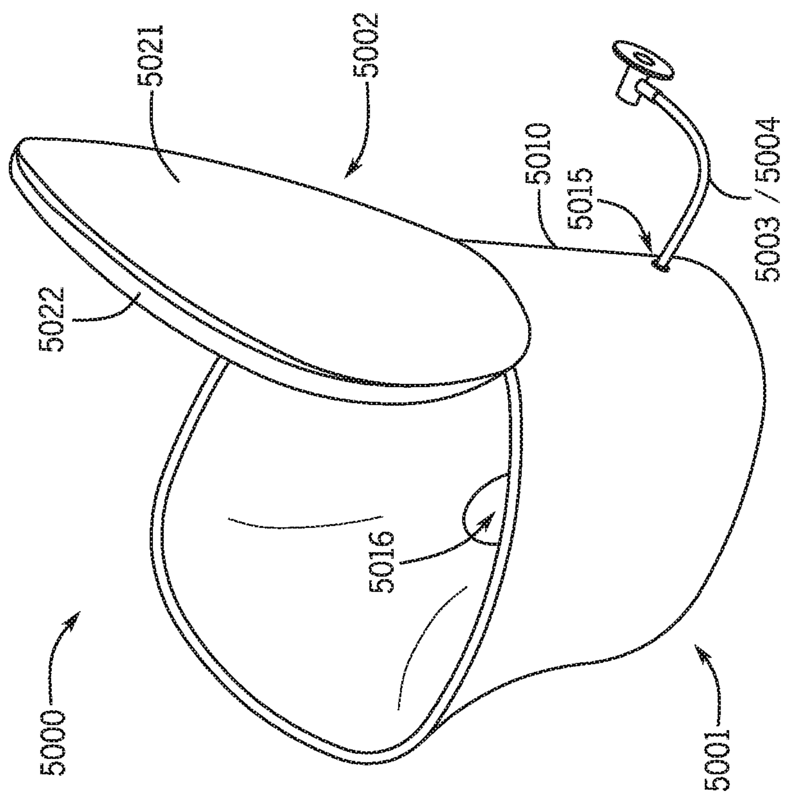

FIG. 122 is another perspective view of the toilet shown in FIG. 116.

Figure 123:
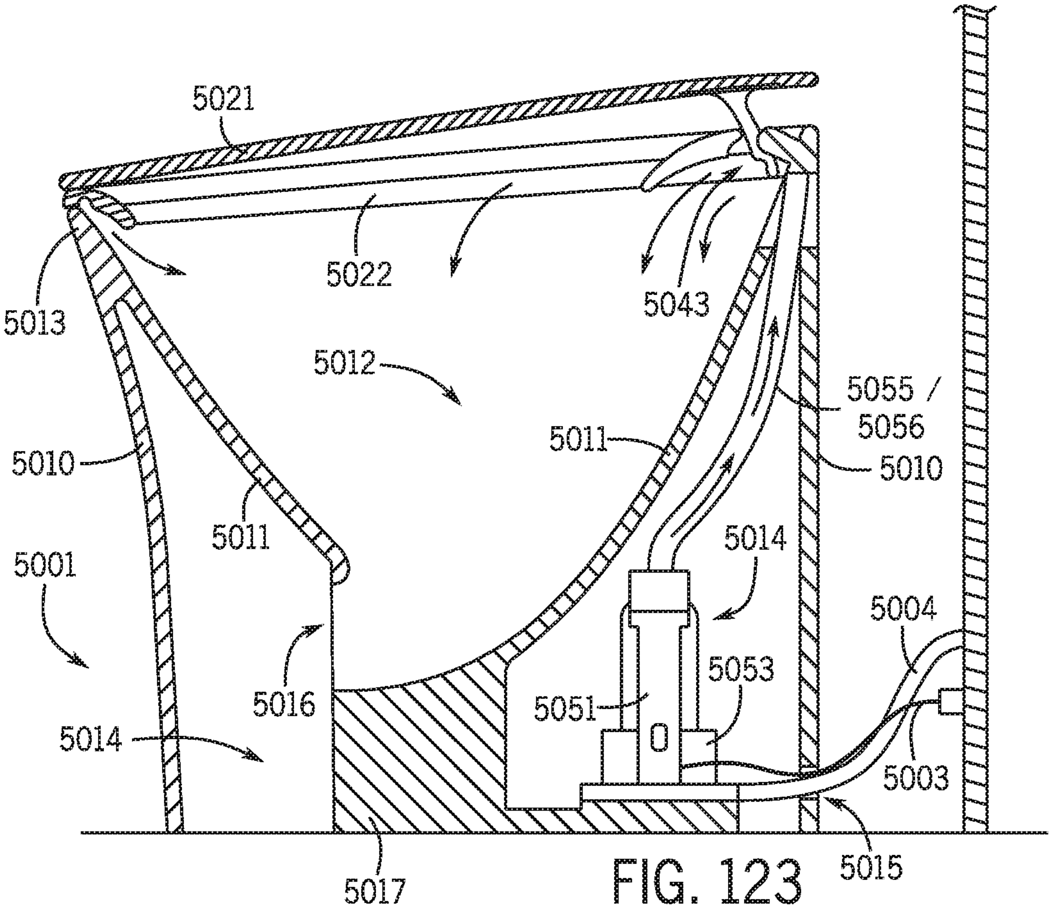

FIG. 123 is a cross-sectional view of a clean toilet, such as the toilet shown in FIG. 116.

Figure 124A:
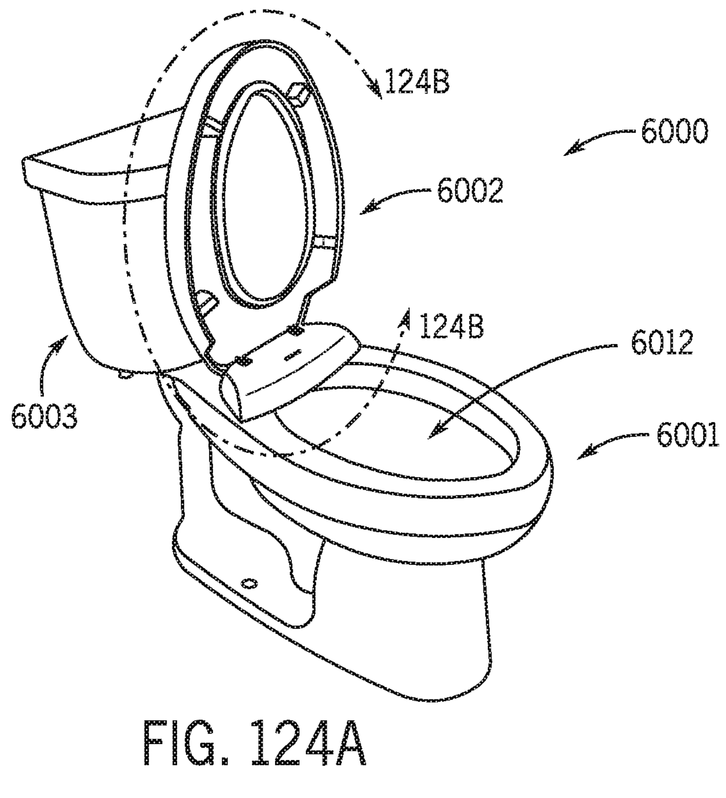

FIG. 124A is a perspective view of another embodiment of a clean toilet.

FIG. 1246 is a perspective view of a portion of the clean toilet shown in FIG. 124A.

Figure 124B:
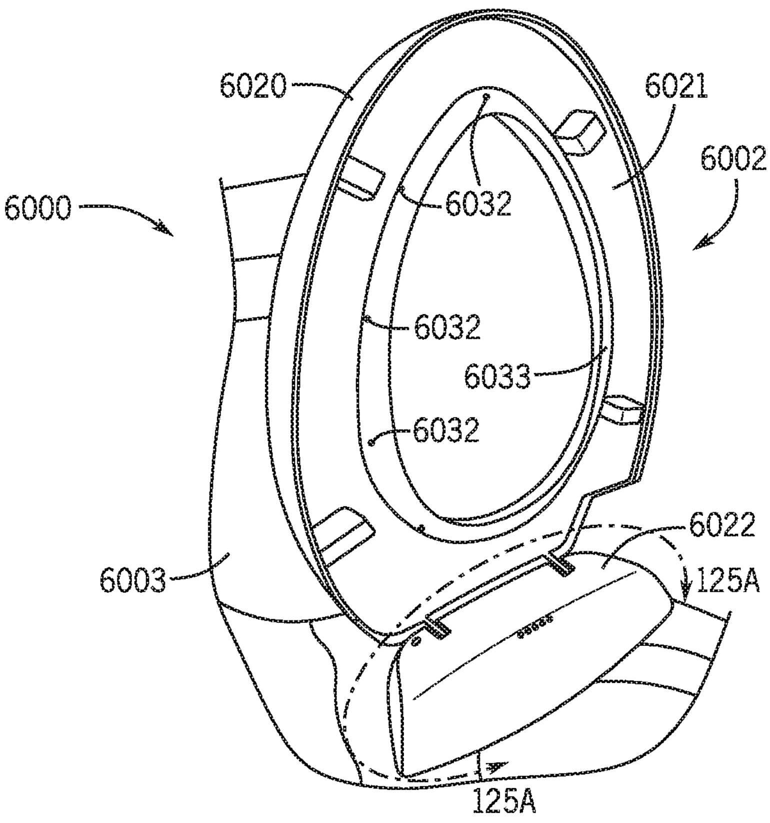
Figure 124C:
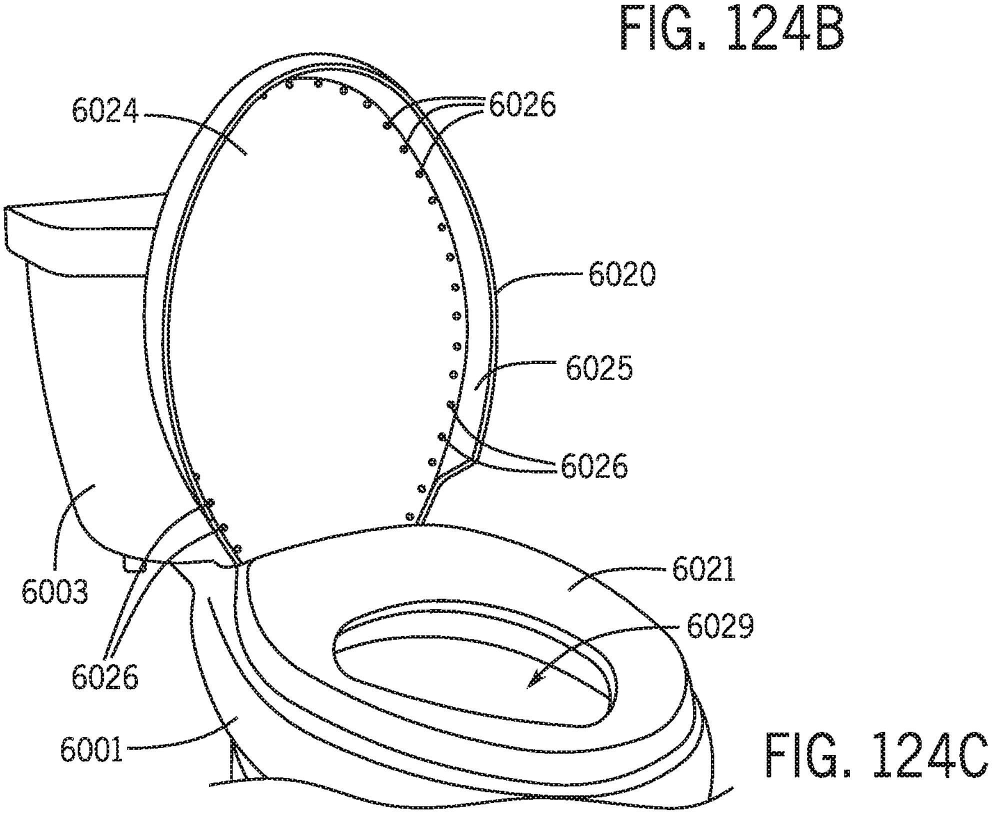

FIG. 124C is a perspective view of a portion of the clean toilet shown in FIG. 124A.

Figure 125B:
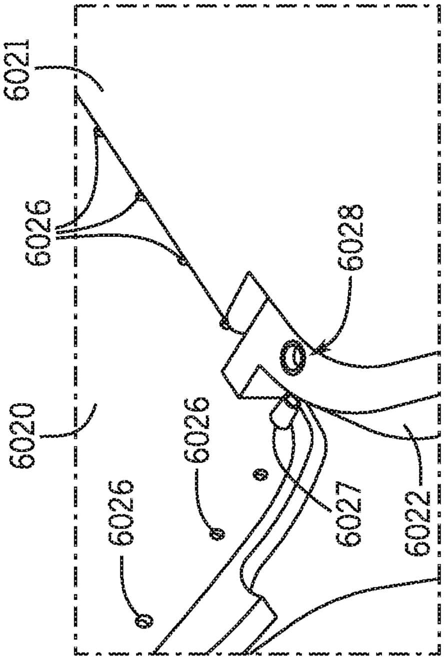
Figure 125C:
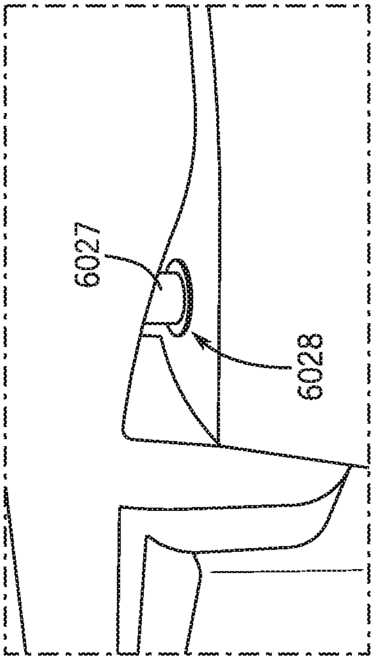
Figure 125A:
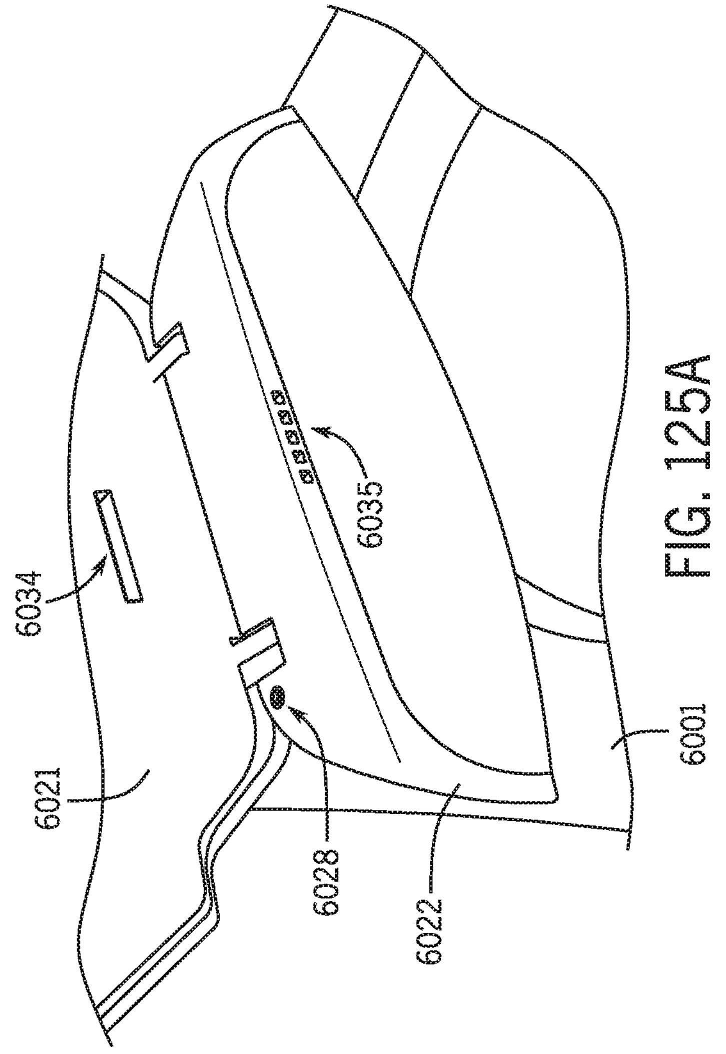

FIG. 125A is a perspective view of a portion of the toilet shown in FIG. 124A.

FIG. 125B is a perspective view of a portion of the toilet shown in FIG. 124A.

FIG. 125C is a perspective view of a portion of the toilet shown in FIG. 124A.

Figure 126A:
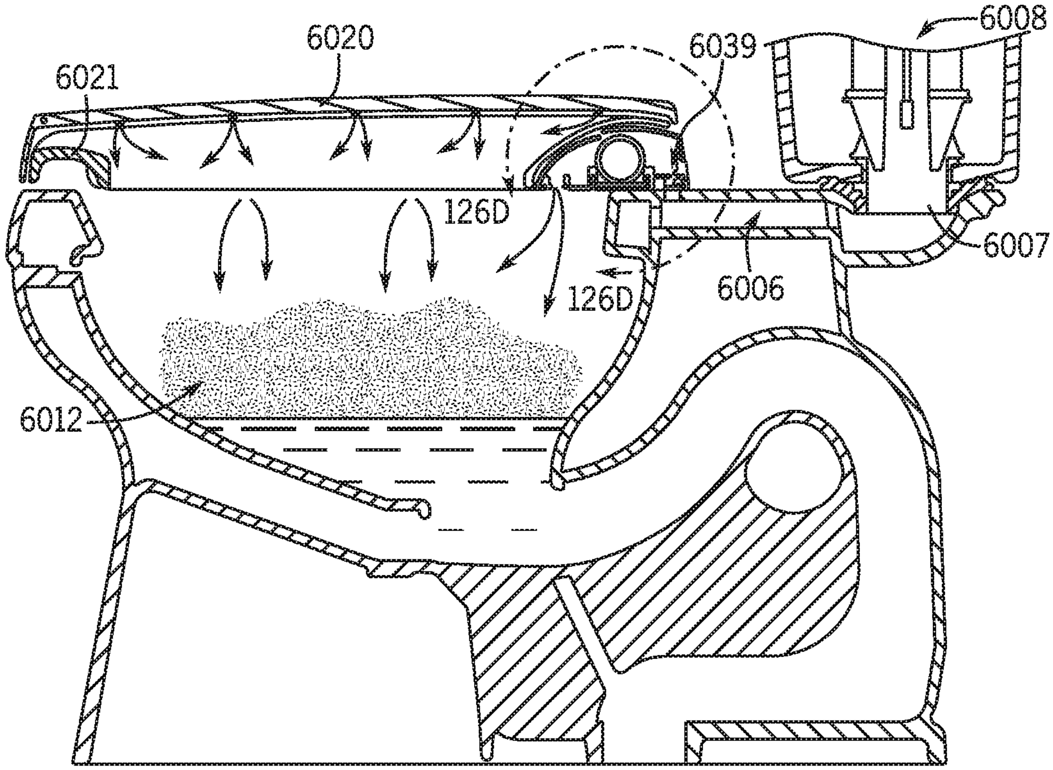

FIG. 126A is a cross-sectional view illustrating operation of the toilet shown in FIG. 124A.

Figure 126B:
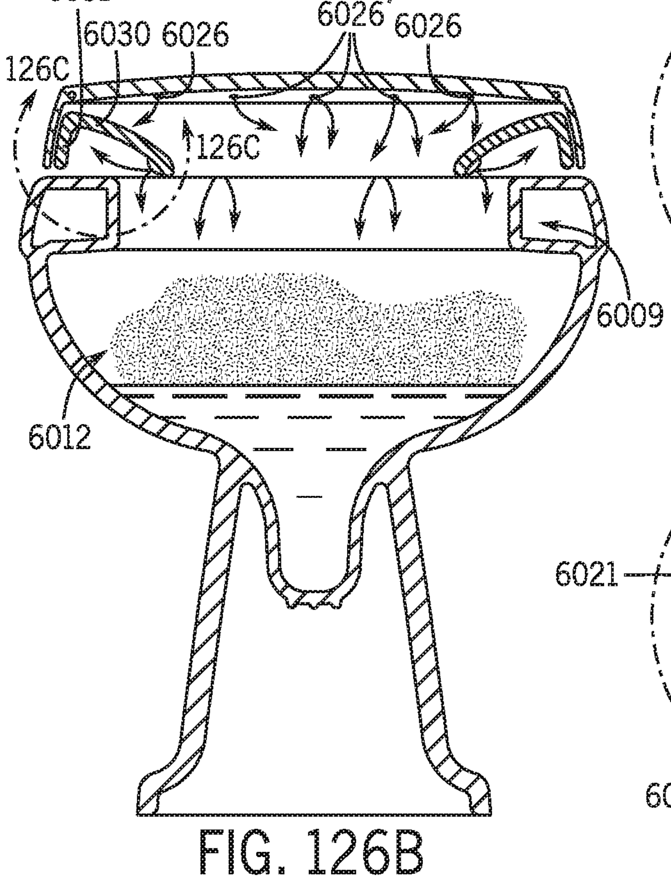

FIG. 126B is a cross-sectional view illustrating operation of the toilet shown in FIG. 124A.

Figure 126C:
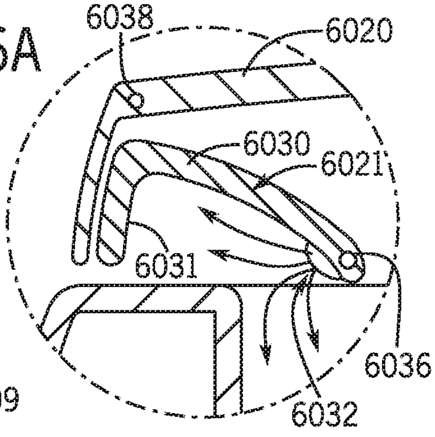

FIG. 126C is a cross-sectional view of a portion of the toilet shown in FIG. 124A.

Figure 126D:
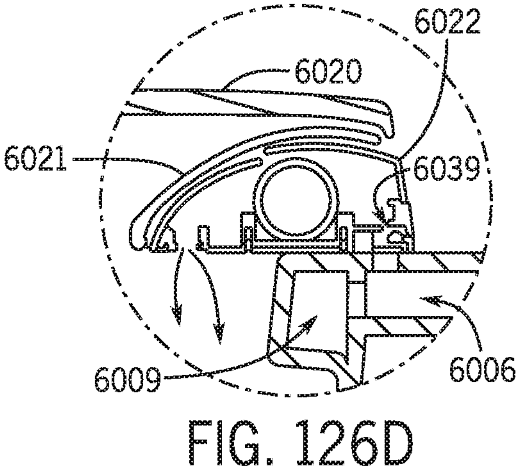

FIG. 126D is a cross-sectional view of a portion of the toilet shown in FIG. 124A.

Figure 127A:
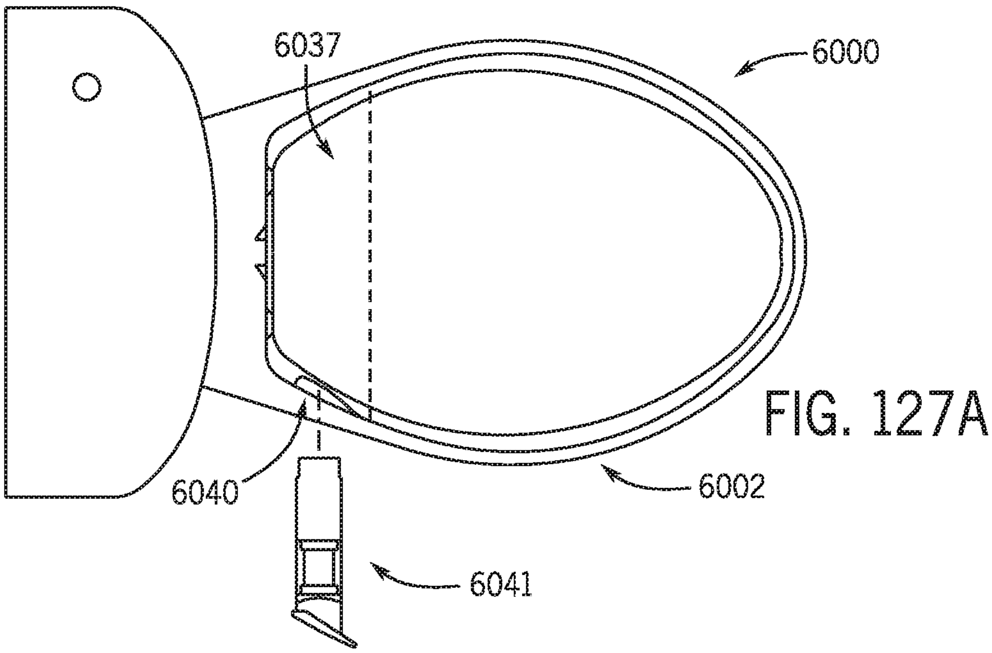

FIG. 127A is a top view of the clean toilet shown in FIG. 124A.

FIG. 1276 is a perspective view of a portion of the toilet shown in FIG. 127A.

Figure 127B:
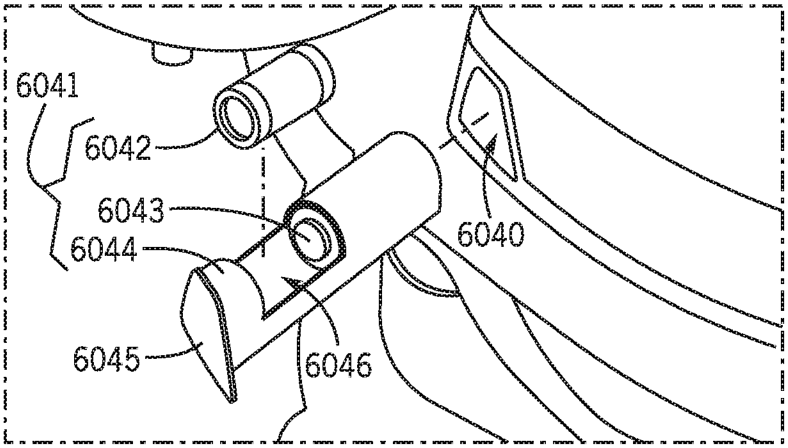
Figure 127C:
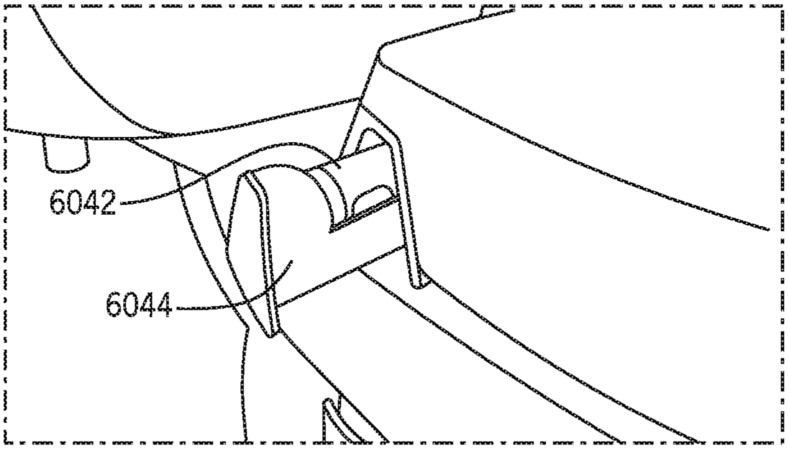

FIG. 127C is a perspective view of a portion of the toilet shown in FIG. 127A.

Figure 127D:
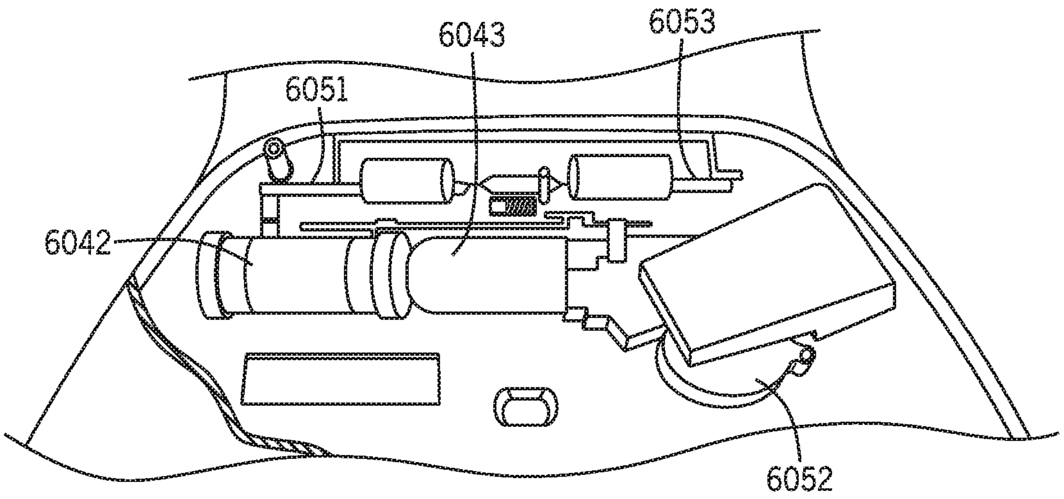

FIG. 127D is a perspective view of a portion of the toilet shown in FIG. 127A.

Figure 128:
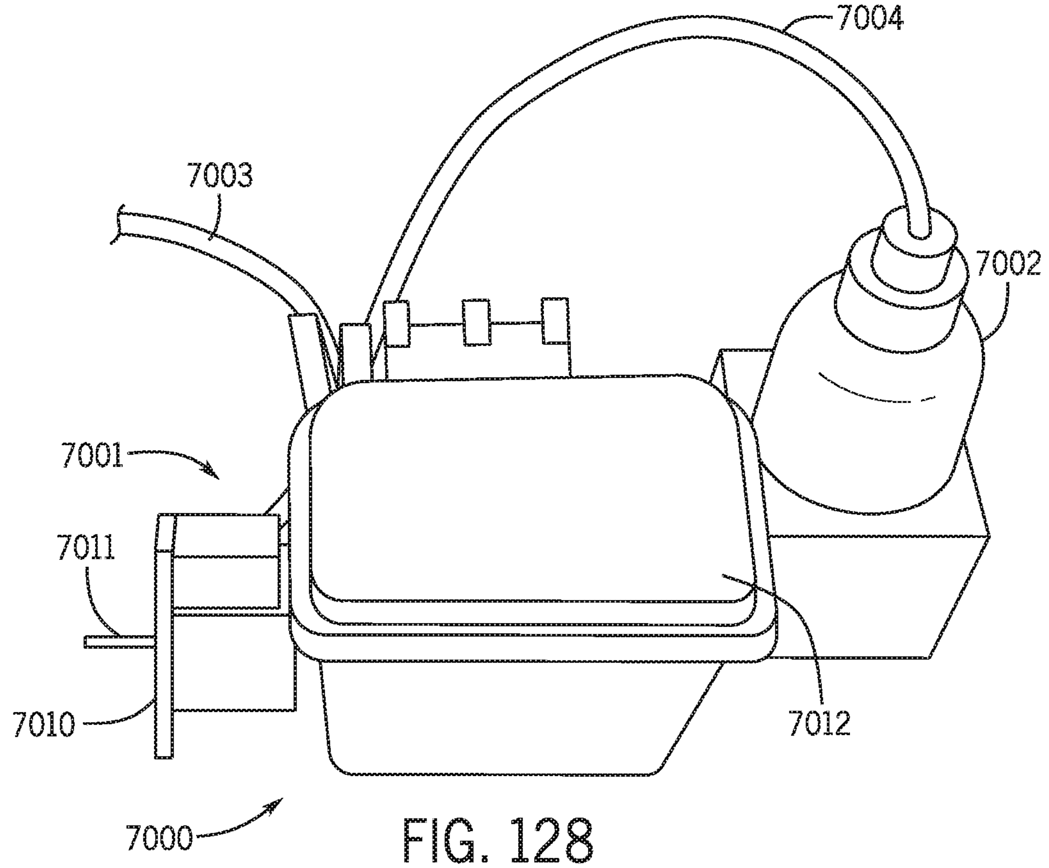

FIG. 128 is a perspective view of an exemplary embodiment of a touchless dispensing system.

Figure 129:
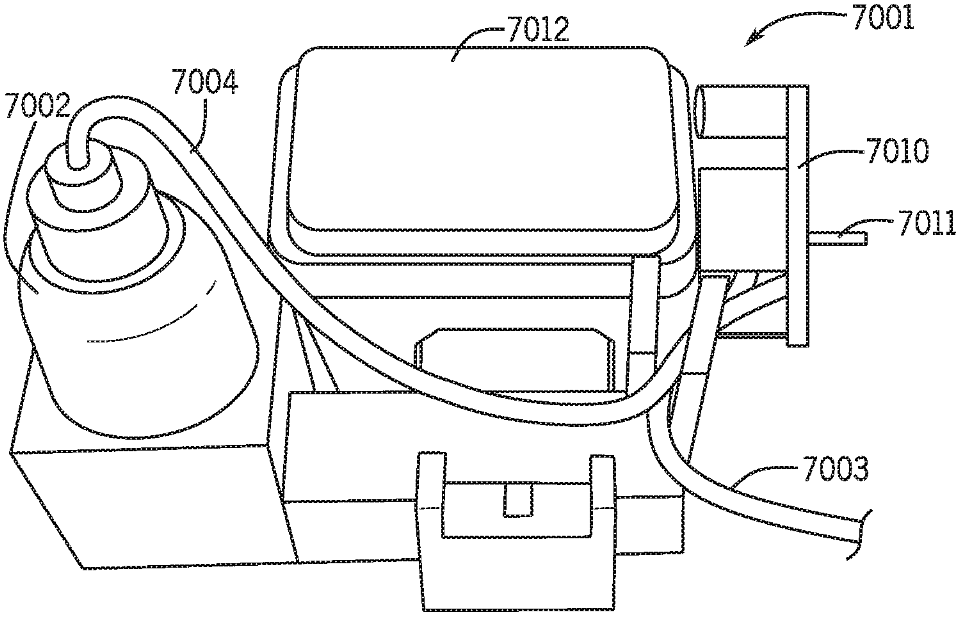

FIG. 129 is another perspective view of the touchless dispensing system shown in FIG. 128.

Figure 130:
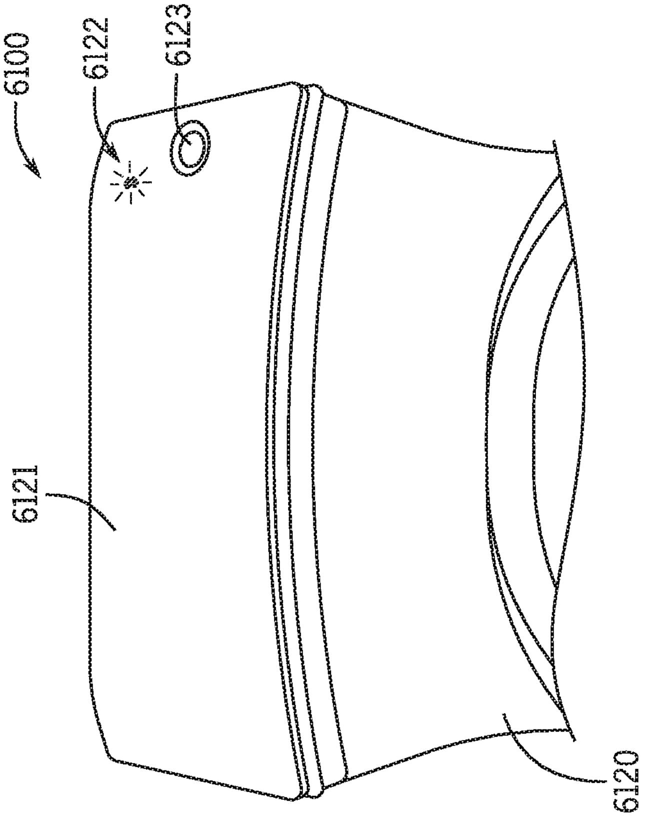

FIG. 130 is a perspective view of a portion of another clean toilet.

Figure 131:
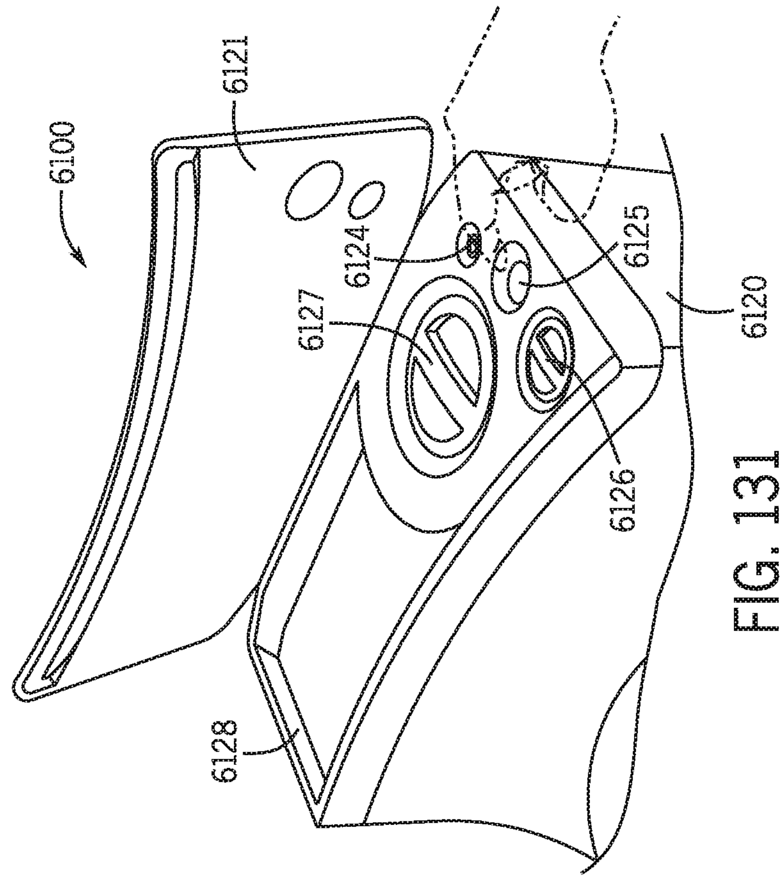

FIG. 131 is a perspective view of the toilet shown in FIG. 130 with the lid open.

Figure 132:
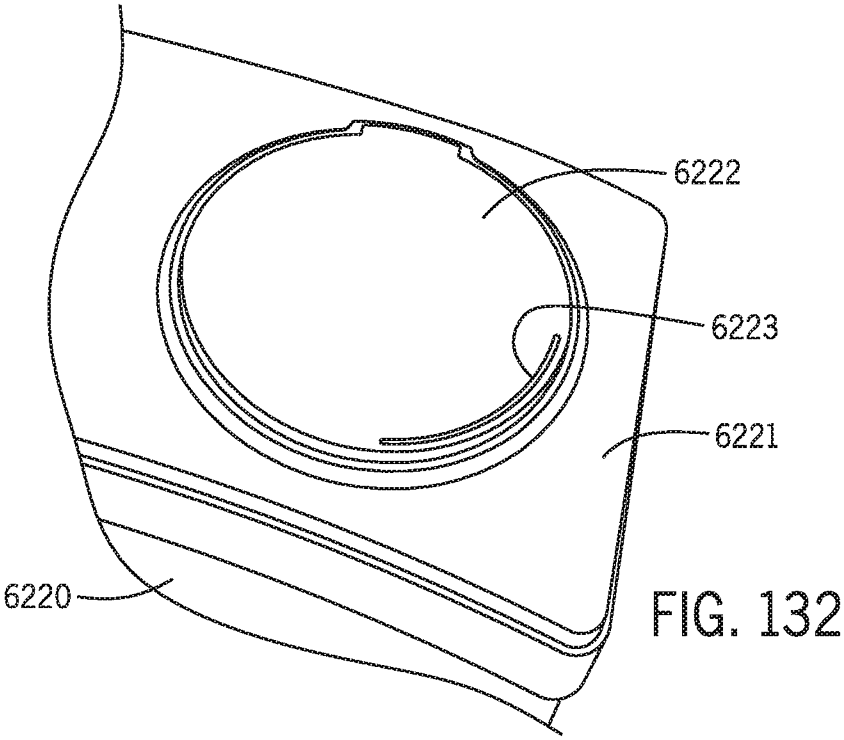

FIG. 132 is a perspective view of an example of a visual indicator for a clean toilet.

Figure 133:
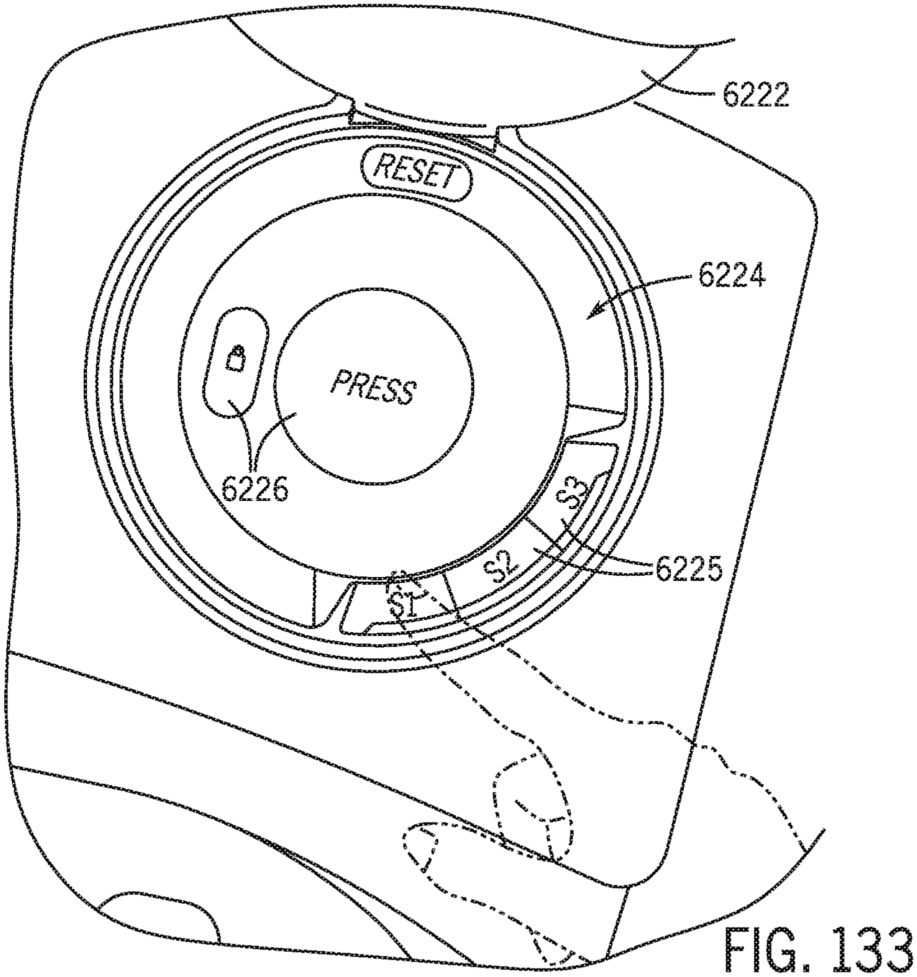

FIG. 133 is a perspective view of an example of a user interface for a clean toilet.

Figure 134:
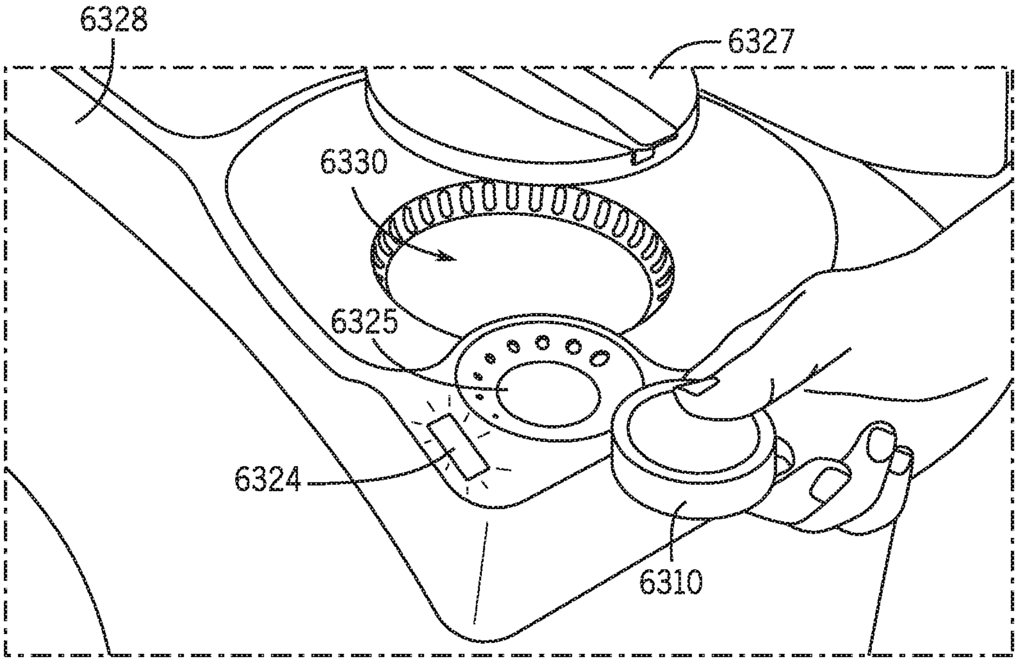

FIG. 134 is a perspective view of a clean toilet with a cap decoupled to refill cleaning compound into the system.

Figure 135:
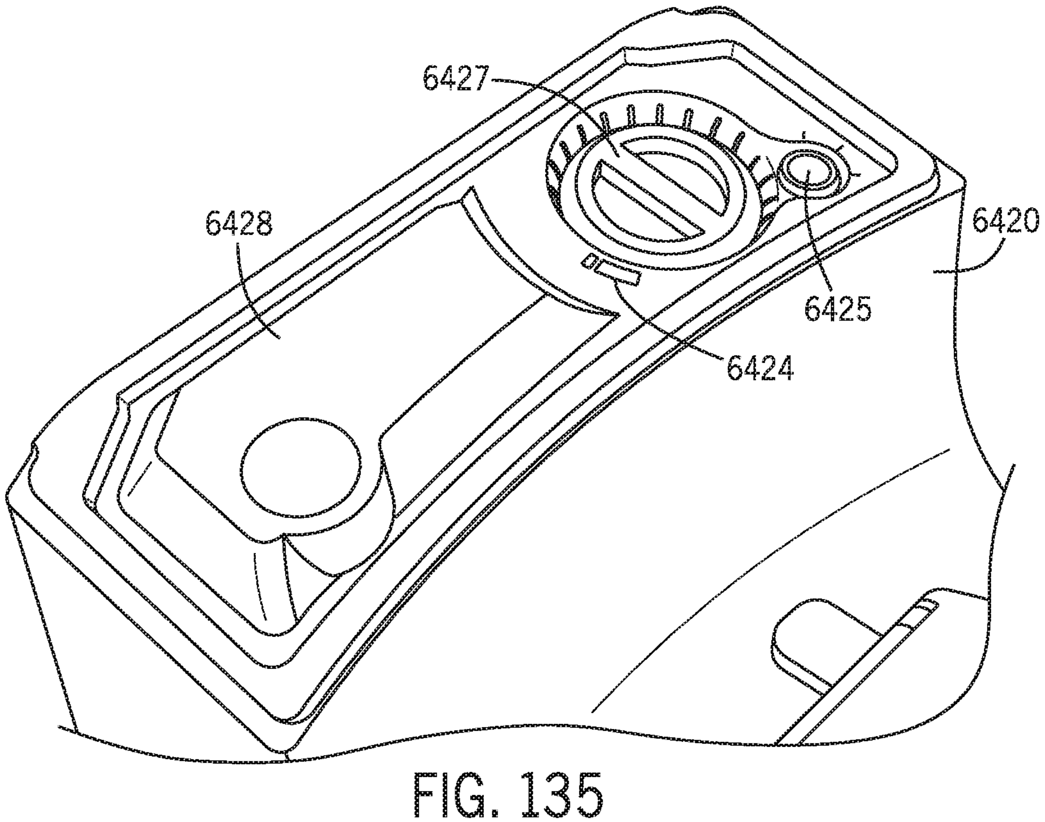

FIG. 135 is a perspective view of a shroud in a tank for a clean toilet.

Figure 136:
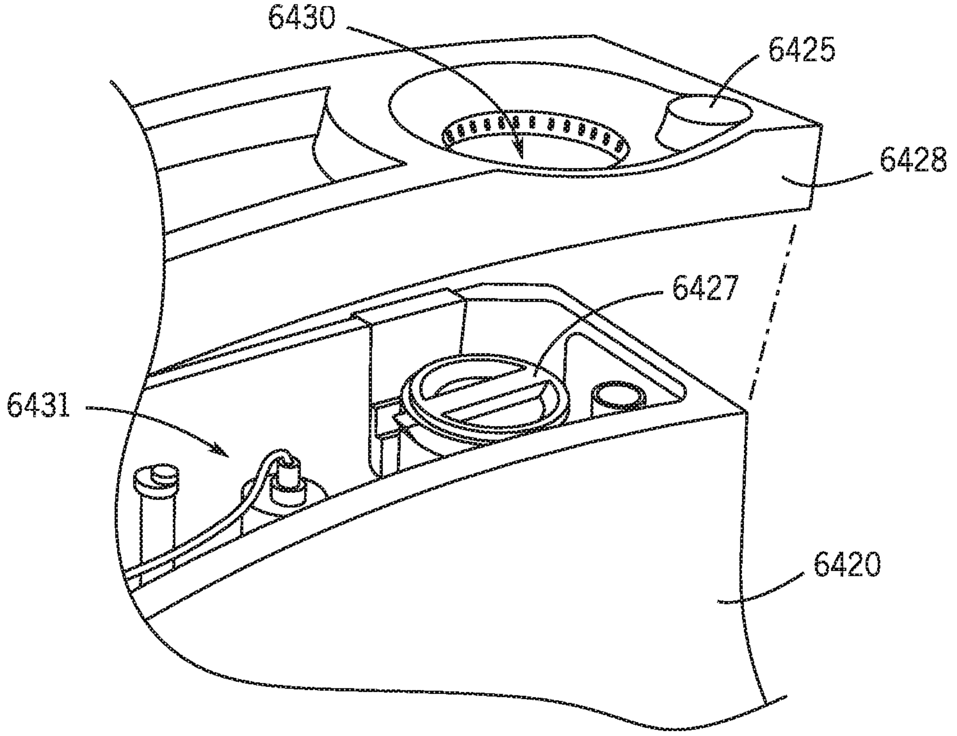

FIG. 136 is a perspective view of the shroud shown in FIG. 135 removed from the tank.

Figure 137:
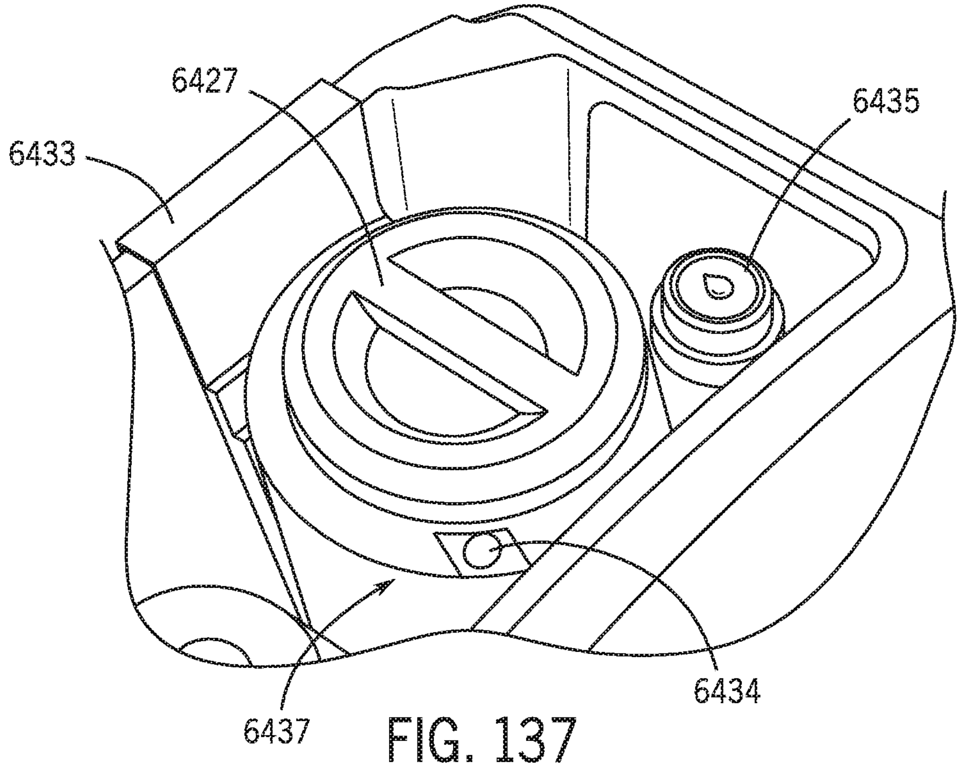

FIG. 137 is a perspective view of the tank for a clean toilet with the shroud removed.

Figure 138:
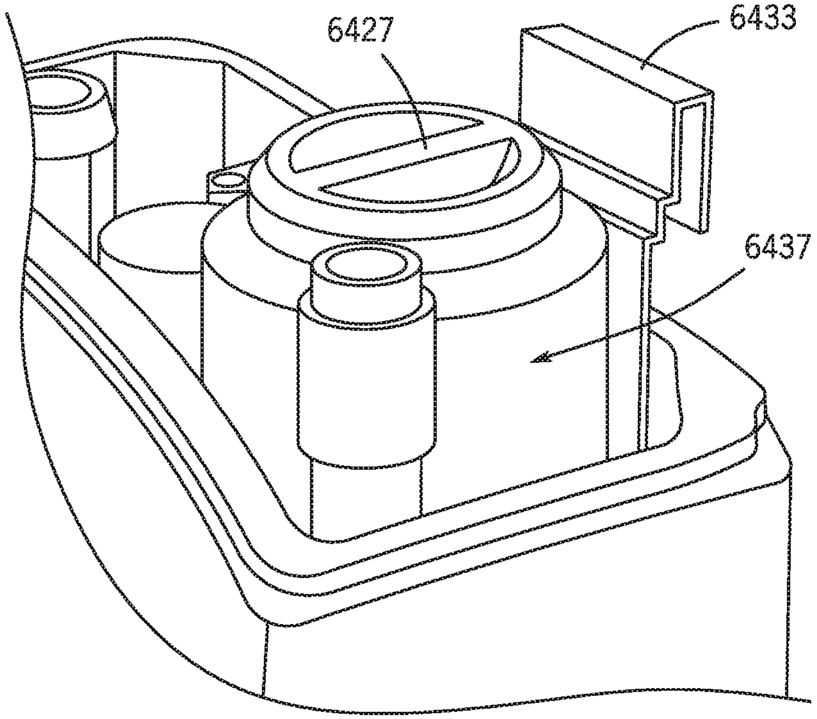

FIG. 138 is a perspective view of the tank shown in FIG. 137 with a container lifted for clarity.

Figure 139:
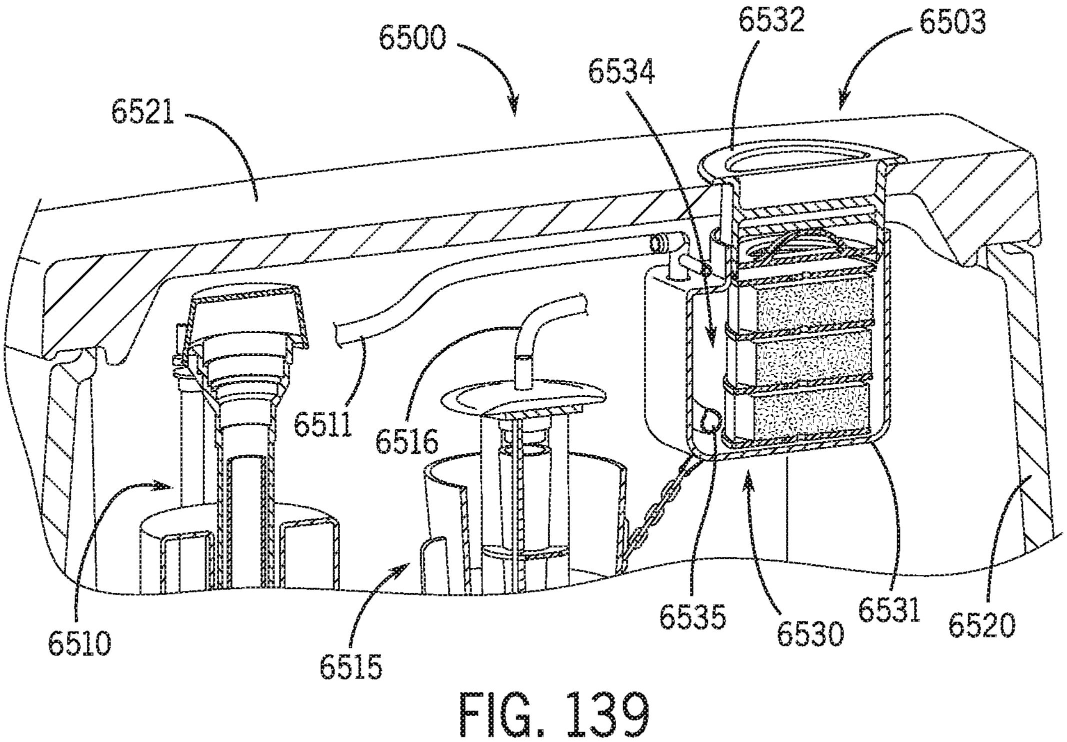

FIG. 139 is a cross-sectional view of a tank for a clean toilet.

Figure 140:
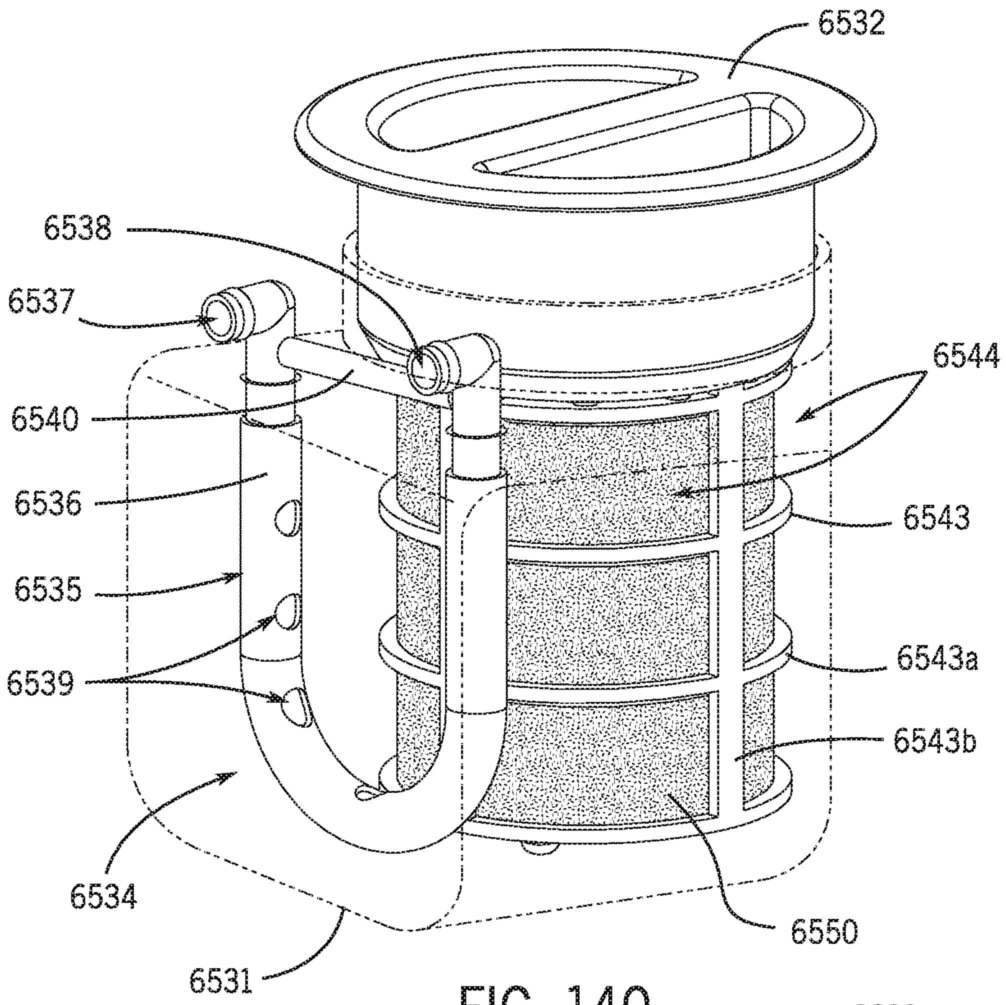

FIG. 140 is a perspective view of a container system for housing a cleaning compound for use with a clean toilet.

Figure 141:
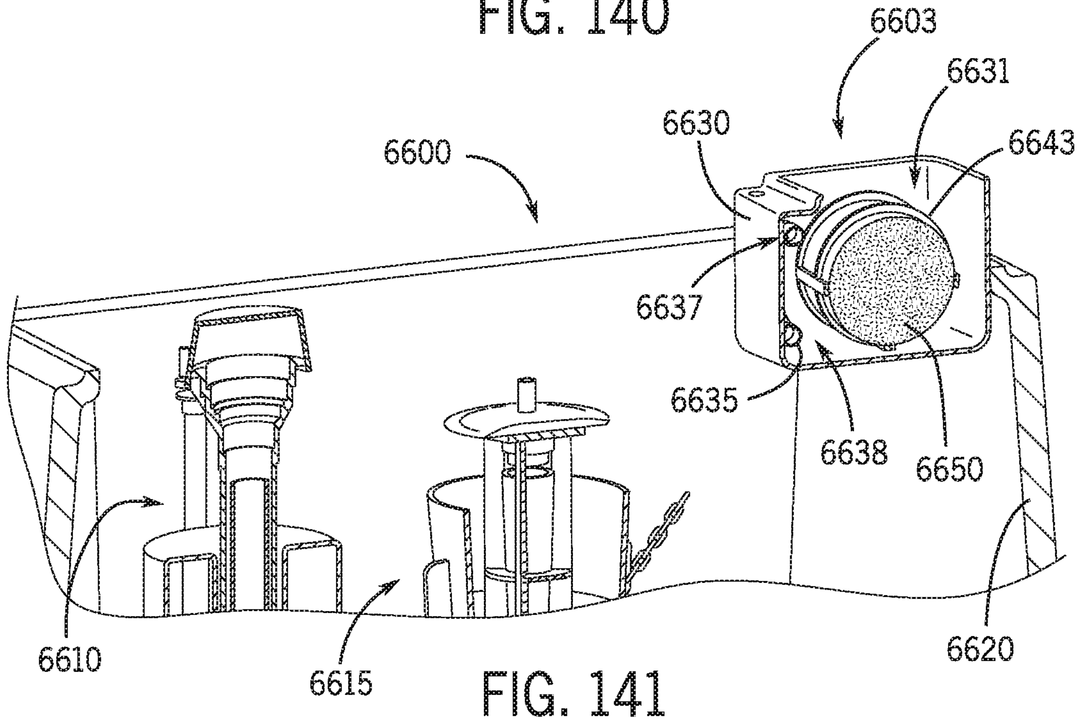

FIG. 141 is a cross-sectional view of another tank for a clean toilet.

Figure 142:
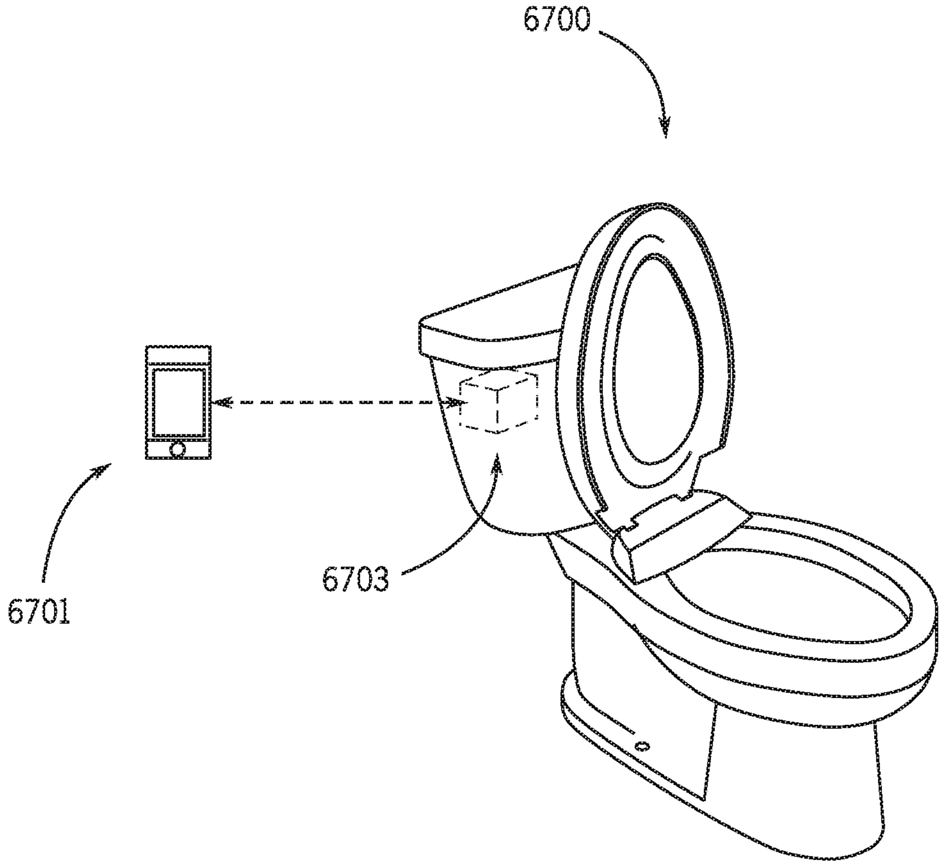

FIG. 142 is a perspective view of a toilet with wireless connectivity to a handheld electronic device, such as a phone.

Figure 143:
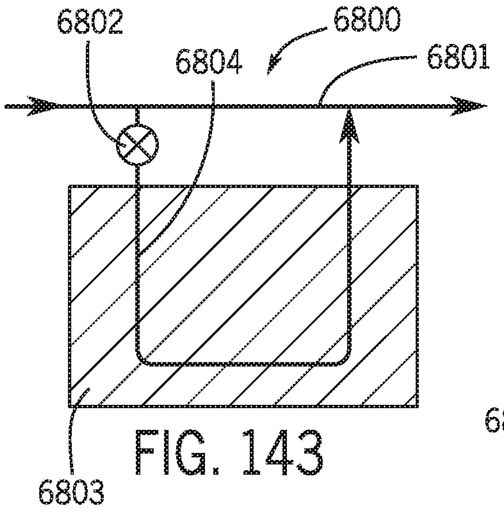

FIG. 143 is a schematic of a controller for use with clean toilets.

Figure 144:
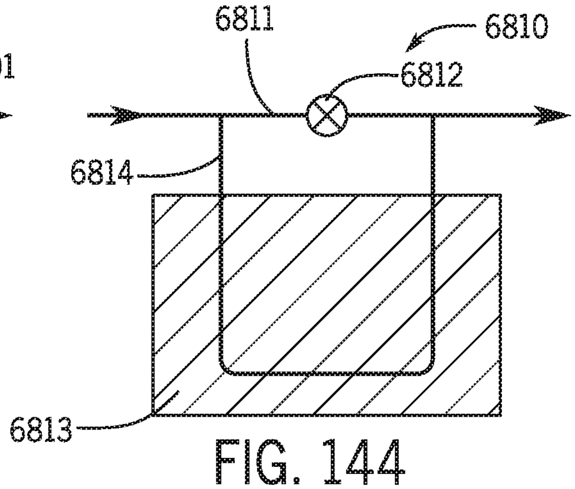

FIG. 144 is a schematic of a controller for use with clean toilets.

Figure 145:
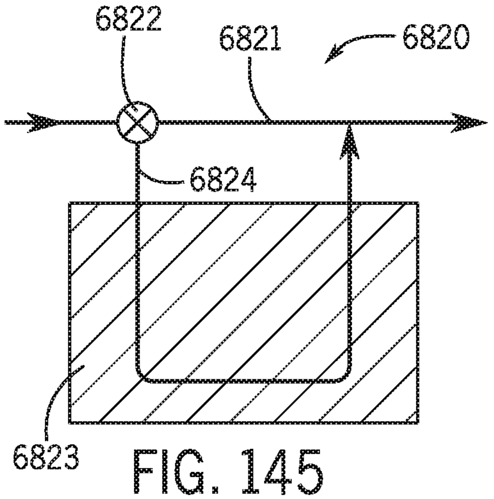

FIG. 145 is a schematic of a controller for use with clean toilets.

Figure 146:
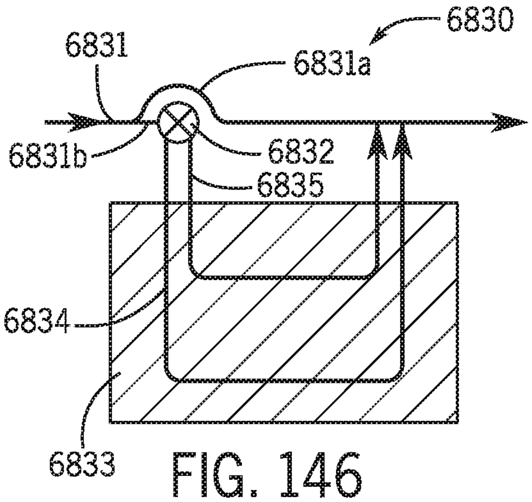

FIG. 146 is a schematic of a controller for use with clean toilets.

Figure 147:
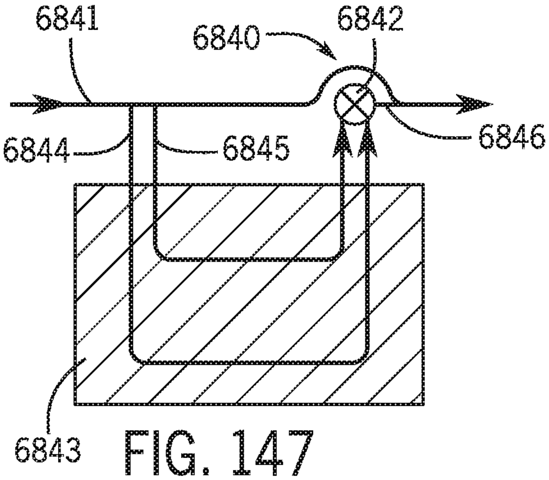

FIG. 147 is a schematic of a controller for use with clean toilets.

Figure 148:
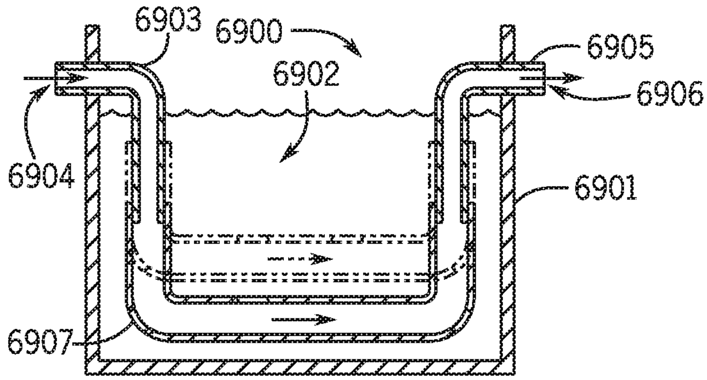

FIG. 148 is a side view of a control system for use with clean toilets.

Figure 149:
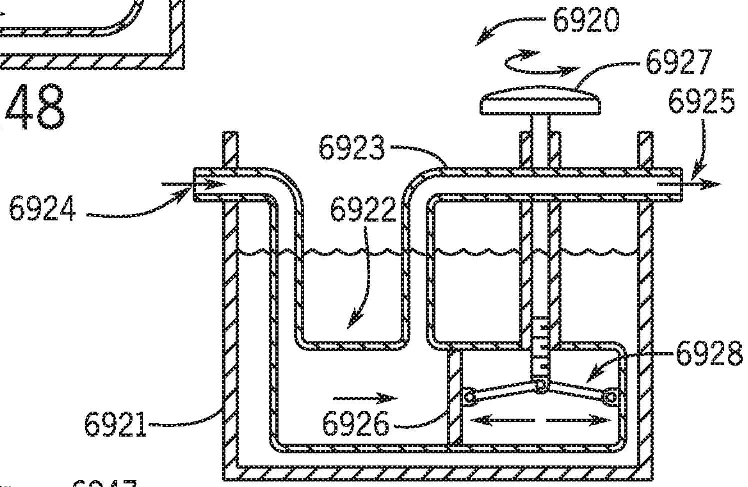

FIG. 149 is a side view of a control system for use with clean toilets.

Figure 150:
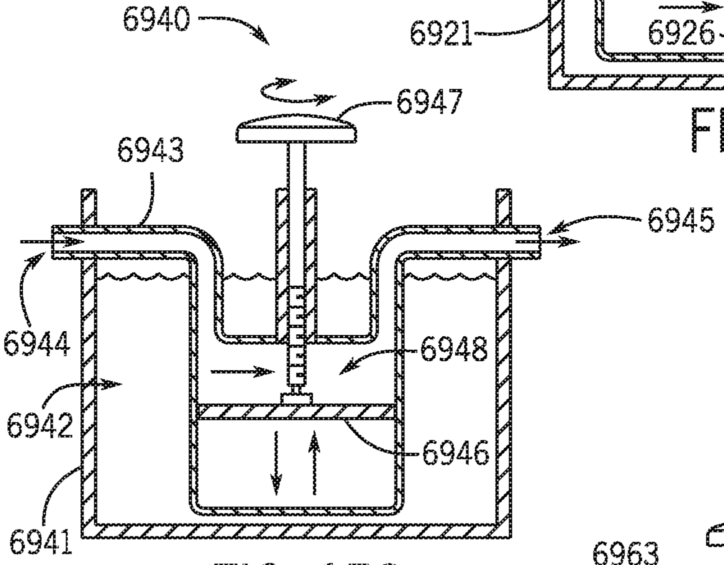

FIG. 150 is a side view of a control system for use with clean toilets.

Figure 151:
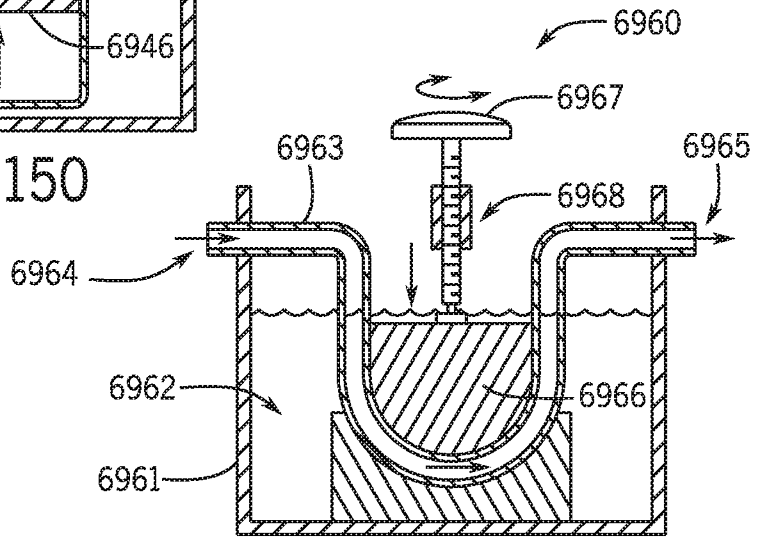

FIG. 151 is a side view of a control system for use with clean toilets.

DETAILED DESCRIPTION

Referring generally to the Figures, disclosed in this application are delivery (e.g., dispensing) systems and methods for dispensing chemicals/cleaning compounds, as part of an integrated system (e.g., a toilet, toilet accessory, etc.) or as a standalone system to improve the cleanliness of the system and/or surrounding (e.g., bathroom, kitchen, etc.).

As non-limiting examples, the systems and methods, as disclosed herein, may be configured to influence scale, slippery, and/or sanitation to thereby have improved cleanliness. For example, the systems and methods of this application may reduce scale, increase slippery, and/or increase sanitation. As used herein, the term "scale" generally refers to mineral deposits (e.g., calcium carbonate, magnesium carbonate, etc.), that collect or build-up on the surfaces of the components of systems, such as toilets. As used herein, the term "slippery" generally refers to coating(s) that may be applied to the surfaces of the components of the systems to influence the coefficient of friction of the surfaces. For example, a non-stick coating, such as a diamond-fusion coating, may be applied to surfaces of the components to reduce the coefficient of friction of the surfaces to which the coating is applied. As used herein, the term "sanitation" generally refers to the application (e.g., introduction, etc.) of anti-microbial chemicals.

One such application for the systems and methods are for use with toilets in order to provide improved cleanliness of the toilet, the area around the toilet, and/or for the user of the toilet. The toilets may be configured to include a delivery system for introducing a chemistry (e.g., a cleaning compound) to thereby reduce, scale, slippery, and/or sanitation. The systems and methods of this application may influence other aspects related to cleanliness or perceived cleanliness of the components. For example, scent(s) related to the systems (and the use thereof) may be influenced (e.g., masked, ameliorated, reduced, etc.) by the systems and methods of this application, such as, but not limited to the use of active filters (e.g., hydroxyl, etc.), passive filters (e.g., carbon, gas, etc.), and/or scent(s) applied to or contained within components of the system. Also for example, the shape of the components of the system may be configured to influence the cleanliness of the systems, such as, but not limited to, the use of rimless bowls, skirting (e.g., around the bowl/pedestal), the reduction in the number of surfaces, improved hinges, tankless water systems, the smoothing of surfaces, as well as other examples disclosed herein. The various aspects (e.g., chemistry, configuration, etc.) are disclosed in greater detail below and the improved delivery systems are disclosed in greater detail below.

Figure 1:
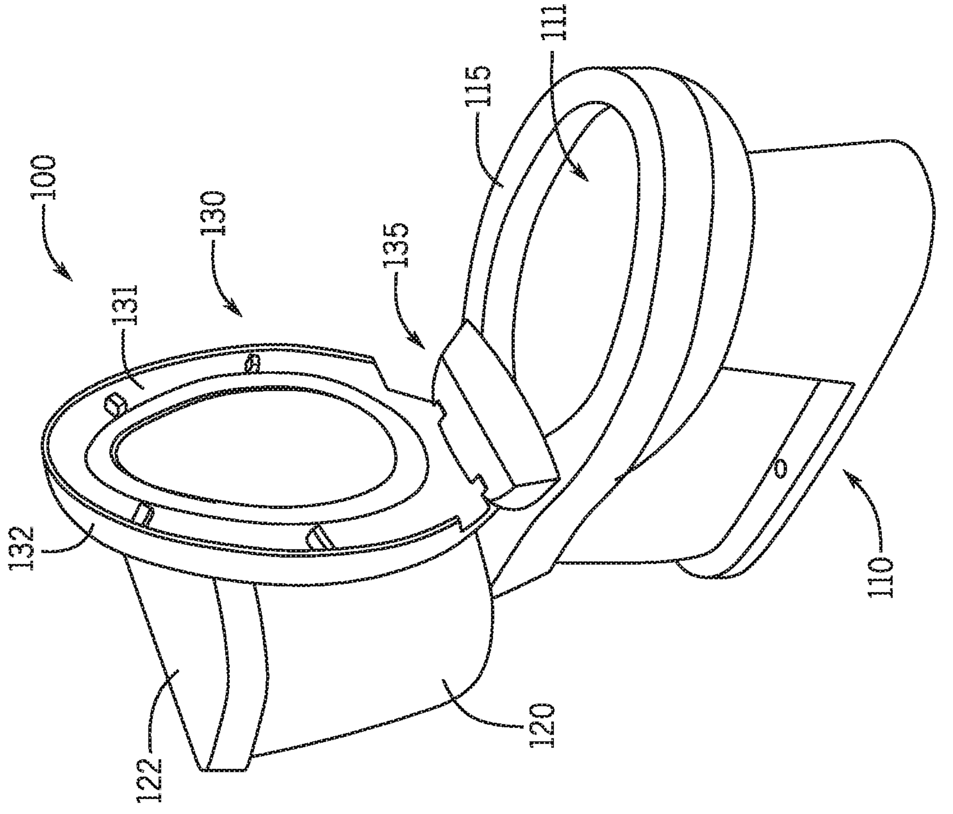
FIG. 1 is a perspective view of an exemplary embodiment of a toilet.

FIG. 1 illustrates an exemplary embodiment of a toilet 100 including a base 110 (e.g., pedestal, bowl, etc.) and a tank 120 supported by the base 110. The base 110 is configured to be secured to another object, such as a drain pipe, floor, combination thereof, or any other suitable object. The base 110 includes a bowl 111 and a passageway 113 fluidly connecting the bowl 111 to the drain pipe. The tank 120 may be supported by a support (e.g., a rear support) of the base 110, such as an upper surface of a rim 115. The tank 120 may be integrally formed with the base 110 (e.g., the support), which is commonly referred to as a one-piece toilet. Alternatively, the tank 120 may be formed separately from the base 110 and coupled (e.g., secured, fastened, connected, etc.) thereto, which is commonly referred to as a two-piece toilet. A lid 122 may be included to cover an opening and an inner cavity of the tank 120. The toilet 100 may include a seat assembly 130. As shown, the seat assembly 130 includes a seat 131 and a seat cover 132 both of which are pivotally (e.g., rotatably) coupled to the base 110, such as through one or more than one pivot (e.g., hinge). FIG. 1 shows a hinge assembly 135 mounted to the rim 115 and rotatably supporting the seat 131 and the seat cover 132.

Figure 2:
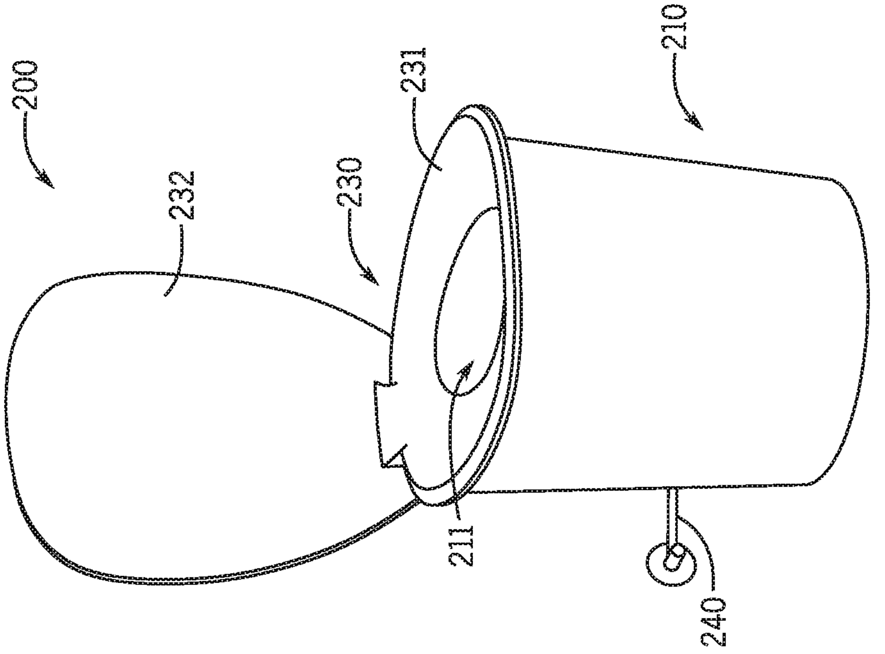
FIG. 2 is a perspective view of another exemplary embodiment of a toilet.

FIG. 2 illustrates another exemplary embodiment of a toilet 200 including a base 210 and a seat assembly 230 coupled to the base 210. The base 210 based includes a bowl 211 and a passageway (not shown in FIG. 2) fluidly connecting the bowl 211 to a drain pipe. The toilet 200 does not include a tank, at least that is supported by the base 210. A water line 240 is shown supplying the toilet 200 with water through an inlet. It is noted that the two examples of toilets 100, 200 are meant to provide context to the various aspects discussed below and are non-limiting examples of toilets that may be configured to utilize the aspects discussed. Therefore, the various aspects of these systems (e.g., dispensing systems, cleaning systems, chemistries/cleaning compounds, etc.) that are discussed in this application may be configured for use with other types of toilets, bidets, and other sanitary devices.

Chemistry

The systems (e.g., toilets, dispensers, etc.) described in this application may be configured to utilize chemistry to advantageously help clean (e.g., up to a level just below disinfection) or help maintain the cleanliness longer than toilets not having the improved chemistry. As non-limiting examples, the chemistries disclosed herein may advantageously help prevent the formation of scale, remove scale that has formed, prevent or remove biofilm, prevent or mask odors, and/or sanitize components of toilets or other devices disclosed in this application. The toilets utilizing the improved chemistry may be able to go for one to six months (e.g., eight weeks) or longer without having to be cleaned (e.g., before the build-up of deposits). More specific examples of chemistry/cleaning compounds are described below in greater detail.

The chemistry/cleaning compounds may be delivered to specific components of the systems (e.g., the bowl, tank, and/or trap of a toilet) alone or mixed with another compound or element. The compounds may be provided into the toilets, such as prepared external to the toilet and introduced into the toilet for use therein. The compounds may be generated in the toilets, such as generated within systems and/or subsystems of the toilets for use therein. For example, chemical/compound generators may be employed by a toilet and/or an accessory to produce a cleaning compound used to clean the toilet and/or accessory. These and other aspects are described below in greater detail.

i. Cleaning Compounds

The systems (e.g., toilets, accessories, etc.) and methods of this application may be configured to utilize one or more than one compound/chemistry to improve the cleanliness of the system. In this application, the terms "chemistry," "compound," and "cleaning compound" are used interchangeably to connote the use of a chemical, chemical compound, chemical element, or any combination thereof that is beyond that of mere water. Thus, while the systems described in this application may use water (e.g., to dilute a cleaning compound, for flushing, etc.) and the cleaning compounds may include water, the chemistry/compounds/cleaning compounds include at least one additional chemical (e.g., elements, compounds, etc.) other than water.

The systems may introduce one or more cleaning compounds into or onto a component (e.g., element), surface, and/or feature of the system or another system. For example, toilets may be configured to introduce one or more cleaning compounds into or onto a bowl, a valve, a tank, a trap or trapway, and/or any other part of the toilet. As one such example, a toilet may be configured to introduce hydrogen peroxide ($H_2O_2$) into the bowl of the toilet to help clean the internal surfaces that come into contact with liquid and solid waste. Other examples are discussed in this application regarding toilets, as well as other systems, such as stand-alone dispensers, paper dispenser, and so forth.

In addition to $H_2O_2$, chlorines and peracedic acid (PAA) are additional non-limiting examples of chemicals/compounds that may be used with the systems and methods of this application. Some additional non-limiting examples of chemicals/compounds that may be used with the systems and methods of this application include (but are not limited to) polyphosphates (e.g., sodium hexametaphosphate (SHMP), tetrapotassium pyrophosphate (TKPP), etc.), low pH acids (e.g., hydrogen chloride (HCL), dihydrogen phosphate ($H_2PO_4$), trisodium phosphate (TSP), ethylenediaminetetraacidic acid (EDTA), and compounds thereof, as well as other acids and/or sequestering agents. These chemicals/compounds may be most beneficial in, for example, preventing and/or removing scale. Yet other examples of chemicals/compounds that may be used with the systems of this application include (but are not limited to) didecyldimethyl ammonium chloride (DDAC), $H_2O_2$, sodium hypochlorite (NaOCl) such as bleach, PAA, triclosan, formic acid, TSP, and compounds thereof, as well as other disinfectants (e.g., quaternary disinfectants) and biocides. These chemicals/compounds may be most beneficial in, for example, preventing and/or removing biofilm. It is noted that other chemicals/compounds may be used in the systems and methods disclosed in this application, and any such chemical/compound disclosed may be used with any system and/or method disclosed.

The chemicals/compounds can take various forms, such as liquids or solids. One example is in the form of phosphate beads, which may be spherical (e.g., 12.7-25.4 mm in diameter) or may have any suitable shape. Another example includes a shell (e.g., glass shell) that houses a chemical (e.g., phosphate) inside and is released or brought into contact with a diluent, such as through an opening. The concentration of the chemical may be relatively high, so that it can last over a long period of time (e.g., about one year) without having to be replaced.

ii. Compound Generators

The toilets may include a system that generates a chemical/compound, such as one of those disclosed above. For example, a system may include a generator that produces $H_2O_2$, such as from oxygen (e.g., in air) and water from a water source. Thus, a chemical/compound generator may be provided within a system, such as a toilet, to produce the cleaning compound. According to one example, a generator may be configured to produce a chemical (e.g., $H_2O_2$) that is diluted to 30 ppm (parts per million), such as with water or other suitable diluent. According to one example, a generator is configured to produce a chemical that is diluted to 100 ppm.

The cleaning compounds may also be used with other systems discussed in this application, such as standalone dispensers, paper dispenser, and so forth. Thus, these other systems may include dispensers for dispensing $H_2O_2$, $O_2$, chlorines, PAA, and any other suitable cleaning compound, as well as any combination thereof.

The systems for introducing a cleaning compound may be built into the system and/or toilet (e.g., an OEM produced toilet) or may be an "add-on" system that can be installed onto a traditional system and/or toilet (after its manufacture, such as an "after-market" system or assembly) to improve the cleanliness of the traditional system and/or toilet.

The systems and methods described in this application may include an electrochemical generator or method of electrochemical generation, which may involve using oxygen, water, and an electrical current to generate a chemical/compound.

Some examples of compound generators that are disclosed in this application are those shown in FIGS. 96-99, which are described in more detail below.

Flow Beads

A non-chemical approach to mitigating (e.g., reducing, removing, etc.) scale and other contaminants may be employed. One such example is the use of beads (e.g., flow beads, OneFlow® media or beads, etc.), which may involve template assisted crystallization (TAC). Certain minerals (e.g., calcium, magnesium, etc.) when in an ionic form (e.g., state) may attach to surfaces (e.g., inner surface of the bowl of a toilet), but do not attach to surfaces when crystalized (i.e., in a crystalline form). The beads involving TAC change the mineral(s) from their ionic form to their crystalline form to prevent the minerals from attaching to surfaces of the systems and/or induce the in minerals to become detached from the surfaces. Thus, flow beads can utilize chemical interaction and/or friction to help clean surfaces of a system by preventing mineral deposits from attaching to the surfaces and/or knocking off mineral deposits attached to the surfaces.

Beads may be used in any system, such as, for example, a toilet to reduce or prohibit the build-up of scale and other contaminants on the surfaces of the toilet. By way of example, flow beads can be used to clean a bowl, a trap, a tank, as well as other surfaces/elements of the toilet. Accordingly, beads may break up the agglomeration of scale on the inside surfaces of the components of the toilet, such as the tank, bowl, etc. By reducing the amount of scale on the surfaces of the toilet, biofilm and other contaminants have less potential of attaching to the surfaces/scale. The flow beads, therefore, may advantageously increase the slippery and/or sanitation of the toilet. Beads may be made from any suitable material that involves TAC. The beads may be blended with other materials. The beads may be configured to attach to the deposits (e.g., urine scale) on surfaces of the system to be cleaned (e.g., toilets) then crystallize to increase in size to thereby allow the bead and attached deposit to be knocked off by a fluid passing over the bead and deposit, such as from the fluidized stream of fluid flowing through the toilet or from a flow of fluid from a dispenser described in this application.

The beads may be configured having any suitable size. According to one non-limiting example, the beads have a diameter of about 0.5 to 1.0 mm. However, the size of the beads can be larger or smaller than 0.5 to 1.0 mm.

One exemplary use for flow beads is for cleaning a toilet, such as the surfaces exposed to water and/or waste. The chemicals and compounds provided by the beads may be introduced into the toilet in different ways. As non-limiting examples, beads may be utilized with any fluid line of the toilet, such as a water inlet line (e.g., line that introduces water into the toilet), inside a tank of the toilet (e.g., exposed directly or indirectly to the water in the tank), inside a valve of the toilet (e.g., fill valve, flush valve, etc.), or in other suitable ways. Described below are several non-limiting examples of toilets configured to use flow beads for cleaning the toilet.

FIG. 100 illustrates an exemplary embodiment of a toilet 170 configured to use flow beads. The toilet 170 includes a base 171 having a fixed member 172 (e.g., panel) and a movable member 173 that is configured to move between a first (e.g., closed) position, as shown in FIG. 100 using phantom lines and reference numeral 173', and a second (e.g., open) position, as shown in FIG. 100 using solid lines. In the closed position, the movable member 173 conceals a cavity 174 in the base 171, and in the open position, the cavity 174 is revealed. The cavity 174 houses a flow bead ("FB") assembly 175 that is configured to introduce one or more chemicals, compounds, or other elements from the one or more flow beads of the FB assembly 175 into the toilet 170, such as during a flush cycle and/or a cleaning cycle. The FB assembly 175 includes a container 176 for holding a volume of flow beads, an inlet for receiving a flow of fluid, such as water, and an outlet for transferring a mixture of water and chemical(s) provided by the flow beads from the container to another element of the toilet 170. The inlet may be fluidly connected to a water supply. The outlet may be fluidly connected to, for example, a flush channel (e.g., a rim channel in the bowl of the base) of the toilet, such that upon actuation of a flush cycle, chemical(s) provided by the flow beads are introduced along with water into the toilet bowl. Thus, the water can be a diluent of the chemical(s) provided by the flow beads and/or a carrier of the chemical(s), as well as aid in flushing the contents from the bowl of the toilet.

FIGS. 101 and 102 illustrate another exemplary embodiment of a toilet 270 configured to use flow beads. The toilet 270 includes a base 271 and a tank 272. The tank 272 is configured to house a volume of water for use during a flush cycle. The tank 272 may include a fill valve and/or a flush valve, such as described in this application or according to conventional valves. The toilet 270 includes a FB assembly 275 that mixes flow beads and water to form a cleaning compound for use in the toilet 270. As shown in FIG. 102, the FB assembly 275 includes a container 276 for housing flow beads, an inlet line 277 fluidly connecting an inlet of the container 276 to a water supply, and an outlet line 278 fluidly connecting an outlet of the container 276 with an inlet of another element of the toilet (e.g., the tank 272). Water received from the water supply enters an inlet of the inlet line 277 and passes through the inlet line to the container. Water in the container 276 mixes with flow beads to form a cleaning compound, which then passes from the container 276 to the outlet line 278. The cleaning compound enters the tank 272 via an outlet of the outlet line 278. As shown in FIG. 101, the container 276 may be coupled to an external portion of the base 271, such as a portion that is rearward of the bowl near the exterior surfaces of the trapway. The container 276 may include a lid that allows access into the container, such as to refill the system with flow beads or other chemical compounds.

FIG. 103 illustrates another exemplary embodiment of an integrated toilet seat assembly and FB assembly 370. The assembly includes a seat that is rotatable relative to a toilet base 371. The assembly may include a cover that is provided above the seat and rotatable relative to the seat and the toilet base 371. The assembly also includes a container 372 that is configured to house flow beads, an inlet line 373 fluidly connecting an inlet of the container 372 to a water supply, and an outlet line. As shown, the assembly includes a first outlet line **374*a* and a second outlet line 374*b*. The first outlet line 374*a* fluidly connects the container 372 to a dispenser configured to discharge a mixture of water and a cleaning compound (e.g., from the flow beads) into the bowl of the toilet base 371. The second outlet line 374*b* fluidly connects the container 372 to another object, such as, for example, a tank 272 of a toilet to transfer a mixture of water and a cleaning compound to the tank. Thus, the cleaning compound delivered through the first outlet line 374*a* is configured to clean the bowl directly, and the cleaning compound delivered through the second outlet line 374*b* first cleans the tank and any internal components within the tank (e.g., fill valve, flush valve, etc.) then, second, may clean the bowl. This system may advantageously provide additional cleaning. The flow beads may be removed from the container, such as to replace the flow beads with new ones. As shown, the container 372 includes a base 372*a* and a cover 372*b* that is removable from the base 372*a* to gain access to inside the container 372** (e.g., a reservoir therein).

FIG. 104 illustrates another exemplary embodiment of a toilet 390 configured to use flow beads. The toilet 390 includes a base 391 and a tank 392 that is for holding water and is supported by the base 391. The tank 392 houses a FB assembly 393 having a container 394 that houses flow beads. An inlet 395 fluidly connects a water supply and the container 394 to introduce water into the container 394. A mixture of water and chemical/compound (e.g., from the flow beads) is transferred via an outlet 396 (e.g., outlet line, outlet opening, etc.) to the tank 392 or another element in the tank 392, such as a fill valve.

FIGS. 105A-1050 illustrate additional exemplary embodiments of FB assemblies 570, 590 for housing flow beads. As shown in FIG. 105A, the FB assembly 570 includes a container 571 configured to house flow beads and a housing 572 for supporting the container 571. The housing 572 includes an inlet 573, which is configured to be fluidly connected to an inlet line 574 carrying water, and an outlet 575, which is configured to be fluidly connected with another element of the toilet through an outlet line 576. The container 571 may be removable from the housing 572 in order to refill and/or replace the flow beads once they are used up. A cavity (e.g., chamber) is provided in the FB assembly 570, such as in the container 571 and/or housing 572, in which one or more chemicals from the flow beads mix with water from the inlet line 574. The mixture is then passed to another element through the outlet 575. The container 571 may include a lid 577 that is movable (e.g., rotatable) relative to a base 578 to allow a user to access the inside of the container 571 to refill/replace the flow beads. As shown, the lid 577 is hinged to the base 578, such that the lid 577 and base 578 remain coupled even in the open position shown in FIG. 105A.

As shown in FIGS. 105B and 105C, the FB assembly 590 includes a container 591 supported by a housing 592, an inlet line 594, and an outlet line 596 (like with the FB assembly 590). FIG. 105C shows the housing 592 removed for clarity. As shown, the container 591 includes an inlet opening 593 and an outlet opening 595 that allow fluid to pass through. According to another example, the container 591 is porous (e.g., made with mesh material or other material having a plurality of holes) to allow fluid to pass through while retaining the flow beads in the container 591, such as when the container 591 is removed from the housing 592. A lid 597 is detachably coupled to the container 591 (or to the housing 592 in another example).

FIGS. 106A and 106B illustrate another exemplary embodiment of a FB assembly 670 configured to introduce flow beads and/or a cleaning compound into the toilet 100. The FB assembly 670 includes a housing having a first portion 671 and a second portion 672 that is rotatable relative to the first portion 671 about a pivot. The first portion 671 is a generally cylindrical element having a top 673, a bottom 674, and a generally cylindrical wall 675 extending between the top 673 and bottom 674. An opening 676 is provided in the cylindrical wall 675, such that in the area of the opening, the wall is semi-cylindrical. The opening 676 leads to cavity that is configured to receive the second portion 672. The second portion 672 is rotatable relative to the first portion 671 between a first (e.g., closed) position, in which the second portion 672 is disposed in the cavity of the first portion 671 (see FIG. 106A), and a second (e.g., open) position, in which the second portion 672 is outside (e.g., removed from) the cavity (see FIG. 106B). The second portion 672 includes a compartment 677 configured to house flow beads. When the second portion 672 is in the second position, the compartment is accessible allowing for the flow beads to be replaced or refilled. For example, a lid may be removably (e.g., detachably) attached to the second portion 672 to provide access to the compartment and/or an opening 678 may be provided in the second portion 672 (e.g., to pass flow beads through and to allow fluid to pass from the second portion 672 to the first portion 671). The FB assembly 670 includes an inlet 679 for receiving a supply of water. A mixing chamber (not shown) may be provided in one of the portions to mix the water with the flow beads. The FB assembly 670 includes an outlet 680 for passing the mixture to another element of the toilet. For example, the second portion 672 may include the outlet 680, which may be fluidly connected to the inlet of the tank 120.

FIGS. 107A and 107B illustrate another exemplary embodiment of a FB assembly 780 for use in-line with a water line 781, such as a water inlet, of a toilet. The FB assembly 780 includes a hollow inlet connector 782 configured to connect to a water line connector 783. The inlet connector 782 is configured to receive water from the water line 781. As shown, the inlet connector 782 includes external threads that mate with internal threads in a bore of the water line connector 783. A passage in the inlet connector 782 fluidly connects the water inlet connector 783 with a mixing chamber in the FB assembly 780. The FB assembly 780 includes a container 784 for housing flow beads, which are configured to be mixed with water in the mixing chamber. The FB assembly 780 includes an outlet connector 785 including a bore 786 having internal threads that mate with external threads of an outlet line 787 to fluidly connect the outlet of the FB assembly 780 with another element of the toilet, such as a tank (e.g., fill valve) or a bowl through the outlet line 787.

FIGS. 108A and 108B illustrate another exemplary embodiment of a FB assembly 870 for use in-line with a water line 871, such as a water inlet, of a toilet. The FB assembly 870 is configured to be disposed within a cavity 872 of the water line 871. The water line 871 includes an inlet 873 for receiving a supply of water and an outlet 874. The water line 871 has a generally circular cross-sectional shape, except in the area of the cavity where the water line has a semi-circular cross-sectional shape. Disposed on each end of the cavity in the water line is a mesh member 875, which can catch (e.g., filter out) particles.

The FB assembly 870 includes a cylindrical canister 877 having two open opposite ends. Disposed in each end of the canister is a mesh member 878, which can be removed, such as to add or remove flow beads from the canister. The canister 877 is sized and shaped to nest in the cavity 872 of the water line 871 and complement the water line. The FB assembly 870 may include a flexible strip 879 extending from an outer surface of the canister. The strip 879 is configured to protrude from the cavity 872 to aid a user in removing the canister 877 from the cavity 872, such as to refill the flow beads, by pulling on the strip 879. Thus, a portion of the strip 879 is connected to the canister 877 and another portion of the strip 879 is not connected to the canister 877. Water passing through the canister 877 mixes with the flow beads to form a cleaning compound that can be used elsewhere in a toilet that is fluidly connected downstream from the FB assembly 870, such as fluidly connected to the outlet 874.

Delivery Systems and Methods

The systems (e.g., toilets, standalone, etc.) of this application may be configured to utilize the various chemistries/cleaning compounds described herein through various delivery (e.g., dispensing) systems and methods. The delivery systems may be integrated with the toilets, with other systems, or may be standalone systems that can be used as an accessory or retrofitted with existing toilets to utilize the various chemistries. The delivery systems may be manually operated, automated (e.g., touchless actuation), or a combination thereof. The delivery systems may be located within a subassembly of the toilet (e.g., the tank), external to the toilet, or a combination thereof, such as having a portion of the system within the toilet and a portion external to the toilet. The delivery systems may be configured to clean the toilet, such as surfaces and/or features of the toilet (e.g., the bowl, handle, etc.), or the systems may be configured to clean other objects, such as paper products and/or a user (e.g., a user's hands) by dispensing a cleaning compound to sanitize the toilet/object. These aspects and more are discussed in greater detail in the various non-limiting examples of delivery systems and methods described below.

iii. Examples of Tank Exterior Dispensing "Hook" Systems

The toilets described in this application may include a delivery system that is configured to attach (e.g., mount, couple, connect, etc.) to a structure of the toilet, such as a tank (e.g., the water tank 120 shown in FIG. 1) and delivery a chemistry/cleaning compound external to the tank. FIGS. 3-7 illustrate examples of these types of delivery systems 301, 331, 361 (e.g., dispensing system, sprayer, etc.). As shown, each delivery system 301, 331, 361 includes a housing 303, 333, 363 with a reservoir 304, 334, 364 (e.g., tank, container, vessel, etc.) that is provided within the housing 303, 333, 363 and is configured to hold a volume of a compound (e.g., a cleaning compound, such as any chemistry discussed in this application), and a dispenser 305, 335, 365 configured to discharge (e.g., dispense, emit, project, etc.) a portion (e.g., a metered amount) of the compound when activated.

Figure 3A:
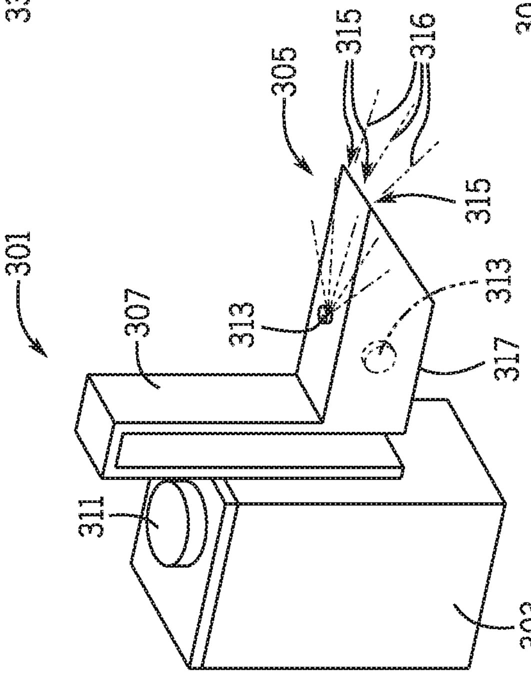
FIG. 3A is a perspective view of an exemplary embodiment of a delivery system for use with toilets.
Figure 3B:
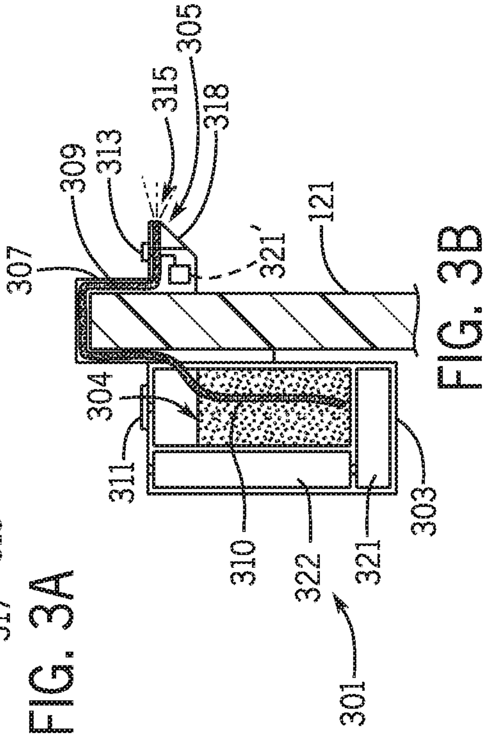
FIG. 3B is a cross-sectional side view of the delivery system shown in FIG. 3A.

Each housing 303, 333, 363 is configured to be coupled to the tank, such as inside the tank. The housing 303, 333, 363 may be coupled to the tank via a conventional fastener, a retaining member, or other suitable element. As shown in FIG. 3B, the retaining member of the system 301 is configured as a hook 307 that is configured to hang from a wall 121 of the tank 120. The hook 307 includes a first end that is coupled to the housing 303 and a second end that is coupled to (e.g., supports) the dispenser 305. The retaining member may further be configured to include a fluid passage 309 (e.g., conduit, passageway, etc.) fluidly connecting the reservoir 304 and the dispenser 305, such that the cleaning compound can be delivered from the reservoir 304 to the dispenser 305 through the fluid passage 309 of the retaining member. The fluid passage 309 may include or be fluidly connected to a flexible passage 310 that may extend into the reservoir (and the cleaning compound in the reservoir) to allow cleaning compound to be drawn into the passage 310.

The reservoir 304 is configured to hold a volume of a compound, such as any chemistry discussed in this application. The compound (e.g., chemical compound) may be a solid or a liquid. The reservoir 304 may be configured as an open container, such as a cup with an open top, where the cup is defined by portions (e.g., walls) of the housing 303. As shown in FIGS. 3A and 3B, the reservoir 304 is configured as a sealed container having a base, which is formed by portions of the housing 303, and a lid 311 or other feature, which is moveable relative to the base to allow access to the reservoir 304, such as to refill the reservoir 304 with a compound when the reservoir 304 is empty or low. For example, the lid 311 may be screwed to the base through mating threads. Also, for example, the lid 311 may snap to the base or be hinge to the base. Thus, the lid 311 may be detachable from the base to provide access to the compartment housing the cleaning compound. A seal may be provided between the lid 311 and a base of the housing 303 defining the reservoir 304.

The dispenser 305 is configured to discharge the cleaning compound when the dispenser 305 is activated (e.g., by a user). The system 301 may include a manual actuator (e.g., a knob, a lever, button, switch, etc.) and/or an automated actuator that controls the operation of the dispenser. Upon activation (e.g. rotating, pushing, sliding, etc.) of the manual and/or automated actuator, such as by a user, the dispenser discharges a predetermined amount of cleaning compound. FIG. 3A illustrates a button 313 (using phantom lines to show it is optional) located on the dispenser 305 for manually actuating the dispenser 305. The automated actuator may be configured to operate based on presence, time, or any other suitable criterion/criteria. The system 301 may include a sensor 313 that is configured to detect the presence of an object (e.g., a user) that is located within a zone of detection, such as by emitting a signal or a beam (e.g., of light) that is reflected back by the object. The dispenser 305 discharges the compound (e.g., cleaning compound) upon a trigger evening, such as a detection of an object in the zone of detection, upon removal of an object from the zone of detection, after a predetermined time following removal of the object from the zone of detection, or in any suitable manner. The sensor 313 may be located in or on a top surface of the dispenser 305 as shown in FIG. 3A, on another surface of the dispenser 305, on the retaining member, or any other suitable part of the toilet. The sensor 313 may be configured as an infrared (IR) sensor or any other suitable optical sensing device. The dispenser 305 may include more than one sensor, such as to provide multiple zones of detection or different functionality.

The dispenser 305 includes one or more nozzles (e.g., orifices, outlets, ports, etc.) configured to direct the cleaning compound from the dispenser 305. As shown in FIGS. 3A and 3B, the system 301 includes a plurality of nozzles 315 having a side by side and spaced apart arrangement that discharge cleaning compound (shown as phantom lines 316 in FIG. 3A). The plurality of nozzles 315 discharge the compound in similar or different directions, such as at angles (e.g., oblique angles) relative to one another to provide a broader distribution of the compound to advantageously sanitize a larger area (e.g., of the toilet). Also shown in FIG. 3A, the dispenser 305 includes a body 317 that is coupled to the retaining member (e.g., an end thereof), such that each nozzle 315 is configured to discharge the compound in a direction away from the retaining member.

Figure 4B:
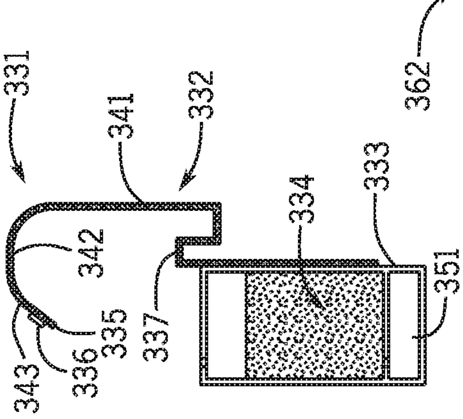
FIG. 4B is a cross-sectional side view of the delivery system shown in FIG. 4A.
Figure 4A:
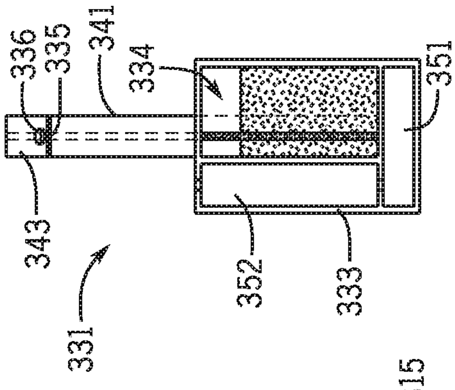
FIG. 4A is a cross-sectional front view of another exemplary embodiment of a delivery system for use with toilets.
Figure 5:
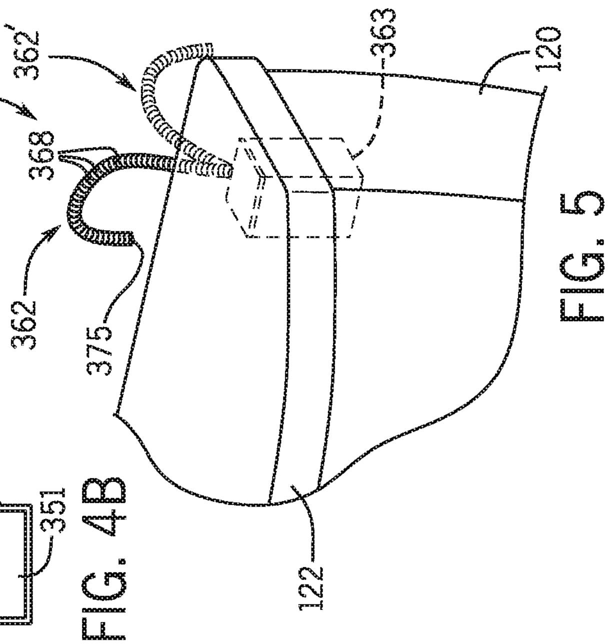
FIG. 5 is a perspective view of a portion of another exemplary embodiment of a delivery system for use with toilets.

FIGS. 4A-5 illustrate dispensing systems 331, 361 configured similar to dispensing system 301, except the dispensers 331, 361 include a spout 332, 362 (e.g. neck) that extends away from the associated retaining member 337. As shown in FIG. 4B, the spout 332 may be configured having a generally inverted J-shape including an elongated first member 341 that is coupled to the retaining member 337 at a first end and in fluid communication therewith. The spout 332 may further include a curved second member 342 that extends from a second end of the first member 341. The spout 332 may include a third member 343 (e.g. a generally straight third member) extending from the second member 342. Disposed at the end of the spout 332 is at least one nozzle 345 configured to direct the compound from the dispenser 331. A fluid passage may extend through the spout 332 to fluidly connect each nozzle 345 to the cleaning compound in the reservoir 334. One or more sensors for detecting presence of a user may also be disposed at the end of the spout 332. By way of example, the sensor 336 may be disposed in or on a top side of the third member 343. The relatively long spouts 332, 362 may be advantageous for applications where the compound is to be directed at a location that is remote (e.g., far) from the housing 333, 363 and/or retaining member 337, such as where the compound is to be dispensed in a direction toward the bowl or where a dispenser disposed on a side of the tank would be difficult to access.

As shown in FIG. 5, the spout 362 may be flexibly configured, such that the shape of the spout 362 may be manipulated by a user to change the location of the dispenser (e.g., nozzle 375) and/or the dispensing direction of the dispenser. By way of example, the spout 362 may be reconfigured into the spout 362' shown in FIG. 5. However, it is understood that the flexible spout 362 may be reconfigured into any shape. The spout 362 may include a plurality of segments 368 that are movable relative to the adjacent segment(s) 368 to allow the shape of the spout 362 to be changed. A fluid passage may be located in the spout and may be flexible so that a shape of the fluid passage generally conforms to the shape of the spout as the spout is reconfigured. Also shown in FIG. 5, the lid 122 may cover the tank 120 (e.g., an opening into the tank), the housing 363 (e.g., reservoir) in the tank 120 and at least a portion of the retaining member when the lid 122 is in a coupled position with the tank 120. The lid 122 is moveable to an open position to provide access to an inside of the tank and the housing 363 and reservoir.

The delivery systems 301, 331, 361 may include a pump or other suitable device configured to move the compound through the system, such as from the reservoir to the dispenser. The pump may be disposed within or coupled to the housing, disposed within or coupled to the retaining member, disposed within or coupled to the dispenser, or provided separate from the housing, retaining member and/or the dispenser. As shown in FIG. 3B, the pump 318 may be located in the dispenser 305, if provided.

The delivery systems 301, 331, 361 may include an electronic controller configured to control dispensing of the system. The electronic controller may include a printed circuit board (PCB) having a microprocessor, such as to communicate with and control other electronic elements of the system. As shown in FIGS. 3B and 4B, the electronic controller 321, 351 may be disposed within the housing 303, 333. The controller 321, 351 may be in electronic communication, either wired or wireless communication, with any sensor, any pump, and/or any other electrical/electronic elements/components of the system 301, 331, 361. For example, the controller 351 may receive a signal output from the sensor 336 indicating that an object has entered a zone of detection of the sensor 336, and in response to the signal output from the sensor 336, the controller 351 may activate the pump to provide pressure on fluid in the fluid passage to dispense a metered amount of cleaning compound from the dispenser 305. FIG. 3B also shows an alternative configuration with the controller 321' disposed in the dispenser 305. It is noted that the controller, if provided, can be located anywhere in the system.

The delivery systems 301, 331, 361 may include an internal power source 322, 352, such as a battery that is configured to supply electric power to the system, such as any sensor, any pump, any controller, or any other electronic component. Thus, the power source 322, 352 may be electrically connected to (e.g., in electric connection with) other any other electronic component of the system. As shown in FIGS. 3B and 4A, each power source 322, 352 is provided within the associated housing 303, 333, such as in a battery compartment of the housing 303, 333. According to other examples, the electronic components of the delivery systems 301, 331, 361 may be powered by external power sources, which may be located elsewhere in the toilet or external to the toilet.

The housing 303, 333, 363 may advantageously include a hermetically sealed compartment configured to house one or more electronic components (e.g., the electronic controller, power source, etc.) to prohibit the intrusion (e.g., ingress) of a fluid (e.g., water, cleaning compound, etc.) into the compartment to prevent contact between the fluid and the electronic component(s). For example, the housing 303, 333 may include a sealed compartment that houses both the controller 321, 351 and the power source 322, 352. Also, for example, the housing may include a first sealed compartment configured to house a first electronic component (e.g., the controller) and a second, separate sealed compartment configured to house a second electronic component (e.g., the battery). The sealed housing may advantageously protect the electronic component(s) from being damaged due to exposure to a fluid, such as water in the tank of the toilet and/or cleaning compound in the reservoir of the system.

Figure 6A:
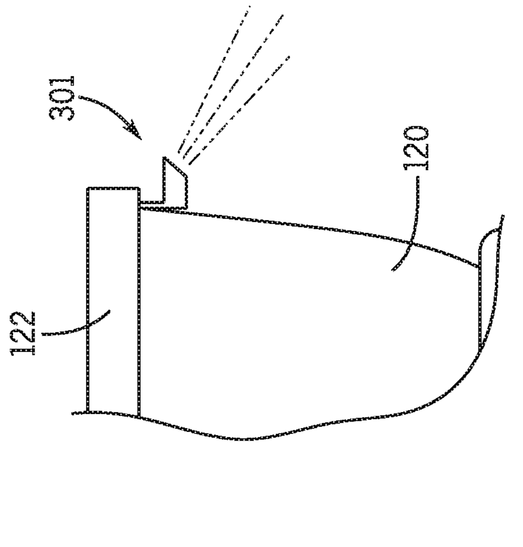
FIG. 6A is a front view of the delivery system shown in FIG. 3A with a portion of a toilet tank and lid.
Figure 6B:
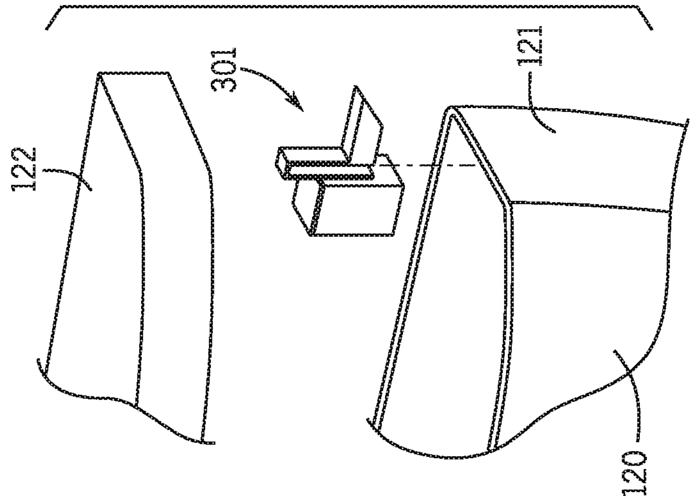
FIG. 6B is an exploded perspective view of the delivery system shown in FIG. 3A with a portion of a toilet tank and lid.
Figure 7:
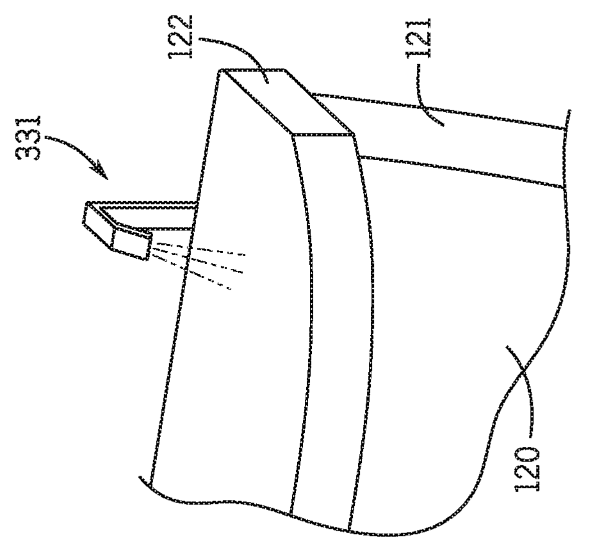
FIG. 7 is an exploded perspective view of the delivery system shown in FIG. 4A with a portion of a toilet tank and lid.

As shown in FIGS. 6A-7, the delivery system 301, 331, 361 may be moveable relative to the toilet 100. For example, the retaining member of the system 301 may be configured to connect to (e.g., hang from) a side wall 121 of the tank 120, as shown in FIGS. 6A and 6B, such that the dispenser 335 discharges compound in a lateral direction (e.g., side-to-side direction relative to the toilet position). The dispenser 335 may discharge the compound to the side of the toilet. This arrangement may be advantageous if the compound is a sanitizing compound intended for the user, such as to sanitize the hands of the user. Also, for example, the retaining member of the system 331 may be configured to connect to a rear wall 121 of the tank 120, as shown in FIG. 7, such that the dispenser 365 discharges compound in a fore-and-aft direction (e.g., front to rear direction relative to the toilet position). The dispenser 365 may discharge the compound directly onto the toilet, such as the seat, bowl, handle, or any other feature of the toilet. This arrangement may be advantageous if the compound is for cleaning the toilet.

One advantage of providing the housing within the tank and the dispenser external to the tank is that the cleaning compound can be diluted with water from the tank, should it be desirable to dilute the compound. For such an example, the housing of the system may be configured to include an inlet that is received by a tube (e.g., conduit, pipe, etc.), which is fluidly connected to the water in the tank of the toilet. The delivery system (e.g., the systems 301, 331, 361) may further include a device (e.g., mixing valve) to mix a volume of the compound with a volume of water for dispensing. The valve may be provided within or coupled to the housing.

iv. Examples of Tank Exterior Dispensing "Integrated Hole" Systems

FIGS. 8-11 illustrate exemplary embodiments of delivery systems 401, 421, 441, 461, 481 for a toilet (e.g., the toilet 100) that is configured to attach (e.g., mount, couple, connect, etc.) to an opening (e.g., hole, aperture, etc.) in a tank of the toilet and deliver a chemistry/cleaning compound external to the tank. For example, each system 401, 421, 441, 461, 481 may be configured to engage a hole in the toilet tank, such as that might otherwise be configured to allow an external trip lever to access the internal flush valve therethrough. The delivery system systems 401, 421, 441, 461, 481 can be integrated with the trip lever for manual flushing toilets or can be separate from the trip lever (e.g., a standalone system), such as for automatic (e.g., touchless) flushing toilets.

Figure 9B:
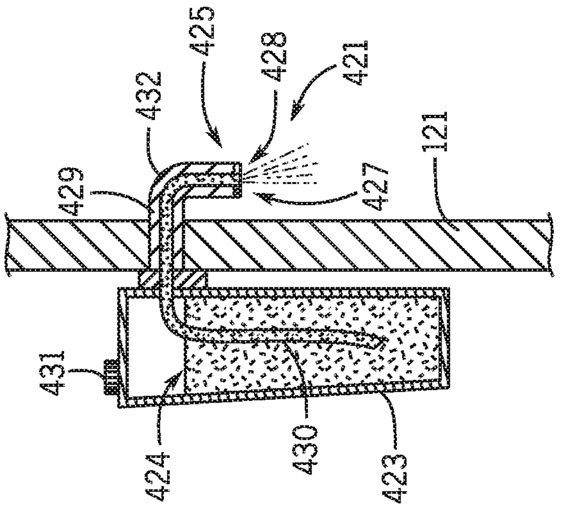
FIG. 9B is a cross-sectional side view of another exemplary embodiment of a delivery system mounted within a wall of a toilet tank.
Figure 9A:
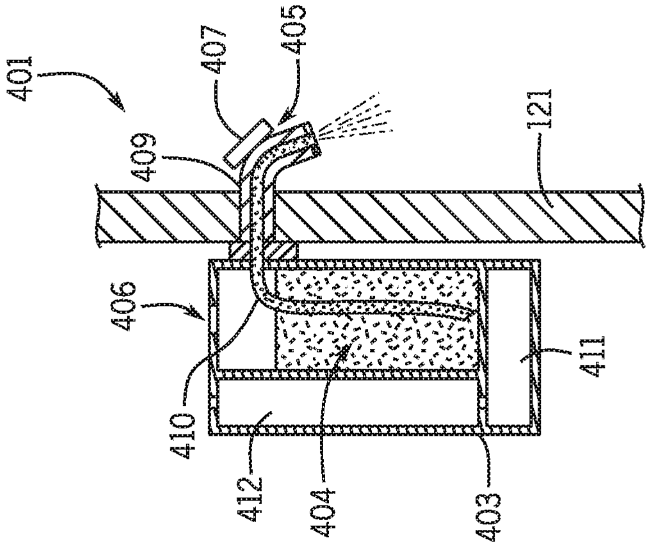
FIG. 9A is a cross-sectional side view of another exemplary embodiment of a delivery system mounted within a wall of a toilet tank.

As shown in FIGS. 9A and 9B, the system 401, 421 includes a housing 403, 423 that is located inside of the toilet tank. The housing 403, 423 may be configured similar to, the same as, or different than the housing for any other system (e.g., system 301, 331, 361). The housing 403, 423 includes a reservoir 404, 424 configured to hold a volume of a cleaning compound (e.g., any chemistry discussed herein). As shown in FIG. 9A, the housing 403 may be an open container having an opening 406 through a top of the housing to refill the reservoir with compound. As shown in FIG. 9B, the housing 423 is a closed container having a lid 431 that closes the reservoir in a coupled position with the housing 423.

Figure 8:
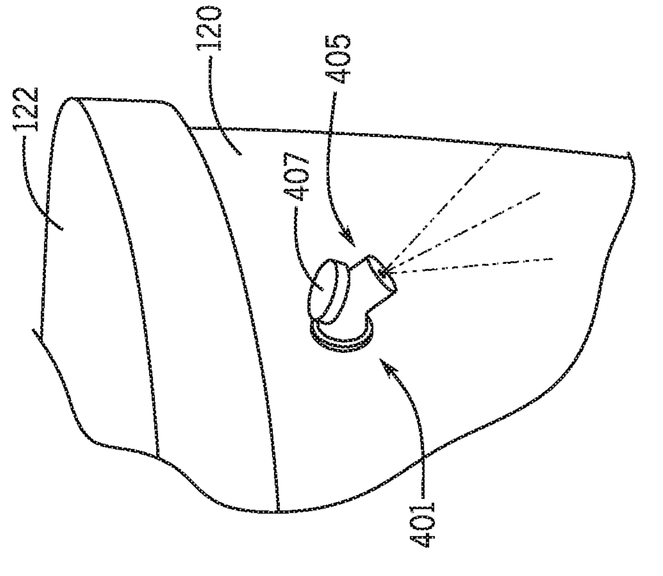
FIG. 8 is a perspective view of an exemplary embodiment of a delivery system mounted within a wall of a toilet tank.

The systems 401, 421 also include a dispenser 405, 425 that is configured to discharge the cleaning compound when activated. The system 421 may be configured to further include any element/component discussed herein for other examples, such as but not limited to a controller, a power source, a sensor, etc. The dispenser 405 may be controlled by a manual actuator 407, such as shown in FIGS. 8 and 9A. Alternatively or in addition to the manual actuation, the system 421 may be configured to provide "hands-free" (i.e., touchless) activation by including a sensor 427 that detects presence of an object within a zone of detection, and upon such a detection triggers activation (e.g., dispensing of the compound). As shown in FIG. 9B, the sensor 427 is disposed in the dispensing end of the dispenser 305 adjacent to the nozzle(s) 428, so that the zone of detection is directly below the sensor 427 and nozzle(s) 428. Alternatively, the zone of detection may be the space in front of the tank 120 and above the bowl of the toilet that would be occupied by a user. For this zone, the dispenser may be configured to discharge the cleaning compound toward the seat after the user leaves the detection zone.

As shown in FIGS. 8-9B, the systems 401, 421 do not need an additional retaining member, because the dispenser 405, 425 is configured to secure the system 401, 421 to the toilet tank, either alone or in combination with the housing. As shown, a body 409, 429 of the dispenser 405, 425 is directly coupled to the wall 121 of the tank 120 to secure the system in place relative to the tank. Each body 409, 429 may be secured to the wall 121 through friction (e.g., press-fit), fasteners, adhesive, or any other suitable manner. Each dispenser 405, 425 is in direct fluid communication with the associated reservoir 404, 424 of the housing 403, 423 through the hole or opening in a wall 121 of the tank, such that the compound flows to the dispenser 405, 425 from the reservoir 404, 424 to be discharged from each nozzle in the dispenser 405, 425. A fluid conduit 410, 430 may be provided to fluidly connect each reservoir 404, 424 with the associated dispenser 405, 425.

Figure 11:
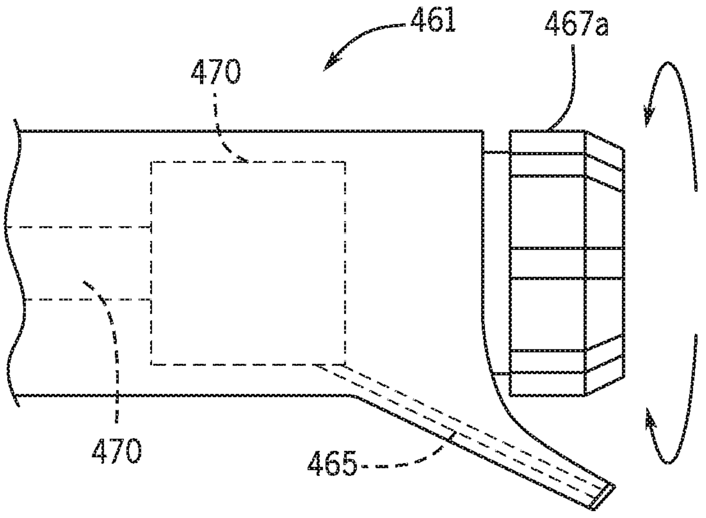
FIG. 11 is a side view of another exemplary embodiment of a delivery system for use with toilets.
Figure 12:
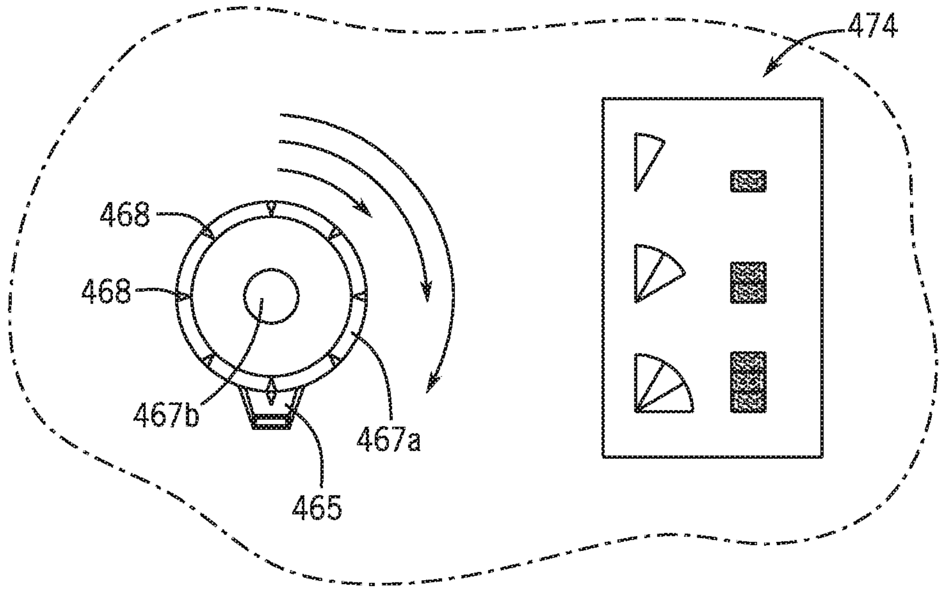
FIG. 12 is a front view of the delivery system shown in FIG. 11.

The dispenser may be configured to be activated manually by a user. As shown in FIG. 9B, the dispenser 425 (may optionally) include a button 432 disposed thereon, such as on an upper surface, to control dispensing of the cleaning compound from the nozzle(s) 428. When the button 432 is depressed, a metered amount of cleaning compound is dispensed from the dispenser 425 of the system 421. The system 421 may include one of the button 432 and the sensor 427 or both to provide multiple ways to actuate the dispenser. Alternatively, the dispensing systems may be manually actuated, such as by a switch, lever, handle, or other suitable actuator. As shown in FIGS. 8 and 9A, a knob 407 may control dispensing the cleaning compound. The knob 407 may be located on the body 409 of the dispenser 405 and may control dispensation through rotation or another movement of the knob. As shown in FIGS. 11 and 12, the system 461 includes both a knob 467*a* and a button 467*b*, where the knob 467*a* controls an amount of cleaning compound dispensed from the dispenser 465 and the button 467*b* activates dispensing the compound. This embodiment is discussed more below.

The dispenser may be configured to be activated automatically by a user input, based on a unit of time, or another suitable criterion/criteria. For example, the system 421 may optionally include a sensor 427 having a zone of detection configured to activate dispensing upon a triggering event occurring within the zone of detection, such as the events discussed above for the systems 301, 331, 361. The automated sensing system 421 may also be paired with hands-free flushing. In other words, the toilet (e.g., the toilet 100, 200, etc.) may be configured to provide hands-free flushing, such as by including one or more than one sensor that monitors usage of toilet (such as discussed herein) and automatically flushes the toilet after each usage. The delivery systems of this application may be actuated by the same automatic flushing system to discharge cleaning compound during or following a flush cycle of the toilet. This arrangement may advantageously simplify the toilet and reduce cost by having a single system monitor and control multiple operations of the toilet (e.g., flushing, cleaning). The system may be configured to provide both flushing and cleaning independently of the other. For example, the system may employ two sensors, where the first sensor is configured to activate flushing upon a first detection and the second sensor is configured to activate cleaning upon a second detection.

The systems 401, 421, 461, 481 may be configured such that the associated reservoir 424 can be refilled with cleaning compound from inside the tank, outside the tank, or a combination thereof. As shown in FIG. 9A, the housing 403 of the system 401 includes an access opening 406 into the reservoir to allow compound to be added to the reservoir therethrough from inside the tank. Thus, for a tank having a lid 122, the access opening 406 in the housing 403 may be accessible upon removal of the lid 122. The system 421 may include a cap 431 or other suitable component to cover and/or close the access opening in the housing 423. The cap 431 may be configured to thread onto the housing, such as through mating threads, or snap onto and off from the housing to cover the access opening. Thus, the systems 401 and 421, as shown, are configured to refill the compound from inside the tank.

Figure 10A:
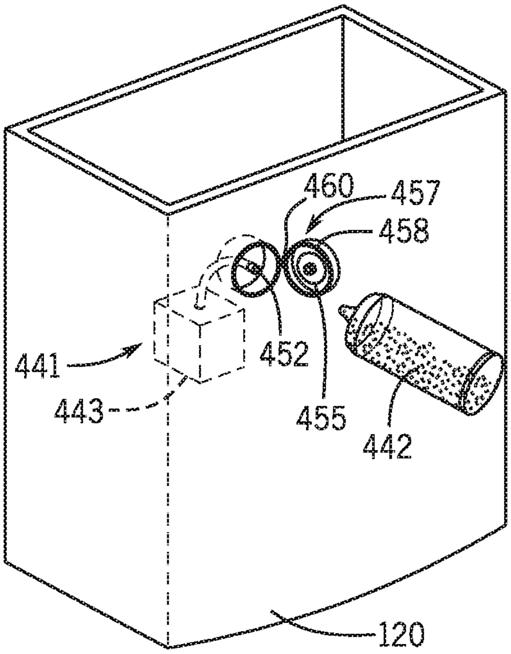
FIG. 10A is a perspective view of another exemplary embodiment of a delivery system mounted within a wall of a toilet tank.
Figure 10B:
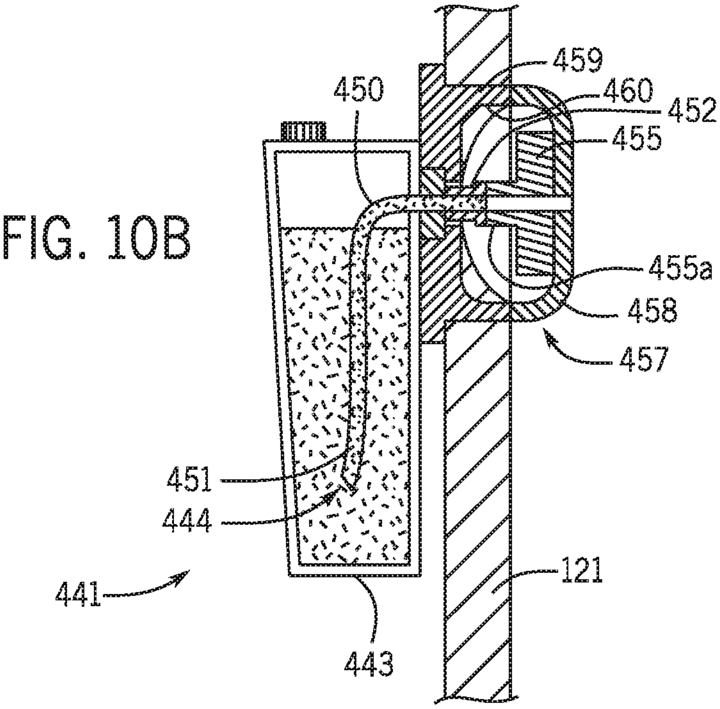
FIG. 10B is a cross-sectional side view of the delivery system shown in FIG. 10A.

FIGS. 10A and 10B illustrate a system 441 that allows for the compound to be refilled from outside the tank 120. As shown in FIG. 10B, the system 401 the fluid conduit 450 also serves as a refill line (e.g., tube, passageway) that extends from the reservoir 444 in the housing 443 through the opening in the toilet tank to a location (e.g., external to the toilet tank, such as proximate the dispenser) that allows the reservoir 444 to be refilled from outside the tank 120. A method for refilling the tank from outside the tank (e.g., externally) may be desirable for end users, since such an arrangement would be easier and simpler for the user to execute. The fluid conduit/refill line 450 has a first end 451 located in the reservoir 444 and a second end 452 that accessible from outside the tank 120. The first end 451 is the inlet and the second end 452 is the outlet when compound is being dispensed from the dispenser 455. The first end 451 is the outlet and the second end 452 is the inlet when compound is being refilled into the reservoir 444. Thus, the fluid conduit/refill line 450 may be used to transfer fluid from the reservoir 444 to the dispenser 405, as well as to transfer fluid back into the reservoir 444.

The system 401 may include a cap 457 or other suitable component to selectively close off access to the second end 452 of the fluid conduit/refill line 450. FIG. 10A shows the cap 457 in an open position allowing access to the second end 452, such that a portable handheld bottle 442 housing more compound can refill the reservoir with compound. FIG. 10B shows the cap 457 is a closed position preventing access to the second end 452. Also shown in FIG. 10B, the cap 457 includes a first (e.g., exterior) portion 458 and a second (e.g., interior) portion 459. The second portion 459 is connected to the wall 121 through the opening therein and retains the fluid conduit/refill line 450 through a bore. The first portion 458 is movably connected, such as through a hinge 460 (e.g., a living hinge), to the second portion 459, such that the first portion 458 can be moved relative to the second portion 459 between the open position and the closed position. Access to the second end 452 of the fluid conduit/refill line 450 is provided when the portions 458, 459 are in the open position. The second end 452 in inaccessible when the portions 458, 459 are in the closed position. Each portion 458, 459 may have a generally cup shape defining a cavity therebetween.

The dispenser 455 may be coupled to one of the portions 458, 459, such as, for example, the first portion 458 as shown in FIG. 10B and the dispenser 455 may include a projection 455*a* (e.g., a plug) that is configured to engage the second end 452 in the closed position. The projection 455*a* may help seal between the dispenser 455 and the second end 452 to prohibit leaking. Thus, the projection 455*a* may be made from or include a material, such as an elastomeric material, that provides an improved seal. The first and second portions 458, 459 may be configured to lock together in the closed position, such as through a snap, latch, detent, or other suitable feature, to secure the portions together. The second end 452 of the fluid conduit/refill line 450 and/or the opening in the second portion 459 may be configured (e.g., shaped) to receive a complementary feature (e.g., a nozzle)

of the refill device (e.g., the portable handheld bottle 442) that houses the compound. The bottle may include a projection with an opening that is configured to engage the inlet of the first portion to allow the compound to be inserted into the reservoir through the fill line from the bottle.

A shown in FIGS. 11 and 12, the system 461 can be adjustable, such as to dispense different amounts of compound based on the setting of the system 461. For example, the dispenser may include an adjusting element (e.g., the knob 467*a*) having multiple settings 468 (e.g., two positions, three positions, eight positions, etc.), where each setting corresponds to a different level of dispensing of the compound. As shown best in FIG. 12, the knob 467*a* is configured to be rotated, whereby rotation in a first direction (e.g., clockwise) increases the amount of compound dispensed and rotation in a second direction (e.g., counterclockwise) decreases the amount of compound dispensed from the system 401 by changing the setting. The system 401 may include a valve 470 that controls the amount of compound dispensed, and the knob 467*a* may be configured to adjust the valve 470. The valve 470 may be disposed in the dispenser, such as along the fluid passageway 471 thereof. The valve 470 may advantageously be provided within the end (e.g., the outlet end) of the dispenser 455 and the adjusting element may be provided on the end, such that the adjusting element and the valve are proximate one another. The adjusting element may be configured as a switch (e.g., slide switch, toggle switch, etc.) or as any other suitable element that provides the desired adjustment. As noted above, the button 467*b* may activate dispensing while the knob 467*a* controls the amount of compound dispensed.

A system may include a user interface for controlling operation of the dispenser and/or providing an indication to the user as to the status (e.g., setting, mode, etc.) of the system. FIG. 12 shows a user interface 474 for use with the system 461 (or any other system). The user interface 474 is configured to control operation of the dispenser 455 and/or indicate the setting of the dispenser 455 to indicate the amount of cleaning compound that will be dispensed upon activation. The user can change the setting of the system 461 through manipulation of the user interface 474, such that after the setting of the system has been changed, the user interface 474 indicates to the user the new setting. The user interface 474 may include a touchscreen and/or display screen. The user interface 474 may be coupled to the toilet or located remotely from the toilet, such as fixed to a wall or other object or configured as a portable device.

The delivery system 401 may be configured to dispense the compound both externally and internally relative to the toilet. For example, the system 401 may include a first dispenser provided external to the tank, such as described above, and a second dispenser provided within the toilet tank. The second dispenser may be configured to distribute compound to the fill valve of the toilet, to the flush valve of the toilet, into the water that is introduced into the tank via the fill valve, or into the water exiting the tank to the bowl via the flush valve. The internal second dispenser may be configured the same as, similar to, or different than any other internal dispenser described in this application.

Figure 13:
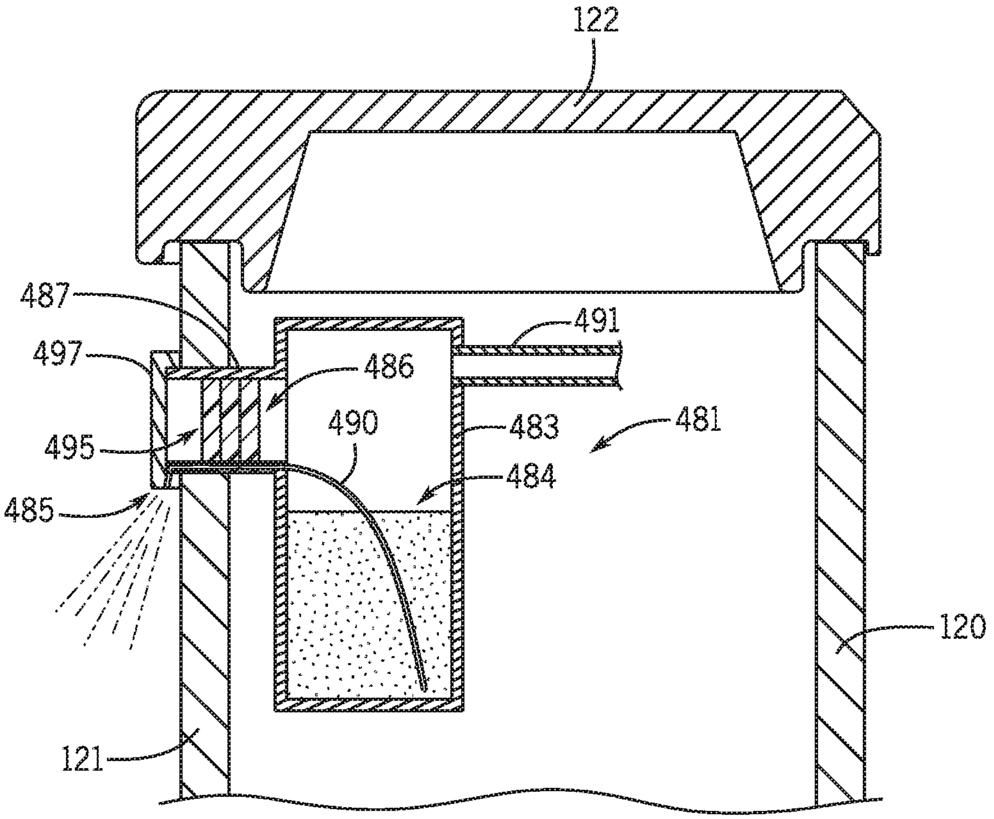
FIG. 13 is a cross-sectional view of another delivery system for use with toilets.

FIG. 13 illustrates another delivery system 481 configured to provide for refilling chemical compound from a position forward of a front wall 121 of the tank 120 and for dispensing in a forward direction from the front wall 121. The system 481 may be configured similar to the system 441, except the system 481 is configured for use with solid pellets 495 of chemical compound. To accommodate the solid pellets 495, a passage 486 (e.g., bore) is defined by a sleeve 487 of the housing 483 that extends through the wall 121. The passage 486 is sized to receive the solid pellets 495. A fluid conduit 490 may fluidly connect the liquid cleaning compound in the reservoir 484 with the dispenser 485. Water may be automatically introduced into the reservoir through an inlet tube 491, which may have a first end coupled to the housing 483 (e.g., at an inlet) and a second end coupled to water in the tank, to a fill valve of the toilet, or other suitable water supply/source. Water may be manually introduced into the reservoir 484, such as through an inlet opening. The dispenser 481 may include a cap 497 (or other feature) that is moveable between a closed position, in which the passage 486 is inaccessible, and an open position, in which the passage 486 is accessible to insert the solid pellets 495 into the passage 486 and into the reservoir 484. The dispenser 485 may include one or more nozzles configured to dispense fluid (e.g., liquid cleaning compound) in one or more directions.

The systems 401, 421, 461, 481 may include a controller, a power supply, or any other element discussed herein for other systems. By way of example, the system 401 shown in FIG. 9A may be configured to include an electronic controller 411 that receives a signal from a sensor 427 (as shown in FIG. 9B) upon detecting the presence of the object and controls activation of the dispenser based on the signal to provide touchless activation in place of or in addition to the manual actuation. Accordingly, the system 401 may include a power supply 412 to power the controller 411 and/or the sensor 427. For example, the power supply 412 may be a battery that is rechargeable and/or replaceable. The housing 403 may house the container, the controller, and/or the battery.

Figure 15:
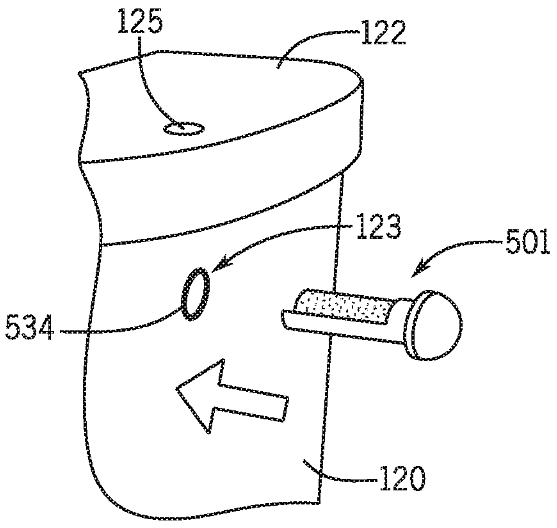
FIG. 15 is a perspective view of the delivery system shown in FIG. 14 in a decoupled state.
Figure 16:
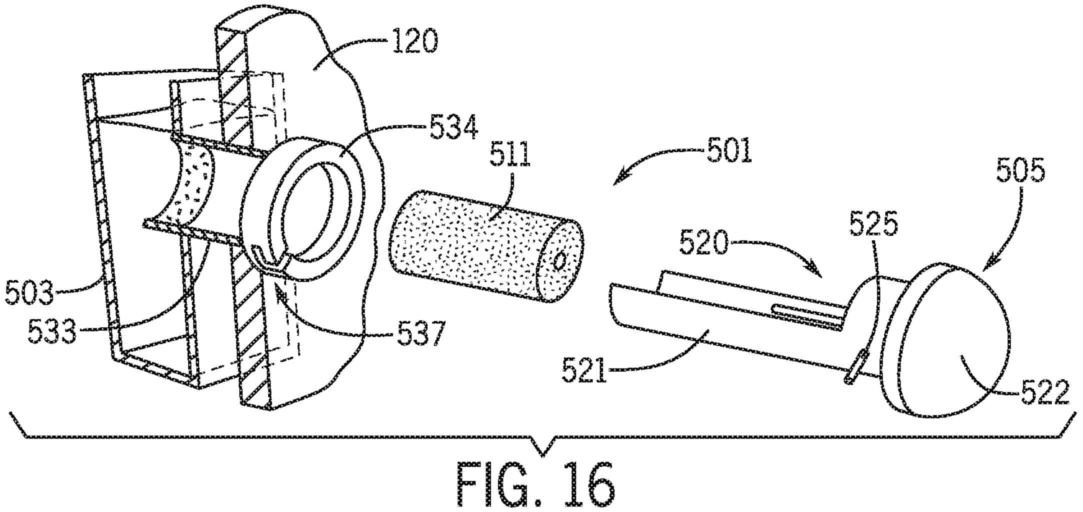
FIG. 16 is a partially exploded and cross-sectional perspective view of the delivery system shown in FIGS. 14 and 15.
Figure 17:
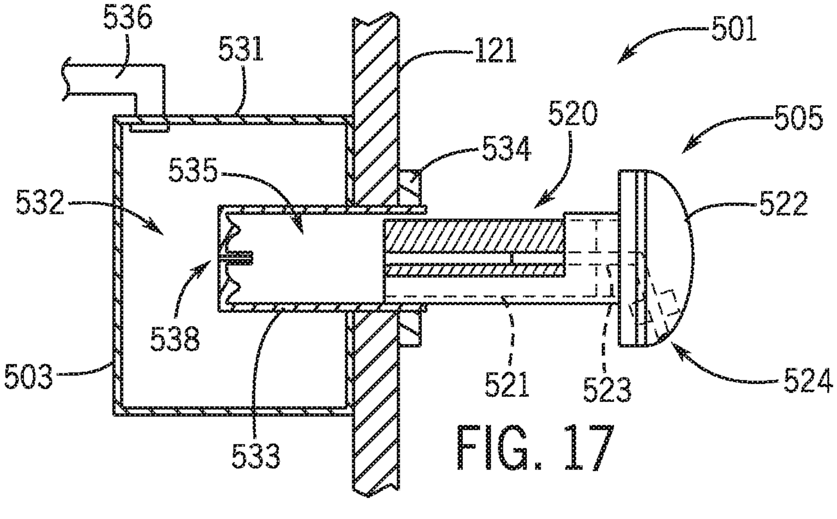
FIG. 17 is a cross-sectional view of the delivery system shown in FIGS. 14 and 15.

FIGS. 14-17 illustrate another exemplary embodiment of a delivery system 501 for a toilet that is configured to attach (e.g., mount, couple, connect, etc.) to a toilet tank 120 through an opening 123 therein and delivery a chemistry/cleaning compound external and/or internal to the tank. As shown best in FIGS. 16 and 17, the system 501 includes a housing 503 that is mountable to the inside of the tank, such as through the opening 123. The housing 503 includes a container 531 defining a reservoir 532 for holding a fluid (e.g., water, cleaning compound). The housing 503 may include a sleeve 533 having a first end that is disposed in the container 531 to help define the reservoir 532 and a second end extends through the opening 123 in the tank 120. A fastener 534 may be employed to engage the sleeve 533 and the tank 120 (e.g., around the opening 123) to secure the system 501 to the tank by clamping the wall 121 between the housing 503 and the fastener 534. By way of example, the fastener 534 may include internal threads that thread to mating external threads on the sleeve. The sleeve 533 defines a bore 535 (e.g., channel, passage, etc.) that is configured to receive a dispenser 505 to fluidly connect the dispenser 505 to a reservoir 532 within the housing 503. The reservoir 532 may be configured to hold a liquid cleaning compound, and the dispenser 505 may be configured to dispense the cleaning compound upon actuation of the system 501. Further, a fluid connector 538 fluidly connects the bore 535 and the reservoir 532. The fluid connector 538 may be configured as a bore. As shown in FIG. 17, the fluid connector 538 is a bore through a projection from the end of the sleeve 533. The system 501 may include a feature that seals the fluid connector 538 to prevent fluid to flow from the reservoir 532 into the bore 535 when the dispenser 505 is removed. For example, the fluid connector 538 may include a diaphragm that is closed when the dispenser 505 is removed from the bore 535, but is open when the dispenser

505 engages the bore 535 to allow fluid to flow from the reservoir 532 into the bore 535. The body 521 may include a finger (e.g., shown in FIG. 17 as the end of the lower portion that supports the pellet 511) that extends from the head 521 to engage the bore 535 to couple the dispenser 505 to the housing 503.

Alternatively, the compound may be in a solid form (e.g., a pellet 511 as shown in FIG. 16) that is configured to mix with a fluid, such as water prior to dispensing to form a liquid cleaning compound that is dispensed from the system 501. As shown in FIG. 17, the reservoir 532 may be configured to hold water, which may be received from the tank 120 via a water inlet 536, and the dispenser 505 is configured to retain a portion of a solid compound (e.g., the pellet 511) in a cavity 520 of a shaft of the dispenser 505. The shaft of the dispenser 505 may be configured as a hollow body 521 (e.g., a sleeve) and a head 522 may be disposed at one end of the body 521. The body 521 is configured to retain the solid compound in the cavity 520 when the body 521 is coupled to the sleeve 533 and/or the fastener 534.

The shape of the body 521 may be tailored to the shape of the solid compound or the shape of the solid compound may be tailored to the shape of the body. For example, the body may be generally cylindrical (or partially cylindrical), such as to receive a generally cylindrical solid compound. The body 521 includes a passageway 523 fluidly connected to one or more nozzles 524 in the head 522 to transfer the liquid compound to the head. The passageway 523 includes an inlet configured to receive a fluid (e.g., water, cleaning compound, etc.). As shown in FIG. 17, the inlet is provided in the end opposite the end that is coupled to the head 522. The body may include (or define such as with the sleeve 533) a mixing chamber for the solid chemical compound and the fluid (e.g., water) to mix to form the liquid cleaning compound. The mixing may be performed prior to activation of the system (i.e., pre-mixed) or may be performed after activation of the system but prior to dispensing. For the former, a portion of the solid compound is pre-mixed with a volume of fluid to generate a volume of liquid compound, which then remains in the mixing chamber until activation of the dispenser, upon which the pre-mixed liquid compound is dispensed. For the latter, the solid compound and fluid remain separated until activation of the dispenser, at which time fluid is introduced into the body of the dispenser through the inlet to mix with a portion of solid compound to form a volume of liquid compound, which is then dispensed from the system through the head.

As shown in FIG. 15, the dispenser 505 is removable (e.g., detachable) from the fastener 534 and/or the sleeve 533 to allow the solid compound to be refilled. According to one example, the dispenser 505 may be threaded to the fastener 534 and/or the sleeve 533 to detachably couple the dispenser to the fastener and/or the housing. For example, external threads of the body 521 may thread to internal threads of the fastener 534 and/or the sleeve 533 to detachably couple the components together. Thus, the dispenser 505 may be rotated into and out of engagement with the fastener 534 and/or the sleeve 533. According to another example, the dispenser 505 may include a bayonet style locking member where the body 521 includes a post 525 that detachably engages a slot 537 in the fastener 534 and/or the housing 503. The dispenser 505 may be rotated into and out of engagement with the fastener and/or the housing, similar to the threaded example. The rotation of the dispensers to lock them in place may be tailored. For example, the dispensers may be configured to lock after a predetermined angle of rotation (e.g., 45°, 90°, etc.).

Once the dispenser 505 is removed from the bore 535, the body 521 may be accessible to remove or replace the solid compound. For example, the body 521 may include a compartment that is configured to hold the solid compound, and once the dispenser 505 is decoupled from the fastener 534 and/or the housing 503, the compartment can be refilled with solid compound.

Figure 14:
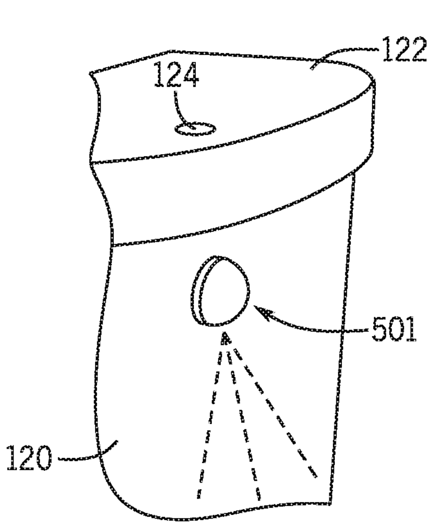
FIG. 14 is a perspective view of another exemplary embodiment of a delivery system for use with toilets, showing the system in a coupled state.

The system 501 may be activated (e.g., actuated) manually, such as by the push button 124 in the lid 122 as shown in FIG. 14, or by any other suitable mechanical actuators. The push button 124 can be located elsewhere, such as on the head 522 of the dispenser 505, on the tank 120 or any other suitable location. Alternatively, the system 501 may be activated automatically to provide touchless cleaning. As shown in FIG. 15, the flush cycle of the toilet may be actuated via the sensor 125 located on the top of the lid 122 on the tank 120, and the cleaning cycle may be activated automatically to dispense compound from the system 501 during or after the flush cycle. By way of example, the system 501 may be configured to dispense a predetermined amount of compound after a predetermined time following actuation of the flush cycle by the sensor 125. As another example, the system 501 may automatically dispense compound upon detection of an object by the sensor 125 in the zone of detection, and the flush cycle may be activated by another actuator (e.g., a trip lever, another sensor, etc.). The sensor 125 may be located elsewhere, such as on the head 522 of the dispenser, on the tank 120 (e.g., proximate to the dispenser 505 in/on the front wall 121 of the tank), or on any other location. Both the manually and automatically activated systems 501 can be used to clean the toilet and/or sanitize a user of the toilet, such as the user's hands after using the toilet.

Figure 19:
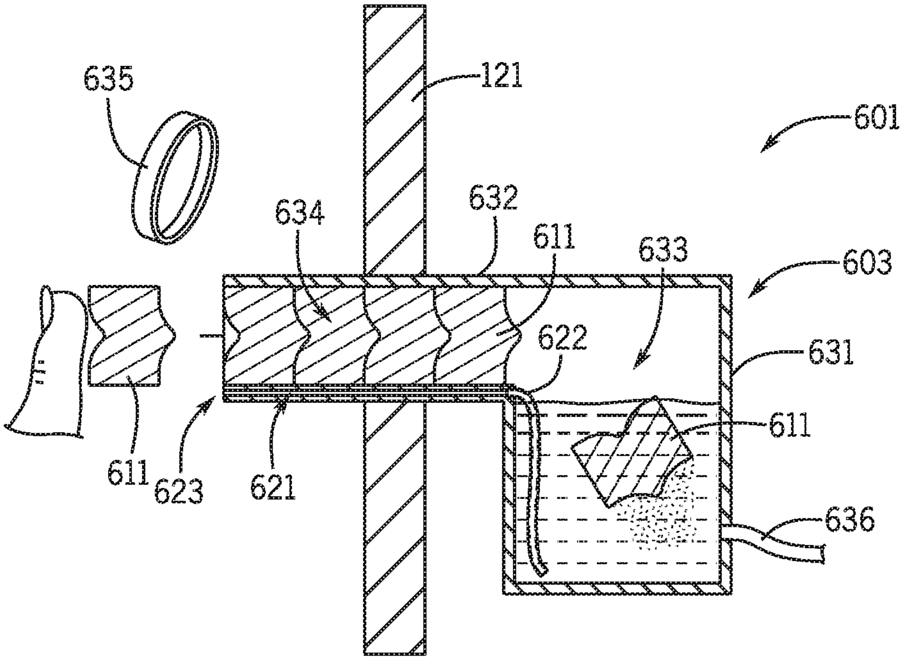
FIG. 19 is a cross-sectional view of the delivery system shown in FIG. 18.

FIG. 19 illustrates another exemplary embodiment of an external dispensing system 601 that is configured to mix solid compounds (e.g., shown as pellets 611) and water inside the tank, and is further configured to dispense the mixed compounds outside the tank. The system 601 includes a housing 603 having a container 631 and an engaging member 632. The engaging member 632 extends from the container 631 through an opening in a wall 121 of the tank 120 to couple the system 501 to the tank 120. One or more fasteners may be used to couple the container to the tank. The container 631 defines a reservoir 633 that is configured to hold a volume of water (e.g., up to the water level line). The housing 603 may include an inlet opening that is configured to receive water, such as to fill the reservoir 633 with water up to a water level line. The inlet opening may receive water from the tank, such as through a fill tube 636 (as shown), water channel, or other suitable element.

The engaging member 632 includes a bore 634 that extends from an outside end to an inside end (at the container 631) that opens into the reservoir 633 at a location above the water level line. The bore 634 is configured to receive solid compounds (e.g., pellets 611) therein and, as shown in FIG. 19, is accessible from outside the tank 120, such as to refill the system with additional compound. The engaging member 632 may include or be configure to receive a cap 635 or other feature that allows access to the outside end of the bore 634 when removed to refill the compound into the system. The solid compound in the bore 634 may be moved along the bore (in a direction from the outside end toward the inside end) to move a portion of the compound from the bore 634 into the reservoir 633 with the water to form a liquid cleaning compound. Thus, the solid compound is water soluble. The portion of solid compound may be manually moved into the reservoir 633, such as by a user pushing on the solid compound from the outside end. Alternatively, the portion of solid compound may be automatically moved into the reservoir 633 by the system when actuated.

Figure 18:
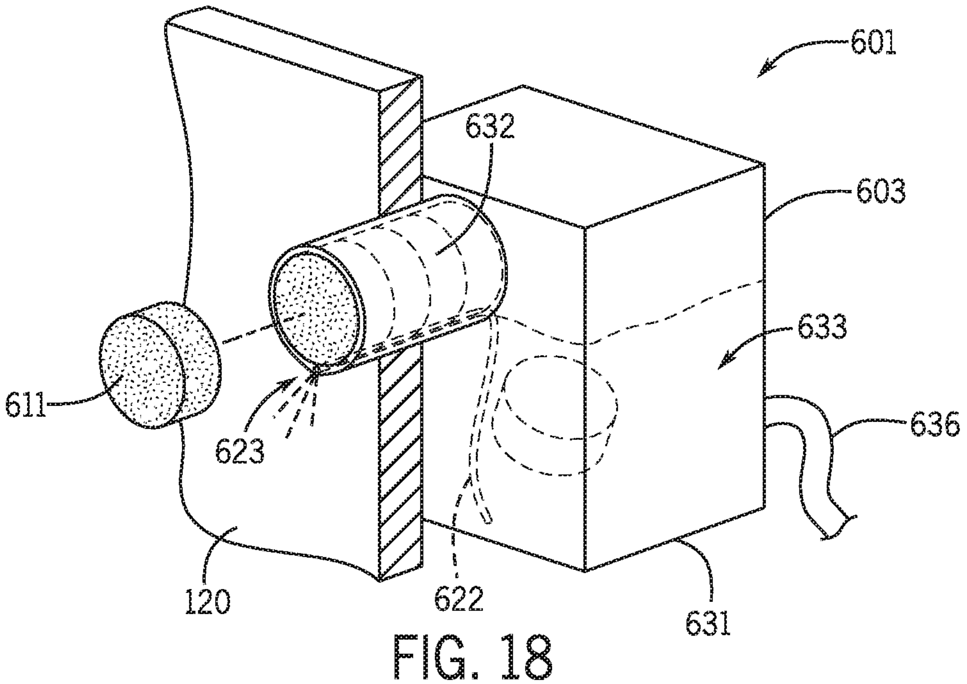
FIG. 18 is a perspective view of a delivery system incorporated into a toilet.

The engaging member 632 of the system 601 may also include one or more nozzles 623 fluidly connected to the reservoir 633 by a passageway 621. As shown in FIGS. 18 and 19, the nozzle 623 and passageway 621 are disposed below the bore 634 at the bottom of the engaging member 632. The passageway 621 may extend into the reservoir 633, or the passageway 621 may be fluidly connected to a fluid conduit 622 that is disposed in the reservoir 633. Upon actuation of the system 601, a portion of the liquid cleaning compound is dispensed from each nozzle 623. The actuation method could be any one of the manual and/or automatic methods disclosed elsewhere in this application.

v. Examples of Trip Lever Dispensing Systems

Figure 20:
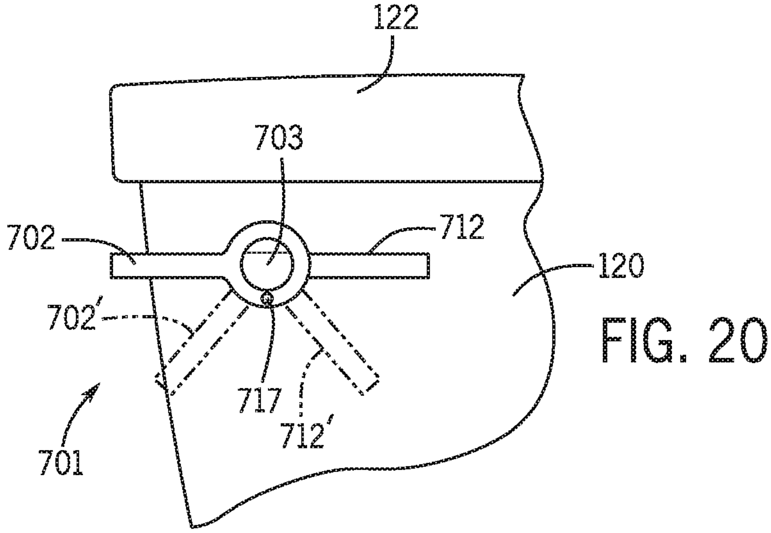
FIG. 20 is a front view of another delivery system integrated with a trip lever.
Figure 21:
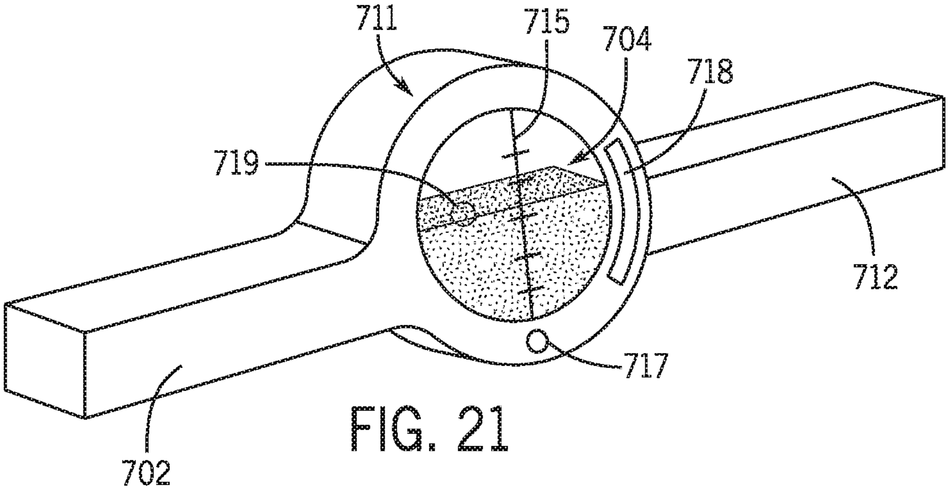
FIG. 21 is a perspective view of the delivery system shown in FIG. 20.

The toilets disclosed herein may include a delivery system that is integrated with a lever (e.g., handle, trip lever, actuator, etc.) configured to actuate a flush cycle of the toilet. FIGS. 20 and 21 illustrate an example of a delivery system 701 (e.g., dispensing system, sprayer, etc.) integrated with an actuator shown as a lever 702 that actuates a flush cycle. The lever 702 may be configured to rotate about an axis of rotation 703 between a first position and a second position (shown as lever 702' in FIG. 20 using phantom lines), which activates a flush cycle of the toilet. The lever 702 may be configured to rotate to a third position, which may activate a different flush cycle such as a lower volume flush (e.g., for use in dual flush toilets). The toilet includes a tank 120 that is configured to hold water from a water supply and a reservoir fluidly connected to the tank and configured to hold a cleaning compound comprising a chemical compound and water. As shown in FIGS. 20 and 21, the reservoir 704 is integrated with the actuator. However, according to other examples, the reservoir may be a container located in the tank.

As shown in FIG. 21, the actuator of the system 701 includes a base 711 and an arm 712 that are configured to pivot about the axis of rotation 703 between the first position and the second position. The first position may correspond to non-use position, in which no compound is dispensed from the system 701. The second position may correspond to a use position, in which a compound is dispensed from the system 701. The base 711 may be concentric or eccentric with the axis of rotation 703. As shown, the base 711 houses the reservoir 704. The base 711 may include a visual indicator 715 indicating the level of cleaning compound in the reservoir 704. The visual indicator 715 may include a transparent portion with a marking identifying the level of cleaning compound in the reservoir 704, which can be seen through the transparent portion. According to other examples, the visual indicator including a light source 718 that illuminates to indicate the level of cleaning compound in the reservoir 704. The light source may illuminate upon the level of the cleaning compound dropping below a threshold level. Alternatively, a size of the illumination from the light source may be proportional to the level of the cleaning compound in the reservoir 704.

The system 701 may include a sensor 719. For example, the system 701 may include a level sensor that detects the level of the cleaning compound. The level sensor may be configured to float in the liquid compound or have another configuration. Also, for example, the system 701 may include a concentration sensor that measures a concentration of the cleaning compound. The system 701 may include a controller that communicates electronically with the one or more sensors. By way of example, the controller may receive a signal from each sensor and may control illumination of the light source based on the signal, such as illuminating a light source upon the concentration of the cleaning compound falling below a threshold concentration.

The arm 712 may extend radially outwardly from the base 711, such as in an opposite direction as the lever 702. The base 711 may be a hollow member that is configured to retain a compound (e.g., a liquid compound) therein. Upon rotation of the arm 712 of the system 701, a portion of the cleaning compound may be dispensed via a nozzle 717 from the system. For example, the nozzle 717 may be located on an annular portion of the base 711. Also, for example, the nozzle 717 may be located on the arm 712, such as at an end thereof.

The arm 712 of the system 701 may be configured to move (e.g., rotate) relative to the lever 702. For example, the lever 702 may be configured to rotate in a first direction (e.g., counterclockwise) and the arm 712 may be configured to rotate in a second direction (e.g., clockwise). Also, for example, the arm 712 may be configured to rotate in the same direction (e.g., clockwise, counterclockwise) that the lever 702 rotates, but may rotate independently thereof. Also, for example, the arm 712 may move differently than the lever 702, such as pivot about a pivot axis that is transverse to the axis of rotation of the lever 702.

The system 701 may be configured to rotate from a non-use position to more than one use positions, where the different positions are configured to dispense different amounts of compound. For example, the farther the system 701, such as the arm, is rotated from a first use position, the system 701 is configured to dispense an increasing amount of compound. The lever 702 may be configured to actuate dispensing of the cleaning compound as well, according to other examples. This arrangement would allow a user to dispense the cleaning compound without flushing the toilet by rotating the arm 712, as well as dispensing the cleaning compound while flushing the toilet by rotating the lever 702.

vi. Examples of Lid Dispensing Systems

The delivery systems may be integrated into the lid of the tank of a toilet. For example, the delivery systems described elsewhere in this application, such as the tank integrated systems, may be integrated with the lid in place of the tank. Other systems may be configured specifically for use with the lid of the toilet tank.

Figure 22:
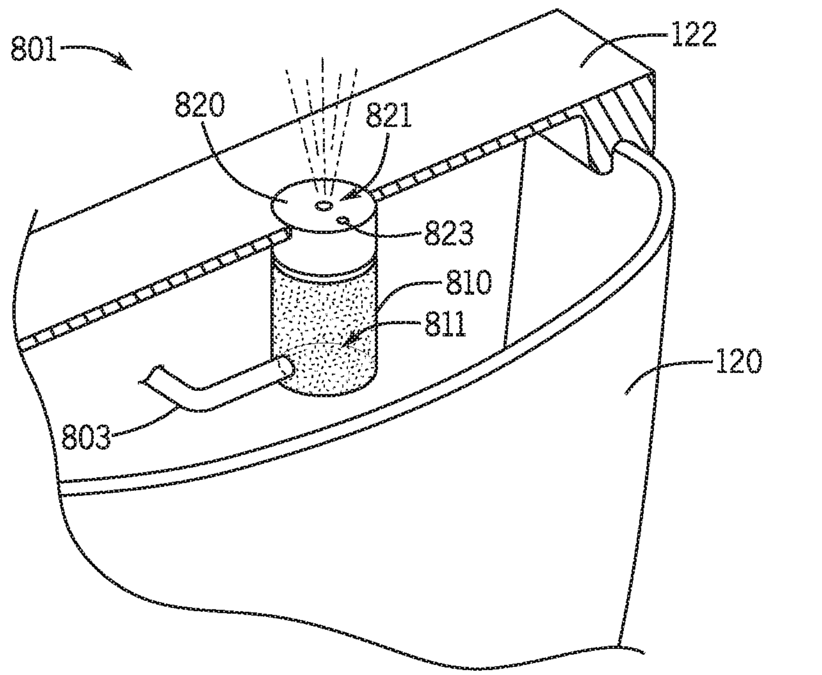
FIG. 22 is a partial cutaway perspective view of another exemplary embodiment of a delivery system for use with toilets.
Figure 23:
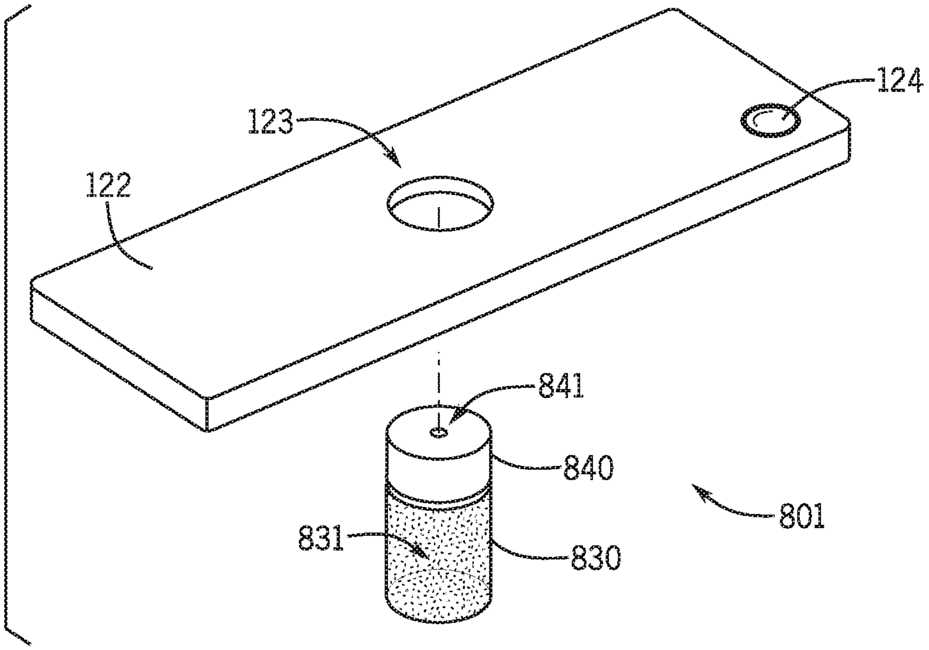
FIG. 23 is a partial exploded perspective view of the delivery system shown in FIG. 22.

FIGS. 22 and 23 illustrate exemplary embodiments of lid integrated delivery systems 801 for dispensing a cleaning compound. The systems 801 are configured for use with toilets that include a tank 120 having a cavity configured to hold water from a water supply and a lid 122 that is moveable relative to the tank 120 to provide access to the cavity. As shown in FIGS. 22 and 23, each system 801 includes a container 810, 830 and a dispensing member 820, 840. The container 810 is located in the cavity and configured to receive water from the tank (e.g., a fill valve located in the tank, water stored in the tank, etc.) through a fill line 803. This arrangement provides for automatic filling of the container 810 with water, such as, for example, by having the fill valve meter (e.g., to supply in a measured or regulated amount) water to the container 810. The container 810 is configured to hold a volume of a compound (e.g., a liquid cleaning compound). For example, the container 810 has a reservoir 811 that is configured to mix water with a chemical compound to form a cleaning compound. The container 830 shown in FIG. 23 is configured basically the same as the container 810 shown in FIG. 22, except the container 830 does not include a fill line. Thus, the container 830 is configured to be manually filled with water, such as through the open top when the dispensing member (e.g., body) is decoupled (e.g., removed) from the container 830.

Each dispensing member 820, 840 is fluidly connected to the container 810, 830 to receive the cleaning compound in the container and to dispense an amount of the cleaning compound externally relative to the toilet (e.g., the tank 120, the lid 122) upon activation. Each dispensing member 820, 840 may include one or more nozzles 821, 841 that discharge (e.g., spray) the cleaning compound. As shown, each dispensing member 820, 840 includes a body 823, 843 that is coupled to the lid 122 through an opening 123 (e.g., aperture) therein. The dispensing member 820, 840 (e.g., the body 823, 843) may be detachably coupled to the associated container 810, 830, such as through a threaded engagement, snap engagement, or other suitable engagement. The body 823, 843 of each dispensing member 820, 840 is configured to be detachably coupled to the lid 122, such as through a threaded engagement, snap engagement, or other suitable engagement. For example, each body 823, 843 may include external threads that thread to mating internal threads of the lid 122 defining the opening 123. As shown, an upper portion of the body 823, 743 of the dispensing member 820, 840 is accessible from above the lid 120 (e.g., through the opening 123).

Each system 810 includes an actuator that is configured to activate the dispenser of each dispensing member 820, 840. The actuator may include a knob, a button, a switch, a lever or any other suitable device that is manually activated by a user to activate dispensing. The actuator may include a sensor that is disposed on or in the body and/or the toilet (e.g., lid, tank), where the sensor activates the dispenser upon detecting a presence of an object in a detection zone (e.g., above the lid, forward of the lid, to the side of the lid, etc.) or another suitable predetermined detection. The sensor may provide for touchless actuation. The system may provide for both manual and touchless actuation. The actuator(s) may be located on or in the dispensing member 820, 840, such as the body 820 as shown in FIG. 22. The actuator 823 shown in FIG. 22 includes a sensor, but could include a manual actuator in place of or in addition to the sensor. The actuator(s) may be located on or in the toilet, such as the push button 124 in a top of the lid 122 as shown in FIG. 23. The push button 124 may be located elsewhere, such as in the lid proximate the dispensing member 820. A portion of compound in the container 810, 830 is dispensed from the system 801 when the actuator is actuated.

Each system 810 may include other elements, such as sensors or light sources (e.g., those discussed elsewhere in this application). By way of example, each system 810 may include a sensor that measures the concentration of the cleaning compound and/or the level cleaning compound in the container. As a further example, each system 810 may include a light source that provide a visual indication (e.g., illuminates) based on the concentration and/or level of the cleaning compound, such as those discussed elsewhere in this application. Such additional sensors and light sources may be controlled by a controller, which may be powered by a battery or other internal power source.

The dispensing members 820, 840 can be configured the same as or similar to other embodiments disclosed in this application. By way of example, the dispensing members 820, 840 can incorporate aspects, features, elements, etc. of the systems shown in FIGS. 135-140. For example, a strainer may be disposed in the container 810, 830 that holds pellets of chemical compound, where the strainer includes one or more holes that fluidly communicate with water in the reservoir 811, 831. The strainer may be removed from the container 810, 830. Also, for example, a diffusing tube fluidly connecting an inlet of the container and the dispenser may be provided. The diffusing tube may include a plurality of spaced apart openings fluidly connecting an inside of the tube to the reservoir.

vii. Examples of Standalone Dispensing Systems

The delivery systems (e.g., chemical dispensing systems) utilizing the chemistries/cleaning compounds discussed in this application may be configured as standalone systems, which may be integrated with toilets or may be configured as separate systems for use in bathrooms, kitchens, as well as in other locations where the chemistries may provide improved cleanliness.

Figure 24:
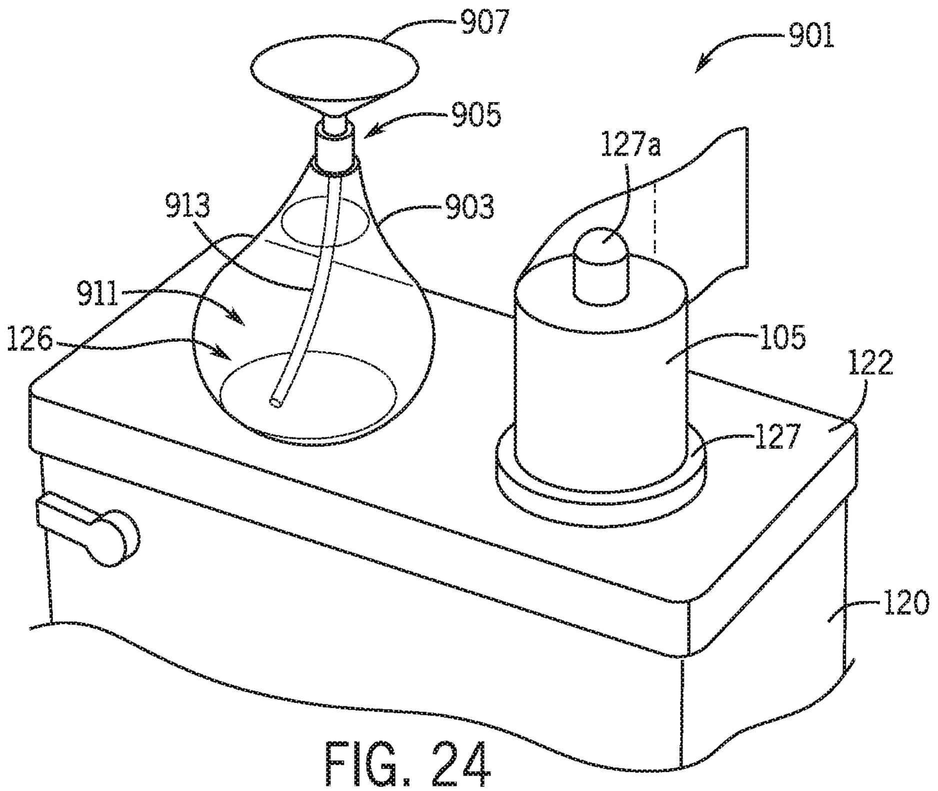
FIG. 24 is a perspective view of exemplary embodiment of a standalone delivery system.
Figure 25:
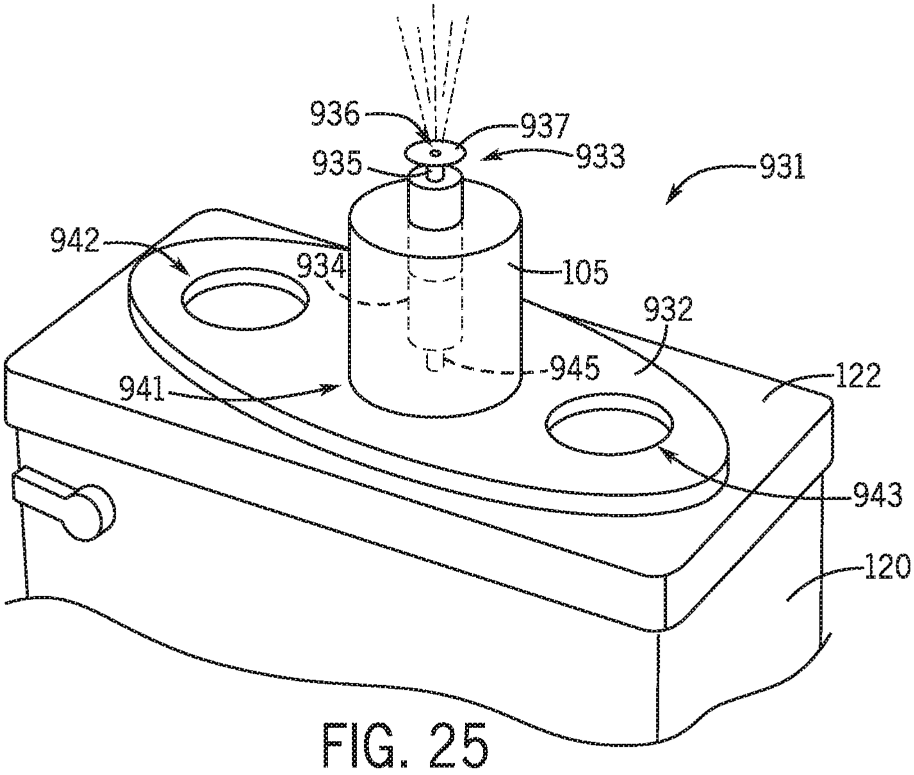
FIG. 25 is a perspective view of another exemplary embodiment of a standalone delivery system.

FIGS. 24 and 25 illustrate an exemplary embodiment of delivery systems 901, 931 that are configured for use with a lid 122 of a toilet tank 120 and configured to deliver a cleaning compound. Each system 901, 931 may be nested with the lid 122 or may be configured to rest on top of the lid 122. For example, the lid 122 may include a feature (e.g., a recess, projection, opening, etc.) that is configured to receive a portion of the delivery system 901, 931 to support and/or retain the system.

As shown in FIG. 24, the system 901 includes a container 903, a dispenser 905, and an actuator 907. The container 903 has a reservoir 911 that is configured to store (e.g., holding) a compound (e.g., a liquid cleaning compound) therein and to sit in a recess 126 in the top of the lid 122. The dispenser 905 is configured to dispense an amount of cleaning compound through one or more nozzles. The dispenser 905 is fluidly connected to the reservoir 911, such as, for example, through a fluid conduit 913 to access the cleaning compound. The dispenser 905 and/or the container 903 may be coupled to the feature of the lid 122 to retain the system in place relative to the lid. The lid may include multiple features. As shown in FIG. 24, the recess 126 in the lid holds the container and a projection 127 of the lid 122 retains a roll of paper 105 (e.g., toilet paper roll). The projection 127 may include a shoulder **127*a* that is configured to engage a bore in the roll of paper 105. The shoulder 127*a* may be configured to include a dispenser, such as discussed below with respect to FIG. 25. The actuator 907 is configured to activate the dispenser 905. The actuator 907 may be a manual actuator or an automatic actuator, such as any other actuator disclosed in this application. As shown, the actuator 907** is a manual actuator that activates dispensing when pumped or pressed.

As shown in FIG. 25, the delivery system 931 includes a base 932 that is configured to cooperate with the lid 122 and is configured to support an integrated container and dispenser shown as a chemical dispensing system 933, as well as other objects (e.g., a toilet paper roll 105). The base 932 may be configured as a plate that is configured to be coupled to or rested on top of the lid 122 of the toilet. The base 932 may include one or more features configured to receive and/or support other objects (e.g., a container, a toilet paper roll, etc.). According to one example, the lid or base includes a first feature, such as a recess, for supporting an integrated container and dispenser and a second feature, such as a post, for supporting a roll of toilet paper. The first and second features are provided adjacent to one another to allow the dispenser to dispense a compound onto the toilet paper. As shown in FIG. 25, the base 932 includes a first recess 941 configured to hold the toilet paper roll 105 and the chemical dispensing system 933, a second recess 942 adjacent to the first recess 941 on a first side thereof, and a third recess 943 adjacent to the first recess 941 on a second side thereof. The second and third recesses 942, 944 can support other devices disclosed in this application, such as the combined container/dispenser shown in FIG. 24.

The chemical dispensing system 933 is configured as a handheld dispenser that detachably docks to the base 932 and supports the toilet paper roll 105. The system 933 includes a container 934 having a reservoir configured to hold a cleaning compound (e.g., that includes a chemical compound and water), a dispenser 935 fluidly connected to the reservoir and having at least one nozzle 936 through which the amount of the cleaning compound is discharged upon activation, and an actuator 937 configured to activate the dispenser 935. The container 934 has a generally cylindrical shape that is sized to fit inside and support the toilet paper roll 105. A pivot 945 may be provided to pivotally couple the container 934 and the base 932, so that the container 934 is rotatable relative to the base 932, such as when paper is withdrawn from the toilet paper roll 105. The chemical dispensing system 933 may include a chemical generator that generates the chemical compound. The chemical dispensing system 933 may include a power source to power the chemical generator, which may be an electrochemical generator that generates $H_2O_2$ using oxygen from air external to the handheld dispenser, the water from the tank, and an electrical current generated by the power source. The chemical generator and/or the power source may be disposed within one of the container 934 (e.g., below the dispenser 935) or in the dispenser 935.

The dispenser may be configured to be manually or automatically actuated, such as through incorporating any other aspects or elements disclosed elsewhere in this application. The container may be configured to include a premixed cleaning compound, including water and a chemistry, or may include a water inlet from the toilet tank to mix, for example, a solid, soluble compound with water to form a liquid cleaning compound that can be dispensed. According to another example, the post that supports the toilet paper roll may be configured to include a dispenser that dispenses a compound stored in a container, which may be located in the post, in the tank, coupled to the lid, or any other suitable place. The post may include a button for manually actuating the dispenser. The post may include a sensor that is configured to provide touchless dispensing.

Figure 26A:
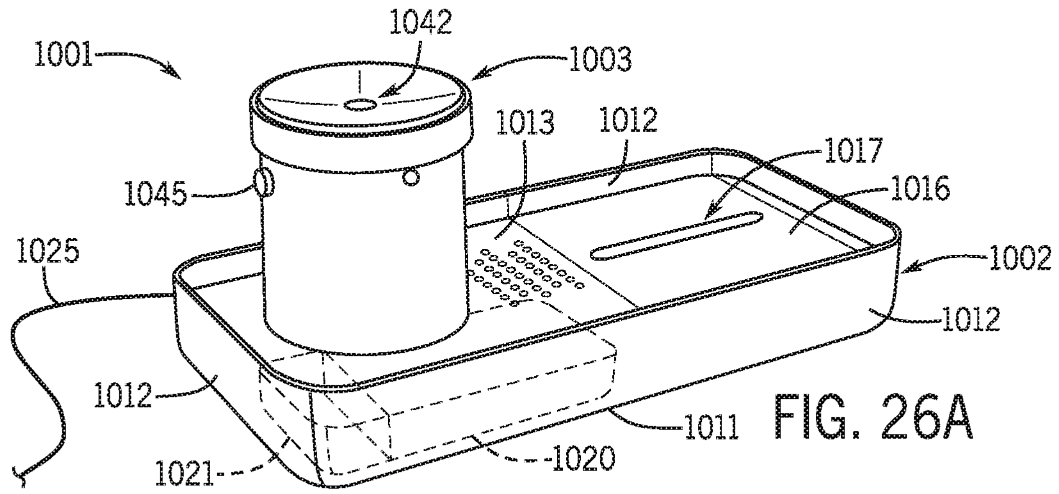
FIG. 26A is a perspective view of another exemplary embodiment of a standalone delivery system with a dispenser docked to a base.
Figure 26B:
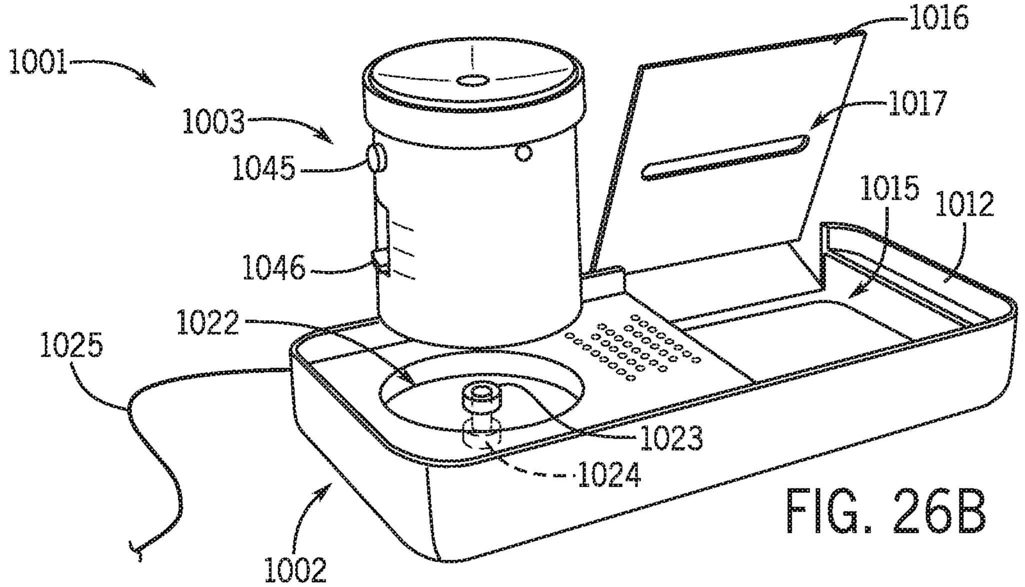
FIG. 26B is another perspective view of the delivery system shown in FIG. 26A with the dispenser undocked from the base.
Figure 26C:
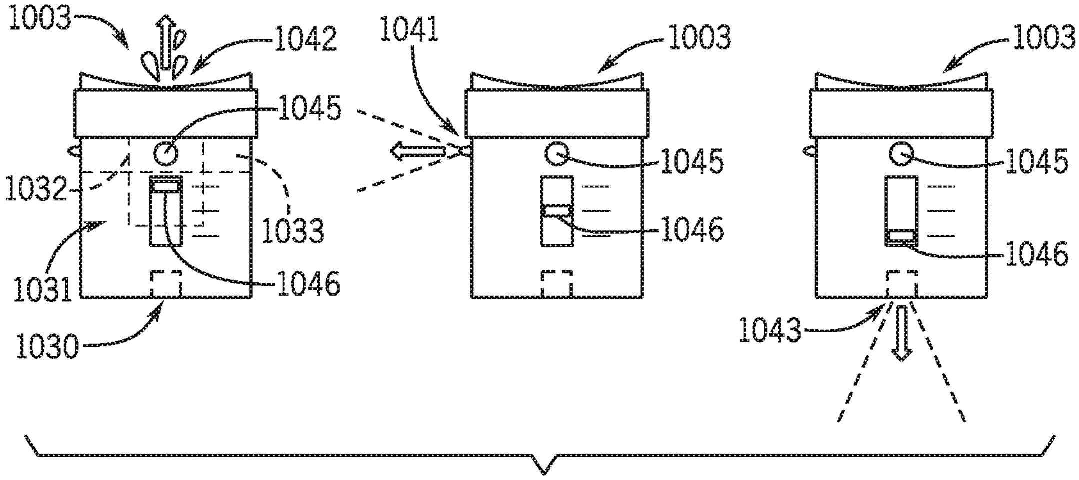
FIG. 26C shows various modes of operation of the dispenser shown in FIGS. 26A and 26B.

FIGS. 26A-26C illustrate another exemplary embodiment of a standalone delivery system 1001 that includes a base 1002 (e.g., base structure) and a dispenser 1003 (e.g., a handheld dispenser) detachably coupled to the base 1002 and configured to dispense a compound. The base 1002 includes one or more walls including a bottom wall 1011 that is configured to rest on or couple to another surface, such as a top surface of a toilet tank lid, a countertop, or other surface. As shown, the base includes a plurality of side walls 1012, the bottom wall 1011, and a top wall 1013 interconnected with the bottom wall 1011 to form a generally cuboidal structure. The base 1002 may include compartments defined by the one or more walls, such as to house other elements (e.g., components) in the base structure. For example, the base 1002 may be configured to house a container, such as a tissue container, toilet paper roll, etc. The base 1002 may further include a door 1016 pivotally coupled to another feature of the base 1002, such as a wall (e.g., side wall), through a hinge (e.g., pivot) to provide access to a compartment 1015 (as shown in FIG. 26B) for housing the container. The door 1016 may be pivoted or rotated relative to the wall between a first (e.g., open) position (as shown in FIG. 26B), in which the compartment 1015 is accessible, and a second (e.g., closed) position (as shown in FIG. 26A), in which the compartment is closed-off by the base. The door 1016 may include an opening 1017 (e.g., a slot) to allow, for example, tissue to be removed from the container in the compartment 1015 without having to open the door 1016.

Also shown in FIG. 26A, the base 1002 may be configured to house a dehumidifier 1020 within the structure to extract water (e.g. vapor) from the air around the base 1002. The dehumidifier 1020 may be integrated with the base 1002 or may be separable from the base 1002. Alternatively, the dehumidifier 1020 may be disposed in the dispenser 1003. Having a dehumidifier 1020 included in the system 1001 may advantageously provide for cleaning of the air (e.g., by outputting filtered air) while reducing the level of moisture (e.g., water, water vapor, etc,). An integrated dehumidifier 1020 is advantageous for the systems that dispense chemicals diluted in water, since the system can pull the water vapor out of the air, collect the condensed water, and use the collected water to dilute the chemicals, which can be produced by a chemical generator, prior to dispensing the compound. The dehumidifier 1020 can be powered by a power supply (which is further discussed below).

It is noted that for the systems and methods described in this application, water may be used as a reactant in creating the chemical, as a diluent to dilute an existing chemical, or as a carrier to carry a chemical, such as through a system (e.g., a flush system of a toilet).

The base 1002 may also be configured to house a chemical generator 1021, such as, for example, any such generator discussed in this application. For example, the system 1001 may include a hydrogen peroxide ($H_2O_2$) generator disposed within the base 1002. The chemical generator 1021 may be configured to reload the dispenser 1003, such as when the dispenser 1003 is docked to the base and low of chemical/compound. The base 1002 may include a recess 1022 that is configured to receive the dispenser 1002 in a docked position. The base 1002 may also include a projection 1023 that is fluidly connected to the generator, such that when the dispenser 1003 is docked in the recess 1022 of the base 1002, the projection 1023 engages an opening 1030 (shown in FIG. 26C) in the dispenser 1003 to refill the dispenser with compound. A flow control 1024 (e.g., a valve, a diaphragm, etc.) may disposed in the base 1002 to regulate the flow of fluid (e.g., water, cleaning compound, etc.) into the dispenser 1003. For example, the flow control 1024 may be open in a docked position of the dispenser 1003 to allow the fluid to flow from the base 1002 into the dispenser 1003, and the flow control 1024 may be closed in an undocked position of the dispenser 1003 to prevent leaking of the fluid when the dispenser 1003 is decoupled from the base 1002.

The dispenser 1003 may be configured to dispense a compound, such as $H_2O_2$, when activated. The dispenser 1003 may include a container 1031 to store the compound therein. As shown in FIGS. 26A-26C, the dispenser 1003 has a generally closed cylindrical shape (e.g., a cylinder with top and bottom surfaces closing the cylinder). The dispenser 1003 may include a pump 1032 or other element configured to move the compound from a stored location to exit the dispenser, such as through one or more nozzles. The pump 1032 may be an electric pump that is electrically coupled to a power source located in the dispenser, such as a battery 1033. The base 1002 may include a power cord 1025 that is configured to plug into a conventional electrical wall outlet or socket. The base 1002 may also be configured to recharge the battery 1033 in the dispenser 1003, such as when plugged into a wall outlet with the dispenser docked.

The dispenser 1003 may include multiple nozzles that are co-located or that are located at different portions on the dispenser. For example, the dispenser 1003 may include a first nozzle 1041 (or set of nozzles) located on a side wall, a second nozzle 1042 (or set of nozzles) located on the top surface, and/or a third nozzle 1043 (or set of nozzles) located on a bottom surface. Each nozzle (or set of nozzles) may be configured to dispense cleaning compound, such as in different spray patterns. For example, the first nozzle(s) 1041 may dispense the cleaning compound in a first spray pattern (e.g., a mist), the second nozzle(s) 1042 may dispense the cleaning compound in a second spray pattern (e.g., a foam), and the third nozzle(s) 1043 may dispense the cleaning compound in a third spray pattern (e.g., a stream). It is noted that the spray patterns may be changed. The dispenser 1003 may include an actuator, which may be a manual or an automatic actuator, to activate the dispenser 1003. As shown in FIG. 26A, the dispenser 1003 includes a button 1045. As shown in FIG. 26B, the dispenser 1003 includes the button 1045 and a switch 1046, where the switch 1046 controls through nozzle (or set of nozzles) the cleaning compound is dispensed and the button 1045 activates dispensing (e.g., when depressed). The switch 1046 can be toggled between three positions, with each position corresponding to one of the nozzles 1041, 1042, 1043 to select the nozzle for dispensing. The dispenser 1003 may include more than one actuator, such as one actuator for each nozzle (or set of nozzles). The actuator may include a sensor, such as disclosed in this application.

Figure 27A:
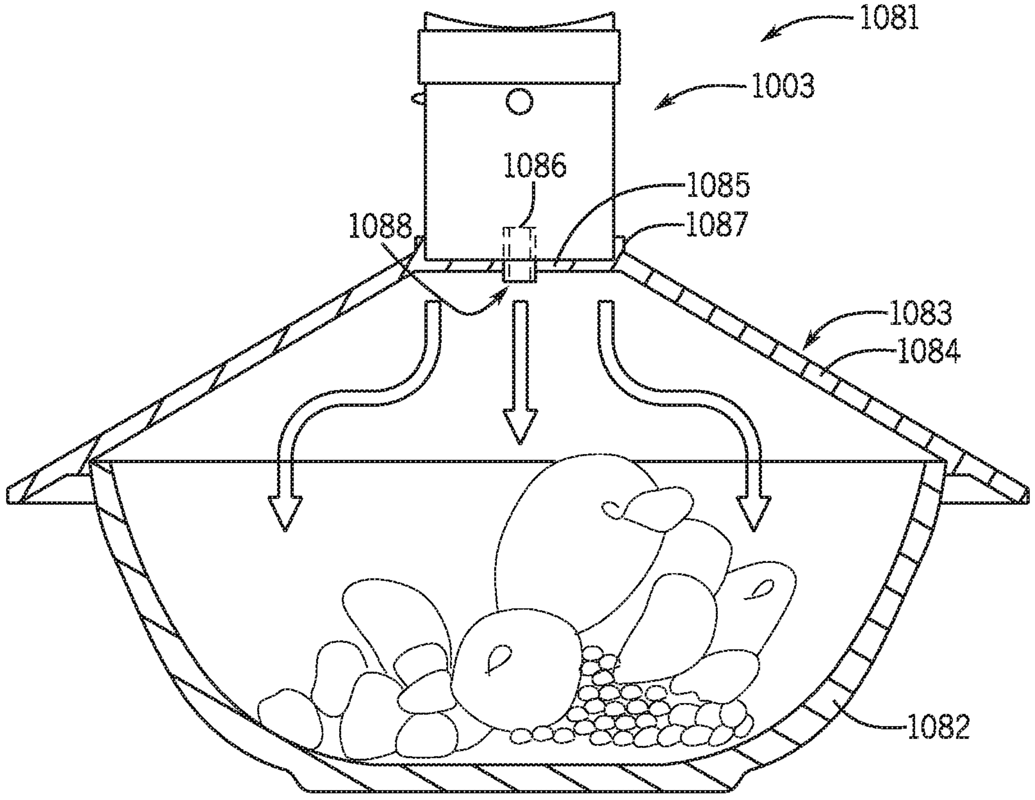
FIG. 27A is a cross-sectional side view of another exemplary embodiment of a standalone delivery system.
Figure 27B:
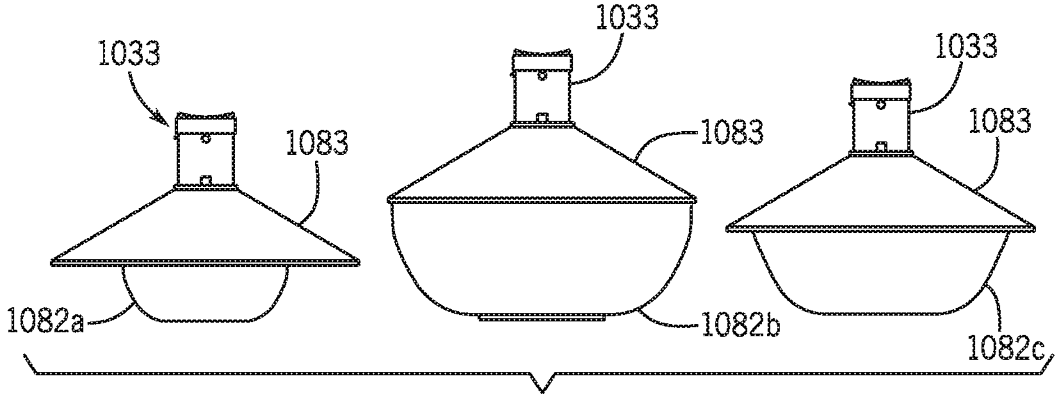
FIG. 27B is a side view of the delivery system shown in FIG. 27A with various bowl sizes.

The system 1001 may be configured to dispense a compound on the tissue paper that is being removed from the opening 1017 in the base 1002. The dispenser 1003 may also be removed from the base 1002 to dispense the compound onto an object that is located remotely from the base 1002. Also, for example, the dispenser may be removed to be used with another system. For example, the dispenser 1003 may be removed to be used with the food sanitizing system 1081 shown in FIGS. 27A and 27B. As shown in FIG. 27, the system 1081 includes a container 1082 (e.g., a bowl) configured to hold food therein, a cover 1083 (e.g., lid) for covering the container 1082, and the dispenser 1003 that is configured to sanitize food (e.g., fruits, vegetables, etc.) located in the container 1082 through the cover 1082. The cover 1083 is shown having a frusto-conical shaped side wall 1084 and a top wall 1085 at the top of the side wall 1084. The cover 1083 includes a docking feature, such as on a top side of the top wall 1085. The docking feature may include the post 1086 extending upwardly from the top side of the top wall 1085 to engage the opening 1030 in the dispenser 1003 (in a docked position) and/or the annular finger 1087 extending upwardly at the intersection of the top wall 1085 and the side wall 1084. The finger 1087 is configured to retain an outside surface of the dispenser 1003 to retain the dispenser 1003 in place in the docked position. A bore 1088 extends through the post 1086 and the top wall 1085 to allow the sanitizing compound to be dispensed onto the food through the bore 1088.

As shown in FIG. 27B, the cover 1083 is configured to work with a plurality of different sized bowls 1082*a*, 1082*b*, 1082*c* to provide additional utility. The cover 1083 may have a generally frusto-conical shape including a recessed base at the smaller end (e.g., the top) to receive the dispenser and an opening at that larger end (e.g., the bottom) to allow the cover to be placed over one of the plurality of bowls. Along the inside surface, the cover 1083 may include one or more detents, protrusions, or other suitable locking members to allow the cover to engage (e.g., snap-over) an edge of each bowl. The recessed base may also include one or more than one aperture to allow the sanitizing compound in the dispenser to be dispensed therethrough to the food in the bowl. The cover 1083 may include a locking element that detachably locks the dispenser to the cover.

Figure 28A:
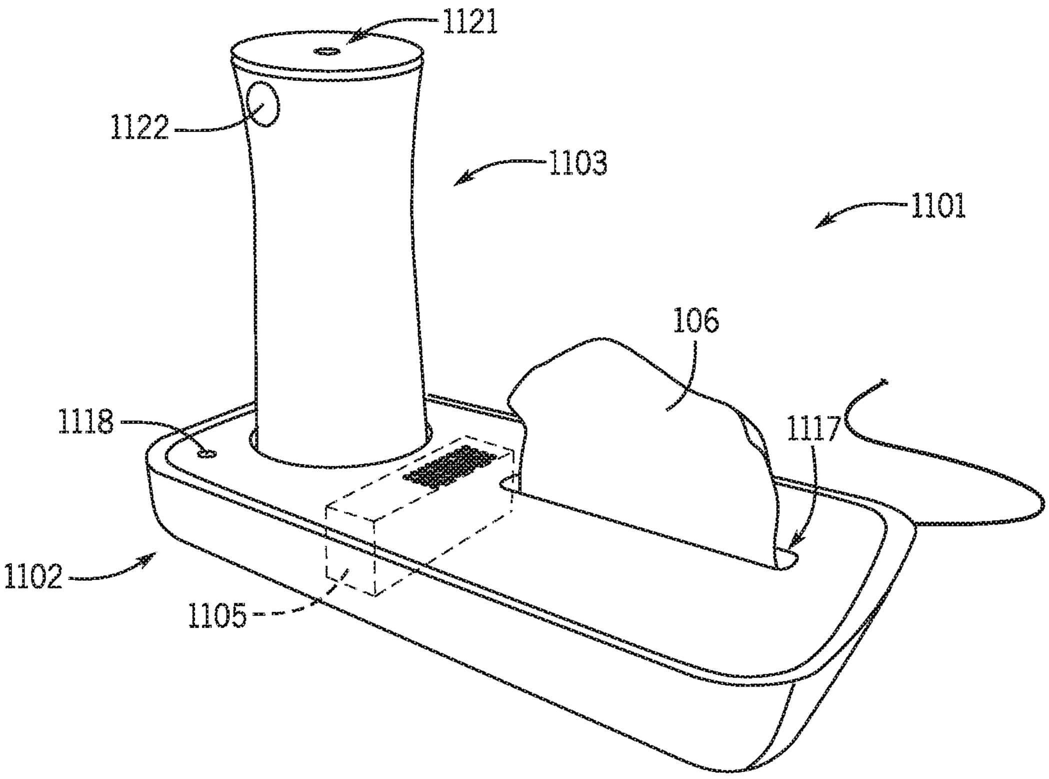
FIG. 28A is a perspective view of another exemplary embodiment of a standalone delivery system with a dispenser docked.
Figure 28B:
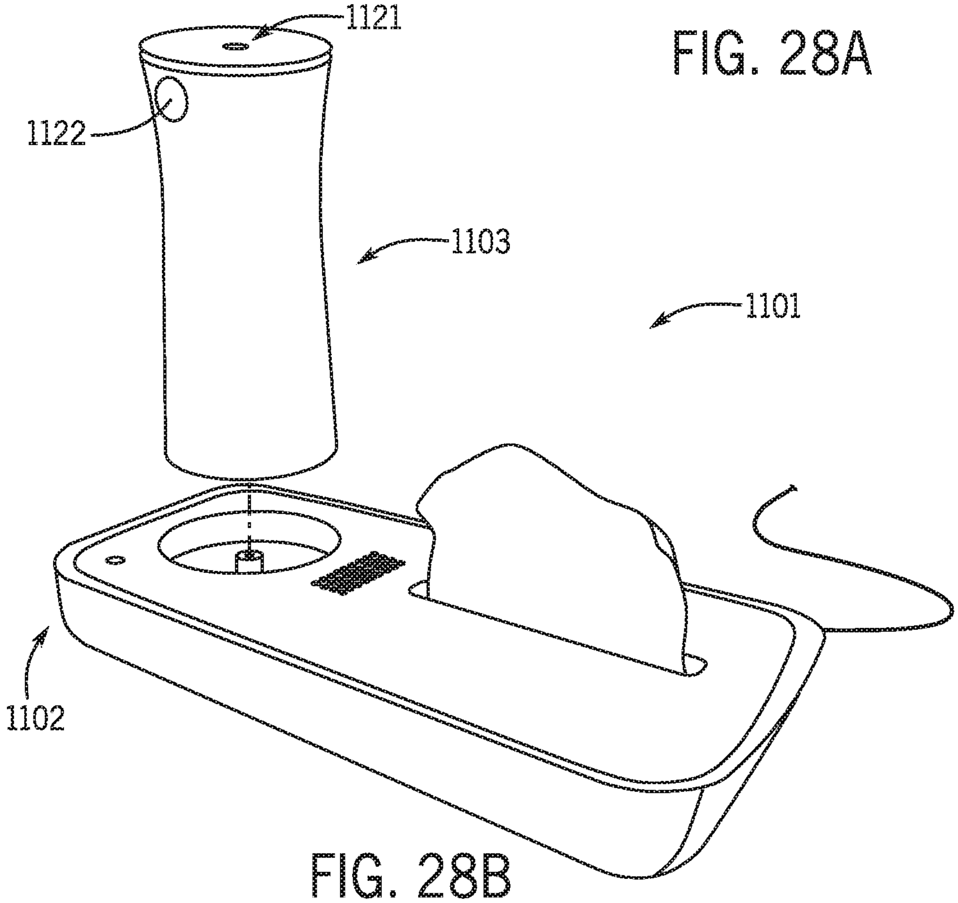
FIG. 28B is a perspective view of the standalone delivery system shown in FIG. 28A with the dispenser undocked.

FIGS. 28A and 28B illustrate another exemplary embodiment of a standalone delivery system 1101 that is similar to the system 1001. The system 1101 includes a base 1102 and a dispenser 1103 for dispensing a compound. The dispenser 1103 is configured similar to a bottle and is removable from the base 1102 to allow the dispenser 1103 to be portable. The base 1102 may include a container (e.g., tissue box) integrated (e.g., embedded, disposed) within an internal compartment of the base 1102 to dispense a paper product 106 through an opening 1117. The base 1102 may also include a generator, such as, for example, an $H_2O_2$ generator 1105 integrated in the base. The generator 1105 may be housed in another internal compartment of the base. The dispenser 1103 may be configured similar to the dispenser 1003, such as having similar elements/components with a different shape. The dispenser 1103 is configured to dispense a compound discussed in this application through the nozzle 1121 when the actuator 1122 is actuated. For example, the dispenser 1103 may be configured to dispense $H_2O_2$ generated by the $H_2O_2$ generator 1105 in the base 1102 of the system 1101. For example, the $H_2O_2$ generated may be applied directly to the paper product 106 (shown as tissue paper) being withdrawn from an internal compartment in the base 1102 or may be applied by a user via the dispenser while docked or undocked from the base.

Also shown in FIG. 28A, the dispenser 1103 can dock with the base 1102 of the system 1101, such as to recharge electric power and/or refill cleaning compound to the dispenser 1103. The base 1102 may include a recharger that receives electric power from an internal or external power supply. When the dispenser is docked to the base, the recharger may automatically recharge the dispenser by way of the power supply. The base and/or the dispenser may include an indicator (e.g., light, visual on a user interface, an alarm, etc.) that indicates when the dispenser is in need of recharging and when it has been fully recharged. A light 1118 is shown in FIG. 28A, which illuminates during recharging or when the dispenser 1103 is recharged.

Figure 29B:
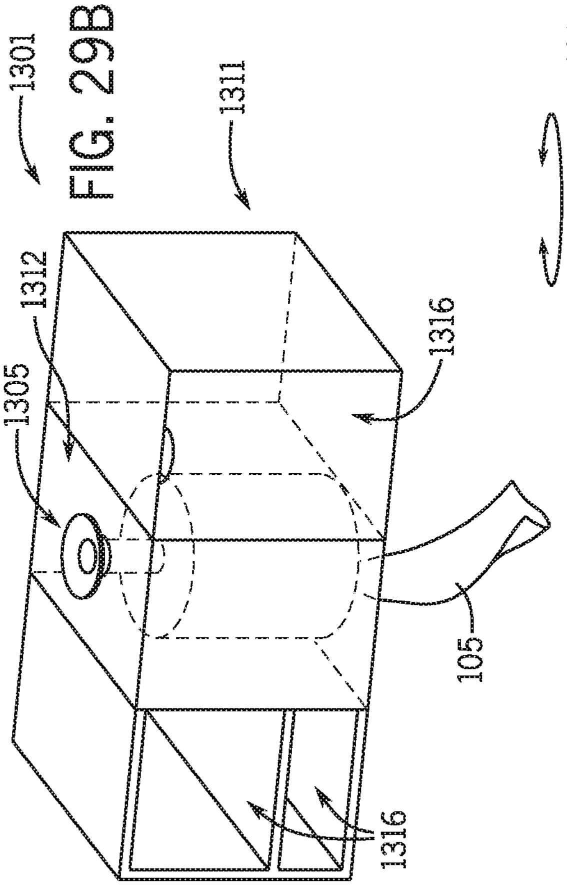
FIG. 29B is a perspective view of another exemplary embodiment of a standalone delivery system.
Figure 29C:
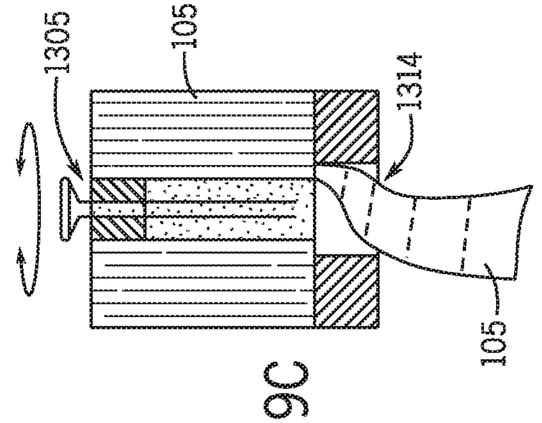
FIG. 29C is a cross-sectional view of a standalone delivery system.
Figure 29A:
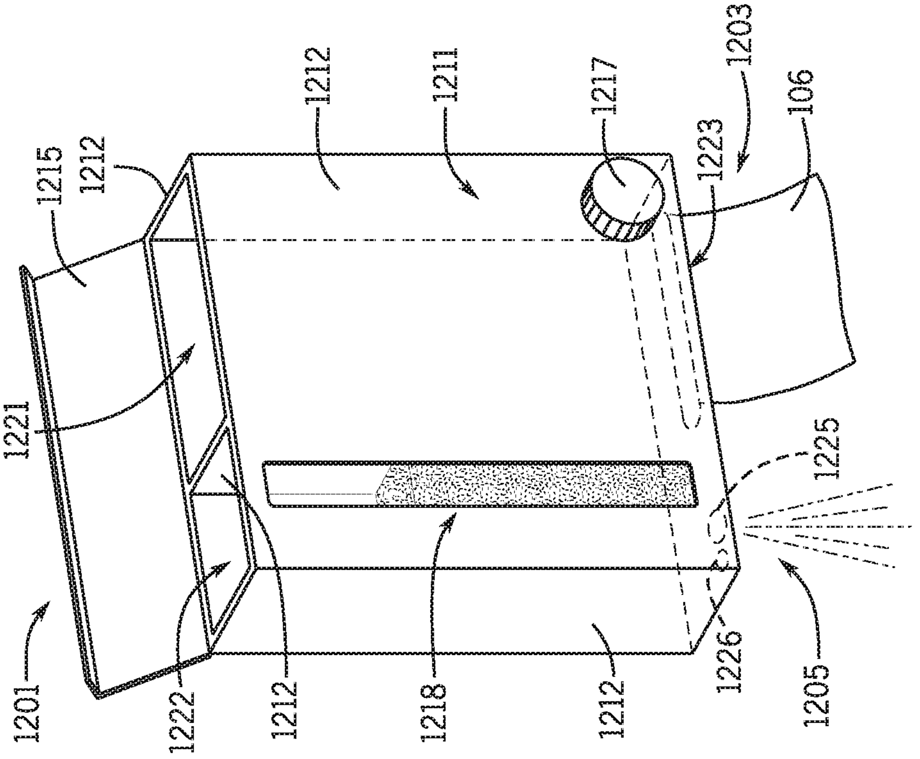
FIG. 29A is a perspective view of another exemplary embodiment of a standalone delivery system.

FIGS. 29A-29C illustrate other exemplary embodiments of standalone dispenser systems 1201, 1301 that are configured to dispense paper products (e.g., paper towels, toilet paper, tissue paper, napkins, etc.) and a compound, which may be used to clean (e.g., sanitize) the paper product or a user of the system or another device in proximity to the system (e.g., a toilet). Thus, the systems 1201, 1301 are configured as paper and chemical dispensing systems.

The system 1201 includes a housing 1211 including a plurality of walls 1212 defining one or more interior chambers (e.g., compartments), a first dispenser 1203 that is configured to dispense a paper product 106, and a second dispenser 1205 that is configured to dispense the cleaning compound. As shown in FIG. 29A, the walls 1212 of the housing 1211 define a first interior chamber 1221 and a second interior chamber 1222. The first interior chamber 1221 is configured to house the paper product 106 (e.g., one or more rolls of toilet paper or paper towel, one or more boxes of tissue paper or napkins, etc.). The first dispenser 1203 includes an outlet 1223 (e.g., opening, aperture, slot) through which the paper product 106 can be withdrawn and obtained. For example, the first outlet 1223 may be located in a bottom wall of the housing 1211. The housing 1211 may include a feature that allows access to the first interior chamber 1221, such as to replenish the paper product 106 once depleted. For example, a door 1215 may be pivotally coupled to the housing 1211, such that the door 1215 can rotate between a closed position, in which the first interior chamber 1221 is not accessible, and an open position, in which the first interior chamber 1221 is accessible. The door 1215 may be configured to lock to the housing 1211. Also, for example, a cover (e.g., tray) may be provided to close off the first interior chamber, but is removable from the housing to gain access to the chamber. The cover may be configured to be secured to the housing, such as through fasteners, snap features, detent features, or any other suitable securing device. The cover may include a tray, such as to support another object (e.g., a second paper product) disposed on the tray.

The system 1201 may include an actuator. As shown in FIG. 29A, a first actuator 1217 is provided on the housing 1211 to allow a user to move the paper product 106 from inside the first interior chamber 1221 out through the first outlet 1223 in order for the user to obtain the paper product 106. The first actuator 1217 may be a manually operated actuator, such as a handle, a knob, a lever, or other suitable actuating device, which is configured to move (e.g., rotate, slide, swing, etc.) in order to move the product from inside the housing to at least partially outside the housing through the first outlet. The first actuator 1217 may be an automatically operated actuator (e.g., touchless actuator) such as by employing one or more sensors configured to detect presence of a user (which are discussed elsewhere in this application and are equally applicable to this example or any other example in this application). As shown, the first actuator 1217 is a rotatable knob that advances the paper product 106 upon rotation.

The second interior chamber 1222 (e.g., second compartment) of the housing 1211 is configured to hold a volume of compound (e.g., a solid cleaning compound, a liquid cleaning compound, etc.). For example, the second chamber 1222 may be provided on one side of the housing 1211, while the first chamber 1221 is provided on an opposite side of the housing. The two chambers may be separated by an internal wall 1212, which (as shown) extends between forward and rearward walls 1212 to prohibit the compound from moving from the second chamber 1222 to the first chamber 1221.

The second dispenser 1205 (e.g., second outlet) includes one or more nozzles, apertures, openings, etc. for dispensing the cleaning compound therefrom. The second dispenser 1205 may be configured to dispense the cleaning compound onto the paper product or in a different direction, such as to dispense the cleaning compound onto the user or another object. For example, the dispenser 1205 may include one or more nozzles 1225 located on a bottom side of the housing 1211, which are configured to dispense the compound in a generally downward direction (e.g., downward and/or oblique to downward), such as onto a person's hand(s). The system 1201 includes an actuator, such as the second actuator 1226, to activate the dispenser to dispense the cleaning compound. The second actuator 1226 may be a sensor that activates the second dispenser 1205 upon detecting the presence of an object in a detection zone. The sensing second actuator 1226 may be located adjacent to the nozzle(s) 1225 so that the sensor can detect a person's hand beneath the nozzle(s) 1225 and dispense cleaning compound onto the hand.

The housing 1211 may have a viewport 1218 including a clear portion through which the level of compound remaining in the second interior chamber 1222 can be viewed. The viewport 1218 may be generally rectangular in shape and may be made from a transparent or translucent material that is generally see-through. A user can visually see the level of compound remaining in the housing 1211 through the viewport 1218 to know when the compound should be refilled. Alternatively or in addition to the viewport 1218, an indicator (e.g., visual, audio) may be provided by the system to alert the user to when the compound is low or out and needs to be refilled. By way of example, a light source, such as disclosed elsewhere in this application, can be located on or in the housing 1211 to provide a visual indication as to the level of cleaning compound.

Also shown in FIG. 29B, the standalone dispenser system 1301 is configured to dispense a paper product (e.g., paper towel, toilet paper, tissue paper, napkins, etc.) and a compound, which may be used to clean (e.g., sanitize) the paper product or a user. For example, the system 1301 can be used to turn a dry paper product into a sanitizing wet wipe or other suitable cleaning wipe. The system 1301 includes a housing 1311 that defines a chamber 1312 for housing the paper product. As shown, the chamber 1312 may be configured to receive a toilet paper roll 105. The housing 1311 includes an opening 1314 through which the toilet paper roll 105 is configured to be withdrawn (e.g., dispensed). The housing 1311 may include a support wall (e.g., a bottom wall) upon which the toilet paper roll 105 is configured to rest, where the support wall includes the opening that allows the dispensing end of the paper product to be fed through into a secondary chamber provided between the support wall and a bottom wall of the housing. The opening in the bottom wall allows the paper product to be removed (e.g., withdrawn) from the system 1301.

The system 1301 also includes a dispenser 1305 for dispensing the compound. The dispenser 1305 may be configured the same as or similar to any other dispenser disclosed in this application (e.g., the dispenser 933). The dispenser 1305 may be a pump dispenser having a generally cylindrical shape, such as to fit within the cylindrical bore in the toilet paper roll 105. Thus, the dispenser 1305 may act as a bearing to allow the toilet paper roll 105 to be rotated relative to the housing to unroll the product. The dispenser 1305 may also dispense cleaning compound via a nozzle or other discharging member. The cleaning compound may be dispensed directly onto the paper product (e.g., the end that is being unrolled or withdrawn), such as into the secondary chamber through an opening in the support wall. Also, for example, the compound may be dispensed away from the paper product, such as in an upwardly direction. A user could dispense the cleaning compound onto paper removed from the roll or onto another object, such as the user's hands. The dispenser may be manually or automatically activated using any method or arrangement disclosed elsewhere in this application.

The system 1301 may be configured to include additional compartments or storage spaces. As shown, secondary storage compartments 1316 are incorporated with the housing 1311 or as a separate structure. The secondary storage compartments 1316 may include one or more open spaces for storing other objects, such as additional rolls of paper product. For example, the secondary storage compartments 1316 may include a shelf that further divides the compartment into sub-compartments. The secondary storage compartment may include one or more closed spaces for storing other objects. For example, the system 1301 may include a slider (e.g., a sliding drawer) that is configured to slide outwardly from a closed position, in which the compartment is concealed or closed by the slider and the housing, to an open position, in which the compartment is revealed via an opening.

Figure 29E:
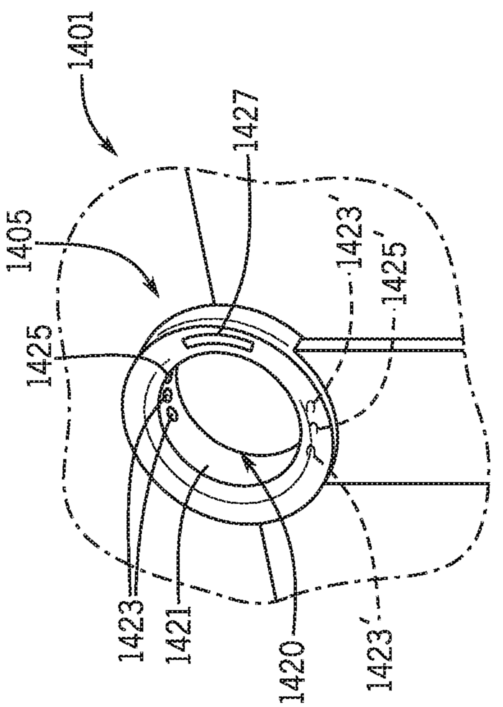
FIG. 29E is a detail view of the standalone delivery system shown in FIG. 29D.
Figure 29D:
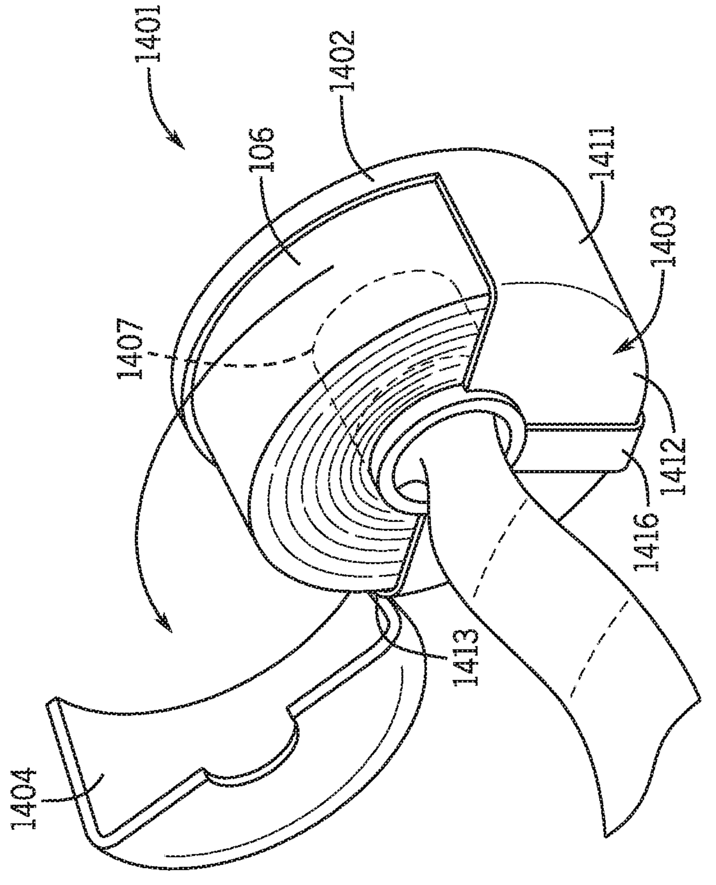
FIG. 29D is a perspective view of another exemplary embodiment of a standalone delivery system.

FIGS. 29D and 29E illustrate another exemplary embodiment of a standalone dispensing system 1401 that includes a mounting member 1402, a support member 1403, a movable member 1404, and a dispensing member 1405. The mounting member 1402 is configured to attach to another object (e.g., wall). As shown in FIG. 29D, the mounting member 1402 is a circular shaped plate. The mounting member 1402 may include one or more openings to receive fasteners or one or more fasteners for attaching the mounting member 1402 to the object. The support member 1403 is configured to support a paper product, such as the roll of toilet paper 106 shown in FIG. 29D. The support member 1403 is coupled to a lower portion of the mounting member 1402. The support member 1403 may be integrally formed with or formed separately from and connected to the mounting member 1402. As shown in FIG. 29D, the support member 1403 includes a semi-cylindrical first portion 1411 coupled to the mounting member 1402 at one side and coupled to an end portion 1412 at the other side. The support and mounting members 1403, 1402 define a first portion of a cavity configured to receive the paper product (e.g., the roll of toilet paper 106). The movable member 1404 forms a second part of the cavity and is configured to rotate relative to the support and mounting members 1403, 1402 about a pivot axis to provide access to the cavity. The movable member 1404 may be pivotally coupled to the support member 1402 via a pivot 1413 (e.g., a hinge). The movable member 1404 has a shape that complements the support member 1403 (e.g., a semi-cylindrical shape with a closed end). The moveable member 1404 may be generally symmetrically opposite to the support member 1403, such that the moveable member 1404 and the support member 1403 form two halves of a clam-shell, and wherein the moveable member 1404 rotates relative to the support member 1403 about a pivot. The support and movable members 1403, 1404 include an opening (e.g., semi-circular notch, a central circular opening) configured to receive a portion of the dispensing member 1405.

As shown in FIG. 29E, the dispensing member 1405 has an annular shape with a central dispensing aperture 1420 through which the paper (e.g., an end of the paper) is withdrawn.

The dispensing member 1405 includes one or more nozzles 1423 provided in an inner wall 1421 (e.g., inner surface) of the dispensing member 1405 (that defines the dispensing aperture) and/or one or more nozzles 1423' located on a forward facing surface of the annular member. The nozzles 1423 on or in the inner wall 1421 direct the compound inwardly (e.g., radially inward) toward a portion of the roll of paper that is being withdrawn through the dispensing aperture, whereas the nozzles 1423' on or in the forward facing surface may direct the compound outwardly toward a portion of the paper. Each nozzle 1423, 1423' is configured to dispense a cleaning compound. Each nozzle 1423 is fluidly connected to a container housing cleaning compound. Accordingly, the dispensing member 1405 is a chemical dispenser configured to dispense a compound (e.g., cleaning, chemical, etc.). The container may be located within the system 1402 or may be remotely located. As shown in FIG. 29D, a container 1407 is disposed in a generally cylindrical holder, which is sized to fit inside the roll of paper, and wherein the holder is detachable from the dispensing member 1405 and/or the mounting member 1402. A fluid conduit 1416 may extend through the support member 1403 and fluidly connecting the container and the dispensing member. The container 1407 may be a sealed container having a base and a lid that is removable from the base to provide access to a reservoir so that the reservoir can be refilled with additional compound, such as the same or similar to other containers disclosed in this application.

The system 1401 may include an actuator that is configured to activate the chemical dispenser. As shown in FIG. 29E, an actuator in the form a sensor 1425 is located in the inner surface 1421 adjacent to the nozzle(s) 1423. The sensor 1425 may be a motion sensor that is configured to detect motion within a zone, so that the compound is dispensed upon detection of motion within the zone. The sensor 1425 being located on or in the inner surface 1421 of the dispensing member 1405 is able to detect motion of the paper being withdrawn through the dispensing aperture 1420, so that the compound is dispensed onto the paper being withdrawn through the dispensing aperture 1420. The sensor may be disposed on or in a forward facing surface of the dispensing member 1405 (see the sensor 1425' shown in FIG. 29E), where the sensor activates dispensing upon detecting a presence of an object in a detection zone that is forward of and above the dispensing aperture 1420.

The dispensing member 1405 may include a chemical generator for generating the compound, and the chemical generator may be located in the container 1407. The dispensing member 1405 may include a visual indicator 1427 indicating a level of the compound in the container 1407 and a level sensor configured to measure the level of the compound in the container 1407 and communicate the measured level to the visual indicator.

Figure 30A:
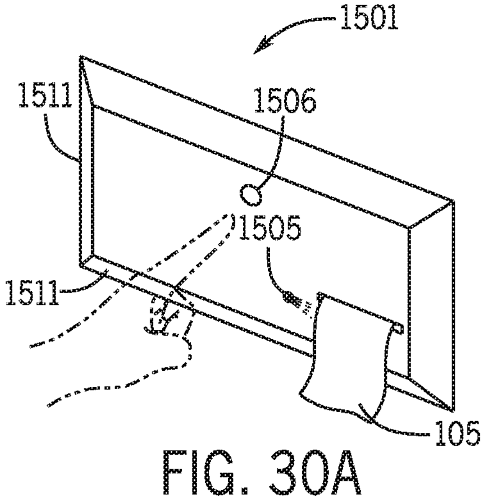
FIG. 30A is a perspective view of another exemplary embodiment of standalone delivery system in a closed position.
Figure 30B:
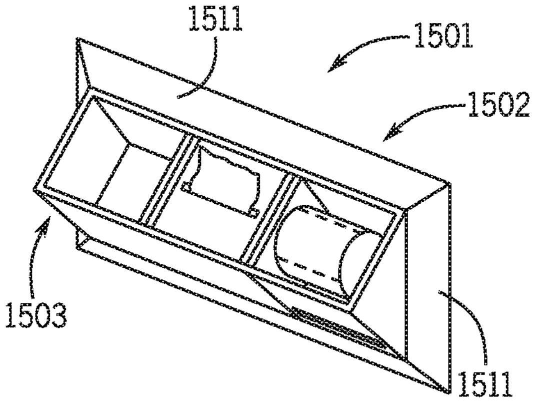
FIG. 30B is a perspective view of the delivery system shown in FIG. 30A in an open position.

FIGS. 30A and 30B illustrate another exemplary embodiment of a standalone dispenser system 1501 that is configured to dispense a paper product 105 (e.g., paper towel, toilet paper, tissue paper, napkins, etc.) and a compound, which may be used to clean (e.g., sanitize) the paper product or a user. The system 1501 includes a fixed frame 1502 (e.g., frame structure) that is configured to mount or be affixed to another object, such as a wall or countertop. As shown, the frame 1502 includes a plurality of interconnected members 1511 that define a central opening configured to receive a pivoting structure 1503 (e.g., a housing). Thus, the frame 1502 surrounds the pivoting structure 1503, which is rotatable relative to the frame 1502 about one or more pivots between a closed (e.g., recessed) position, in which the pivoting structure appears as the "picture" in the frame 1502 (FIG. 30A) and one or more internal compartments of the structure 1503 are hidden, and an open (e.g., exposed) position, in which the internal compartments are revealed (FIG. 30B). The frame 1502 may rotate about two pivots on opposite sides of the frame 1502 and the structure 1503. The compartments may be configured to hold a paper product, dispensers of compound, or other objects. The compound dispenser 1505 may dispense compound onto the paper product 105, as shown in FIG. 30A, or may dispense the compound in another direction, such as onto a user. An actuator 1506 may open the structure 1503 when depressed or actuated. Another actuator may activate the dispenser, such as a sensor or a manual actuator, according to the examples disclosed herein.

Figure 31A:
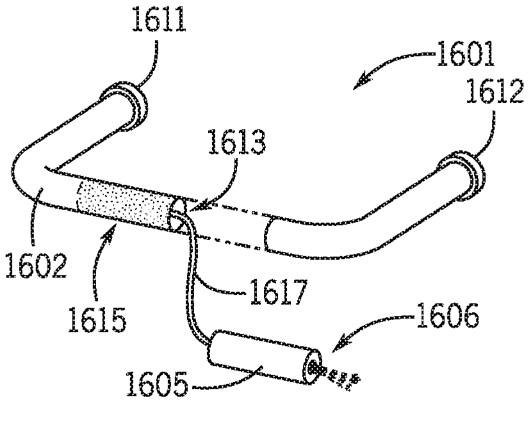
FIG. 31A is a perspective view of another standalone delivery system.
Figure 31B:
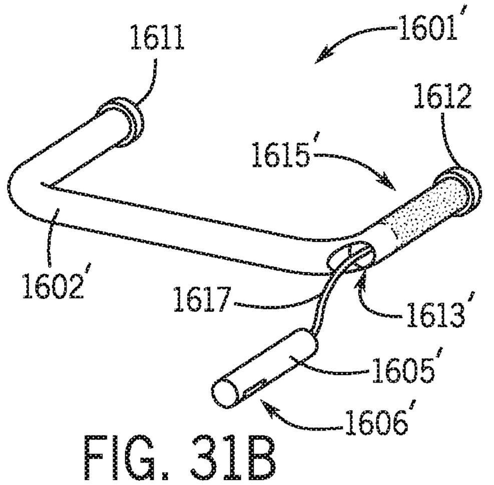
FIG. 31B is a perspective view of another standalone delivery system.

FIGS. 31A-31E illustrate dispensing systems incorporated into various utilitarian products commonly used in bathrooms. As shown in FIGS. 31A and 31B, the dispensing systems 1601, 1601' are incorporated into an elongated structural member shown as a support bar 1602, 1602' (e.g., a towel bar, towel rod, handle bar, etc.). The support bar 1602, 1602' may be configured as a generally C-shaped bar, linear bar, curved bar, or any other suitable shape, which may be continuous or discontinuous. Each support bar 1602, 1602' include a first end 1611 and a second end 1612 that are configured to mount to a support member such as a wall or other object. Each support bar 1602, 1602' also includes a hollow portion 1613, 1613'.

Each dispensing system 1601, 1601' includes a container having a reservoir for housing a cleaning compound and a chemical dispenser 1605, 1605' configured to detachably dock with the associated support bar 1602, 1602' and configured to dispense an amount of the cleaning compound upon activation. Thus, the dispenser 1605, 1605' is moveable relative to the associated support bar 1602, 1602' in an undocked position. As shown in FIG. 31A, the dispenser 1605 docks with a central portion of the support bar 1602 and takes the place of a missing section (e.g., a gap) therewith in the docked position. As shown in FIG. 31B, the dispenser 1605' docks with a corner section through an opening therein. Each dispenser 1605, 1605' has one or more nozzles 1606, 1606' that dispense a cleaning compound, which is stored in the container.

The container may be located in the dispenser 1605, 1605' (e.g., as provided for other dispensers discussed in this application), or may be located outside the dispenser, such as in the support bar 1602, 1602' or elsewhere. As shown in FIG. 31A, the container 1615 is located in a hollow part of the central portion of the support bar 1602 that is adjacent to the missing section. A flexible fluid conduit 1617 fluidly connects the dispenser 1605 and the container 1615. As shown in FIG. 31B, the container 1615' is located in a hollow side part of the support bar 1602' that is adjacent to the second end 1612. A locking feature may be provided to secure the dispenser 1605, 1605' to the associated support bar 1602, 1602' in the docked position. It is noted that each dispenser 1605, 1605' may be configured the same as, similar to, or different than any other dispenser disclosed in this application. The detachable portion (e.g., dispenser) may be located in the base member of a C-shaped support bar or in one of the two leg members extending away from the base member. For example, the support bar may include an opening (e.g., bore), such as in a transition portion (e.g., where the base member and a leg member meet) that is configured to receive the dispenser therein. Thus, the dispenser may be nested within the support bar (e.g., the main portion), such that only a portion of the dispenser is visible when in the nested position.

Figure 31E:
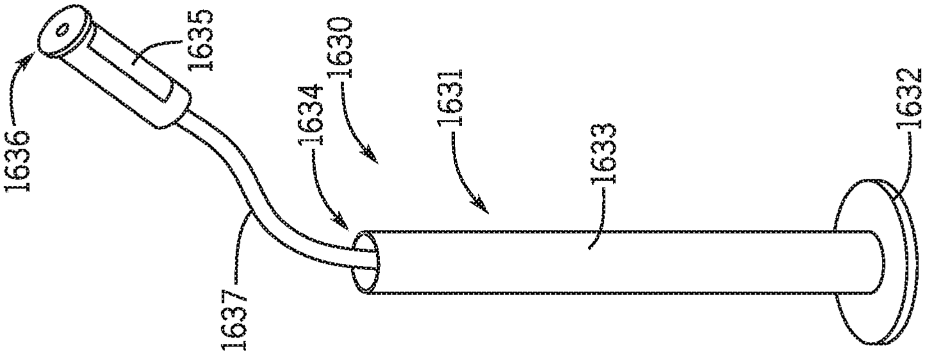
FIG. 31E is a perspective view of another standalone delivery system.
Figure 31D:
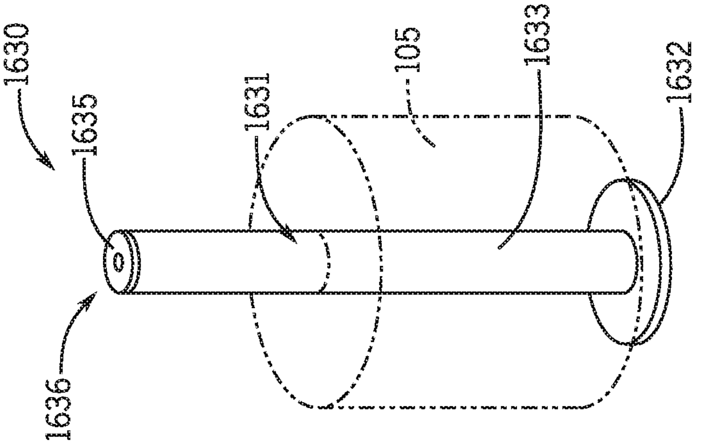
FIG. 31D is a perspective view of another standalone delivery system.
Figure 31C:
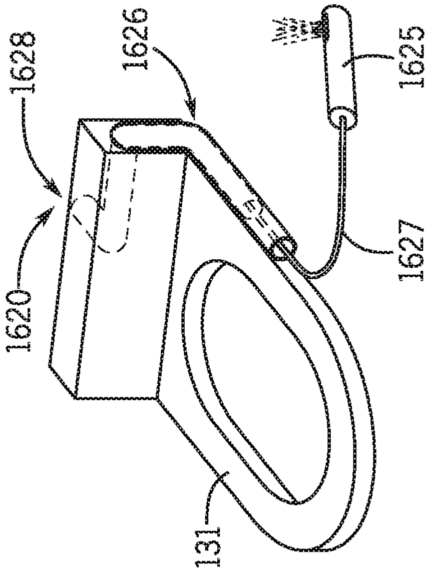
FIG. 31C is a perspective view of another standalone delivery system.

FIG. 31C illustrates another dispensing system 1620 that is integrated with a seat 131. The seat 131 is configured to be coupled (e.g., pivotally coupled) to a toilet or bidet, such as through a hinge. A cover may be provided that is pivotally coupled to the seat and/or the toilet/bidet. As shown in FIG. 31C, the elongated member and dispenser may be configured to couple to a side of the seat 131. The system 1620 includes an elongated member 1622 having an opening therein to receive a detachable dispenser 1625 that is configured to dispense a cleaning compound held in a container, such as the container 1626 in the elongated member 1622. The container 1626 may be removable from the elongated member 1622 (e.g., see the systems shown in FIGS. 108A, 108B, and 127A-127C as examples). The container 1626 may be fluidly connected to the tank, such as through a water passage 1628 or any other example disclosed in this application. The dispenser 1625 may include a chemical generator (e.g., as described elsewhere in this application) that generates the chemical compound, such that no fluid conduit is required (and the container 1626 is not required) or a fluid conduit 1627 may be provided to introduce water into the dispenser 1625. The dispenser may generate the compound that is dispensed when activated, such as via a push button, switch, or other actuator. This arrangement may include a flexible conduit 1627 that connects the detachable portion to the main portion of the system, such as where the connector carries electric power to the dispenser or acts as only a tether to limit extraction of the dispenser, yet does not provide fluid or electric power.

The dispenser 1625 may be integrated with a bidet wand, such as to provide dual functional dispensing. The dispenser may be fluidly connected to a water supply (e.g., a water tank, a water inlet line, etc.) to dispense water as a first function. The dispenser may dispense a cleaning compound as a second function, such as to sanitize an object (e.g., toilet seat). The dispenser may include a switch (e.g., lever) that is configured to switch the dispenser between dispensing water and the cleaning compound.

FIGS. 31D and 31E illustrate another example of a dispensing system 1630 that is incorporated into a toilet paper holder 1631 to hold the roll of toilet paper 105 (shown using phantom lines in FIG. 31D). The holder 1631 may be configured to be free standing (e.g., resting on a generally horizontal surface, such as a floor) or may be connected to a wall, furniture, or other suitable object. As shown, the holder 1631 includes a base 1632 that is configured to rest on a surface and a post 1633 that extends upwardly along a longitudinal axis from the base 1632. The post 1633 has a relatively smaller size (e.g., diameter), which may be tailored to the size of a paper product (e.g., the toilet paper roll 105), compared to the base 1632. The holder 1631 may include one or more shoulders (e.g., supports) that extend outward radially from the post 1633 relative to the longitudinal axis. Each shoulder may have a set vertical spacing from the base 1632, such as the length of a roll of paper product. The system 1630 includes a dispenser 1635 that is configured to dock to and undock (e.g., detachably couple) from the holder 1631, such as a hollow end 1634 of the post 1633, which may include an opening, a bore, or other suitable feature that is configured to receive the dispenser. The dispenser 1635 may be configured similar to, the same as, or different than any other dispenser discussed in this application. For example, the dispenser may include a chemical box (e.g., container, chemical generator, etc.) that is configured to house a cleaning compound, a pump (or other suitable device to move the cleaning compound), and one or more nozzles 1636 from which the compound is dispensed. A flexible conduit 1637 may couple the dispenser 1635 to the holder 1631. The conduit 1637 may carry fluid, electric power, and/or provide freedom of movement of the dispenser 1635 relative to the holder 1631.

FIGS. 32A-33B illustrate another exemplary embodiment of a standalone delivery system 1701 that includes a base 1702 (e.g., base structure) and a dispenser 1703 for dispensing a compound. The base 1702 is configured to mount to a surface. For example, a wall 1721 (e.g., rear wall) or surface of the base 1702 is mountable to a wall. The base 1702 may include a top surface 1722 that is configured to serve as a shelf and support other objects. As shown in FIG. 32B, the base 1702 includes a dehumidifier 1710 configured to remove water vapor from air introduced through an inlet opening 1723 in the base 1702. As shown in FIGS. 32B and 32C, the base 1702 includes a reservoir 1711 for holding a cleaning compound. For example, the cleaning compound may be used to sanitize the air exiting the base, routed to the dispenser 1703, and/or any other suitable use. The base 1702 includes an outlet opening 1724 through which the sanitized dry air from the dehumidifier 1710 is returned to the living space in which the system 1701 is located. The dehumidifier 1710 and the reservoir 1711 may be provided within a housing 1720 of the base 1702, where the inlet opening 1723 and the outlet opening 1724 are provided in the housing 1720. The housing 1720 may also include one or more access panels (e.g., door, sliding panels, rotating panels, etc.) that are configured to move from a closed position, in which the dehumidifier and/or reservoir are concealed, to an open position, in which the dehumidifier 1710 and/or the reservoir 1711 are accessible, such as to refill the reservoir for embodiments not having a dehumidifier or if the water level runs low on embodiments having the dehumidifier. The moisture (e.g., water vapor) removed from the air by the dehumidifier 1710 may be used to form the cleaning compound, such as by mixing the water with a liquid or solid compound. For example, an $H_2O_2$ generator may be provided in the base or in a dispenser, where the generator produces $H_2O_2$ from the removed moisture. The base 1702 may include one or more fluid conduits to fluidly connect the elements/components of the base 1702. As shown in FIG. 32B, a first line 1725 brings air and water vapor into the dehumidifier 1710. The first line 1725 may also fluidly connect the reservoir 1711 with the dehumidifier 1710 such that the water recovered can be routed to the reservoir 1711. A second line 1726 may fluidly connect the dehumidifier 1710 and the outlet opening 1724 to output clean air and/or air removed of water vapor into the surrounding atmosphere.

Figure 32B:
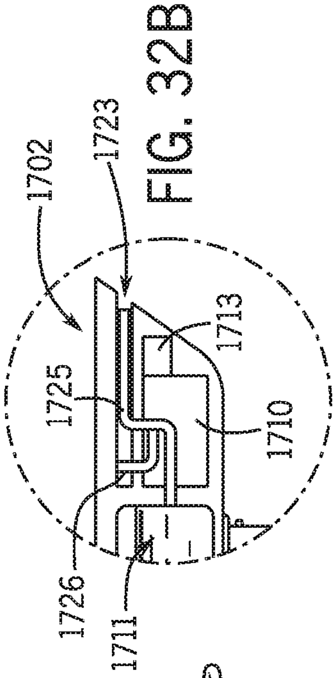
FIG. 32B is a detail view of the standalone delivery system shown in FIG. 32A.
Figure 32C:
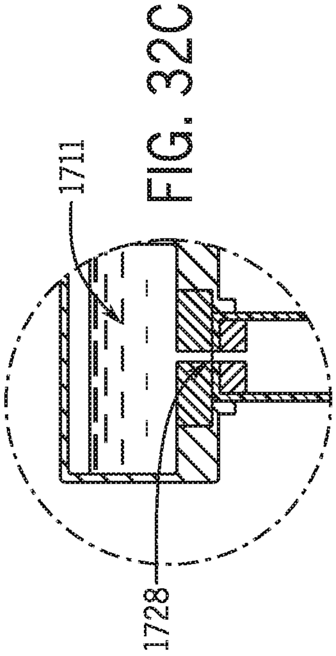
FIG. 32C is a cross-sectional view of the standalone delivery system shown in FIG. 32A.
Figure 32D:
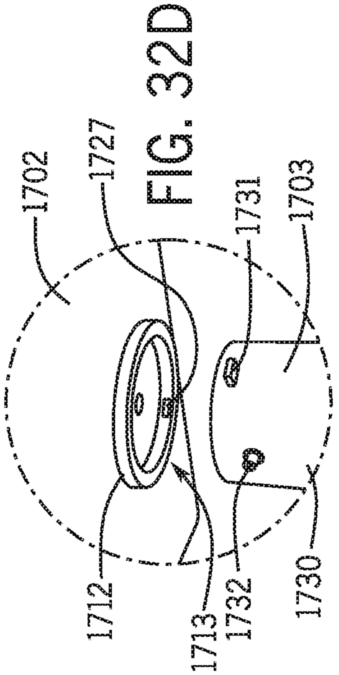
FIG. 32D is a detail view of the standalone delivery system shown in FIG. 32A.
Figure 32A:
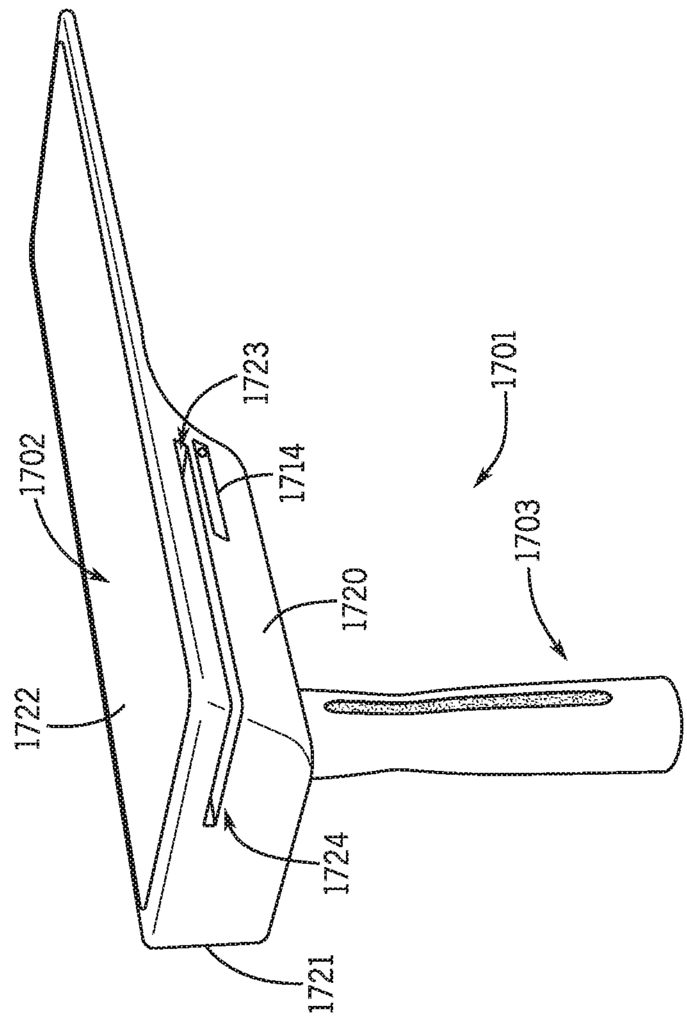
FIG. 32A is a perspective view of another exemplary embodiment of a standalone delivery system having a detachable dispenser.

The base 1702 may further include an attachment feature to facilitate coupling (e.g., docking) and decoupling (e.g., undocking) between the dispenser 1703 to the base 1702. As shown in FIG. 32D, the attachment feature 1712 is provided on a bottom surface of the base 1702 and includes a recess 1713 for receiving the dispenser 1703 in the docked position. The recess 1713 may be a circular opening to receive a cylindrical dispenser 1703. A locking feature may be employed to detachably secure the dispenser 1703 in place when coupled to the base 1702. As shown in FIG. 32D, the locking feature may include an tab 1731 extending from the casing 1730 of the dispenser 1703 and configured to engage an aperture 1727 in the attachment feature 1712 to dock the dispenser 1703 to the base 1702. The locking feature may include a plurality of tabs and apertures. By way of example, two or more tabs 1731 may extend radially outward from the casing 1730 to engage two or more mating apertures 1727 extending radially inward into the attachment feature 1712 or another element of the base 1702. Further, the tab(s) 1731 may be located in the base 1702 and the aperture(s) 1727 may be located in the dispenser 1703. A release (e.g., the button 1732) may be provided to release each tab 1731 from the associated aperture 1727, such as by moving the tab 1731 inwardly to disengage the aperture 1727. The attachment feature 1712 may advantageously be located proximate to the reservoir 1711 holding the water/compound, so that when the dispenser 1703 is docked with the base 1702, the dispenser 1703 is fluidly connected to the reservoir 1711 and can be refiled with water/compound as necessary. As shown in FIG. 32C, a fluid connection 1728 is located between the reservoir 1711 and the attachment feature 1712 that is provided. The attachment feature 1712 may be configured to open the fluid connection when the dispenser 1703 is docked and close the fluid connection when the dispenser 1703 is decoupled from the base 1702 to prevent compound from flowing out the fluid connection.

The system 1701 may include a microprocessor 1713 having a PCB (or other suitable device) to control the dehumidifier 1711, refilling of the dispenser 1703 with compound, and/or other functions of the system. The system 1701 may include a control panel 1714 that is configured to provide a user interface and to control the microprocessor 1713. For example, a user may be able to turn on the dehumidifier 1710 and adjust the settings (e.g., whether to sanitize, dehumidify, or both) via the control panel 1714. Also, for example, the dehumidifier 1710 may have more than one adjustment (e.g., speed, flow rate through the system, etc.), which can be controlled by the user via the control panel 1714. The control panel 1714 may also display to the user various functions of the system 1701, such as the mode of operation of the dehumidifier 1710, the level of water and/or cleaning compound in the reservoir 1711 and/or the dispenser 1703, as well as any other suitable output.

The system 1701 may include one or more sensors to monitor various characteristics of the system. For example, the system 1701 may include an air sensor that monitors moisture content (e.g., humidity, a level or amount of water vapor) in the incoming air. The air sensor may be part of the dehumidifier 1710 and may communicate via a signal to the microprocessor 1713 the moisture content, wherein the microprocessor 1713 may automatically adjust the operation of the dehumidifier based on the moisture content in the incoming air. For example, a user may program in a desired moisture content via the control panel and the air sensor cooperates with the microprocessor to adjust the system 1701 until the air coming into the system has the desired moisture content. Also, for example, the system 1701 may include a fill sensor that monitors the level of compound in the system and upon the level dropping below a threshold, the system will indicate such via an indicator. The indicator may be a visual indicator (e.g., a light on the base), an audio indicator (e.g., a bell, an alarm, etc.), or a combination thereof. Also, for example, the system 1701 may include a touchless actuator, such as on the base or on the dispenser, including a sensor that detects presence of an object in a zone of detection.

The system 1701 may be configured to operate on an internal power source (e.g., battery), an external power source (e.g., wall outlet), or a combination thereof. The electronic components (e.g., the microprocessor, control panel, sensors, etc.) may be electrically connected to the power source(s) to power the component(s).

Figure 33B:
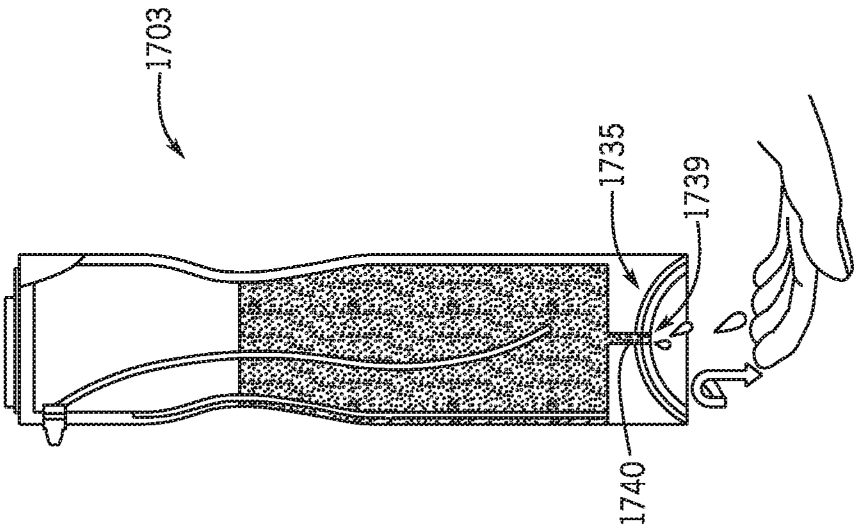
FIG. 33B is another side view of the detachable dispenser shown in FIG. 33A.
Figure 33A:
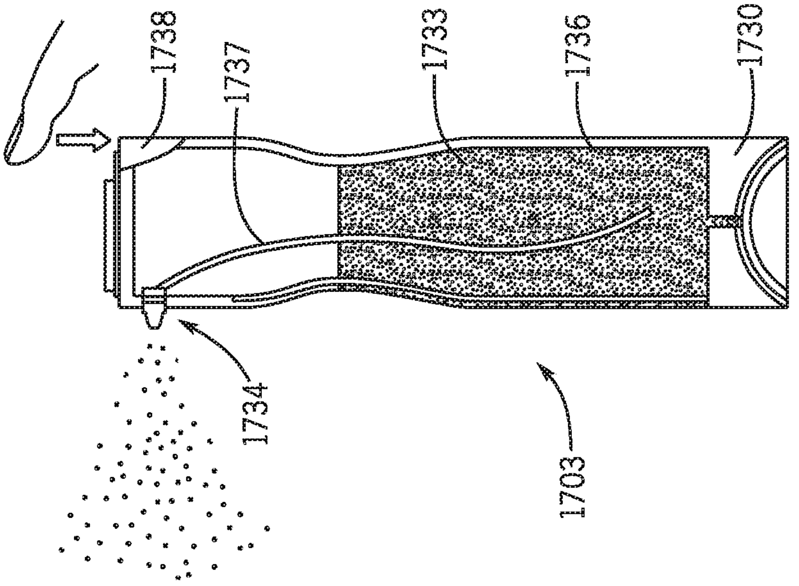
FIG. 33A is a side view of the detachable dispenser for use with the delivery system shown in FIGS. 32A-32D.

As shown in FIGS. 33A and 33B, the dispenser 1703 is configured to dispense a compound 1733 stored in the dispenser 1703. The dispenser 1703 may include a spray dispenser 1734, a pump dispenser 1735, or a combination thereof. As shown, the dispenser 1703 includes a housing 1730, a spray dispenser 1734 provided at a first location on the housing 1730 (e.g., at the top), and a pump dispenser 1735 provided at a second location on the housing 1730 (e.g., at the bottom). The dispenser 1703 may include a reservoir 1736 configured to hold a volume of compound 1733. A side wall of the housing 1730 may define the reservoir 1736 or a portion thereof, which is provided between the first and second locations.

The spray dispenser 1734 may be configured to provide a spray pattern (e.g., misting) of compound 1733 upon activation of the spray dispensing function. The spray pattern can be used to sanitize an object (e.g., a toilet, sink, countertop, etc.) that is positioned remotely from the spray dispenser at a spray distance. The spray dispenser 1734 includes one or more nozzles that are fluidly connected to the reservoir 1736, which holds the compound 1733, such as through a fluid conduit 1737. As shown, the fluid conduit 1737 is a flexible hose that is configured to extend into the compound 1733 and includes an open end configured to be positioned in the compound. The other end of the hose is fluidly connected to the nozzle(s) of the spray dispenser 1734. The spray dispenser 1734 may include a propellant to propel the compound and/or a pressure device configured to pressurize the compound to force it out through the nozzle(s) of the dispenser. The spray dispenser 1734 may be configured to atomize the compound, such that it is sprayed as a relatively fine mist. The dispenser 1703 may include a manual actuator, automatic actuator, or a combination thereof for activating the spray dispensing function. As shown in FIG. 33A, a manual actuator in the form of a button 1738 is provided, such that the spray dispensing function is activated when the button 1738 is depressed.

The pump dispenser 1735 may be configured to provide one or more droplets of compound upon activation of the pump dispensing function. The pump dispensing function can be used to sanitize, for example, a user's (e.g., hands), a paper product (e.g., tissue, toilet paper, paper towel, etc.), as well as other objects that is positioned below the pump dispenser. The pump dispenser 1735 includes an outlet 1739 that is fluidly connected to the reservoir 1736, which holds the compound 1733, through a fluid conduit. As shown in FIG. 33B, the fluid conduit 1740 is formed by an interior wall of the housing 1730 that extends from a bottom side of the reservoir 1711 to the outlet 1739. Thus, gravity can be used to feed the compound into the fluid conduit 1740 and out the outlet 1739 of the pump dispenser 1735. The dispenser 1703 may include a manual actuator, automatic actuator, or a combination thereof for activating the dispensing function of the pump dispenser. The actuators can be arranged according to any other actuator disclosed in this application.

FIGS. 34-40 illustrate additional exemplary embodiments of standalone delivery systems that are configured to dispense a paper product, which may be sanitized with a cleaning compound. FIGS. 34A-36B illustrate an exemplary embodiment of a paper dispensing system 1801 configured to dispense paper (e.g., toilet paper, paper towel, hand wipes, etc.) from two different apertures (e.g., openings, notches, orifices, etc.). FIGS. 34A-34E also illustrate various states (e.g., positions, modes, etc.) of the paper dispensing system 1801. FIG. 34A shows the system 1801 in a closed position (e.g., state) without any paper product being dispensed. FIGS. 34B and 34C show the system 1801 in different partially open positions. FIG. 34D shows the system 1801 in a fully open position (e.g., state) with paper product being dispensed from two different dispensing apertures. FIG. 34E shows the system 1801 in the closed position with paper product being dispensed from two different dispensing apertures.

As shown in FIGS. 34A-36B, the paper dispensing system 1801 includes a housing 1802 configured to house a unit of paper (e.g., roll of toilet paper 106, roll of paper towel, etc.). The housing 1802 includes a fixed member 1803 that includes a base 1804 that is configured to mount (e.g., attach, couple, etc.) to another object, such as a wall. For example, the base 1804 may include one or more openings (e.g., holes, etc.) that receive fasteners to couple the housing 1802 to the wall. The fixed member 1803 also includes a pair of spaced apart and opposing side members (e.g., a first side member 1805 and a second side member 1806) provided on each end of and extending from the base 1804. The base 1804 and the side members 1805, 1806 may form a cavity 1807 that houses the unit of paper.

The housing 1802 also includes a movable member 1808 (e.g., a panel) that is movable relative to the fixed member 1803 between a closed position, in which the cavity 1807 is inaccessible, and a fully open position, in which the cavity 1807 is fully accessible. The cavity 1807 may be accessible (e.g., partially accessible) with the movable member 1808 in intermediate positions between the open and closed positions. Thus, the movable member 1808 may be moved to additional positions between the fully open and the closed positions, which provide varying sized openings (e.g., intermediate partially open positions).

The side members 1805, 1806 may be integrally formed with the base 1804 or formed separately and then coupled to the base 1804, such that base 1804 and side members 1805, 1806 are fixed relative to one another. As shown in FIGS. 34A-34E, the fixed member 1803 has a generally semi-cylindrical shape (e.g., a cylindrical shape with a semi-cylindrical opening for the movable member 1808), such as to complement the exterior shape of a full roll of paper. However, the fixed member 1803 may have other shapes, which may or may not complement the shape of the paper product.

Each side member 1805, 1806 is provided on one side or end of the base 1804 forming the ends of the cylinder. As shown best in FIG. 34C, each side member 1805, 1806 has a generally circular shape to complement the semi-cylindrical base 1804. However, each side member 1805, 1806 may be configured having other shapes, which may or may not complement the fixed member. Each side member 1805, 1806 may include a guide 1809 (e.g., track, channel, groove, etc.) that is configured to receive and guide movement of the movable member. For example, each side member 1805, 1806 may include a groove having a circular or semi-circular shape disposed in an inner surface (e.g., the surface facing the opposing side member), where the groove receives a portion (e.g., an edge, tab(s), etc.) of the movable member 1808 to guide movement of the movable member 1808 in a circular direction. Thus, for this example, there are two opposing grooves (with one in each side member) that receive opposite ends/sides of the movable member 1808 to guide the movement of the movable member 1808. Each guide 1809 may be provided near the outer periphery (e.g., an outer diameter) of the side member, which may advantageously maximize interior space in the cavity. Also, for example, each side member 1805, 1806 may include a pair of projections that extend inwardly from an inner surface of the member to form a channel in which the movable member 1808 may be moved within.

At least one side member 1805, 1806 includes an opening (e.g., the second dispensing aperture 1822 shown in FIG. 36B) for dispensing a paper product from the unit of paper housed in the housing 1802 to outside the system for a user to obtain. Each opening (e.g., aperture) may have a circular shape or other suitable shape. Each opening may extend through the side member into the cavity 1807.

Figures 34A, 34B, 34C, 34D, 34E:
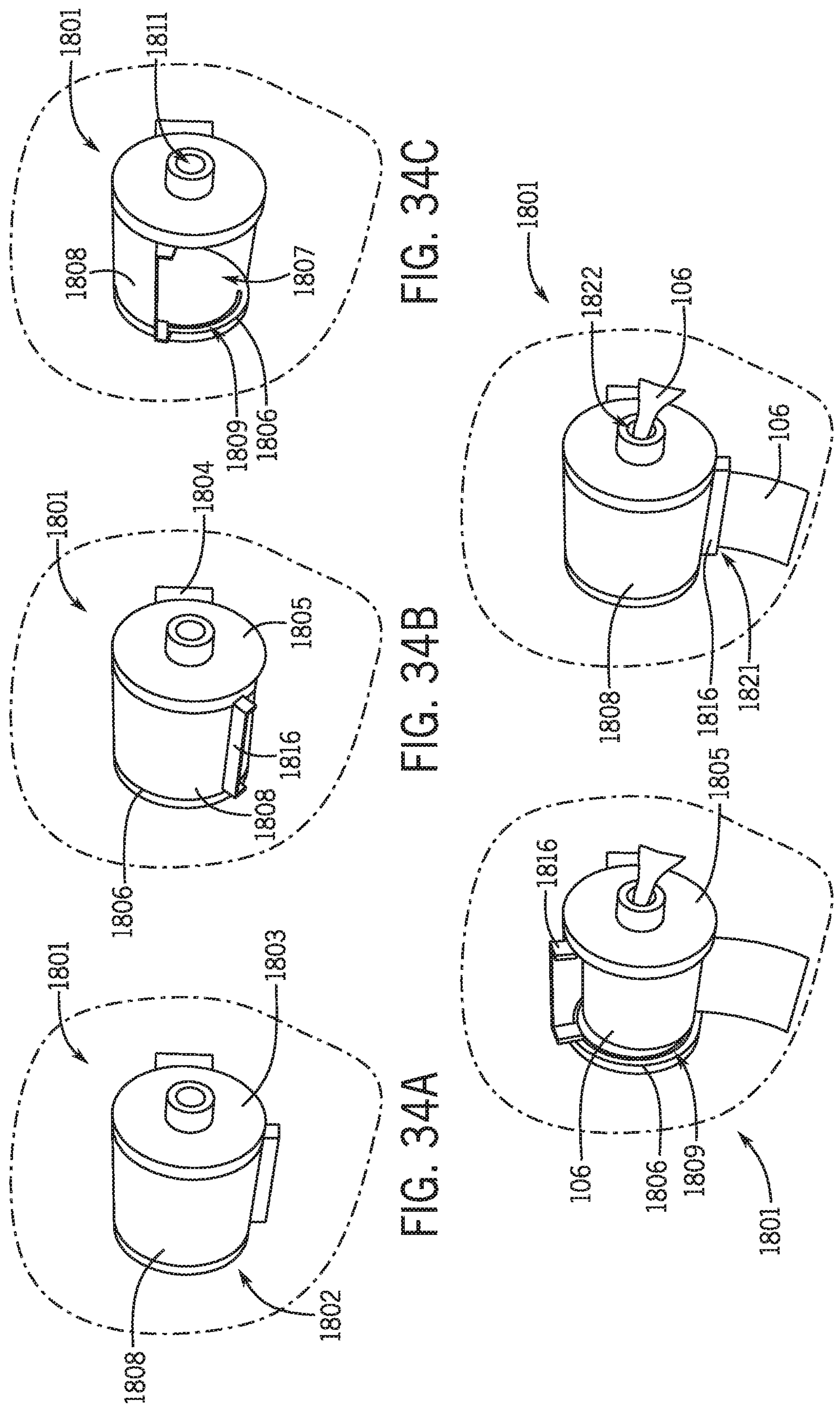
FIG. 34A is a perspective view of an exemplary embodiment of a paper dispensing system.
FIG. 34B is a perspective view of the paper dispensing system shown in FIG. 34A.
FIG. 34C is a perspective view of the paper dispensing system shown in FIG. 34A.
FIG. 34D is a perspective view of the paper dispensing system shown in FIG. 34A.
FIG. 34E is a perspective view of the paper dispensing system shown in FIG. 34A.
Figure 36B:
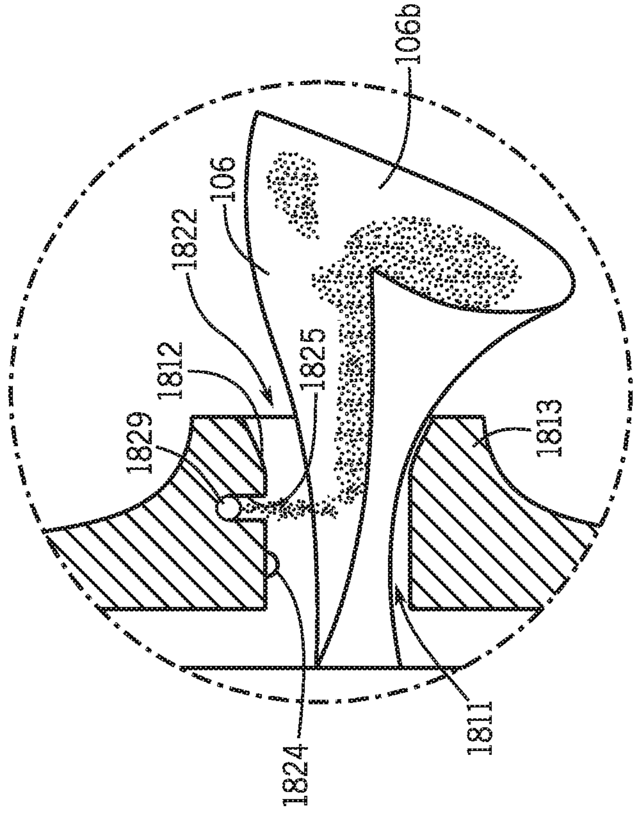
FIG. 36B is a detail view of the paper dispensing system shown in FIG. 36A.

As shown best in FIGS. 34C and 36B, the first side member 1805 (e.g., panel) includes a bore 1811 extending through the first side member 1805 to allow paper (e.g., a sheet of paper) to be withdrawn from inside the cavity 1807 of the system 1801 to outside the system. The bore 1811 may be defined by an inner surface 1812. The inner surface 1812 includes a first portion extending from an interior side (e.g., from the cavity), which may have a cylindrical shape (as shown). The inner surface 1812 may include a second portion extending from the first portion to an exterior side. The second portion may be configured as a curved portion (e.g., convex curve), a tapered portion, a chamfer, or other suitable shape to provide for a relatively larger exterior opening compared to the interior opening of the bore. The first side member 1805 may include a protrusion 1813 extending outwardly from a base to provide additional material, such as to house additional elements (e.g., a sensor, a dispenser, etc.).

Figure 36A:
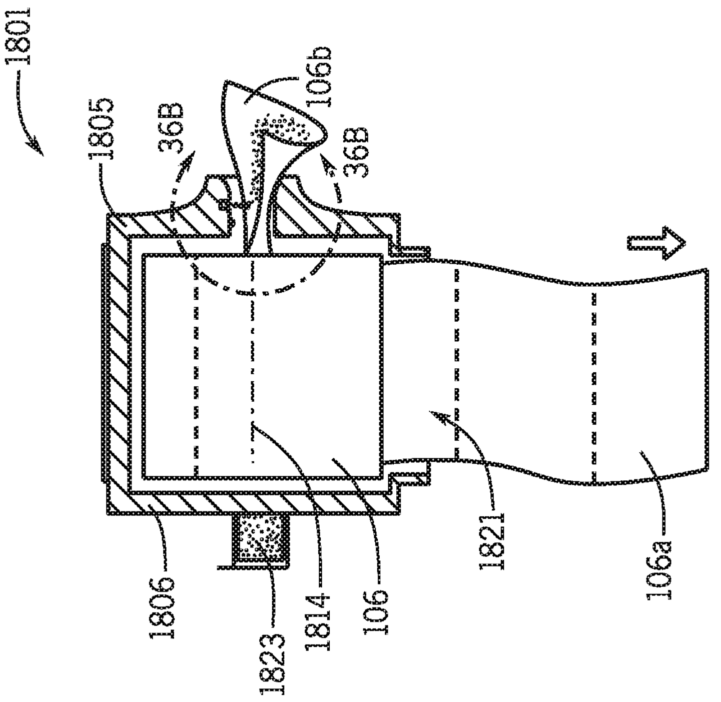
FIG. 36A is a cross-sectional view of the paper dispensing system shown in FIG. 35A.

The movable member 1808 is configured to move relative to the fixed member 1803 (e.g., side members) between a fully open position and a closed position to allow or prevent access to the cavity 1807, respectively. As noted above, the movable member 1808 may be configured to be guided by other elements of the system 1801. For example, the movable member 1808 may ride in a channel, groove, or other feature of one side member or each side member. As shown best in FIGS. 34A-34E, the movable member 1808 has a semi-cylindrical shape that complements the shape of the side members 1805, 1806 (e.g., the channels, grooves, etc. therein). The semi-cylindrical movable member 1808 may pivot (e.g., rotate, etc.) about a pivot axis 1814 (e.g., an axis of rotation) as shown in FIG. 36A between the fully open and closed positions. The movable member 1808 is configurable in any number of intervening partially open positions (i.e., between the fully open and closed positions).

A chute 1816 may be provided on the fixed member 1803, the movable member 1808, or both the fixed and movable member, such as to direct the paper through an opening. As shown in FIGS. 34A-34E, the movable member 1808 includes a chute 1816 that is configured to at least partially define the first dispensing aperture 1821, such as when the movable member 1808 is in the closed position. The chute 1816 in cooperation with the fixed member 1803 define the first dispensing aperture 1821 when the movable member 1808 is in the closed position. As shown, the chute 1816 may include a radially extending base member and a side member provided on each end of the base member. Each side member may be configured generally perpendicular to the base member to form a generally inverted U-shape (or C-shape) chute defining an opening (e.g., the first dispensing aperture 1821 in FIG. 35A) for the paper to be dispensed therethrough.

The paper dispensing system 1801 may include a compound 1823 (e.g., chemistry) that is configured to clean (e.g., sanitize) the paper product being dispensed through one or more openings in the system. As shown in FIG. 36, the paper dispensing system 1801 includes a sensor 1824, a chemical dispenser 1825, and a container 1826 (e.g., reservoir).

The chemical dispenser 1825 of system 1801 is configured to dispense the cleaning compound onto the paper product that is being dispensed (e.g., withdrawn) from the system 1801 through one or more of the openings (e.g., dispensing apertures) in the system. For example, the dispenser 1825 may be provided in the first side member 1805, such as in in the base and/or the protrusion 1813, and may be configured to dispense the cleaning compound onto the paper product being dispensed through the bore 1811 defining the second dispensing aperture 1822. The dispenser 1825 may be configured to dispense the compound as a spray (e.g., atomized), a stream, or in any suitable manner. The system 1801 may include multiple chemical dispensers. By way of example, the dispensers 1825' shown in FIG. 35B can be used in addition to or in place of the dispenser 1825.

The sensor 1824 of system 1801 is configured to detect the paper product to control dispensing of the cleaning compound from the dispenser 1825. The sensor 1824 may be configured to detect presence of the paper. For example, the sensor 1824 may be provided in the first side member 1805, such as along the inner surface 1812 that defines the bore 1811, and configured to detect the presence of the paper product 106 in the bore 1811 of the first side member 1805 (see FIG. 36B), and upon detecting such presence, the sensor 1824 may communicate a signal output to the dispenser 1825 to trigger (e.g., actuate) dispensing of the cleaning compound 1823. The sensor 1824 may be configured to detect movement. For example, the sensor 1824 may be configured to detect the movement of the paper product 106 in the bore 1811 of the first side member 1805, and upon detecting such movement, the sensor 1824 may communicate a signal output to the dispenser 1825 to trigger (e.g., actuate) dispensing of the cleaning compound. The dispenser 1825 may be configured to dispense the compound during withdrawal of the paper product, such as to impart the cleaning compound onto the paper product 106 just prior to withdrawal from the system. This method may be more advantageous in several circumstances. For example, it may be advantageous to dispense the compound as each sheet is withdrawn to impart the compound onto each and every sheet. Also, for example, if the effectiveness of the compound may deteriorate (e.g., due to evaporation) over time from exposure to air and/or the paper, it may be advantageous to dispense the compound during withdrawal to limit exposure time of the compound to the air/paper. Alternatively, the dispenser 1825 may be configured to dispense the compound after a predetermined amount of time (e.g., a time delay), such as to impart the compound onto the paper product 106 that is going to be withdrawn. For example, the system 1801 may dispense the compound after a set time following completion of the withdrawal of the paper product 106. Thus, the system 1801 may impart the compound onto the next sheet to be withdrawn from the system. This method may be more advantageous if, for example, the effectiveness of the compound increases over time with exposure to air and/or the paper.

The container 1826 of system 1801 is configured to house the cleaning compound 1823 in a compartment (e.g., cavity) therein. The container 1826 may be a sealed container that is configured to house a liquid compound. The container 1826 may be disposed in the housing 1802 or coupled to the housing. The container 1826 may be coupled to an outer surface of the base 1804 proximate the second side member 1806, such that the container 1826 is accessible to refill the compartment with cleaning compound without having to move the movable member 1808 or remove the paper product from the system 1801. Alternatively, the container 1826 may be coupled to the second side member 1806 or to any other element (e.g., fixed member, first side member, etc.) of the system 1801. Alternatively, the container 1826 may be integrally formed with an element of the system 1801. For example, the base 1804 may be formed including the container 1826. The container 1826 may include a lid 1827, cap, or other feature that is removable from a body 1828 of the container 1826 to provide access to the compartment once removed. The lid 1827 may be coupled to the body 1828 through any suitable feature (e.g., threads, snaps, etc.).

Figure 35B:
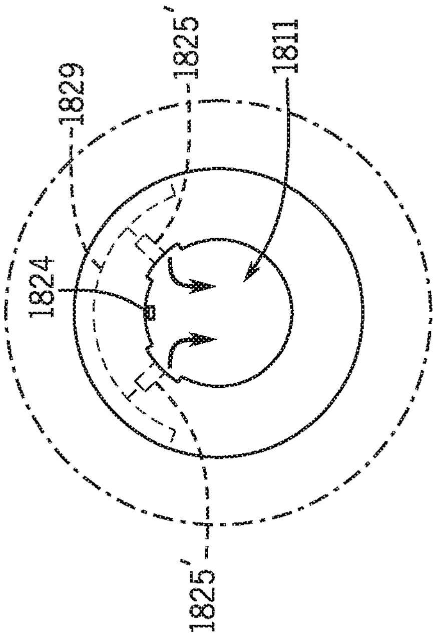
FIG. 35B is a detail view of the paper dispensing system shown in FIG. 35A.
Figure 35A:
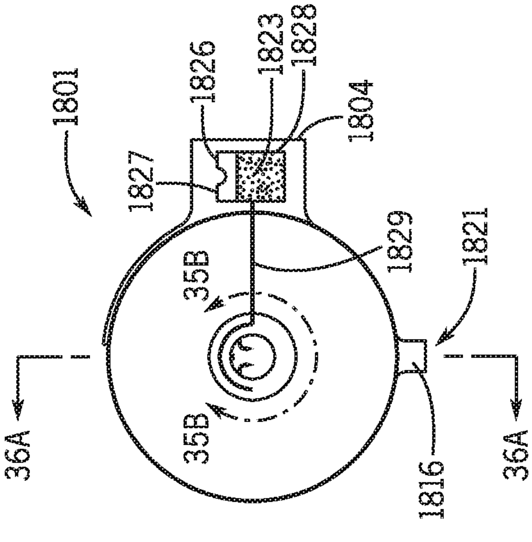
FIG. 35A is a side view of the paper dispensing system shown in FIGS. 34A-34E.

The system 1801 may include a fluid conduit 1829 through which the cleaning compound is transferred from the container 1826 to the chemical dispenser 1825. As shown in FIG. 35A, the fluid conduit 1829 extends from the container 1826 through the base 1804 (e.g., rearward of the roll of the paper product) to the first side member 1805 and connects to the dispenser 1825 provided in the first side member 1805. The fluid conduit 1829 may be routed differently depending on the location of the container 1826. For example, when the container 1826 is located on the second side member 1806, the fluid conduit may be routed through the second side member 1806 (e.g., an opening therein)

through a central region of the system to the dispenser provided in the first side member.

The paper dispensing system 1801 may be configured to receive a unit of paper, such as a roll of paper 106. The roll of paper 106 may be configured having two ends from which sheets of paper may be withdrawn and separated from the roll containing the remaining sheets. As shown in FIG. 36A, the first end 106*a* of the roll of paper 106 is an outside end that is located at an outer periphery (e.g., outer diameter) and is configured to dispense through the first dispensing aperture 1821; and the second end 106*b* of the roll of paper 106 is an inside end that is located proximate the pivot axis 1814 (e.g., an inner diameter) and is configured to dispense through the second dispensing aperture 1822. This arrangement may advantageously allow for a single roll of paper to provide both paper that is free (e.g., devoid) of cleaning compound, such as from the first end, and paper that includes cleaning compound, such as from the second end. Thus, the user can decide whether to use compound free paper or paper including compound.

As an alternate embodiment, the system 1801 may be configured having two dispensers and two containers, with one dispenser associated with each dispensing aperture and one container. The first dispenser may be configured to dispense a first compound and the second dispenser may be configured to dispense a second compound, which may be different than the first compound.

FIGS. 37-40 illustrate other alternate embodiments of paper dispensing systems 1901, 2001, 2101 that are configured to dispense paper (e.g., toilet paper, paper towel, hand wipes, etc.) from two different apertures (e.g., openings, notches, orifices, etc.).

Figure 37:
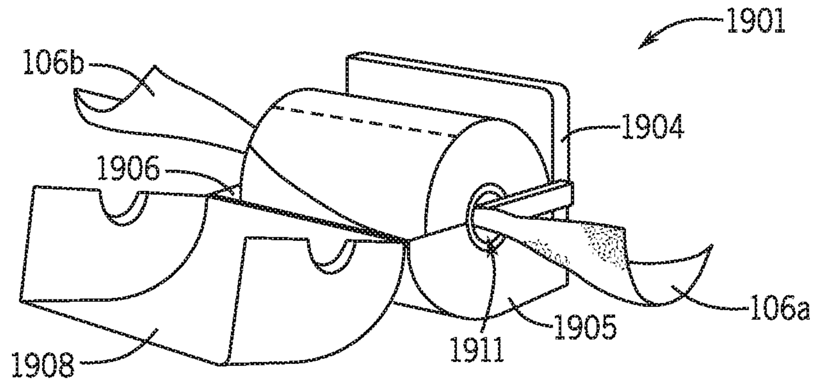
FIG. 37 is a perspective view of another exemplary embodiment of a paper dispensing system in an open position.
Figure 38:
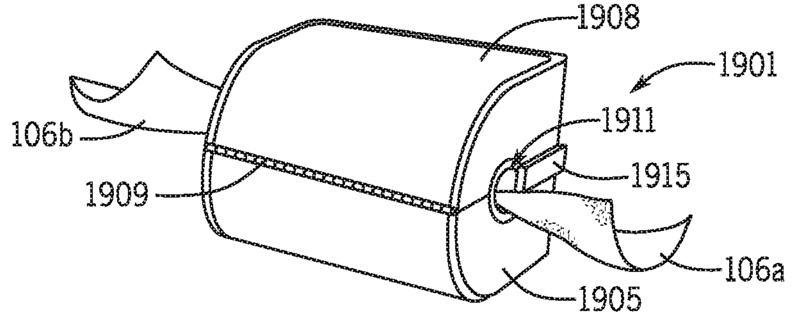
FIG. 38 is a perspective view of the paper dispensing system shown in FIG. 37 in a closed position.

As shown in FIGS. 37 and 38, the system 1901 includes first and second side members 1905, 1906 (e.g., panels), a base 1904, and a movable member 1908 (e.g., panel). Each member may be configured the same as or similar to the members discussed above, except for the noted differences. The movable member 1908 of the system 1901 is configured to pivot about a pivot 1909 (e.g., hinge) that is disposed on the fixed member (e.g., the base 1904) between a closed position and a fully open position. The pivot 1909 is offset from a longitudinal axis (i.e., the axis about which the paper rotates) in a radial direction. Preferably, the pivot 1909 of the movable member 1908 is located on the side of the fixed member that is opposite the mounting surface of the base 1904 to allow the movable member 1908 to pivot away from the object (e.g., wall, vanity, etc.) that the base is secured to. The system 1901 may include a locking element (e.g., latch, detent, etc.) that is configured to selectively lock the movable member 1908 and the fixed member together in the closed position. The system 1901 may include a releasing element (e.g., button, lever, etc.) that is configured to release the locking element to allow the movable member to pivot relative to the fixed member to an open position.

Also shown, the first side member 1905 includes a first dispensing aperture 1911 through which a first paper product (e.g., a first end 106*a* of the roll) can be dispensed; and the second side member 1906 includes a second dispensing aperture through which a second paper product (e.g., a second end 106*b* of the roll) can be dispensed. The first and second dispensing apertures may be located on opposite sides of the system to dispense paper (e.g., sheets of toilet paper) from each side. Thus, the system 1901, as shown, is configured as a horizontal dispenser. The system 1901 may include a dispenser configured to spray cleaning compound onto one of the first and second paper products while the other of the products may not include the cleaning compound or may include a different cleaning compound. For example, a dispenser 1915 may be located on the first side member 1905 to direct the compound onto the first end 106*a* of the roll while the paper is withdrawn through the first dispensing aperture 1911. A dispenser may be located on the second side member 1906 to direct the compound onto the second end 106*b* of the roll while the paper is withdrawn through the second dispensing aperture.

Figure 39:
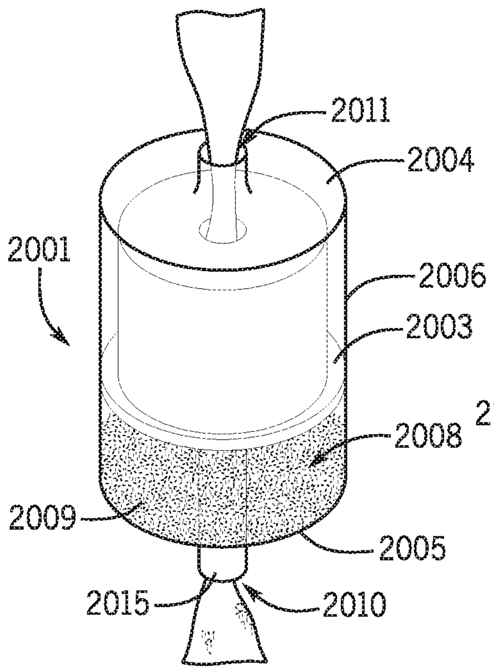
FIG. 39 is a perspective view of another exemplary embodiment of a paper dispensing system.

As shown in FIG. 39, the system 2001 is configured as a vertical dispenser having two dispensing apertures. The system 2001 includes a fixed member 2003, a top member 2004, and a bottom member 2005. Each member may be configured the same as or similar to the members discussed above, except for the noted differences. The fixed member 2003 may be configured to be mounted (e.g., secured, affixed, coupled, etc.) to an object, such as a wall. The fixed member includes a cylindrical (e.g., semi-cylindrical) member and a mounting member 2006 extending away from an outer portion of the cylindrical member. The mounting member is configured to mount to an object and may include one or more holes, such as to receive fasteners therethrough, or other elements for mounting the fixed member to the object. The cylindrical member is hollow to receive a paper product therein.

The bottom member 2005 of system 2001 may be coupled to the fixed member 2003, such as the cylindrical member, to form a cavity for dispensing the paper product. The exterior shape of the bottom member 2005 may be configured to complement the fixed member, such as being cylindrical in shape. The roll of paper product may be placed on the fixed member 2003 and supported by the bottom member 2005, such as an upper wall thereof. The bottom member 2005 may alone or in cooperation with the fixed member form a container 2008 (e.g., reservoir, etc.) that is configured to house a compound 2009 therein. For example, the bottom member 2005 may include offset upper and lower walls that are interconnected via a side wall to from a hollow cylinder to house the compound. The bottom member 2005 may also include a bore 2010 (e.g., a central bore along a longitudinal or vertical axis of the system) that extends through the bottom member 2005 into the cavity to allow the paper product to be withdrawn through a dispensing aperture defined by the bore. Thus, the bottom member 2005 having the bore 2010 has an annular shape. The container 2008 may include an access opening to facilitate refilling of the compound. The access opening may be provided in the upper wall of the bottom member that is accessible when the paper product is removed from the cavity.

The top member 2004 of system 2001 is detachably coupled to the fixed member 2003, such as to close off the cavity formed by the bottom member and the fixed member. The top member 2004 may have an annular shape with an outer periphery that complements the shape of the fixed member 2003 and a bore 2011 that extends into the cavity to allow the paper product to be withdrawn through a dispensing aperture in the bore 2011. The bore 2011 of the top member 2004 may be generally concentric to the bore 2010 of the bottom member. The fixed and top members of system 2001 may be configured to detachably couple together via a lock element and a release element.

The system 2001 may be configured to dispense paper through the first dispensing aperture in the bottom member (e.g., the bore 2010) and the second dispensing aperture in the top member (e.g., the bore 2011). The paper that is withdrawn may be from the same unit (e.g., roll) that is disposed in the cavity, such as where an inner end of the roll is dispensed through one aperture and an outer end of the roll is dispensed through the other aperture. The system 2001 may include a dispenser 2015 that is configured to dispense a cleaning compound onto the paper product being withdrawn through at least one dispensing aperture, such as the second dispensing aperture in the bottom member 2005. The system 2001 may also include a sensor that is configured to actuate the dispenser 2015 based on a detected parameter (e.g., presence of paper, movement of paper, etc.).

Figure 40:
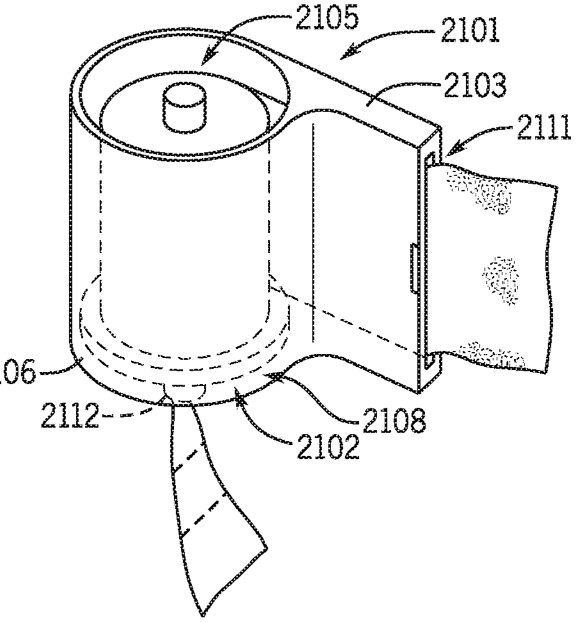
FIG. 40 is a perspective view of yet another exemplary embodiment of a paper dispensing system.

As shown in FIG. 40, the system 2101 is configured to dispense paper in both a vertical direction and a horizontal direction. The system 2101 includes a housing 2102 that has a generally cylindrical portion and an arm 2013 extending from a first end (e.g., side) of the cylindrical portion. The housing 2012 may have an open top 2105 to allow the roll of paper to be replaced. A cover may be provided for covering the opening top 2105. The arm includes a first dispensing aperture 2111, which may be configured as a chute that dispenses the paper as flat sheets. The housing 2012 may include a bottom portion 2106 coupled to the cylindrical portion forming a cavity to receive the paper product. The bottom portion 2106 may include a second dispensing aperture 2112, which may be configured as a circular opening or a cylindrical bore that dispenses partially rolled and/or folded paper. The system 2101 may include a cleaning compound, such as provided in a container 2108 in the housing 2102, and a dispenser configured to dispense the compound onto the paper being withdrawn from at least one dispensing aperture.

viii. Examples of Internal Fluid (e.g., Inside Tank) Dispensing Systems

As noted elsewhere, the systems utilizing cleaning compounds having improved chemistries configured to clean toilets may be configured to dispense the compounds inside the toilet (e.g., within the toilet tank, the water inlet of the tank, the water inlet of the bowl, etc.). For example, the systems disclosed in this application may be dual dispensing systems that are configured to dispense cleaning compounds outside the toilet and inside the toilet. Also for example, the systems may be single dispensing systems that are configured to dispense cleaning compounds either outside the toilet or within the fluid internal to the toilet, such as within the fluid delivery system of the toilet.

The fluid delivery system of the toilet may include any one or combination of the tank for housing a volume of water, the fill valve for transferring water from a water supply to the tank, a flush valve for transferring water from the tank to the bowl, and a passageway that transfers (e.g., carries) water and waste from the bowl to another element (e.g., soil pipe, holding tank, etc.).

Figure 41:
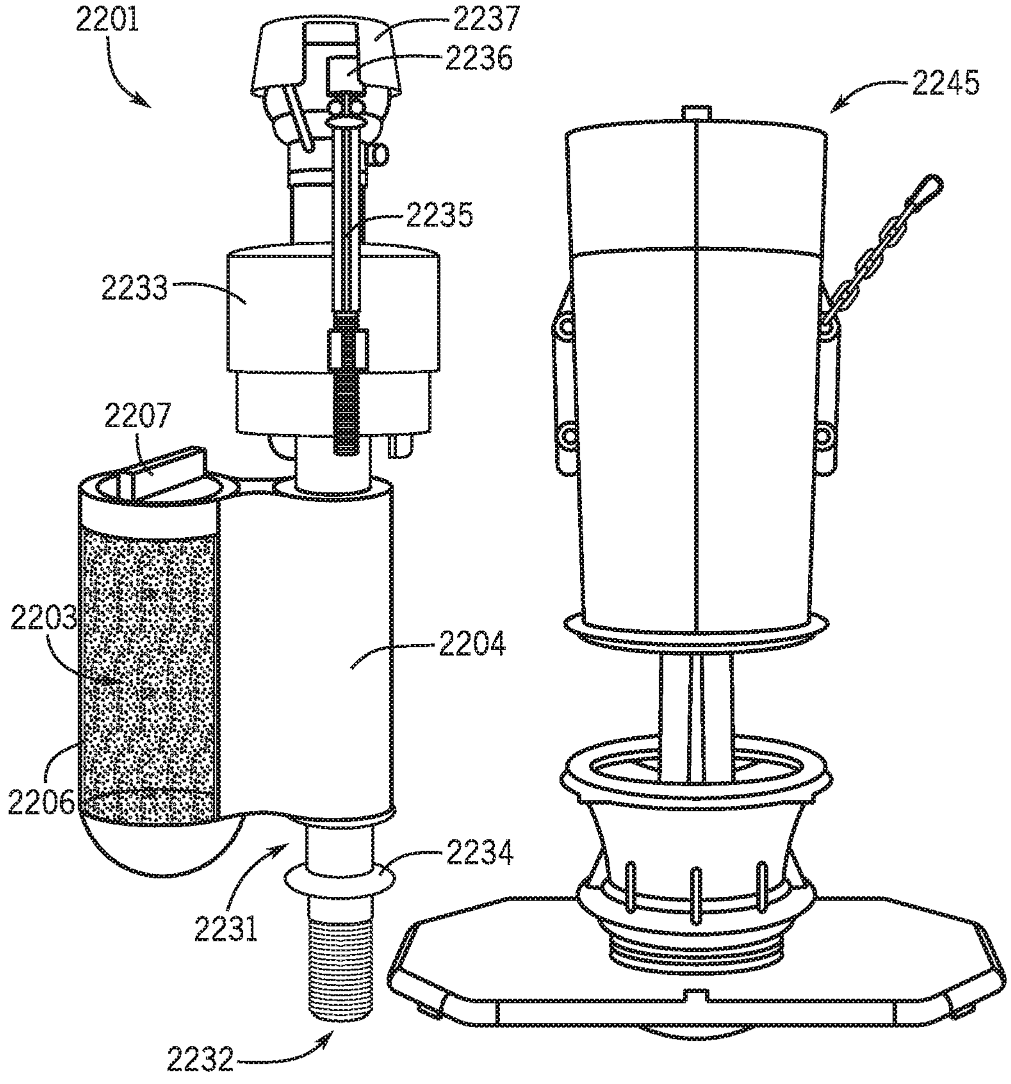
FIG. 41 is a perspective view of an exemplary embodiment of an internal dispensing system.
Figure 42:
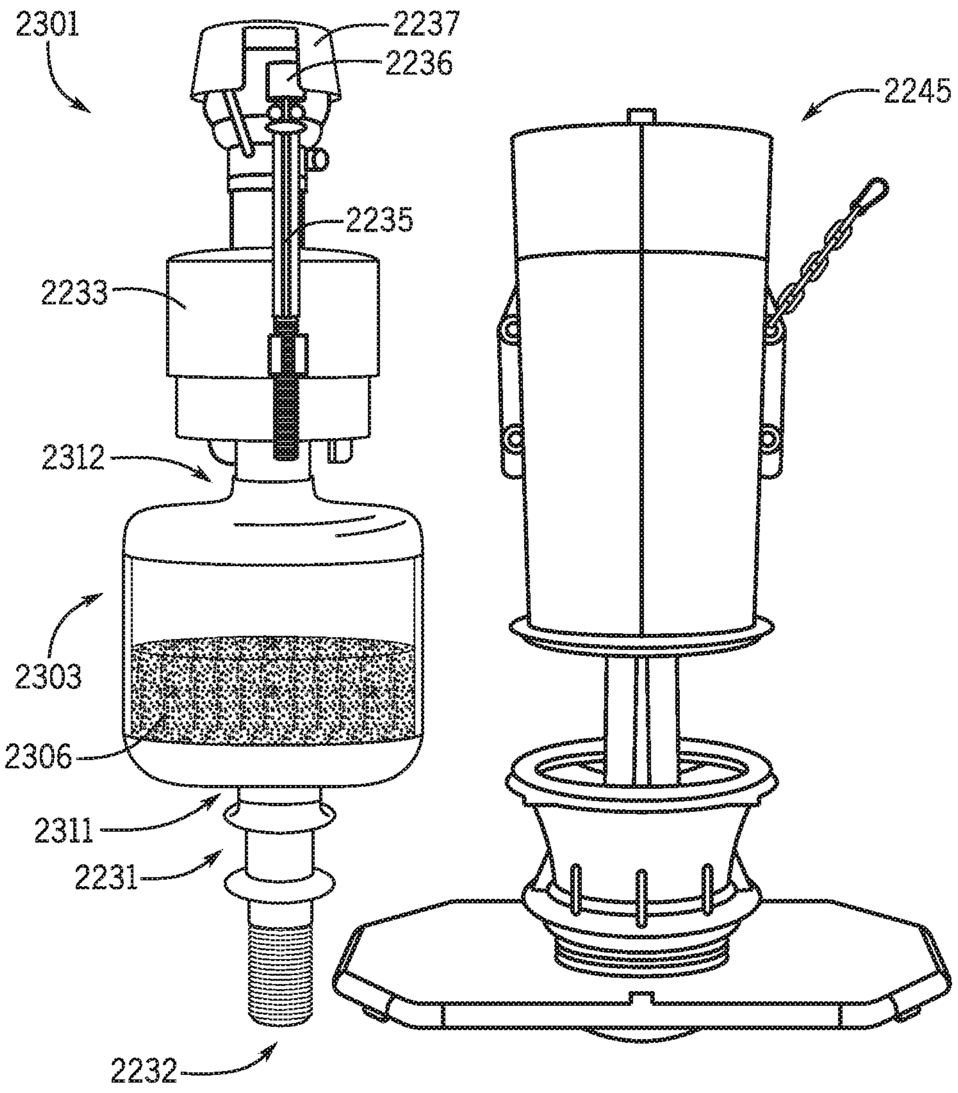
FIG. 42 is a perspective view of another exemplary embodiment of an internal dispensing system.
Figure 43:
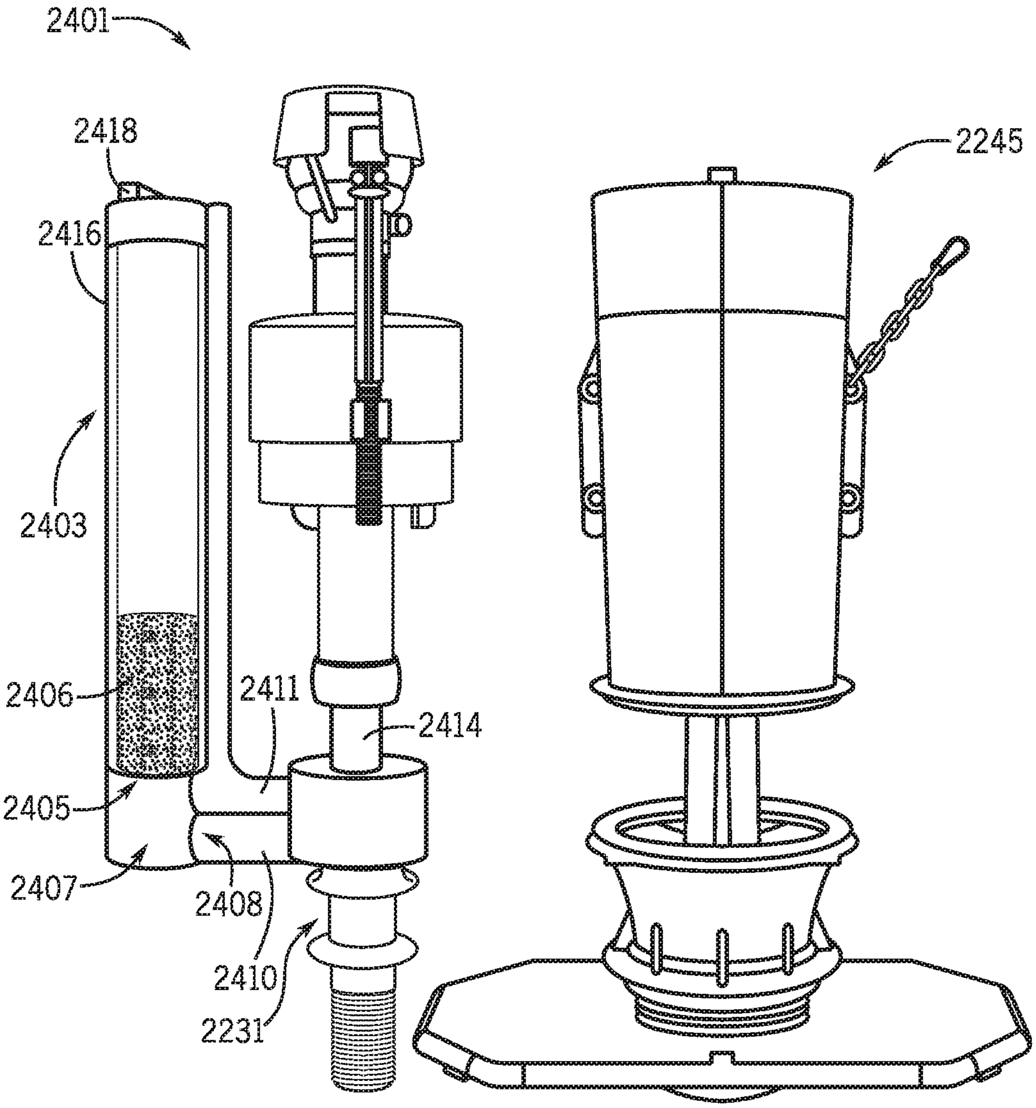
FIG. 43 is a perspective view of another exemplary embodiment of an internal dispensing system.

FIGS. 41-43 illustrate various examples of systems that utilize improved chemistries with fluid delivery system components for use with toilets. As shown, each fluid delivery system includes a fill valve 2230 and a flush valve 2245 (e.g., canister flush valve), where each fill valve is configured to introduce a cleaning compound (e.g., chemistry) into the water being introduced into the system via a fill valve. Each fill valve of FIGS. 41-43 may include any combination of a valve body 2231 having a water inlet 2232, which is configured to receive water from a water supply, a float 2233 (e.g., a float cup) that is configured to control operation of the fill valve based on a water level in the tank, a lock nut 2234 for securing the fill valve to the tank by coupling to a threaded shank of the valve body, a seal for sealing the connection between the valve body and the tank, a linkage 2235 for providing water level adjustment, an arm 2236 for connecting a linkage to a cap 2237, and a fill tube configured to provide water into the tank and/or a flush valve 2245, as well as other suitable elements.

FIG. 41 illustrates an example of a fill valve and integrated dispensing system 2201 configured to introduce a cleaning compound into the water flowing through the valve body 2231 of the fill valve 2230. The dispensing system 2201 is integrated with the valve body 2231 and includes a container 2203 that is coupled to a jacket 2204 of the valve body 2231. The container 2203 is configured to house a volume of compound (e.g., liquid cleaning compound) and may have any suitable shape (e.g., generally cylindrical). The container 2203 is fluidly connected to the valve body 2231 (e.g., a passage therein) through an inlet (e.g., a compound inlet). For example, the jacket 2204 may include an inlet and an outlet that are fluidly connected to the container 2203 to transfer water and compound between the container 2203 to the valve body 2231. For example, water passes from an inlet of the valve body 2231 to container 2203 (e.g., a mixing chamber) through the inlet of the jacket 2204; and water and compound pass from the container 2203 (e.g., the mixing chamber) to an outlet of the valve body 2231 through the outlet of the jacket 2204. The container 2203 may include a casing 2206 that is transparent or translucent to allow a user to visibly detect a level of compound in the container 2203, such as to determine when the container 2203 needs to be refilled with compound.

A cap 2207 of system 2201 is detachably coupled to the container 2203 to provide access to a cavity in the container 2203 when removed and to seal the compound in the container 2203 when coupled thereto. For example, the cap 2207 may include a threaded portion that engages mating threads of the container 2203. Also, for example, the cap 2207 may include flexible snap-elements that can be elastically deformed (when loaded) to allow engagement with receiving features of the container 2203, and then engage the receiving features once the load is removed.

The dispensing system 2201 is configured to dispense the compound into the water supply flowing through the valve body 2231 of the fill valve 2230 to form a mixture of cleaning compound and water that can clean the components of the toilet (e.g., the tank, the bowl, etc.) as the water passes through the components. For the embodiments involving fill valves (or other suitable dispensing systems), the chemicals/cleaning compounds can be in solid form and/or in liquid form. For example, the solid form chemicals may be in beads (e.g., phosphate beads), pellets, or any other suitable configuration. For the liquid chemicals, a metering device, such as a venturi, a metering pump, a timed pump, etc., can be used to dispense a measured amount (e.g., proportion) of chemical, such as to ensure a desired concentration after dilution.

FIG. 42 illustrates another example of a fill valve and integrated dispensing system 2301 configured to introduce a compound into the water flowing through a valve body 2231 of the fill valve. The dispensing system 2301 is integrated with the valve body 2231 and is provided in-line with the valve body 2231. The dispensing system 2301 includes a container 2303 for storing a volume of cleaning compound 2306, where the container 2303 is provided in-line with the valve body 2231. The container 2303 includes an inlet 2311 that is fluidly connected to an outlet of an inlet portion (e.g., pipe) of the valve body 2231, which receives a supply of water from a water source. The container 2303 includes an outlet 2312 that is fluidly connected to an inlet of an outlet portion of the valve body 2231. As water flows through the container 2303, the cleaning compound mixes with the water, then the mixture of compound and water flow from the container 2303 to the outlet portion of the valve body 2231.

FIG. 43 illustrates another example of a fill valve and integrated dispensing system 2401 configured to introduce a cleaning compound into the water flowing through a valve body 2231 of the fill valve. The dispensing system 2401 is integrated with the valve body 2231 and includes a container 2403 that is configured to house a volume of compound 2406 (e.g., liquid cleaning compound) and has a generally elongated cylindrical shape. The container 2403 of the system 2401 is fluidly connected to a first inlet 2405 of a mixing chamber 2407 of a mixing valve to transfer cleaning compound to the mixing chamber. A second inlet 2408 of the mixing chamber 2407 is fluidly connected to the valve body 2231 via an inlet tube 2410 (e.g., pipe) that transfers water supplied into the inlet of the valve body 2231 into the mixing chamber 2407. The cleaning compound and the water mix in the mixing chamber 2407. An outlet tube 2411 fluidly connects an outlet of the mixing chamber 2407 and an outlet 2414 of the valve body 2231 to supply a mixture of water and compound to the fluid delivery system. The first inlet is positioned at a bottom end of the container 2403 in order to utilize gravity and head pressure in transferring the compound into the mixing chamber 2407. Alternatively, a pump or other device may be used to aid in transferring liquid compound to the mixing chamber 2407. The container 2403 may include a casing 2416 that is transparent or translucent to allow a user to visibly detect a level of compound 2406 in the container 2403, such as to determine when the container 2403 needs to be refilled with compound 2406. A cap 2418 is detachably coupled to the container 2403 to provide access to a cavity in the container 2403 when removed and to seal the compound in the container 2403 when coupled thereto.

Figure 45:
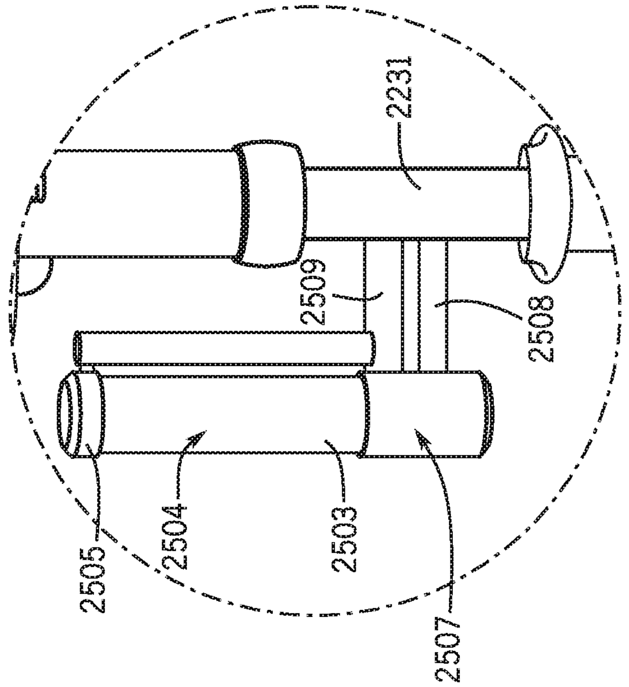
FIG. 45 is a detailed view of the internal dispensing system shown in FIG. 44.
Figure 44:
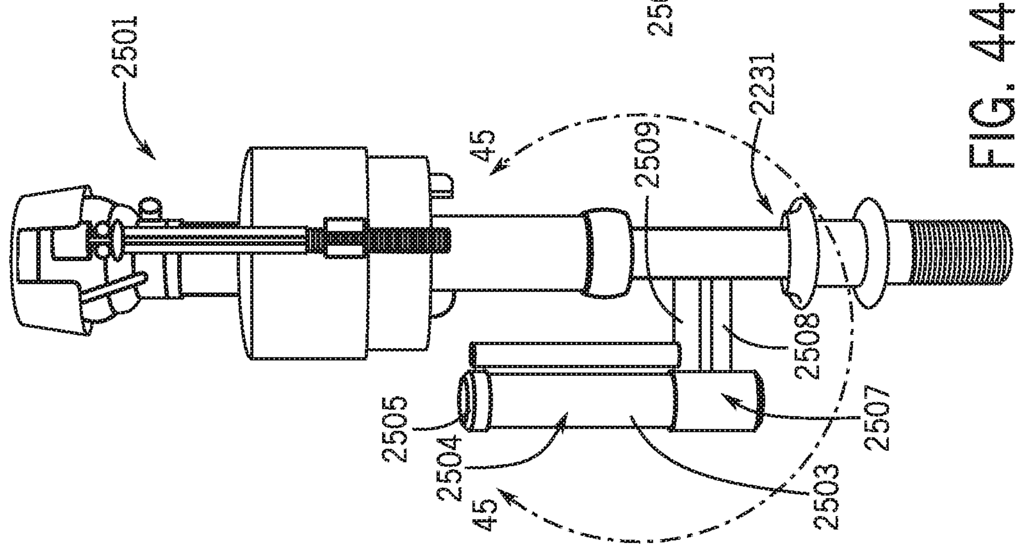
FIG. 44 is a front view of another exemplary embodiment of an internal dispensing system.

FIGS. 44 and 45 illustrate another example of a fill valve and integrated dispensing system 2501 that is configured to introduce a cleaning compound into the water flowing through a valve body 2231 of the fill valve. The system 2501 is configured to have the same basic construction as the system 2401, except the system 2501 utilizes a solid cleaning compound instead of a liquid cleaning compound. The solid compound may be in the form of units (e.g., wafers, pellets, etc.) that are loaded into a cavity 2504 in the container 2503, such as through an opening accessed when the cap 2505 is removed. Gravity may help feed a single unit of cleaning compound into the mixing chamber 2507 of the system, where the solid compound dissolves in the water introduced into the mixing chamber via the inlet tube 2508 and a mixture of water and compound exits the mixing chamber through the outlet tube 2509.

Figure 46:
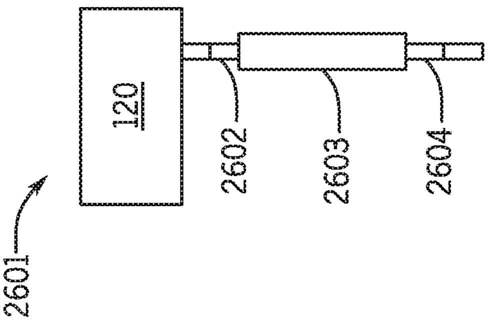
FIG. 46 is a schematic view of another exemplary embodiment of an internal dispensing system.

FIG. 46 illustrates another example of a compound dispensing system 2601 integrated with a fluid delivery system of a toilet using a schematic. The system 2601 is provided in-line between the inlet connection 2602 into the tank 120 (e.g., into the fill valve) and the water supply 2604. Thus, the system 2601 while integrated with the fluid delivery system of the toilet is provided external to the tank 120 of the toilet. The system 2601 may include a container 2603 that is configured to house a volume of cleaning compound, such as any container disclosed elsewhere in this application, and may include a mixing chamber for mixing the compound and water together. The mixture of water and cleaning compound is then introduced into the fill valve in the tank 120. The system 2601 may be configured to utilize a solid compound or a liquid compound. As another example, the system 2601 may include a peristaltic pump to introduce the chemical (e.g., a mixture of water and cleaning compound) into the system 2601, such as the fill valve.

Figure 48:
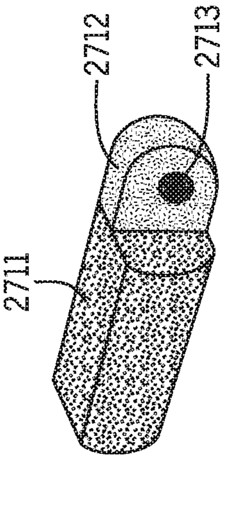
FIG. 48 is a perspective view of a removable container for use with internal dispensing systems, such as the system shown in FIG. 47.
Figure 47:
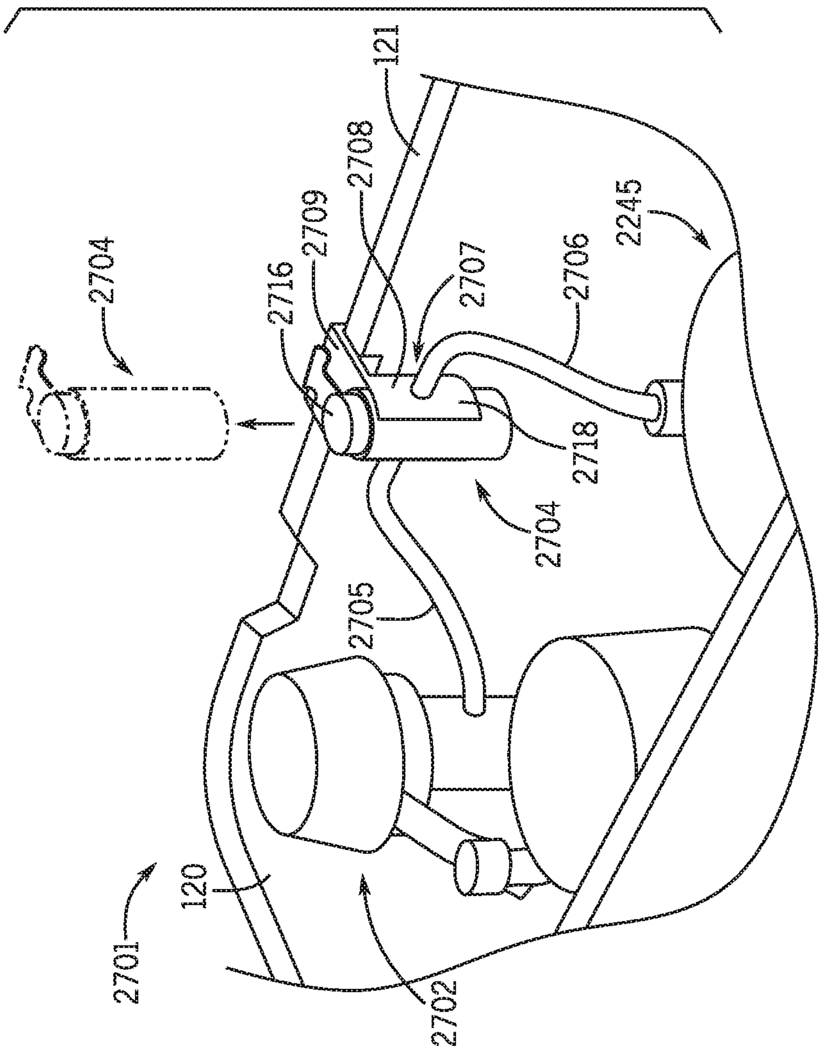
FIG. 47 is a perspective view of another exemplary embodiment of an internal dispensing system having a removable container.

FIGS. 47 and 48 illustrate another example of a compound dispensing system 2701 integrated with a fluid delivery system of a toilet. The system 2701 is configured to be provided in series between the fill valve 2702 and the flush valve 2245. The system 2701 includes a container 2704 configured to house a cleaning compound, an inlet tube 2705 for supplying water into the container 2704, an outlet tube 2706 for transferring a mixture of water and compound, and a retainer 2707 configured to retain the container 2704 in place in the tank 120. The retainer 2707 includes a first retaining element 2708 for retaining the container 2704 and a second retaining element 2709 for securing the retainer 2707 to another element, such as the tank 120, the lid, the bowl, or other objects other than the toilet. The first retaining element 2708 may have a semi-cylindrical shape to retain a generally cylindrical container. However, the shape of the first retaining element 2708 may be configured differently (e.g., U-shape, C-shape, etc.), which may or may not complement the shape of the container. For example, the first retaining element 2708 may include a base member and two spaced apart legs that extend away from the base. Each leg may be configured to receive one of the inlet and outlet tubes, such as in an opening in the leg. As shown, the second retaining element 2709 includes a base that extends from the first retaining member 2708 and a pair of spaced apart legs that extend downwardly from the base to form a channel that is configured to be coupled to the end of a wall 121 of the tank 120 (e.g., the rear wall).

The container 2704 of the system 2701 is configured to be detachably coupled to the retainer 2707 to fluidly connect the container 2704 to the inlet and outlet tubes 2705, 2706. The container 2704 may hold a liquid or solid cleaning compound and may include a mixing chamber for mixing the compound with water introduced through the inlet tube. For example, the container 2704 may include a first compound 2711 that is a detergent, a second compound 2712 that is an anti-scaling agent, and a third compound 2713 that is a dye, as shown in FIG. 49. The container 2704 may be configured having a greater or fewer number of compounds than the example shown in FIG. 49. The detergent compound may be configured to sanitize the toilet surfaces that come into contact with the mixture of water and compound that is downstream from the system 2701. The anti-scale compound is configured to prevent and/or reduce the buildup of scale on surfaces of the toilet that come into contact with the mixture of water and compound. The dye compound may be configured to act as a visual indicator to alert the user when the compound and/or container 2704 has been or is about to be used up and needs to be replaced. For example, a blue dye may be used, such that when the water in the bowl turns a blue color, the user is alerted to replace the compound and/or container 2704 to ensure continued cleaning of the toilet.

Figure 49A:
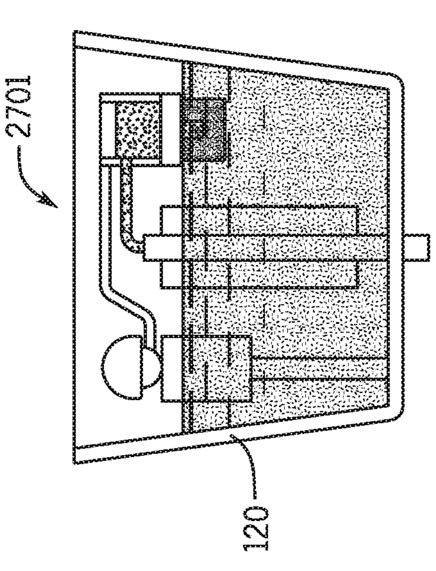
FIG. 49A is a front view showing a step of a flush cycle for an exemplary embodiment of an internal dispensing system.
Figure 49B:
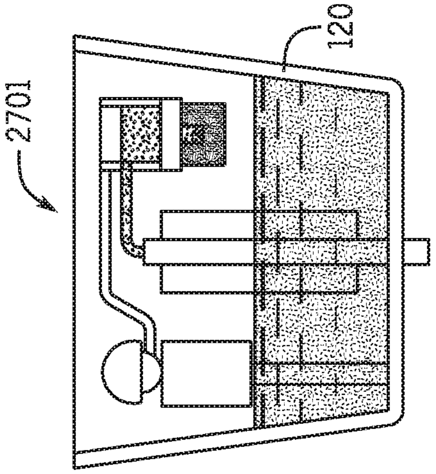
FIG. 49B is a front view showing a step in a flush cycle of an internal dispensing system, such as the system shown in FIG. 49A.
Figure 49C:
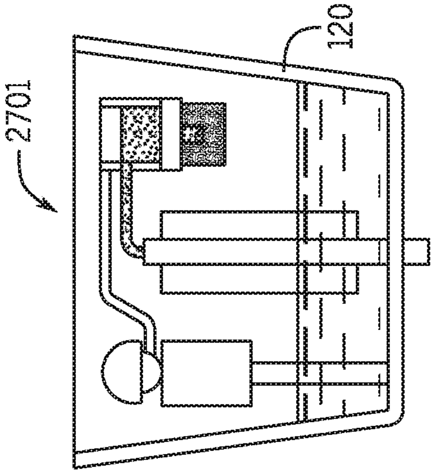
FIG. 49C is a front view showing a step in a flush cycle of an internal dispensing system, such as the system shown in FIG. 49A.
Figure 49D:
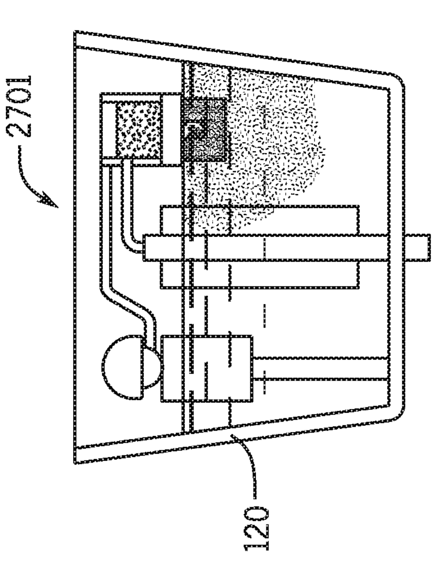
FIG. 49D is a front view showing a step in a flush cycle of an internal dispensing system, such as the system shown in FIG. 49A.
Figure 49E:
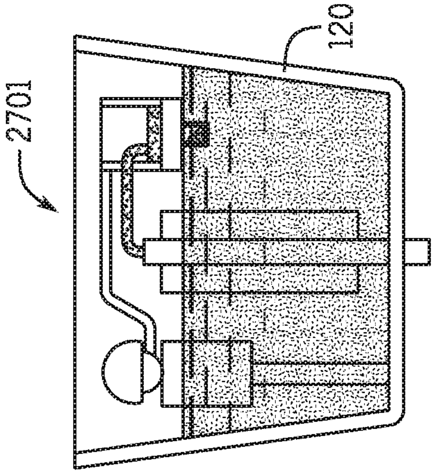
FIG. 49E is a front view showing a step in a flush cycle of an internal dispensing system, such as the system shown in FIG. 49A.
Figure 49F:
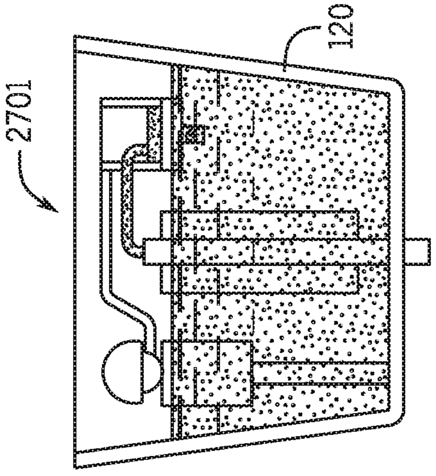
FIG. 49F is a front view showing a step in a flush cycle of an internal dispensing system, such as the system shown in FIG. 49A.

FIGS. 49A-49F illustrates an example of a method for cleaning a toilet utilizing the flush cycle. In the first step shown in FIG. 49A, the tank 120 is filled with a mixture of water and anti-scale compound. In the second step shown in FIG. 49B, when a flush cycle is initiated, the dispensing system 2701 begins dispensing detergent into the flush valve as the water and anti-scale compound is transferred from the tank to the bowl. In the third step shown in FIG. 49C, detergent continues to be dispensed, as water from the fill valve begins to refill the tank 120. In the fourth step shown in FIG. 49D, the dispensation of detergent is ceased and the anti-scale compound is dispensed into the water in the tank 120. In the fifth step shown in FIG. 49E, a mixture of water and anti-scale compound is formed in the tank 120. In FIG. 49F, when the water in the bowl is dyed the requisite color (e.g., blue), then the user is alerted that the compound needs to be replaced.

A cap 2716, as shown in FIG. 47, may be detachably coupled to the container 2704 to allow the container 2704 to be refilled with compound for the refillable examples. The examples where the entire container 2704 is replaced do not need to include caps that are detachably coupled to the container.

The inlet tube 2705 of the system 2701 fluidly connects the fill valve 2702 with the container 2704. As shown in FIG. 47, the inlet tube 2705 includes an inlet that is fluidly connected to an outlet of the fill valve 2702. The inlet tube 2705 includes an outlet that is retained by a leg of the first retaining member 2708 and is fluidly connected to an inlet of the container 2704. Water is transferred from the fill valve 2702 to the container 2704 through the inlet tube 2705.

The outlet tube 2706 of the system 2701 fluidly connects the container 2704 with the flush valve 2245. As shown, the outlet tube 2706 includes an inlet that is retained by a leg 2718 of the first retaining member 2708 and is fluidly connected to an outlet of the container 2704. The outlet tube 2706 includes an outlet that is fluidly connected to an inlet of the flush valve 2245. A mixture of water and cleaning compound is transferred from the container 2704 to the flush valve 2245 through the outlet tube 2706.

Figure 50:
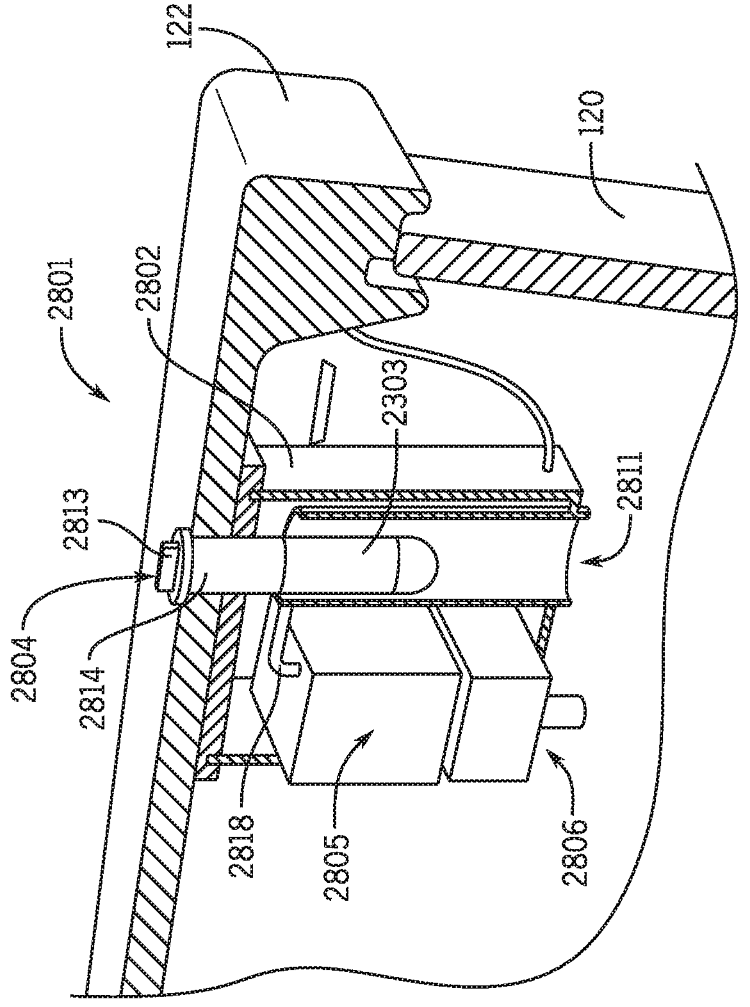
FIG. 50 includes a perspective partial cutaway view of another exemplary embodiment of an internal dispensing system.
Figure 51:
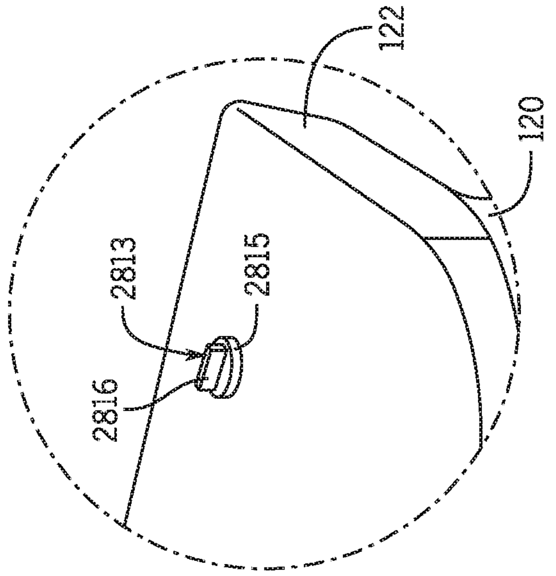
FIG. 51 is a detail view of a portion of the dispensing system shown in FIG. 50.

FIGS. 50 and 51 illustrate another example of an in-fluid dispensing system 2801 configured to introduce a cleaning compound into the water for use in the toilet. The system 2801 includes a housing 2802, a container 2803, a retainer 2804, a mixing chamber 2805, and a dispenser 2806. The container 2803 is configured to house a cleaning compound, such as an anti-scale compound, a detergent compound, and/or a dyeing compound. The housing 2802 of the system 2801 is configured to mount to an element of the toilet, such as to the lid 122 and/or the tank 120. The housing 2802 includes a water inlet 2811 configured to receive a supply of water from another element, such as a fill valve. The housing 2802 is configured to retain or include the mixing chamber 2805.

The retainer 2804 of the system 2801 is configured to retain the container 2803 in place. The retainer 2804 may be configured to mount to the toilet, such as the lid 122 and/or the tank 120. As shown, the retainer 2804 includes a head 2813 and a shank 2814 that extends downwardly from the head 2813. The shank 2814 is configured to extend through an opening in the toilet, such as an opening in the lid 122 to allow the head to be positioned external to the lid and the shank 2814 to extend through the lid 122 into the cavity of the tank 120. The shank 2814 may be generally cylindrical in shape and may include a feature at the distal end (i.e., the end opposite the head) to detachably retain the container 2803. The shank 2814 may include an externally threaded portion that is configured to thread with mating internal threads in the opening of the lid 122 to detachably couple the retainer 2804 to the lid 122. Alternatively, the shank 2814 may have a smooth exterior surface to allow the shank 2814 to be inserted into the opening in the lid 122 (without rotation), and the head 2813 may be used as a stop (against the lid) to limit further axial movement of the retainer 2804 relative to lid 122.

The head 2813 of the retainer 2804 is configured to extend outward from a top surface of the lid 122, such as to allow the head 2813 to be accessible by a user from outside the tank. The head 2813 may include a cylindrical base element, which is configured to rest against the outer surface of the lid when the retainer 2804 is inserted into the opening in the lid 122, and a protrusion 2816 extending upwardly from the base 2815. The protrusion 2816 may be generally rectangular in shape (e.g., an hourglass shape having two opposite concave surfaces) to allow a user to grab the protrusion 2816 to remove the retainer 2804 from the lid 122, such as by lifting or rotating the head 2813 relative to the lid. For example, the protrusion 2816 may allow a user to rotate the retainer 2804 to disengage the threads of the shank 2814 from the threads of the lid. The head 2813 may be configured to include an indicator, such as, for example, the visual/audio indicators discussed elsewhere in this application. The indicator may alert a user to the level of cleaning compound remaining in the container.

The mixing chamber 2805 of the system 2801 may be integrally formed with the housing 2802 or formed separately and then coupled to the housing. Water and cleaning compound are configured to mix in the mixing chamber 2805 before being dispensed. The mixing chamber 2805 includes at least one inlet that receives water therethrough. The mixing chamber may include a second inlet that receives cleaning compound therethrough. However, the mixing chamber may include a single inlet 2818 that receives a water and cleaning compound therethrough, such as for the arrangement where water is passed through the container 2803 to begin mixing with the cleaning compound in the container 2803 then exits the container 2803 into the mixing chamber 2805 where additional mixing takes place.

The dispenser 2806 of the system 2801 is configured to dispense the mixture of cleaning compound and water into another element of the toilet. For example, the dispenser 2806 may dispense a mixture of detergent compound and water into the flush valve. Also, for example, the dispenser 2806 may dispense a mixture of anti-scale compound and water into the tank. A system (e.g., the system 2801) may include more than one dispenser, such as both of the dispensers previously described.

Figure 52:
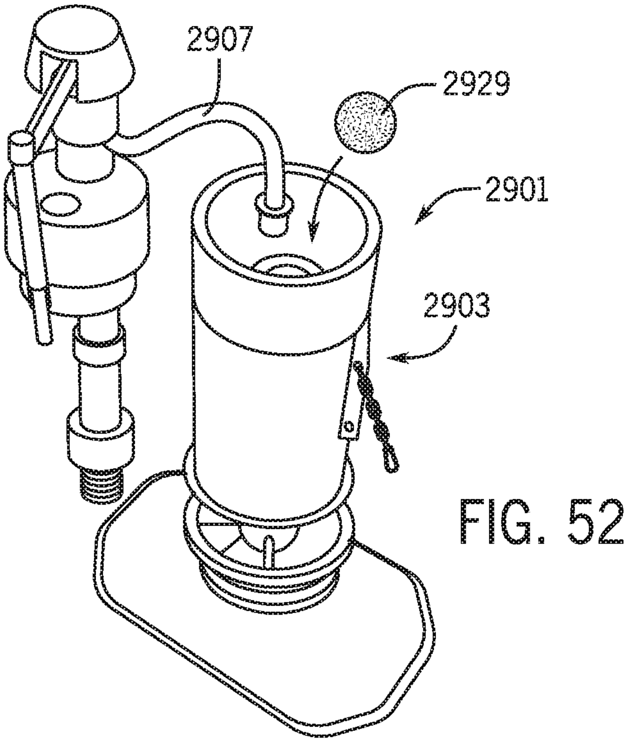
FIG. 52 is a perspective view of another exemplary embodiment of an internal dispensing system outside a tank.
Figure 53:
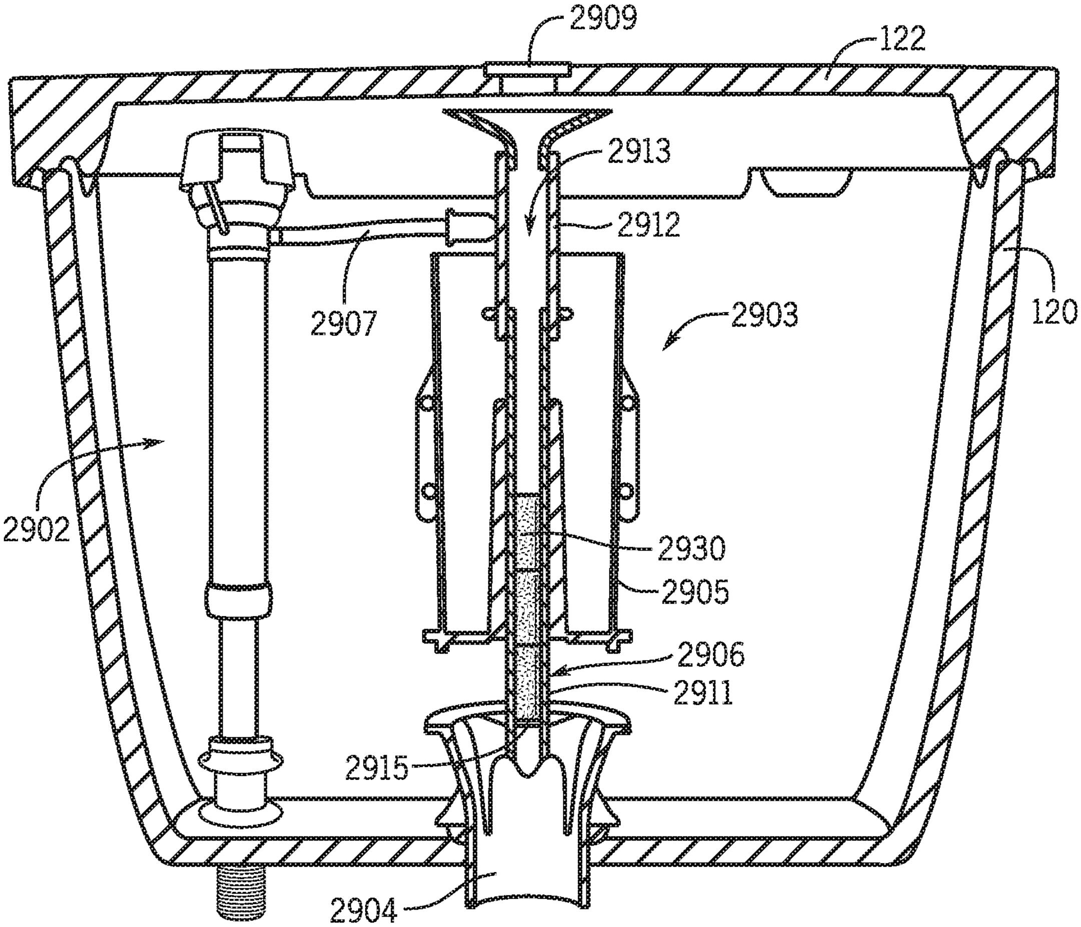
FIG. 53 is a front cross-sectional view of another exemplary embodiment of a dispensing system in a tank.

FIGS. 52-54B illustrate another example of an in-fluid dispensing system 2901, which is integrated with a flush valve 2903 and is configured to introduce a cleaning compound into the water passing from the tank to the bowl. A fill valve 2902 is provided, which may be configured according to any fill valve disclosed herein or conventional fill valves. The flush valve 2903 is configured having a valve body 2904 that mounts to the outlet opening of the tank 120, a buoyant element 2905 (e.g., a float) that controls the volume of water delivered to the bowl from the tank during a flush cycle, and a guide member 2906 that is coupled to the valve body 2904 and guides movement of the buoyant element 2905 when the buoyant element moves relative to the valve body 2904. As shown in FIG. 53, the guide member 2906 includes a hollow body (e.g., a cylindrical body) having a lower end 2911 coupled to the valve body and an upper end 2912 configured to receive water from the fill valve via a fluid conduit 2907. The hollow body of the guide member defines a chamber 2913 (e.g., bore, cavity, etc.) that is configured to receive compound, such as solid pellets (e.g., the ball shaped pellets, the cylindrical shaped pellets 2930) of detergent therein, which is configured to form a cleaning solution/compound when mixed with water flowing through the flush valve 2903.

In place of or in addition to the solid compound in the guide member, solid compound, such as in the form of spheres 2929 (as shown in FIG. 52) may be placed inside the float 2905 of the flush valve and/or in the guide member 2906. The spheres 2929 (of solid compound) may be used to form a cleaning compound when mixed with water flowing through the flush valve. The cleaning compound may be used to sanitize the toilet (e.g., the bowl) and/or prevent (or reduce) the buildup of scale on surfaces of the toilet.

Figure 54A:
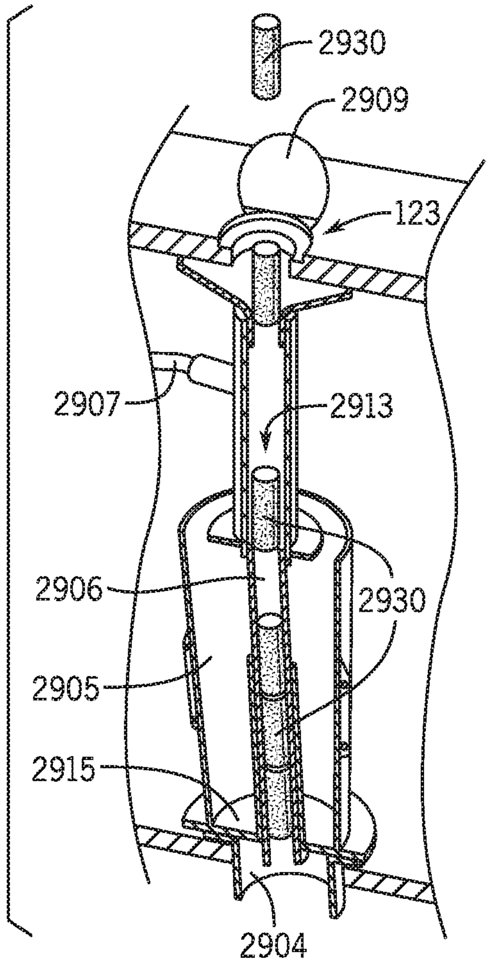
FIG. 54A is a partial cross-sectional perspective view of the internal dispensing system shown in FIG. 53 showing refilling of solid pellets of compound into the system.
Figure 54B:
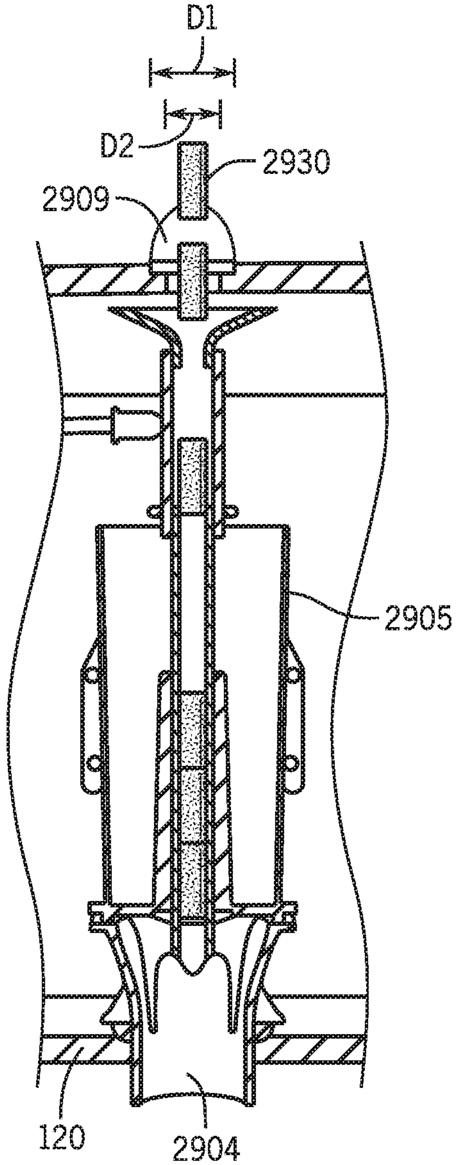
FIG. 54B is a front view of the dispensing system shown in FIG. 54A.

The toilet may be configured to allow replacement of the solid compounds of the system without having to remove the lid 122 from the tank 120 of the toilet. A cover 2909 that is movable between a closed position (as shown in FIG. 53) and an open position (as shown in FIGS. 54A and 54B) relative to the lid 122. In the closed position, the cover 2909 conceals an opening 123 (e.g., aperture, hole, etc.) in the lid 122 that provides access to the chamber 2913 in the flush valve. In the open position, the opening 123 and chamber 2913 are accessible, such as to refill solid pellets of compound into the dispensing system 2901 through the opening 123 into the chamber 2913. As shown, the chamber 2913 of the flush valve is a bore that extends through the guide member 2906 extending between the valve body 2904 and the lid 122. The pellets may be generally cylindrical in shape and configured having a size that complements the bore in the guide member 2906, such as to allow the pellets to be stacked one on top of another within the bore. This arrangement may advantageously expose the bottom most pellet to water, such as to dissolve the compound in the water to form a mixture of cleaning compound and water that can be introduced in the bowl of the toilet during a flush cycle. As the bottom most pellet dissolves, the pellets above the bottom most pellet will lower down the bore eventually exposing the second from the bottom pellet to the water, and so forth.

The cover 2909 may pivot about a hinge or pivot between the closed and open positions. The cover 2909 may be a flat member having a shape that complements the opening/aperture in an upper surface of the lid 122, such that when the cover 2909 is in the closed position, the cover 2909 resides in the bore in the lid 122. As shown best in FIG. 54B, the opening 123 in the lid 122 is configured as a counterbore that includes a first section having a first diameter (labeled D1) and a second portion having a second diameter (labeled D2). The first section is located above the second section and the first diameter is larger than the second diameter. The cover 2909 is configured to have approximately the same size and shape of the first section, such that when in the closed position, the cover 2909 nests in the first portion and an upper surface of the cover 2909 is flush with the upper surface of the lid 122. The cover 2909 may include a feature, such as a handle, for a user to grasp to aid in opening the cover.

The flush valve 2903 may include a feature to limit the axial travel of the solid pellets of compound into the guide member 2906. For example, the valve body 2904 may include a cross member 2915 that extends across the bottom of the guide member 2906 to limit the travel of the pellets in an axial direction (i.e., along a central axis of the bore of the guide member). Also, for example, the guide member 2906 may include the cross member 2915 that extends across the bottom of the bore of the guide member 2906 to limit the travel of the pellets in the axial direction.

Figure 55A:
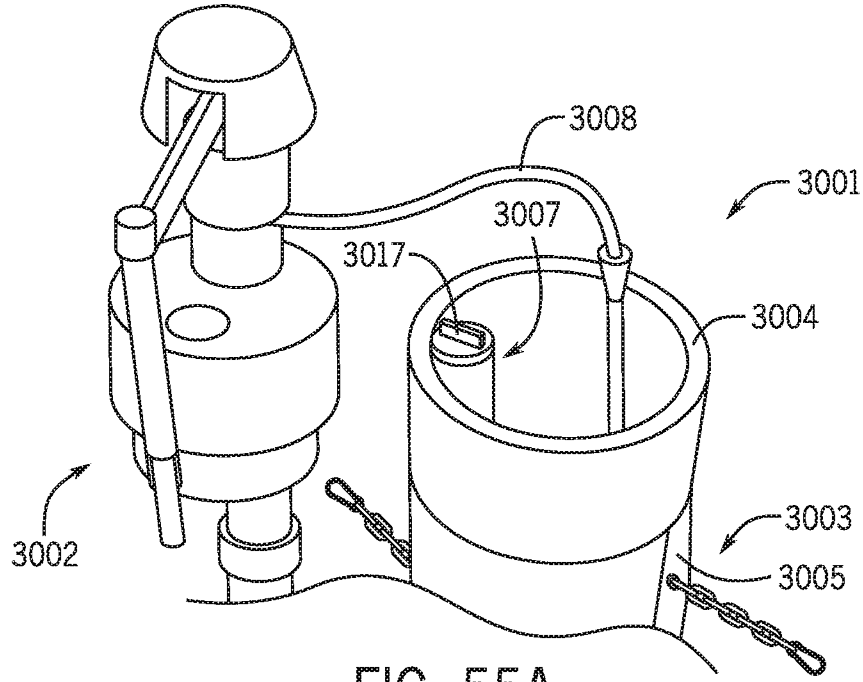
FIG. 55A is a perspective view of another exemplary embodiment of an internal dispensing system.
Figure 55B:
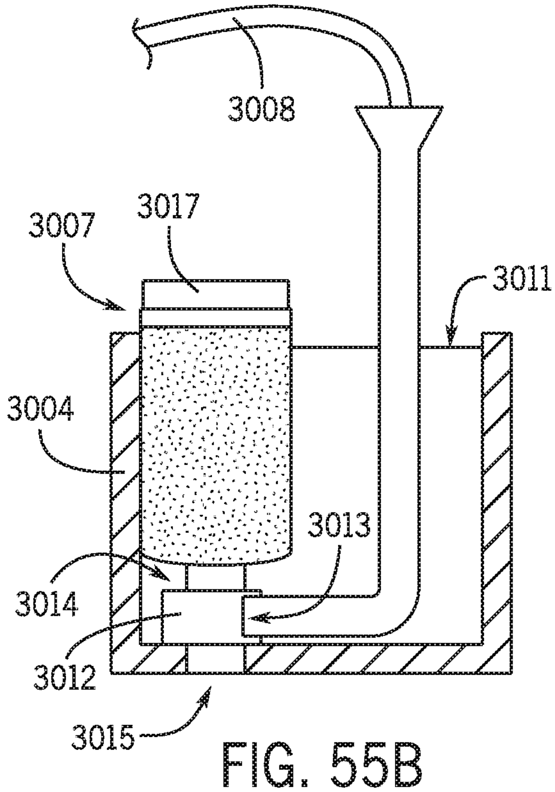
FIG. 55B is a detail view of a portion of the dispensing system shown in FIG. 55A.
Figure 55C:
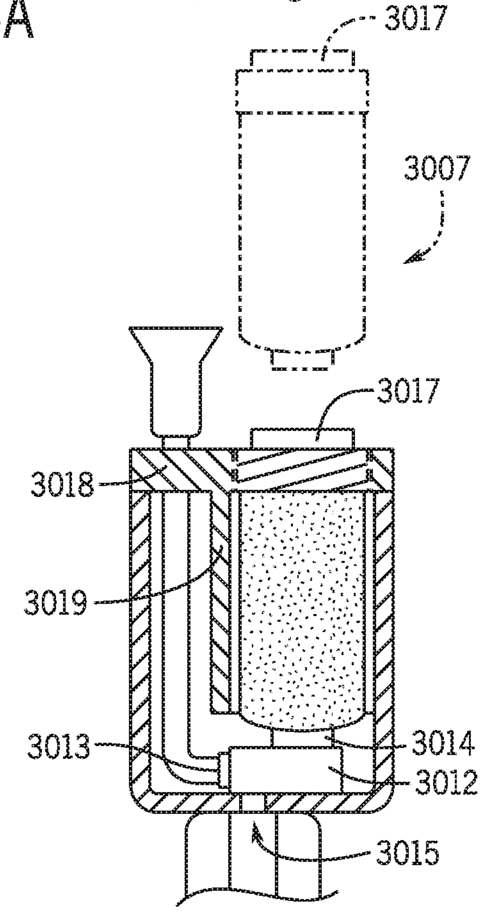
FIG. 55C is a partial cross-sectional view of the dispensing system shown in FIG. 55A.

FIGS. 55A-55C illustrate another exemplary embodiment of a dispensing system 3001 that is integrated with a flush valve 3003 and configured to dispense a compound into the water used during a flush cycle of the toilet. As shown, a cup 3004 is disposed at an upper end of the flush valve 3003 (e.g., a float 3005). The cup 3004 has a generally cylindrical shape having a flat bottom and a cylindrical wall, which extends upwardly from a top surface of the bottom and defines a compartment 3011 and an open top. Provided within the compartment 3011 of the cup 3004 is a container 3007 that holds a cleaning compound. Also provided within the cup is an inlet line 3008 that receives a supply of water, such as from the fill valve 3002. Also provided within the compartment of the cup is a mixing chamber 3012 in which the cleaning compound and the water are mixed. A first inlet 313 is configured to introduce water from the inlet line 3008 into the mixing chamber 3012; and a second inlet 3014 is configured to introduce cleaning compound from the container 3007 into the mixing chamber 3012 as shown in FIGS. 55B and 55C. An outlet 3015 may transfer the mixture of water and cleaning compound from the mixing chamber 3012 to another element of the toilet, such as the bowl through the flush valve 3003.

Also shown in FIG. 55C, the container 3007 is detachably coupled to the cup 3004. Thus, the container 3007 can be removed, such as to refill the compound within the container 3007 or replace the container all together. The container 3007 may be configured similar to, different from, or the same as any other container described in this application. The container 3007 may include a cap 3017 that is detachably coupled to a base, such as through a threaded engagement, snap-engagement, or other suitable element, to provide access to a cavity within the container 3007 that is configured to house the compound. Also shown in FIG. 55C, the cup 3004 may optionally include an upper wall 3018 and an internal wall 3019 to support the container 3007 and/or the inlet line 3008.

The dispensing (e.g., delivery) systems may be configured to be powered by electric power. Thus, a power source (e.g., power supply) may be included to provide electric power to the system. The power source may be an external (i.e., provided outside the system) or internal (i.e., provided within the system) power source.

FIGS. 56A-56D illustrates another exemplary embodiment of an integrated flush valve and dispensing system 3051 that is configured to dispense a cleaning compound into the water used during a flush cycle of the toilet. As shown, the system 3051 includes a valve body 3052, a guide member 3053 coupled to the valve body 3052, a float 3054 (e.g., float member) movably coupled to the guide member 3053, and a dispenser 3055. The valve body 3052 includes an outer seat 3061 that is configured to be disposed in an opening of the toilet and contact a mating seating surface to seal the valve body 3052 and the toilet. The valve body 3052 also includes a top seat 3062 that is configured to seat against a bottom seat of the float 3054 to seal the valve when in the closed position. The valve body 3052 includes an inner chamber 3063 through which fluid passes when a flush cycle is activated. For example, the fluid may pass from the tank to the bowl through the inner chamber 3063.

The guide member 3053 includes an elongated inner hollow body (e.g., a generally cylindrical body) that extends between a first end 3071 and a second end 3072. The first end 3071 of the body of the guide member 3053 is coupled to the valve body 3052, such that the guide member 3053 and the valve body 3052 remain stationary when the float 3054 moves. The first end 3071 may be directly coupled to the valve body 3052 or indirectly coupled through the dispenser, which may be directly coupled to an inner member of the valve body 3052. The second end 3072 of the guide member 3053 may be configured to support a supply ring 3057, if provided. The second end 3072 may also include a stop member that is configured to limit a travel of the float 3054 relative to the guide member 3053. The stop member may include a bottom surface 3073 that extends outwardly from the body (e.g., generally in a radial direction, which may be at an oblique angle relative to a longitudinal axis of the body).

The float 3054 is configured as a buoyant element that moves during a flush cycle. For example, when a flush cycle is activated, the float 3054 may be moved upward (relative to the valve body and guide member) to an open valve position to allow fluid (e.g., water) to pass between a bottom seat 3081 of the float 3054 and the top seat 3062 of the valve body 3052 into the inner chamber. The float 3054 is configured to move to a closed position, in which the bottom seat 3081 of the float 3054 contacts the top seat of the valve body 3052, due to gravity and the water level based on the buoyancy of the float. The float 3054 may include a stop 3082 that contacts the stop member (e.g., the bottom surface 3073) of the guide member 3052 to limit a travel (e.g., movement, upward linear displacement) of the float 3054.

The dispenser 3055 is located in the inner chamber of the valve body 3052 and is configured to dispense a cleaning compound into the water passing to the toilet (e.g., bowl) through the valve body 3052. The dispenser 3055 may be coupled to the first end 3071 of the hollow body of the guide member 3053, such that water directed into the second end 3072 of the guide member 3053 flows down a bore 3075 to the first end 3071. As shown best in FIG. 56D, the dispenser 3055 includes a mounting member 3091, a normal member 3092, a neck 3093, and a head 3094. The mounting member 3091 is generally annular (e.g., semi-annular, annular, etc.) and is configured to seat between two inner walls of the valve body to couple the dispenser to the valve body. The mounting member 3091 may also extend around the sides of the first end of the guide member 3053. The normal member 3092 extends transversely to the longitudinal axis (e.g., of the elongated hollow body, of the neck 3092) across an opening in the first end 3071 of the guide member 3053 to seal off the flow of fluid. The normal member 3092 includes an inlet opening to a fluid passage 3096 through which water may flow. The neck 3093 extends downwardly from the normal member 3092 in a direction parallel to the longitudinal axis. The head 3094 is disposed on a distal end of the neck 3093, which is opposite from the end that is connected to the normal member 3092. The fluid passage 3096 fluidly couples the inlet opening with the head 3094 (e.g., one or more nozzles 3095 of the head). According to one example, the normal member 3092 may be configured as the body of the dispenser (e.g., see FIG. 74), which is discussed in greater detail below, such as to atomize the cleaning compound dispensed. The dispenser 3055 may be configured based on other examples described in this application.

The system 3051 is configured to utilize a cleaning compound. For example, solid pellets of compound may be placed into the bore 3075 of the guide member 3053, such that water passing through the bore dissolves the compound to form a liquid cleaning compound, which is then dispensed via the dispenser. Also for example, the dispenser 3055 may be configured to dispense $H_2O_2$ from water received through the inlet opening. Thus, the dispenser 3055 may include a generator (e.g., a $H_2O_2$ generator).

Figures 56A, 56B, 56C, 56D:
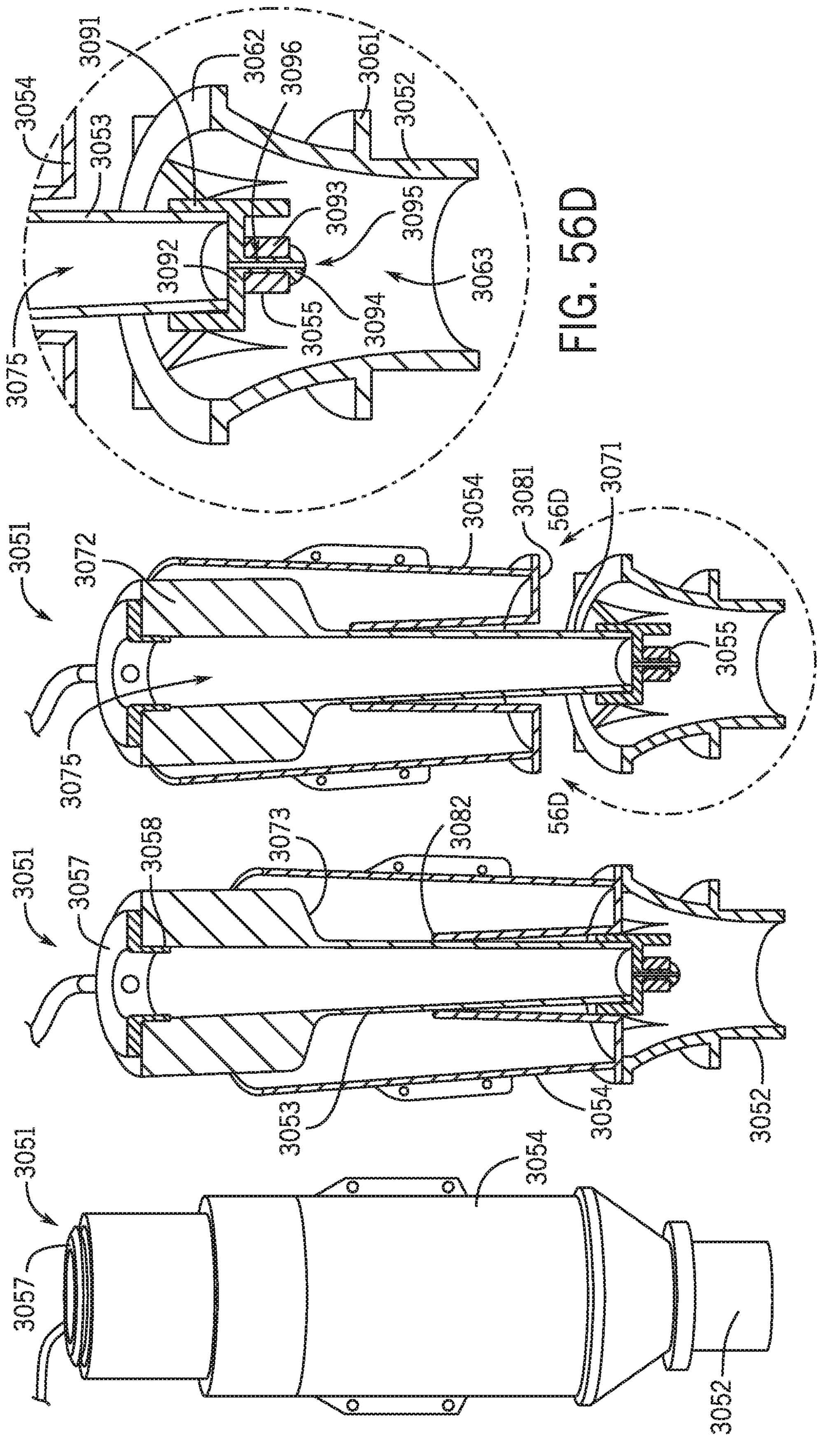
FIG. 56A is a perspective view of an exemplary embodiment of a flush valve including a dispensing system.
FIG. 56B is a cross-sectional view of the dispensing system shown in FIG. 56A.
FIG. 56C is another cross-sectional view of the dispensing system shown in FIG. 56A.
FIG. 56D is a detail view of the dispensing system shown in FIG. 56C.

The supply ring 3057 may be provided to help direct the water into the bore 3075 of the guide member 3053. As shown in FIG. 56B, the supply ring 3057 is an annular member that includes an inlet configured to receive a supply of water and at least one outlet that directs water into the bore 3075 of the guide member 3053. Several outlets may be provided around a central opening of the supply ring. The supply ring 3057 may include a projection 3058 that defines the central opening and extends down into the bore 3075 to couple the supply ring 3057 and the guide member 3053 together.

An inlet line may be connected to the inlet of the supply ring 3057 at one end to introduce the water supply to the supply ring 3057. The inlet line may be connected at the other end to a water supply, such as a fill valve (e.g., the fill valve 2902).

Figure 58:
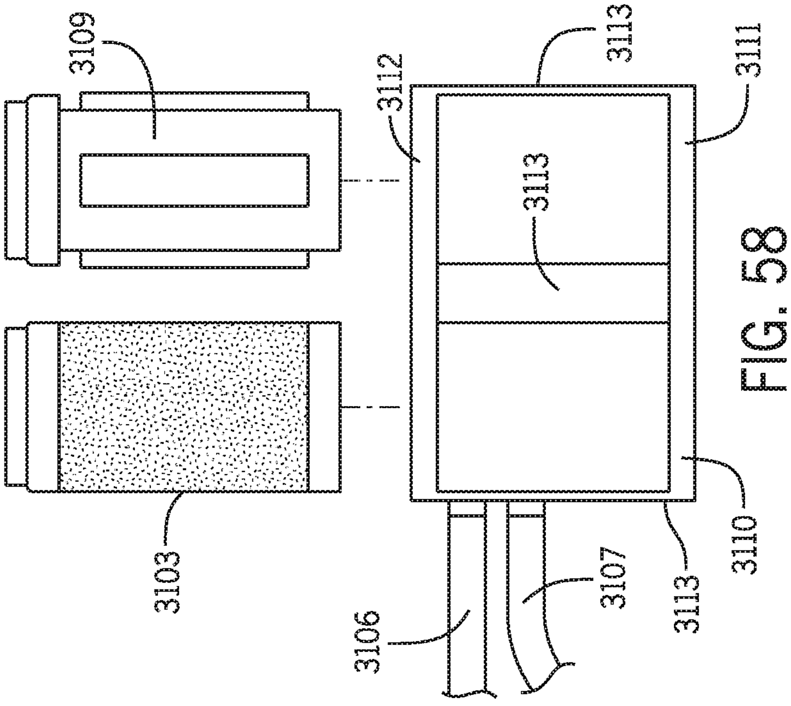
FIG. 58 is a partially exploded front view of a portion of the system shown in FIG. 57.
Figure 57:
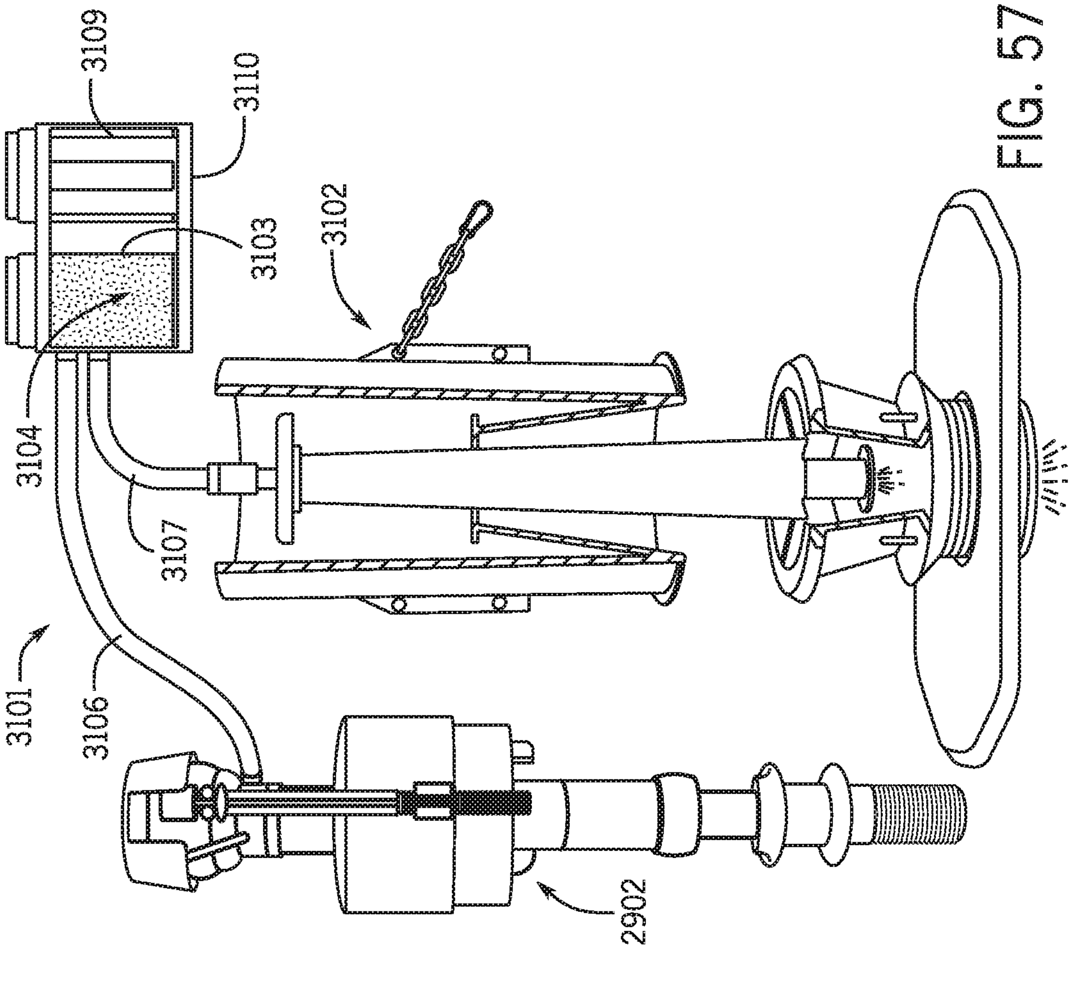
FIG. 57 is a front perspective view of another exemplary embodiment of an internal dispensing system.

FIGS. 57 and 58 illustrate an exemplary embodiment of a dispensing system 3101 having an internal power source 3109. Although, the system 3101 is shown in FIG. 57 to include a fill valve 2902 fluidly connected to a container 3103, which houses a compound 3104, via an inlet line 3106 and a flush valve 3102 fluidly connected to the container via an outlet line 3107, the power source 3109 may be integrated with any other system described in this application. The system 3101 includes a housing 3110 that is configured to retain (e.g., support, house, etc.) the container 3103 and the power source 3109. As shown in FIG. 58, the housing includes a bottom member 3111, a top member 3112 spaced apart (e.g., offset vertically) from the bottom member, and at least one side member 3113 that extends between the top and bottom members. The top member 3112 may include a first opening that is configured to receive the container 3103 therethrough and a second opening that is configured to receive the power source 3109 therethrough. The inner surfaces of the top member 3112 defining the first and second openings may be configured to support the container 3103 and the power source 3109, respectively, to maintain the position of each relative to the housing 3110. Also shown, the inlet and outlet lines 3106, 3107 are connected to the side member 3113, which includes an opening associated with each line to allow fluid to communicate between the line and the container 3103.

The power source 3109 may be configured, for example, as one or more batteries that are electrically connected to one or more elements of the system to provide electric power thereto. The second opening in the top member 3112 may be configured to allow the one or more batteries to be removed from the housing 3110, such as to recharge or replace the batteries with new ones. The housing 3110 may be configured to be mounted inside the tank 120 at an elevation (e.g., height) that is above the water level in the tank to avoid exposure of the power source to water. Alternatively, the housing 3110 may be hermetically sealed to prevent the ingress of water into a cavity in the housing 3110 that holds the container 3103 and/or one or more batteries. The hermetically sealed housing 3110 may be located at a height that is below the water level in the tank 120.

It is noted that the systems utilizing a container holding a cleaning compound (e.g., chemistry) may be configured to be replaceable as a unit rather than refillable. For example, the container for one of the systems disclosed herein (e.g., the system 2701) may be configured to be replaced as a unit rather than refilled. Thus, a user would buy a new container and replace the old empty container with the new full container.

The dispensing systems for use with fluid delivery systems may include an indicator that is configured to alert a user as to when a level of cleaning compound in the associated container drops below a minimum threshold level. For example, a visual indicator may be provided on a tank, a lid, or other external feature of the toilet to provide a visual indication (e.g., a light) that the compound in the dispensing system has dropped below the threshold level. The visual indicator may include a light source (e.g., an LED) that is configured to illuminate when the cleaning compound level is below the threshold level. For example, a red colored light source may illuminate to notify the user that the dispensing system needs refilling. Also, for example, the visual indicator may include a red colored light source, which is illuminated when the compound is below the threshold level, and a green colored light source, which is illuminated when the cleaning compound is equal to or above the threshold level. An audio indicator may be used in place of or in combination with a visual indicator to provide an audio indication (e.g., an alarm, buzz, beep, etc.) that the compound in the dispensing system has dropped below the threshold value. An indicator may be advantageous for systems (like the systems 2201, 2301, 2401) that have containers that are not openly visible to a user since the containers are positioned within a tank or other element of the toilet that conceals the container. This way the user is notified that the cleaning compound needs to be refilled without the user having to remove the lid or other element that is concealing the container.

ix. Examples of Toilet Seat Dispensing Systems

The delivery systems (e.g., chemical dispensing systems) utilizing the chemistries discussed in this application may be integrated with toilet seat assemblies to provide improved cleanliness of the toilet. FIGS. 59-66 illustrate exemplary embodiments of dispensing systems that are integrated with toilet seat assemblies. FIG. 31C also shows an example of a dispensing system 1620 integrated with a seat assembly. FIGS. 93-95 also show additional examples of dispensing systems integrated with toilet seat assemblies. A seat assembly includes a seat, which is configured to support the user of the toilet. The seat may be pivotally attached to the toilet, such as a rear platform of a pedestal of the toilet. A seat assembly may also include a seat cover, which may be configured to conceal the seat when positioned in a concealed position. The seat cover may be configured to pivot relative to the toilet and/or the seat between the concealing (e.g., down) position and a non-concealing (e.g., up) position, in which the seat cover no longer covers the seat to allow the user to sit on the seat.

Figure 60:
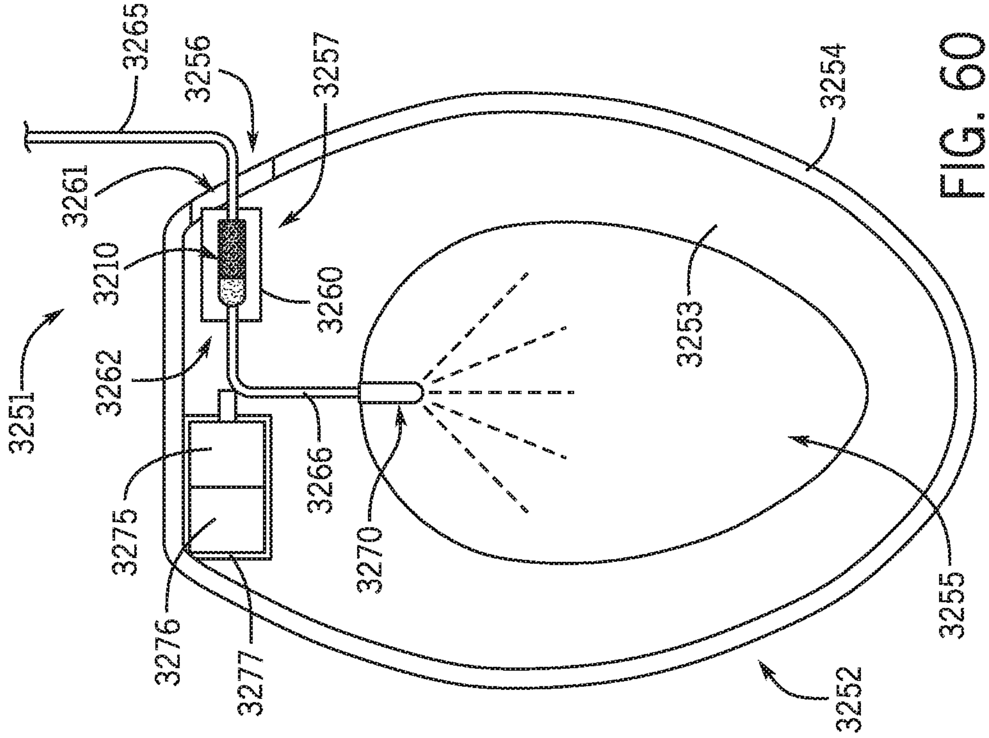
FIG. 60 is a bottom view of another exemplary embodiment of a dispensing system integrated with a toilet seat assembly.
Figure 59:
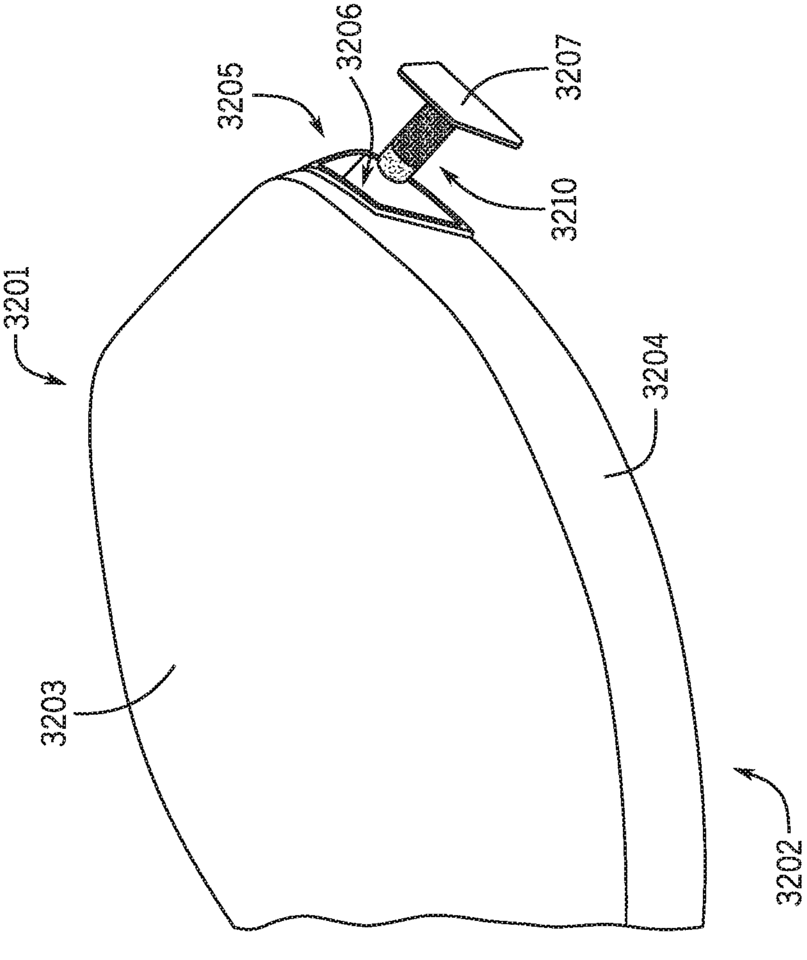
FIG. 59 is a perspective view of an exemplary embodiment of a dispensing system integrated with a toilet seat assembly.

FIGS. 59 and 60 illustrates a dispensing system 3201 that is integrated with a seat cover 3202 of a toilet seat assembly. As shown in FIG. 59, the seat cover 3202 includes an upper member 3203 and a side member 3204 extending downwardly from an outer periphery (e.g., profile) of the upper member 3203. An aperture 3205 is provided in the side member 3204 and opens to a cavity 3206 within the side member 3204 and below the upper member 3203. The cavity 3206 is configured to receive a dispenser having a container 3210 through the aperture 3205, which is discussed in greater detail below. A cover 3207 may be employed to cover the aperture 3205 and conceal the dispenser in the cavity 3206.

FIG. 60 illustrates a dispensing system 3251 that is integrated with a seat 3252 of a toilet seat assembly. The seat 3252 includes an upper member 3253 and a side member 3254 extending downwardly from an outer periphery (e.g., profile) of the upper member 3253. The upper member 3253 includes an opening 3255 (e.g., a central opening). An aperture 3256 is provided in the side member 3254 and opens to a cavity 3257 within the side member 3254 and below the upper member 3253. The cavity 3257 is configured to receive the dispensing system 3251. The seat 3252 can be used alone or with the seat cover 3202 as a seat assembly.

A cap (e.g., the cover 3207) may be provided to conceal the aperture 3256, 3205 in the seat/seat cover and/or retain the container 3210 within the cavity 3257. The cap may be detachably coupled to the seat assembly, such as to the cover 3202. The cap may be removable to allow access to the cavity 3257 in which the container 3210 is disposed, such as to allow the container 3210 to be refilled or replaced when the compound is used up. As shown in FIG. 59, the cap may be coupled to the container 3210, such that the cap and container 3210 are coupled to or decoupled from the seat assembly together.

The dispensing system 3201, 3251 include the container 3210 having at least one cleaning compound. The container 3210 may be configured similar to or the same as other containers disclosed in this application. For example, the container 3210 may be configured the same as the container shown in FIG. 59 (described above). A retaining structure 3260 is provided to retain the container 3210 in place in the cavity 3257 of the seat assembly. The retaining structure 3260 may be integrally formed with a member of the seat assembly (e.g., a seat, a seat cover) or may be formed separately from the seat assembly and coupled to a member of the seat assembly. The retaining structure 3260 may be in the form of a frame that surrounds at least a portion of the container 3210. The frame may include an inlet opening 3261 and an exit opening 3262.

The dispensing system 3201, 3251 may include an inlet line 3265 that is configured to introduce water into the container to mix with a compound (e.g., solid cleaning compound, liquid cleaning compound) contained within the container 3210. The inlet line 3265 may be configured as a tube, pipe, or other element that transfers fluid. Water mixes with compound in a mixing chamber to form a liquid cleaning compound. The dispensing systems 3201, 3251 include a dispenser 3270 configured to dispense the liquid cleaning compound. The dispenser 3270 may be configured to dispense the mixture into the water in the bowl of the toilet or onto one or more surfaces of the toilet (e.g., a rim, a bowl, a seat, etc.). Alternatively, a liquid cleaning compound is contained within the container 3210 of the dispensing system 3201, 3251 and the compound is dispensed without first mixing with water. This arrangement avoids having an inlet line. The liquid cleaning compound may be dispensed into the water in the bowl of the toilet or onto one or more surfaces of the toilet.

The dispensing system 3201, 3251 may optionally include an outlet line 3266 that fluidly connects the mixing chamber with the dispenser 3270. The outlet line 3266 may be configured as a tube, pipe, or other element that transfers fluid. The system including an outlet line 3266 may advantageously allow the dispenser 3270 to be located remotely (e.g., away from) the location that the container 3210 is retained.

The dispensing system 3201, 3251 may include a device (e.g., motor, pump, etc.) that is configured to induce flow of the mixture of water and compound to the dispenser and/or move the dispenser between positions. For example, a motor 3275 may move the dispenser 3270 between an extended position and a retracted position. Also, for example, the motor 3275 may be provided to control the flow of the mixture to the dispenser 3270. The motor 3275 may be contained with the seat assembly, such as within the cavity of the seat, and electrically connected to a power supply. As shown in FIG. 61, the motor 3275 is disposed in a rear portion of the cavity on the opposite side from the retaining structure 3260 and the container 3210. Alternatively, a pump may be used to control the flow of the fluid through the dispenser 3270.

The dispensing system 3201, 3251 may include a power source 3276 configured to supply electric power to an element of the system. For example, the power source 3276 may include a battery that provides electric power to the motor. For example, the battery may be located proximate the motor in the cavity of the seat. A retaining structure 3277 may be provided to retain the motor and/or power source in place relative to the seat. The retaining structure 3277 for the motor and/or power source may be integrally formed with the retaining structure 3260 retaining the container 3210 or may be formed separate from the retaining structure 3260 for the container 3210. Locating the power source 3276 under the seat advantageously conceals its location when the seat is in a down position, while allowing access to replace or recharge the battery when the seat is an up position. By being located proximate to the dispenser 3270, the dispenser 3270 may be configured to dispense cleaning compound onto the underside of the seat, onto the housing storing the battery, or other suitable surface(s) of the system to clean the surface(s).

Figure 61A:
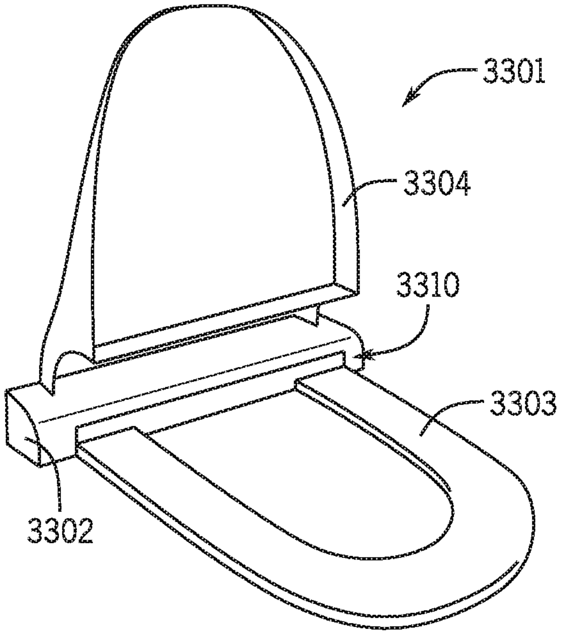
FIG. 61A is a perspective view of another exemplary embodiment of a dispensing system integrated with a toilet seat assembly.
Figure 61B:
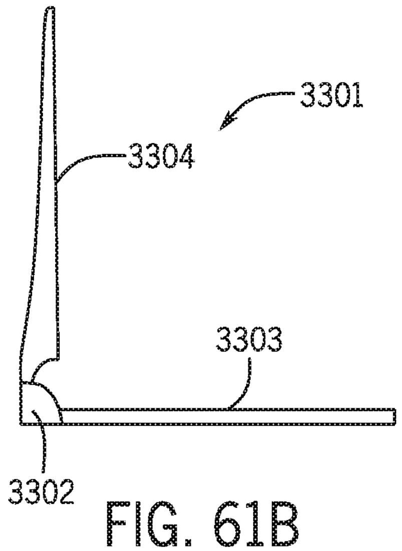
FIG. 61B is a side view of the dispensing system shown in FIG. 61A.

FIGS. 61A and 61B illustrate a dispensing system 3301 that is integrated with a toilet seat assembly. The seat assembly includes a cross-member 3302 and a seat 3303 that is coupled to the cross-member 3302. The seat assembly (or a portion thereof, such as the seat 3303) is configured to move relative to a pedestal from a first (e.g., seating) position, in which the seat overlays a rim of the pedestal, and a second (e.g., non-seating) position, in which the seat no longer overlays the rim. For example, the seat 3303 may be configured to slide (e.g., displace), such as in a fore and aft direction relative to the pedestal between the first and second positions. The cross-member 3302 may be moved, such as by a motor or other suitable moving device, to in-turn move the seat 3303 coupled to the cross-member 3302. According to one embodiment, the cross-member 3302 may be disposed within a cavity in a fixture (e.g., a wall) having an opening. The seat 3303 may extend through the opening and the cross-member 3302 may move within the cavity. Alternatively, the cross-member 3302 may be part of the fixture (e.g., the wall) and remain stationary, while the seat 3303 moves relative to the cross-member 3302 and the fixture. For this arrangement, the cross-member 3302 may include an opening 3310 that receives each end of the seat. The arms of the seat extending between the ends and the front may have a cross-section that is configured to pass within the opening 3310 as the seat moves rearward relative to the cross-member (i.e., toward the cross-member). The seat assembly may also include a seat cover 3304 pivotally coupled to the cross-member 3302, the fixture, or the seat 3303, depending on the arrangement of the assembly.

The dispensing system 3301 includes a dispenser and a container. The container is configured to house a cleaning compound and the dispenser is configured to dispense the cleaning compound. The container and the dispenser may be disposed within the cross-member 3302, such as for the embodiment having a fixed cross-member and a seat 3303 that moves (e.g., slides) relative to the cross-member 3302, or within the fixture, such as for the embodiment having a seat 3303 and cross-member that are movable relative to the fixture.

Figure 62:
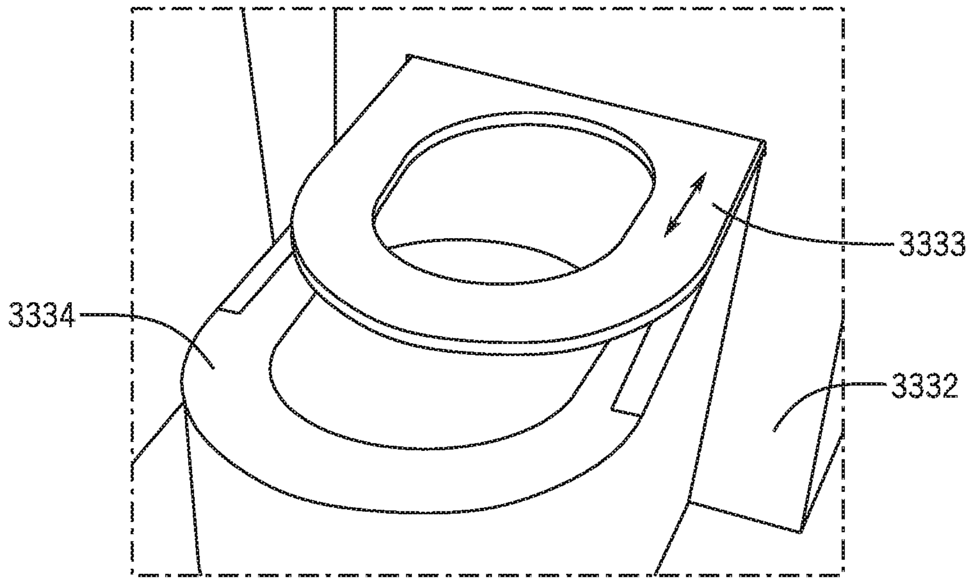
FIG. 62 is a perspective view of a toilet seat and a dispensing system.

FIG. 62 illustrates a seat 3333 that slides into and out of a fixture 3332 relative to a pedestal 3334 that contains a bowl. The system shown in FIG. 62 may include a dispenser and a container, such as discussed above or elsewhere in this application.

Figure 63:
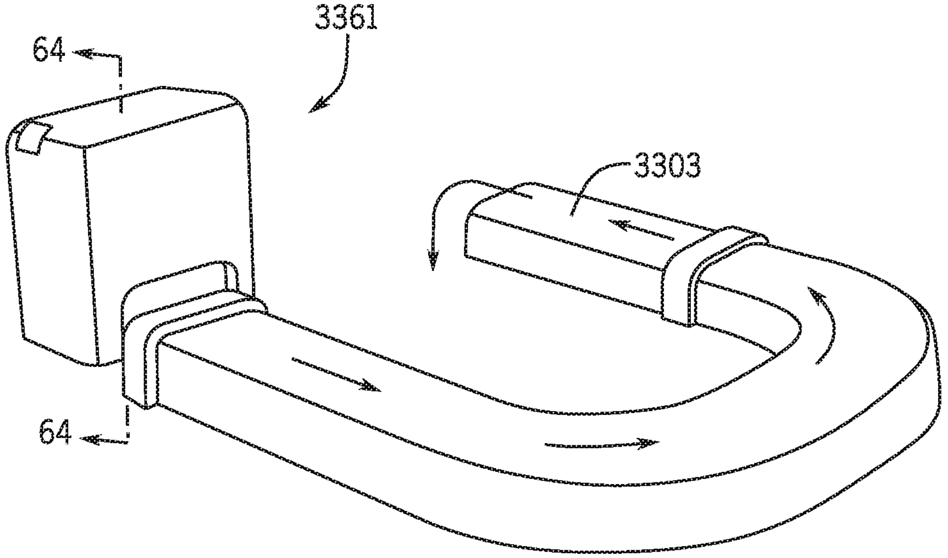
FIG. 63 is a perspective view of a toilet seat and a dispensing system.
Figure 64:
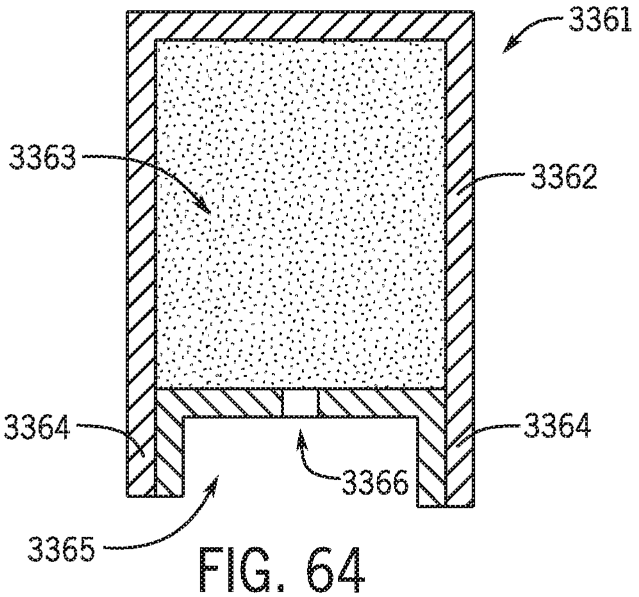
FIG. 64 is a front view of the dispensing system shown in FIG. 63.

As shown in FIGS. 63 and 64, the container 3361 includes a base shell 3362 that forms an internal compartment for housing a compound 3363 therein. The container may include a leg that extends downwardly from the base. As shown in FIG. 64, two opposing legs 3364 extend away from the base 3362 to define an opening 3365 (e.g., recess, channel, etc.), which is configured to receive an end of the seat 3303. The base 3362 may include a bottom having an opening 3366 for the cleaning compound to exit the compartment. The compound may be dispensed onto the seat (e.g., an end or arm), such as via a dispenser. The dispenser may be disposed within the container 3361, such as between the bottom of the base and the channel. Alternatively, a dispenser may be provided in a leg of the container (in which no opening would be provided in the bottom) and the compound is passed through a fluid conduit in the leg to the dispenser. The dispenser may dispense the cleaning compound onto the seat, such as the ends and arms as the seat moves relative to the dispenser. The dispenser may be configured according to any dispenser disclosed in this application.

Figure 65A:
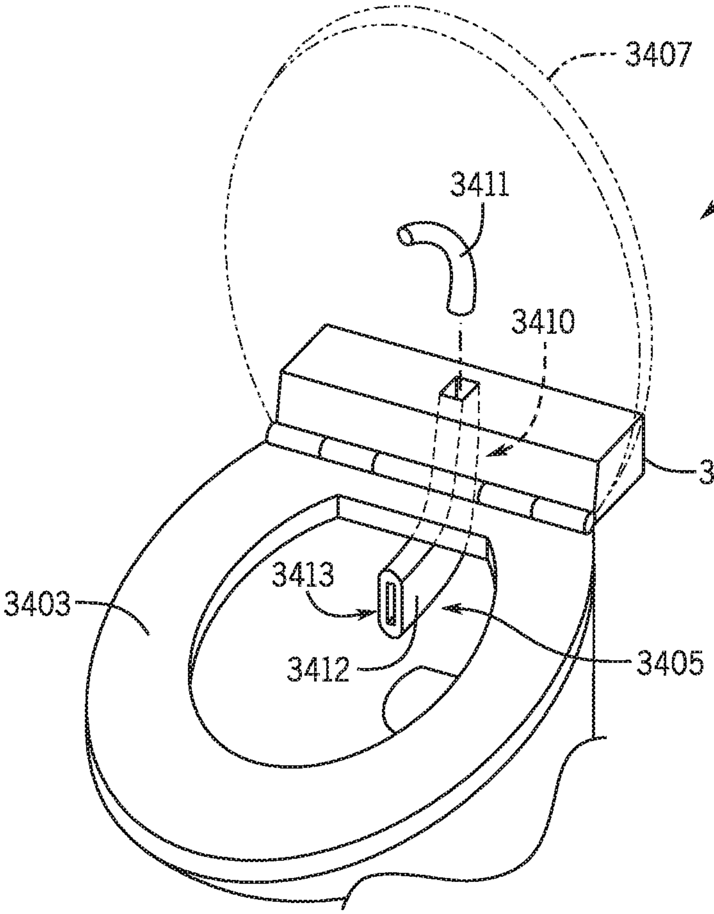
FIG. 65A is a perspective view of another exemplary embodiment of a dispensing system integrated with a toilet seat assembly.
Figure 65B:
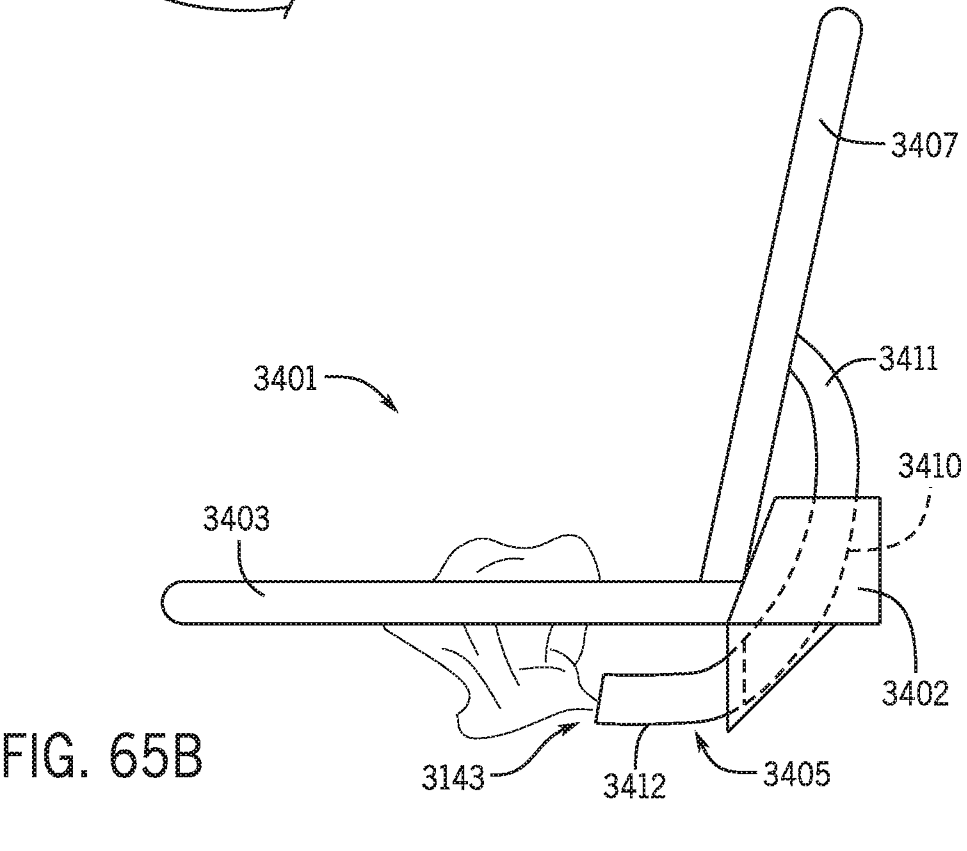
FIG. 65B is a side view of the dispensing system shown in FIG. 65A.
Figure 66:
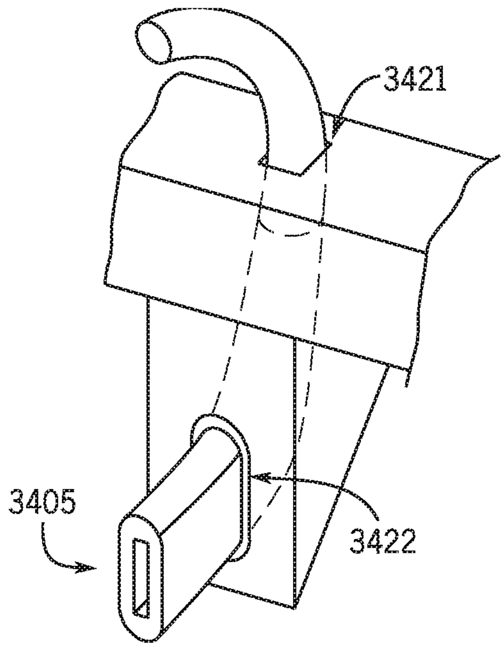
FIG. 66 is a perspective view of a portion of the system shown in FIG. 65A.

FIGS. 65 and 66 illustrate a dispensing system 3401 that is integrated with a toilet seat assembly. The system 3401 includes a dispenser 3405 that is movable (e.g., generally in a fore and aft direction) relative to a base 3402 and a seat 3403 of the assembly, such as between a retracted (e.g., withdrawn) position and an extracted (e.g., extended) position. In the extracted position, the dispenser 3405 extends a farthest distance from the base 3402, such that an end of the dispenser 3405 extends in a forward direction beyond a rear portion of the seat. In the retracted position, the dispenser 3405 extends the shortest distance from the base 3402, such that the end of the dispenser 3405 is rearward of the seat. For example, the end may be located within the base 3402 in the retracted position.

The base 3402 may include a guide 3410 (e.g., track, groove, channel, etc.) that guides movement of the dispenser of the dispensing system 3401. The base 3402 may include a motor or other element that drives movement of the dispenser 3405. As shown, the base 3402 includes a bore that is configured to receive the dispenser 3405 through upper and lower openings. The guide may be located in the bore. The bore may lead to a cavity that houses the motor.

The dispenser 3405 of the system 3401 is shown to include a first (e.g., upper) portion 3411 and a second (e.g., lower) portion 3412. The first portion 3411 includes a first end coupled to the second portion 3412 and a second end opposite the first end. The second portion 3412 includes a first end coupled to the first end of the first portion 3411. The second portion 3412 also includes a second end that includes at least one nozzle 3413 (e.g., orifice, opening, aperture, etc.) through which the compound is dispensed. The dispenser 3405 is fluidly connected to the compound, which may be contained within a container provided in the toilet (e.g., the base of the toilet seat assembly). As shown in FIG. 66, the dispenser 3405 has an arcuate shape, such that the first portion 3411 extends upwardly and forward when the first portion 3411 is in the extended (e.g., extracted) position and is disposed in the base 3402 when in the withdrawn (e.g., retracted) position. The second portion 3412 extends forward through the lower opening in the base when the second portion 3412 is in the extracted position and is disposed in the base 3402 when in the retracted position.

According to one example, the second end of the first portion 3411 of the dispenser 3405 may be configured to rotate a seat cover 3407, such as toward or into the down position, when moved from the retracted position to the extracted position. For example, the second end of the first portion 3411 may be coupled to the seat cover 3407 via a pivot to move the seat cover 3407 up and down depending on extraction/retraction of the dispenser. Also, for example, when the dispenser 3405 moves from the extracted position to the retracted position, the second end of the first portion 3411 may be configured to bear against (e.g., contact) a top surface of the seat cover 3407 when the cover is in the up position. Further such movement of the dispenser 3405 imparts a force into the seat cover that urges movement of the cover 3407 from the up position to the down position.

The dispensing system 3401 may be configured to dispense a cleaning compound from the second end of the second portion 3412 based on the position of the dispenser 3405. For example, the dispenser 3405 may be configured to dispense cleaning compound only when in the extended position.

According to a further example, the dispensing system 3401 includes a disposable dispenser 3405 (e.g., wand), that is inserted into a first opening 3421 (e.g., the upper opening shown in FIG. 66), is moved into an extended position when activated. Once the wand has dispensed the chemical and/or water, the disposable wand is then ejected through a second opening 3422 (e.g., the lower opening shown in FIG. 66) into the bowl to be flushed from the toilet during a flush cycle. Thus, the only handling of the wand is inserting the wand into the system. It is noted that an automatic inserting mechanism could be employed to insert the wand into the first opening of the system.

The dispensing systems described above may include any dispenser described in this application. For example, any dispensing system may be modified to include any one of the dispensers described in the Section x below.

x. Examples of Dispensers

Dispensers may be configured to dispense (e.g., spray, mist, discharge, etc.) a cleaning compound from one or more nozzles (e.g., orifice, opening, aperture, etc.). The dispensers described in this section of the application may be used with any dispensing system described elsewhere in this application. For example, each dispenser provided below may be used with a seat assembly, with other elements of a toilet, with other plumbing fixtures, as standalone cleaning devices or with other suitable devices.

FIGS. 67A-67D illustrate an exemplary embodiment of a multi-part dispenser 150 configured to provide multiple modes of operation. As shown, the dispenser 150 includes a first (e.g., inner) portion 151 and a second (e.g., outer) portion 152. The first and second portions are movable relative to each other and to a fixed element, such as the toilet (e.g., the toilet bowl) to provide multiple modes of operation. For example, the first portion 151 of the dispenser 150 may be slidable relative to the second portion 152 and the toilet between a withdrawn (e.g., retracted) position and an extended (e.g., extracted) position. Also, for example, the second portion 152 may be slidable relative to the first portion 151 and the toilet between a withdrawn position and an extended position. Thus, each of the first and second portions 151, 152 is independently movable relative to the other portion.

As shown, the first portion 151 has a generally cuboidal shape with a generally rectangular cross-section that is configured to nest in a channel 154 in the second portion 152 to allow relative movement between the portions. The second portion 152 includes a base 155 and a pair of spaced apart legs 156 that extend away from the base 155. The legs 156 may extend substantially upward in a parallel manner, such that together, the base 155 and legs 156 define the channel 154 extending downwardly from a top surface of the second portion 152. Thus, the second portion 152 may have a generally U-shaped cross-section or other suitable cross-section (C-shaped, H-shaped, etc.) that provides the channel 154 in which the first portion 151 could nest within. The second portion 152 may include a foot 157 that extends away from a leg 156 to help retain the first portion 151 in the channel 154. For example, each leg 156 may include a foot 157 that extends inwardly toward the opposite leg 156 to retain the first portion 151 in the channel 154. Each foot 157 may extend from an end of the leg 156 toward the other foot 157.

Figure 67A:
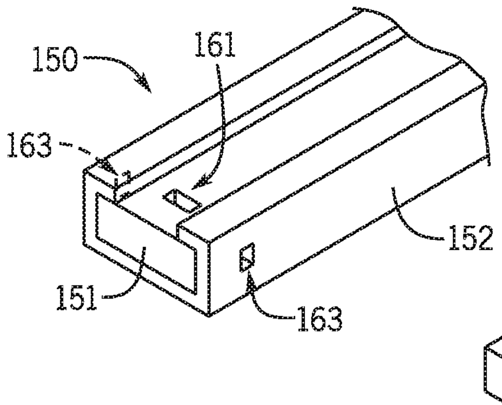
FIG. 67A is a perspective view of an exemplary embodiment of a dispenser for use with a dispensing system.
Figure 67B:
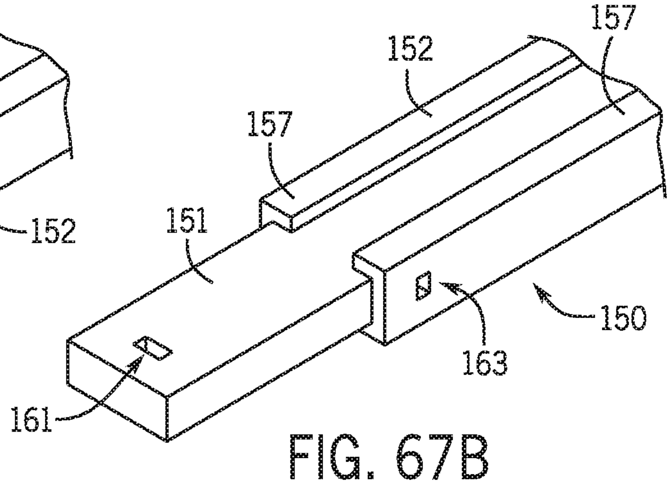
FIG. 67B is another perspective view of the dispenser shown in FIG. 67A.

Each of the first and second portions 151, 152 includes at least one nozzle that is configured to discharge a fluid (e.g., a cleaning compound). As shown in FIGS. 67A and 67B, the first portion 151 includes a nozzle 161 disposed on a top side, which faces through the open top of the channel 154 of the second portion 152. The nozzle 161 may be disposed proximate a distal end of the first portion 151. Also shown, the second portion 152 includes a nozzle 163 disposed on each leg 156 (e.g., in an outer side surface). Each nozzle 163 of the second portion 152 may be disposed proximate a distal end of the second portion.

Figure 67C:
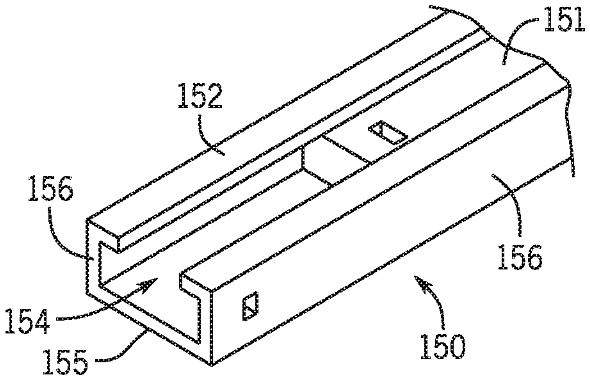
FIG. 67C is another perspective view of the dispenser shown in FIG. 67A.
Figure 67D:
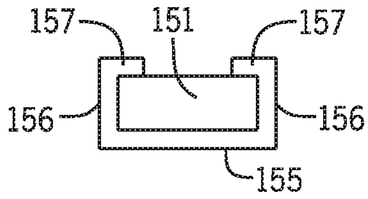
FIG. 67D is a front view of the dispenser shown in FIGS. 67A-67C.

The dispenser 150 may be configured to control the flow of the discharging fluid depending on the relative positions of the first and second portions 151, 152. FIG. 67A illustrates both of the first and second portions in extended positions, which may correspond to a first mode of operation of the dispenser 150. In this configuration, the dispenser 150 is configured to discharge fluid through all of the nozzles 161, 163 (e.g., the single nozzle of the first portion and the two nozzles of the second portion). Thus, the dispenser 150 may be configured to discharge fluid in three different directions when in a first mode of operation. FIG. 67B illustrates the first portion 151 in the extended position and the second portion 152 in the withdrawn position, which may correspond to a second mode of operation. In this configuration, the dispenser 150 is configured to discharge fluid through only the nozzle 161 of the first portion 151. Thus, the dispenser 150 may be configured to discharge fluid in a single direction when in a second mode of operation. FIG. 67C illustrates the second portion 152 in the extended position and the first portion 151 in the withdrawn position, which may correspond to a third mode of operation. In this configuration, the dispenser 150 is configured to discharge fluid through only the two nozzles 163 of the second portion 152. Thus, the dispenser 150 may be configured to discharge fluid in two opposing directions when in a third mode of operation.

The first and second portions 151, 152 may be configured differently and still provide for multiple modes of operation. For example, the first and second portions may be configured having a side by side arrangement where each portion may be moved (e.g., slide) independently to adjust the flow through the dispenser. Additionally, the first portion 151 and/or the second portion 152 may include a greater or fewer number of nozzles, which may be located differently than the examples above.

Figure 68:
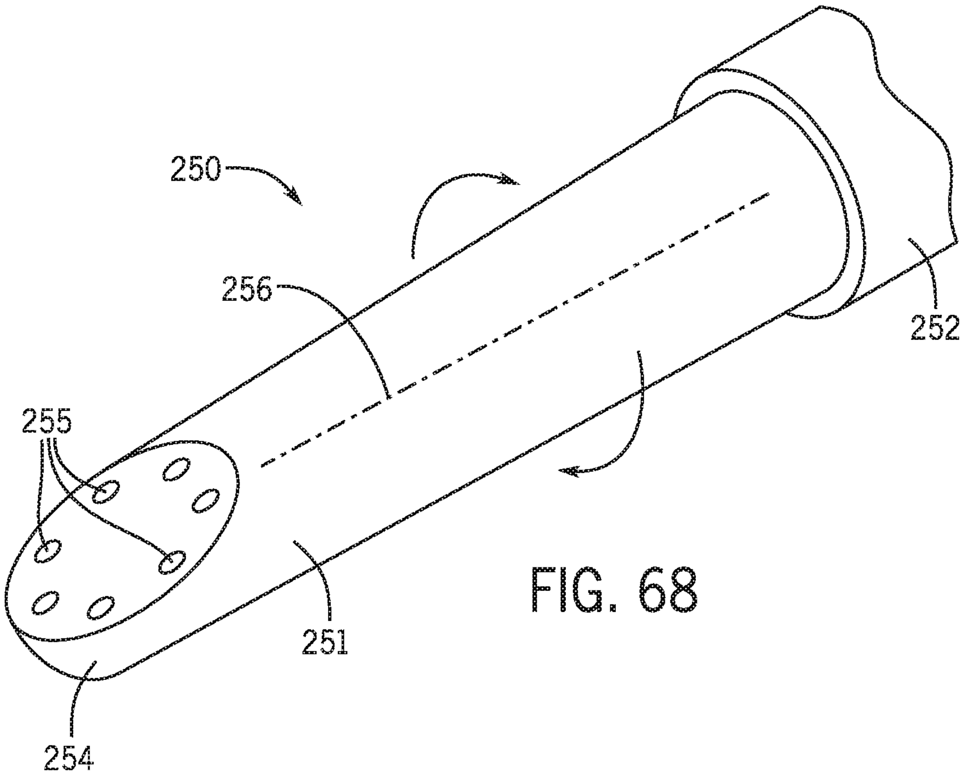
FIG. 68 is a perspective view of another exemplary embodiment of a dispenser for use with a dispensing system.

FIG. 68 illustrates an exemplary embodiment of a dispenser 250. The dispenser 250 includes a first portion 251 (e.g., a body) that is movable relative to a second portion 252 (e.g., base) to provide telescopic adjustment of the portions. For example, the first portion 251 may be configured to slide relative to the second portion 252 between an extended position (as shown in FIG. 67) and a withdrawn position, in which at least a portion of the first portion 251 is disposed within the second portion 252. The first portion 251 may have a shape that complements (e.g., is configured to nest with) the shape of the second portion 252. For example, the first and second portions 251, 252 may have generally cylindrical shapes, such that the first portion 251 nests within the second portion 252 or the second portion 252 nests within the first portion 251 when in the withdrawn position. Also, for example, the first and second portions 251, 252 may have frusto-conical shapes that nest together. Thus, the first and second portions 251, 252 may be telescopically arranged.

The first portion 251 includes at least one nozzle 255 configured to direct discharged fluid from the dispenser 250. As shown, a distal end 254 (relative to the second portion) includes a plurality of nozzles 255 configured to direct the flow of fluid in several different directions. The first portion 251 may be rotatable, such as around a longitudinal axis 256, relative to the second portion 252. The rotation of the dispenser 250 (e.g., the first portion) may induce a swirling pattern of spray from the dispenser 250.

The second portion 252 may be fixed to the toilet, such as a portion of the seat assembly, or may be configured to be movable relative to a third portion, such as to provide additional telescopic movement of the dispenser 250. The third portion may be an element of the dispenser 250 or part of the toilet. The third portion may have a shape that complements the second portion 252 to allow the second portion to move (e.g., slide) relative to the third portion between an extended position, in which a distal end of the second portion 252 is farthest away from the third portion, and a withdrawn position, in which the distal end of the second portion 252 is closest to the third portion and at least a portion of the second portion 252 either overlies or is disposed within the third portion.

Figure 69:
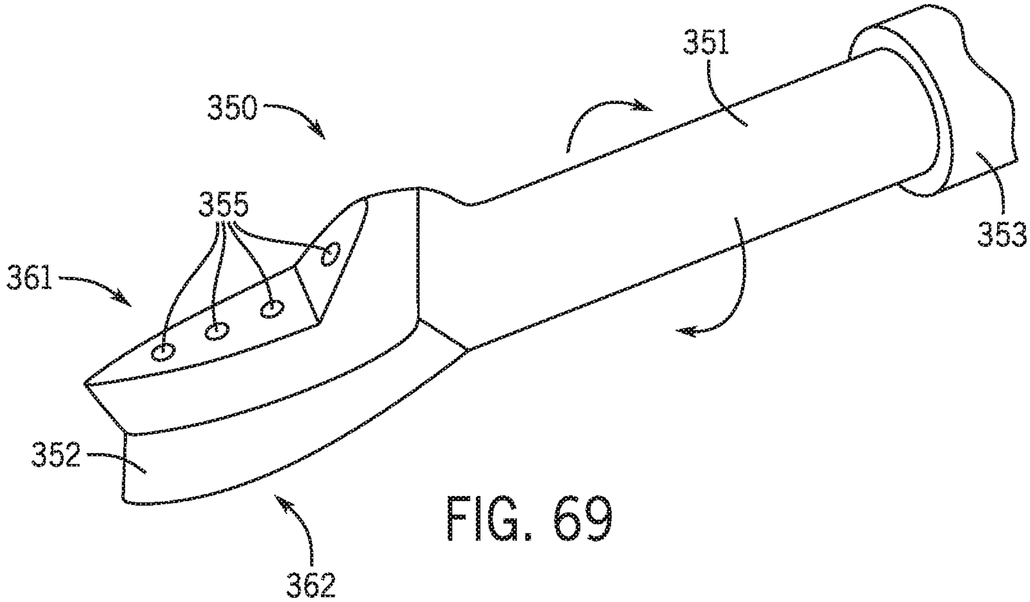
FIG. 69 is a perspective view of another exemplary embodiment of a dispenser for use with a dispensing system.

FIG. 69 illustrates an exemplary embodiment of a rotatable dispenser 350. The dispenser 350 includes an elongated body 351 and a head 352 that is provided on a distal end of the body 351. The body 351 includes an inlet at an inlet end (opposite from the distal end), which is fluidly connected to a cleaning compound and/or water. The head 352 includes a first side 361 having a plurality of nozzles configured to direct the flow of discharged fluid.

The body 351 and head 352 of the dispenser 350 are rotatable relative to a fixed portion 353 (e.g., a base), which may be an element of the dispenser or an element of the toilet. For example, a motor or other suitable device may be provided to rotate the body 351, such as the inlet end, in a single direction (e.g., clockwise, counterclockwise). Alternatively, the motor or rotating device may be configured to rotate the body 351 of the dispenser 250 in clockwise and counterclockwise directions. The rotation the body 351 may advantageously rotate the plurality of nozzles 355 on the first side 361 to direct the discharged fluid onto different surfaces (e.g., of the toilet) and in different rotational directions.

According to one embodiment, the head includes a first side 361 and a second side 362, which may be on opposite sides. The first side 361 includes at least one nozzle 355 configured to discharge a fluid containing a cleaning compound; and the second side 362 includes at least one nozzle 355 configured to discharge water. Thus, each nozzle 355 of the first side 361 is fluidly connected to a supply of cleaning compound and each nozzle 355 of the second side 362 is fluidly connected to a supply of water. The supply of cleaning compound may be contained within the dispenser 350 or may be located remotely, such as in or on the toilet, and routed to the dispenser. The dispenser 350 may be rotated (e.g., clockwise, counterclockwise) to both change the orientation (e.g., angle) of discharge, but also to change which fluid is being discharged. Thus, a user may rotate the second side 362 toward the object (e.g., surface, user, etc.) to spray the object with water or may rotate the first side 361 toward the object to spray the object with cleaning compound.

Figure 70A:
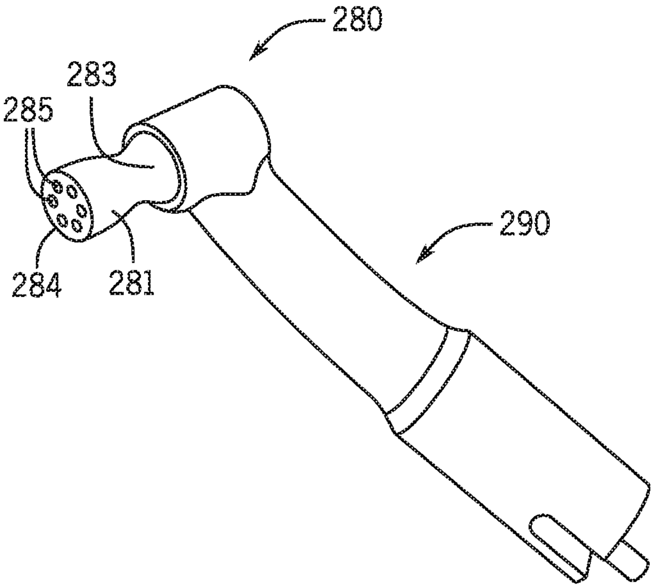
FIG. 70A is a perspective view of another exemplary embodiment of a dispenser for use with a dispensing system.
Figure 70C:
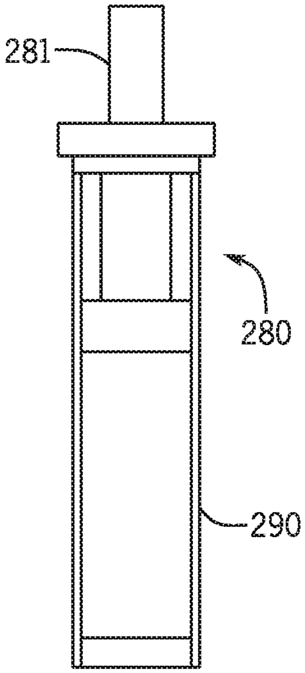
FIG. 70C is a side cross-sectional view of an exemplary embodiment of a dispenser.
Figure 70B:
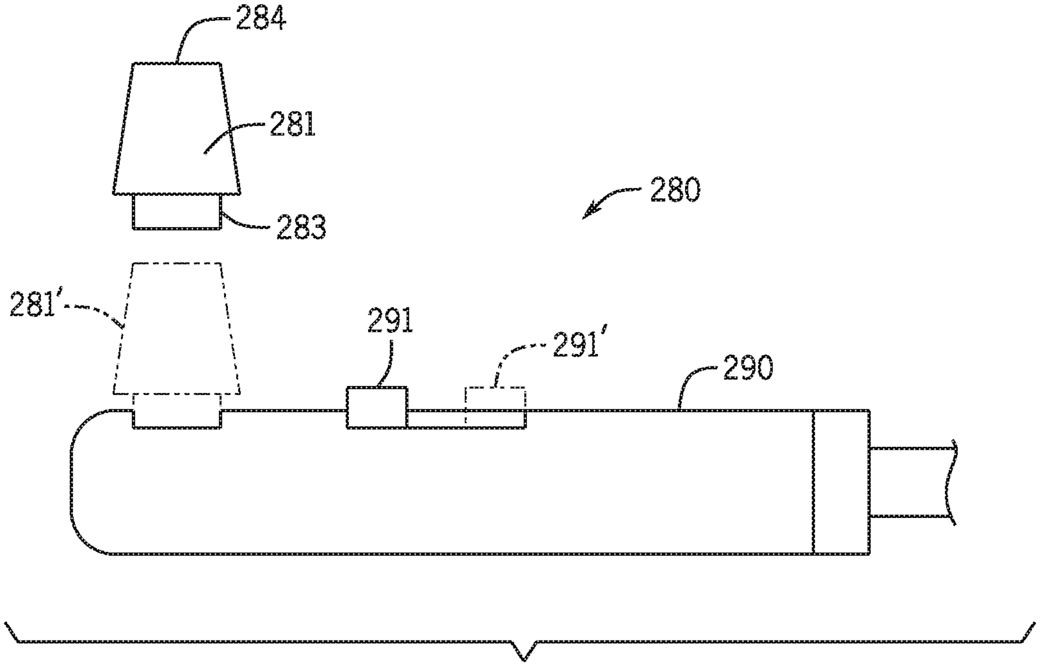
FIG. 70B is a side view of another exemplary embodiment of a dispenser.

FIGS. 70A-70C illustrate additional examples of dispensers 280 for use with a bidet wand. The dispenser 280 includes a body 281 having a first end 283 that is configured to detachably couple to the bidet want 290 and a second end 284 that is configured to discharge a cleaning compound via at least one nozzle 285 disposed in the second end 284. The first end 283 includes an inlet that is fluidly connected to the bidet wand 290, such as to receive water. The dispenser 280 includes a compound (e.g., cleaning compound) within a compartment. The cleaning compound is mixed with the water in a mixing chamber and then is discharged via each nozzle.

The dispenser 280 (or an attachment thereto) may be disposable, in that it may be detachably coupled to the bidet wand and configured to be replaced when the cleaning compound in the dispenser 280 is used up. As shown in FIG. 70B, the bidet wand 290 may include an actuator 291 (e.g., a slide switch, a button, etc.) that when actuated decouples the body 281 from the bidet wand 290 to allow the body 281 to be replaced with a new one. As shown, the bidet wand 290 may include a recess that is configured to receive the first end 283 of the body 281. When the first end 283 is placed in the recess and engaged with a retaining element of the bidet wand 290, the body 281 moves from a non-locking (e.g., unlocked) position to a locking position to releasably lock the body 281 to the bidet wand 290. As shown, the bidet wand 290 includes a slide switch that can be moved (e.g., slid) in a locking direction to thereby move the engaged the body 281 to the locked position. In the locked position, the body 281 is fluidly connected to the bidet wand 290, such as to receive water. To unlock the body 281, the slide switch may be moved in the unlocking direction (which is opposite to the locking direction) to move the body 281 to the unlocked position.

This arrangement advantageously allows a bidet or toilet having a bidet wand to be retrofitted to provide multiple functionality, in that it can function as a traditional bidet wand and can provide the added function of a cleaning dispenser that dispenses a cleaning compound, such as to clean the toilet. The disposable dispensers may advantageously improve cleanliness while allowing the user to discard the used dispenser without having to contact it directly, as well as allowing different types of dispensers containing different compounds to be used with the same bidet wand.

Figure 71:
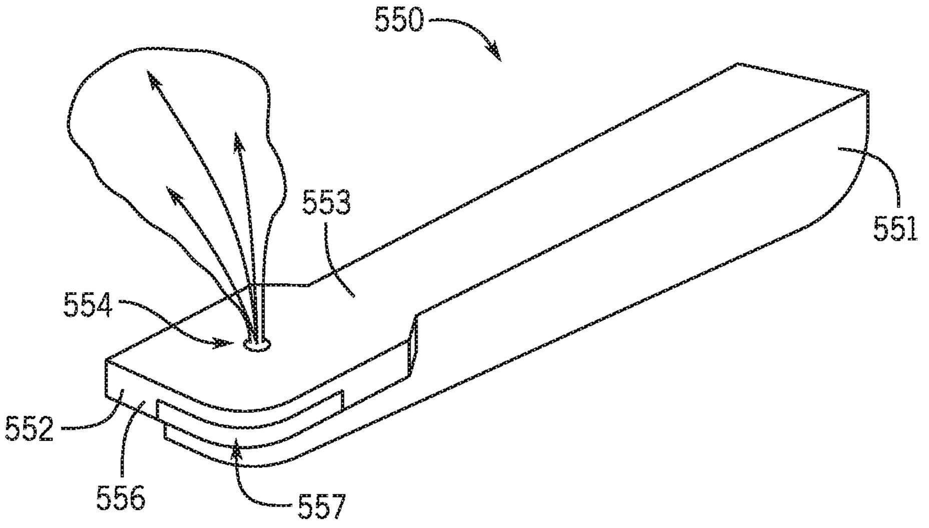
FIG. 71 is a perspective view of another exemplary embodiment of a dispenser for use with a dispensing system.

FIG. 71 illustrates another exemplary embodiment of a dispenser 550 including a body having a first end 551 and a second end 552. The first end 551 may be coupled to the toilet, another element of the dispenser 550 (e.g., to provide telescopic movement), or a rotating element to rotate the body. The second end 552 includes an upper surface 553 having at least one nozzle 554 that is configured to discharge a fluid as a stream or mist. The second end 552 includes a side surface 556 that extends transversely relative to the upper surface 553. The side surface 556 includes an elongated opening 557 (e.g., spray opening) that is configured to discharge a fluid as fan-shape. As shown, the side surface 556 is generally semi-cylindrical in shape and the elongated opening 557 has a semi-cylindrical shape as well. According to one embodiment, each nozzle 554 on the upper surface and the elongated opening 557 discharge the same fluid. The fluid may be water or a cleaning compound. According to another embodiment, the elongated opening 557 discharges a fluid that is different than the fluid discharged via each nozzle 554 on the upper surface. For example, the elongated opening 557 may discharge water and each nozzle 554 on the upper surface may discharge a cleaning compound or vice versa.

Also shown in FIG. 71, the dispenser 550 discharges fluid through the elongated opening to clean the sides and the front of a toilet bowl, while the nozzle(s) in the upper surface of the body may clean the toilet seat/cover and/or the user of the toilet. The elongated opening may be configured to extend continuously for a defined angle (e.g., approximately 180°) around the side surface. Alternatively, the elongated opening may be broken into several smaller openings that extend discontinuously (e.g., in a separated manner) for a defined angle around the side surface.

Figure 72:
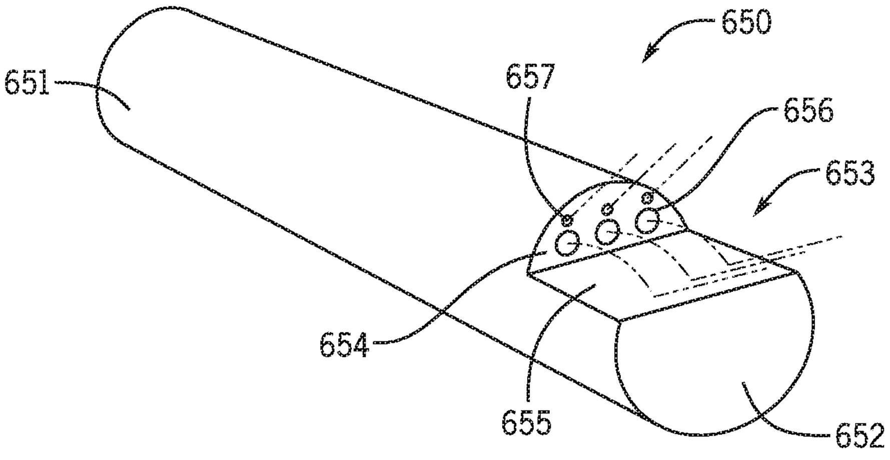
FIG. 72 is a perspective view of another exemplary embodiment of a dispenser for use with a dispensing system.

FIG. 72 illustrates another exemplary embodiment of a dispenser 650 including a body having a first end 651 and a second end 652. The first end 651 may be coupled to the toilet, another element of the dispenser 550 (e.g., to provide telescopic movement), or a rotating element to rotate the body. The second end 652 includes a notch 653 defining a first (e.g., forward facing) surface 654 and a second (e.g., upward facing) surface 655. The first surface 654 includes at least one nozzle 656 configured to discharge a fluid therefrom. According to one example, the second surface 655 is configured to deflect (e.g., reflect) the discharging fluid in a direction other than the original direction from the nozzle 656. According to another example, the second surface 656 is an atomizing plate, which is configured to vibrate. When a liquid chemical and/or water is dispensed from one of the nozzles 656 in the first surface 654, the chemical/water strikes the vibrating plate and is then atomized to form a mist, which is then dispensed onto another object. The first surface 654 may include a first plurality of nozzles 656, such as, for example, three nozzles 656 as shown in FIG. 72, such that the dispenser 650 may dispense three different chemicals, two different chemicals and water, or the same fluid through all three nozzles 656. A second set of nozzles 657 may be disposed in the first surface 654, which may discharge water or a compound. Each nozzle 657 may direct the fluid so that the fluid does not impact the second surface 655.

Figure 73:
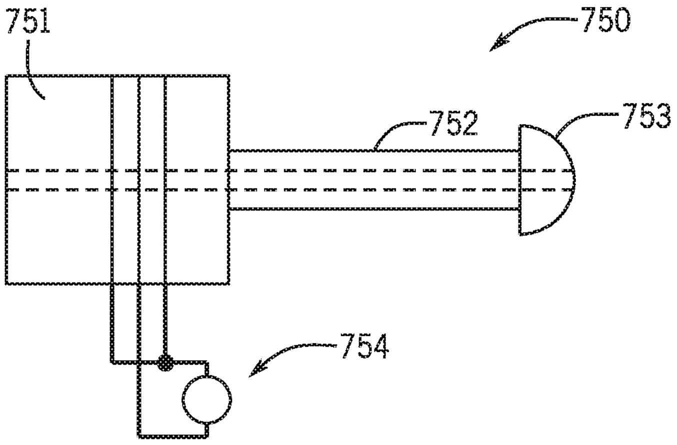
FIG. 73 is a side view of another exemplary embodiment of a dispenser for use with a dispensing system.
Figure 74:
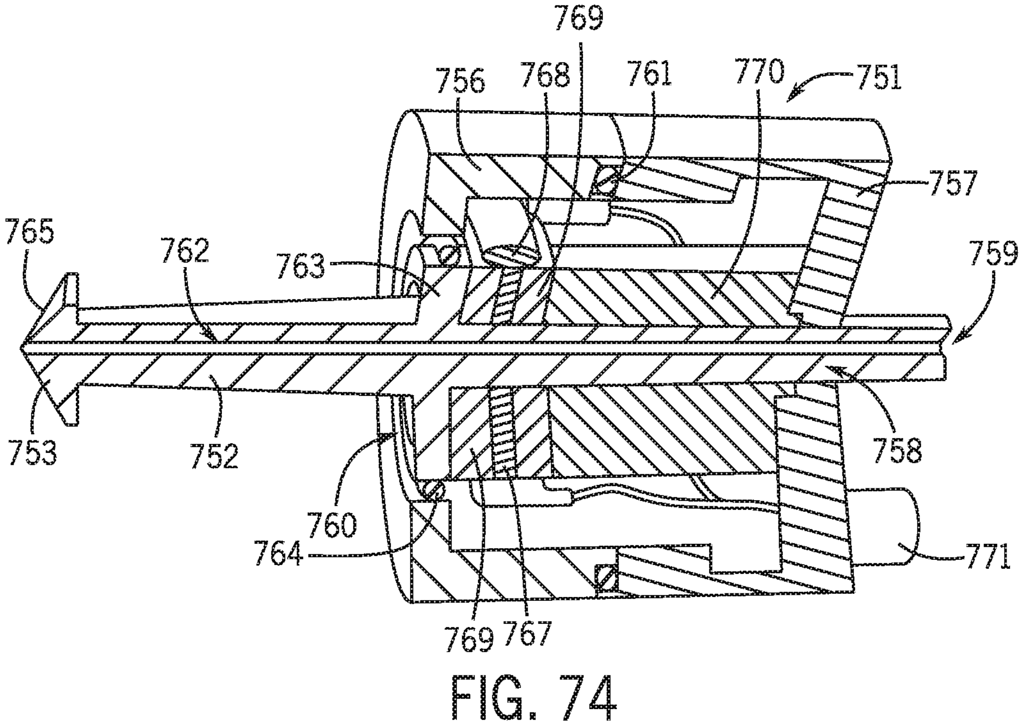

FIGS. 73 and 74 illustrate another exemplary embodiment of a dispenser 750. The dispenser 750 includes a body 751, a neck 752 extending from one end of the body 751, and a head 753 extending from a distal end of the neck 752. The dispenser 750 is configured to discharge a fluid as a mist, such as a plurality of atomized particles. For example, the dispenser 750 may receive a supply of fluid containing a cleaning compound and discharge the fluid (and cleaning compound) as atomized particles. As shown in FIG. 73, the dispenser 750 can receive electric power from a power input 754.

The body 751 of dispenser 750 includes a housing. As shown in FIG. 74, the housing includes a front housing 756 and a rear housing 757 that are formed separately and coupled together to capture other elements of the dispenser 750 in a cavity defined by the housing. Alternatively, the front and rear housings 756, 757 may be integrally formed as a unitary element. The rear housing 757 includes a generally circular end and a generally cylindrical wall extending away from the end. The end includes an inlet opening 758 that is configured to receive the supply of fluid (e.g., water, cleaning compound, etc.) into the dispenser 750. As shown, the inlet opening 758 is generally concentric to a longitudinal axis and is configured to receive a liquid feed channel 759. The front housing 756 includes a generally circular end, which includes an outlet opening 760, and a generally cylindrical wall extending away from the end. Each wall may include a distal end that is configured to be proximate to the distal end of the other wall when the housings are coupled together. A first o-ring seal 761 may be disposed between the walls of the front and rear housings 756, 757 to help seal the cavity (e.g., from the ingress of liquids). For example, each wall of the front and rear housings may include a recess that is configured to receive a portion of the first o-ring 761.

The neck 752 of dispenser 750 extends away from the outlet opening 760 in the end of the front housing 756. The neck 752 may have a frusto-conical shape as shown in FIG. 74, a cylindrical shape as shown in FIG. 73, or any other suitable shape. The neck 752 is configured to have a relatively large aspect ratio, where the aspect ratio is the ratio of its length (along the longitudinal axis) to its width (e.g., diameter). For the frusto-conical shaped neck, its diameter can be considered its average diameter, since it will change along the length. A bore 762 extends through the neck 752 to transfer fluid to the head 753. The neck 752 may extend into the cavity of the housing and out of the inlet opening 758 of the rear housing 757, such that an inlet of the bore serves as the liquid feed channel 759 that receives the fluid from a fluid source. The neck may further include a shoulder 763 that is configured to seat in the outlet opening 760 in the front housing 757. A second o-ring seal 764 may be disposed between the neck 762, such as the shoulder 763, and the front housing 756, such as the inner surface of the end that defines the outlet opening 760.

The head 753 of dispenser 750 includes an atomizing surface 765 configured to dispense the atomized particles of fluid into the air as a mist. As shown in FIG. 74, the head 753 has a generally pyramidal shape that narrows in size moving from a base, which is disposed on a distal end of the neck 752, to a tip, which is the outermost end of the dispenser 750. As shown in FIG. 73, the head 753 has a semi-spherical shape. The head 753 includes a bore that is an extension of the bore 762 in the neck 752 (or is fluidly connected to the bore 752) to dispense the fluid from the nozzle(s) in the head 753.

Also shown in FIG. 74, the dispenser 750 includes an active electrode 767, a ground electrode 768, and at least one piezoelectric crystal 769 (e.g. two piezoelectric crystals 769 that sandwich the active electrode 767 therebetween). Each piezoelectric crystal 769 may have a generally annular shape with a portion of the liquid feed channel 759 passing through an opening (e.g., central opening) in the piezoelectric crystal 769. The active electrode 767 may have a generally annular shape with a portion of the liquid feed channel 759 passing through an opening (e.g., central opening) in the active electrode 767. The piezoelectric crystals 769 and electrodes may be disposed between a rear horn 770, which may be a generally annular titanium member, and the shoulder 763 of the neck 752, which may be a generally annular titanium member. The ground electrode 768 extends between an inner surface of the housing (e.g., the front housing 756, the rear housing, or at least a section of both the front and rear housings) and an outer surface of the active electrode 767 and each piezoelectric crystal 769.

Also shown in FIG. 74, the dispenser 750 includes a connector 771. The connector 771 may, for example, be an electrical connector for providing an electrical connection to a broadband ultrasonic generator. The connector 771 is electrically connected to the active electrode 767 and/or each piezoelectric crystal 769, such that the electric signal received from the broadband ultrasonic generator is passed to the active electrode 767 and/or each piezoelectric crystal 769.

During operation, as fluid passes through the liquid feed channel 759 the dispenser 750 atomizes the fluid via the electrical signal received via the connector 771. The atomized fluid is dispensed, such as a mist having a generally parabolic cross-sectional shape, from the head 753 away from the body 751.

Figure 75:
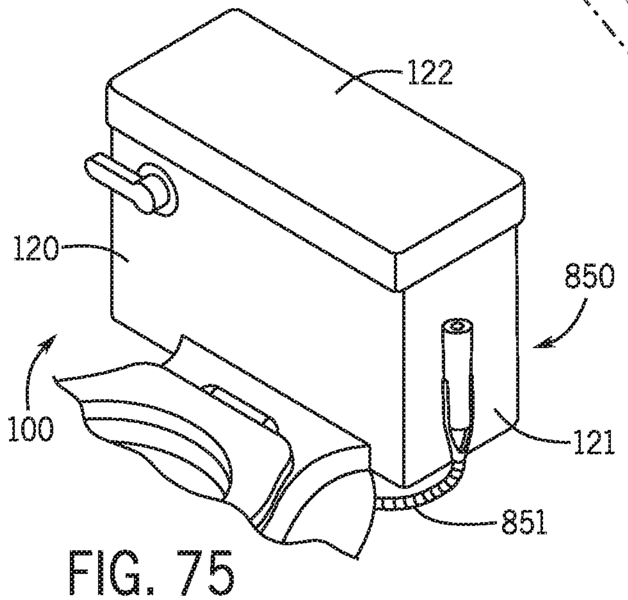

FIGS. 75-77B illustrate another exemplary embodiment of a dispenser 850. As shown in FIG. 75, the dispenser 850 is integrated with the toilet 100. However, the dispenser 850 may be integrated with other systems or configured as a standalone system. As shown in FIG. 75, a hose 851 may fluidly connect the dispenser 850 with one or more fluids located elsewhere in the toilet 100, with electricity, provide flexibility for improved mobility of the dispenser 850 and/or a combination thereof. For example, the hose 851 may introduce both water and a cleaning fluid (e.g., containing a mixture of water and a cleaning compound) into the dispenser 850. Thus, the cleaning fluid may be contained remotely from the dispenser 850, such as in the tank 120. Also, for example, the hose 851 may introduce only water into the dispenser 850 and the dispenser 850 may include a cleaning compound that can be mixed with the water to dispense a cleaning fluid in a first mode of operation; and the dispenser 850 may also dispense water in a second mode of operation.

The dispenser 850 includes a housing 852, which may be configured to detachably mount to the toilet 100, such as a wall 121 of a tank 120. The housing 852 may be generally cylindrical in shape having a first end 853 containing a first outlet 861 (see FIG. 76) and a second end 854 having a second outlet 862 (see FIG. 77B). The first outlet 861 may be configured to dispense a first fluid, such as the cleaning fluid, and the second outlet 862 may be configured to dispense a second fluid, such as water.

Figure 76:
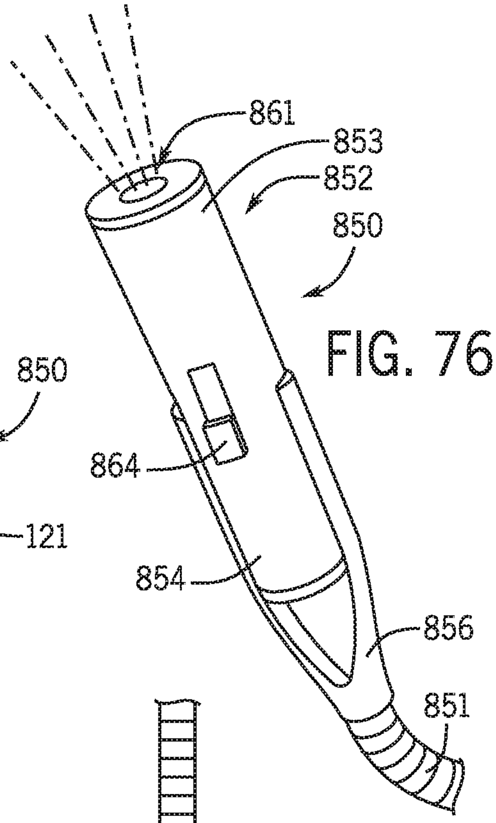
Figure 77A:
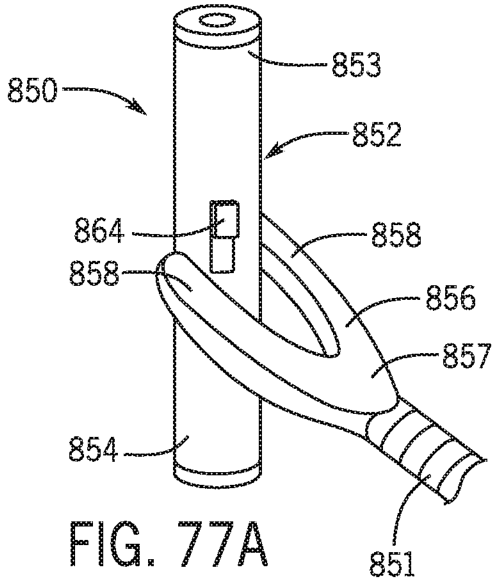
Figure 77B:
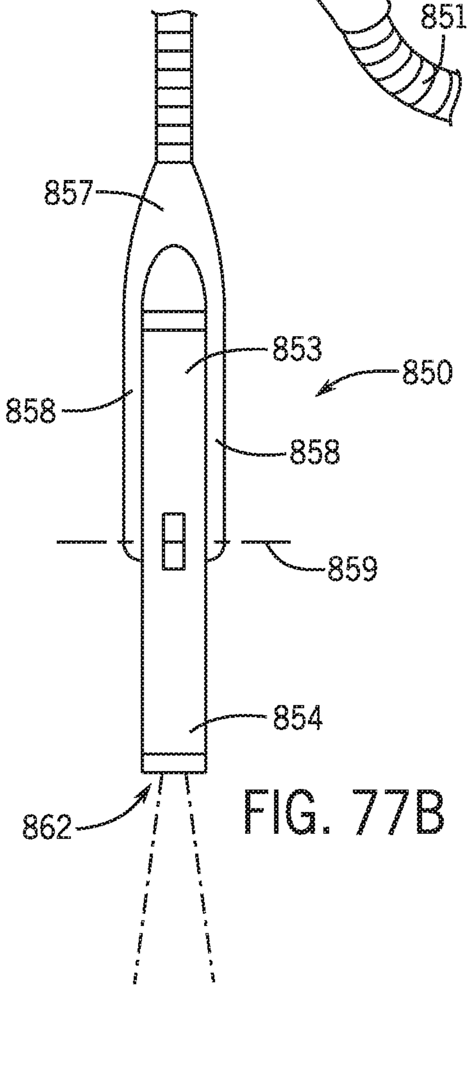

As shown best in FIGS. 76 and 77A, the dispenser 850 includes a clevis 856 connected to the hose 851 and the housing 852. The clevis 856 includes a base 857, which is connected to an outlet end of the hose 851, and a pair of arms 858, each of which is connected to the housing 852. As shown, each arm 858 is pivotally connected to the housing 852 on opposite sides to allow the housing 852 to be rotated about a pivot axis 859 (see FIG. 77B) relative to the clevis 856. For example, the housing 852 may be configured to rotate 180° relative to the clevis 856 to move the first end 853 from a distal position relative to the base 857 of the clevis 856 to a proximate position relative to the base 857 of the clevis 856, which in-turn moves the second end 854 from a proximate position relative to the base 857 to a distal position relative to the base 857. This arrangement advantageously allows the user to rotate the housing 852 to align the desired outlet (e.g., first outlet 861, second outlet 862) away from the base 857 of the clevis and the hose 851 to direct the spray of the desired fluid (e.g., water, cleaning fluid). One or both arms 858 of the clevis 856 may fluidly connect the hose 851 and the housing 852, such as to transfer fluid from the hose 851 to the housing 852, in order to then dispense the fluid from the outlet(s) of the housing 852. Thus, each arm 858 that fluidly connects the hose 851 and the housing 852 may be configured as a hollow body having a fluid conduit disposed within the body to route fluid therethrough.

The dispenser 850 includes an actuator 864 supported by the housing 852 and configured to control operation of the dispenser 850. For the single mode of operation dispenser 850, the actuator 864 may be configured as a switch (e.g., slide switch, toggle switch, etc.) that has a first position corresponding to an "off" setting, in which no fluid is emitted from the dispenser 850, and a second position corresponding to an "on" setting, in which a cleaning fluid is emitted from the dispenser 850, such as through an outlet (e.g., first outlet 861, second outlet 862). For the dispenser 850 having more than one mode of operation, the actuator 864 may have an additional position corresponding to each additional mode of operation. Thus, the actuator 864 for the two mode of operation dispenser 850 has three positions, where the first two positions correspond to those discussed above and the third position corresponds to a second "on" setting, in which water is emitted from the dispenser 850.

The dispenser 850 may include additional elements, such as valves, chemical generators, etc., which may be disposed within the housing. Additionally, the dispenser 850 may be configured having more than one actuator. For example, a second actuator may be provided that controls the flow rate of the fluid emitted from the dispenser 850. The second actuator may control a valve, such as opening or closing it to increase or decrease the flow rate based on manipulation by a user (e.g., sliding in a first or a second direction, rotating clockwise or counterclockwise, etc.).

FIGS. 78-79B illustrate another exemplary embodiment of a dispenser 950 that is configured to be stored within a portion of a base structure 1031 of a seat assembly 1030. The base structure 1031 may be positioned on a pedestal (e.g., base) of a toilet and, as shown, a seat 1032 is pivotally coupled to the base structure 1031. It is noted that the dispenser 950 can be located into other structures of the toilet or other structures in bathrooms or kitchens. A bore 1033 is provided in the base structure 1031, and the bore 1033 is configured to receive the dispenser 950 when the dispenser is in a docked position (i.e., not in use) to store and conceal the dispenser. The dispenser 950 can be removed from the bore 1033, such as by actuation of an actuator. For example, the actuator may be a button 1034 (e.g., a push button, a touch sensitive button, etc.) that when depressed/touched actuates a mechanism 1035 (e.g., a spring mechanism) that pushes the dispenser 950 at least partially out of the bore 1033 (see FIG. 79B), such that a user can access (e.g., grab, obtain, etc.) the dispenser 950. The spring mechanism may be located in an end of the bore 1033 opposite the open end, such that when a user inserts the dispenser 950 into the bore 1033, the spring mechanism is compressed to store energy. When the dispenser 950 is fully stored in the bore 1033 (see FIG. 79A), a locking mechanism secures the dispenser 950 in place and the spring mechanism in the stored energy position. Actuation of the actuator releases the locking mechanism to allow the stored energy of the spring mechanism to push at least a portion of the dispenser 950 from the bore. The dispenser 950 may be configured according to any dispenser described in this application.

The base (e.g., of the toilet) may include a cleaning system that cleans the dispenser 950 when in the docked position. For example, a second dispenser may be disposed in the base and configured to dispense a cleaning compound onto the dispenser 950 when the dispenser is docked in the bore. The system may include a sensor or other suitable element that detects presence of the dispenser and/or cleanliness of the dispenser 950 to control cleaning of the dispenser 950. The system may be utilized with the chemical generation system shown in FIG. 127D, so that the cleaning compound is regenerated and refilled into the hand-held dispenser 950 in a docked position in the base.

FIGS. 80A and 80B illustrate another exemplary embodiment of a hand-held dispenser 1050. The dispenser 1050 includes a housing 1051 having a water inlet 1052, which may be located, for example, at a bottom end of the housing 1051. The housing 1051 also includes a first outlet 1061 and a second outlet 1062 configured to dispense first and second fluids. As shown, the first outlet 1061 is located at an end opposite the end having the inlet 1052. The first outlet 1061 is configured to direct the first fluid in a direction away from and transverse to the end. Also shown, the second outlet 1062 is located on a cylindrical portion extending between the ends. A fluid channel 1063 extends longitudinally through the dispenser 1050, and a second fluidly fluid channel connects the second outlet 1062 and the fluid channel 1063 and/or inlet 1052. The fluid channel 1063 also is fluidly connected to a reservoir (shown using the reference numeral 1065) containing a chemical compound to form the cleaning compound when mixed with water (e.g., in a mixing chamber), according to a first embodiment, or a chemical generator (also shown using the reference numeral 1065) that generates a chemical compound to mix with water to form the cleaning compound, according to a second embodiment. The cleaning compound is then fluidly connected to the first outlet 1061.

The dispenser 1050 may include a valve, a pump, or other element that controls flow of the water, such as to the first outlet and/or the second outlet and the mixing chamber. A dispensing mechanism 1066 (e.g., a pump, etc.) may optionally be located between the first outlet 1061 and the chemical generator/reservoir at 1065. The dispenser 1050 may include an actuator that controls operation of the valve. The actuator may be a manual actuator or an automatic actuator (e.g., a touchless actuator), according to any embodiments disclosed in this application. The dispenser 1050 may include a chemical/compound generator, such as any generator discussed in this application. A reservoir 1067 may optionally be provided in the dispenser 1050, such as between the fluid channel 1063 and the housing 1051.

FIGS. 81A and 81B illustrate another exemplary embodiment of a dispenser 1150. The dispenser 1150 is configured similar to the dispenser 1050 and, therefore, the features described above for the dispenser 1050 apply to the dispenser 1150, except where otherwise noted. The dispenser 1150 includes a head 1155 that is configured to move relative to the housing 1051 between a retracted position, in which the head 1155 is disposed within a cavity 1152 in a first (e.g., upper) end of the housing 1051 (shown in FIG. 81A), and an extended position, in which the head 1155 extends beyond the top edge 1054 of the first end (shown in FIG. 81B). The retracted position corresponds to a non-use position of the first dispensing nozzle(s) 1161, which may be a use position for the second dispensing nozzle(s) 1162. The extended position corresponds to a use position of the first dispensing nozzle(s) 1161.

The cleaning compound is dispensed through each nozzle 1161 in the head 1155. As shown, the head 1155 is generally cylindrical in shape and include a plurality of nozzles 1161 disposed on the cylindrical surface, rather than the outer end. A locking mechanism may be provided to selectively retain the head 1155 (e.g., a portion of the inner end of the head 1155). As shown in FIG. 81D, the locking mechanism includes a tab 1156 disposed on the head 1155, an annular track 1157, and a biasing member 1158. The annular track 1157 includes an annular shaped channel (e.g., groove, recess, etc.) provided between a top wall 1159 and a bottom wall 1160. The top wall 1159 is annular in shape; and the bottom wall 1160 may be circular or annular in shape. The track 1157 includes an opening that extends through the top wall and has a shape and size that complements the tab 1156 to allow the tab 1156 to pass through the opening. For example, the tab 1156 may be a semi-annular protrusion that extends in a radial direction from the circular inner end. The biasing member may be a spring (e.g., a coil spring or helical spring) disposed in the cavity and configured to provide a force that biases the head away from the housing. When the head 1155 is pushed downward and the tab 1156 is aligned with the opening in the track 1157 (e.g., the tab and opening are in phase), such as by rotation of the head 1155 relative to the housing 1051, the tab 1156 passes through the opening and into the recess thereby moving the head downward into the cavity 1152. If the head 1155 is then rotated until the tab 1156 is out of phase with the opening, the biasing member pushes the head 1155 upward (e.g., away from the track) until a top surface of the tab 1156 contacts a bottom surface of the top wall 1159 of the track, which limits further upward movement of the head 1155 (retaining the head 1155 in the cavity 1152). Thus, the tab 1156 is retained in the channel of the track 1157 until the head 1155 is rotated until the tab is aligned with the opening in the track. The locking mechanism may include a plurality of tabs, which engage a plurality of openings in the track. Each tab may extend radially at a different angle. A bore may extend from the bottom of the head upward a distance to allow the biasing member to extend into the bore when the head is locked in the retracted position. A container 1167 may be located in the housing 1051 to hold a cleaning compound or water.

FIG. 82 illustrates another exemplary embodiment of a dispenser 1250 configured to provide for an attachment 1252 to be detachably coupled to the housing 1251. As shown, the housing 1251 includes an end, which is shown opposite from the end proximate the clevis 1256, that has a connector 1253 that is configured to engage the attachment 1252 to detachably couple the two together. As shown, the connector 1253 is configured as a cylindrical protrusion that engages a complementary recess 1254 in the attachment. The protrusion may be hollow having a bore 1255, such that fluid (e.g., cleaning compound) can flow through the bore 1255 and into the attachment 1252 when coupled to the protrusion.

The attachment 1252 may be a brush, a sponge, a nozzle that influences the spray pattern being dispensed, a combination of these elements, or any other suitable element. The attachment may snap onto the protrusion, such as by having a detent that engages the protrusion. The protrusion may include an annular recess in the outer surface that receives a snap-ring or other element. The cleaning compound can be dispensed onto the attachment, such as for a sponge or brush, or can be dispensed through the attachment, such as for a nozzle.

FIGS. 83A and 83B illustrate another exemplary embodiment of a dispenser 1350 that includes a housing 1351 having a first dispensing outlet 1361 configured to dispense water and a second dispensing outlet 1362 configured to dispense a cleaning compound. As shown in FIG. 83B, the first dispensing outlet 1361 has a semi-cylindrical shape and dispenses water in a semi-cylindrical pattern (e.g., fan shaped). The second dispensing outlet 1362 has a cylindrical shape and dispenses cleaning compound in a cylindrical shape. However, the shapes of the dispensing outlets may be different than shown.

The dispenser 1350 may include an actuator that controls the dispensing through the first and second dispensing outlets. As shown FIG. 83B, the dispenser 1350 includes a first actuator in the form of a button 1353 that is disposed on an end (e.g., a nose) of the dispenser 1350, such that when the button 1353 is depressed, the cleaning compound is dispensed from the second dispensing outlet 1362. By having the button 1353 on the end of the dispenser 1350, the dispenser 1350 can be actuated when the end is pressed against another object (e.g., a toilet), such as the object being cleaned. For example, a user can press the end (e.g., the button 1353) against an interior surface of the toilet bowl to spray the cleaning compound onto the interior surface and into the bowl.

The dispenser 1350 may include a second actuator for controlling dispensing from the first dispensing outlet. For example, the second actuator may be a second button 1354 that is configured to directly control dispensing from the first dispensing outlet 1361, such as by turning the dispenser on and off upon activation of the second actuator. Also, for example, the second actuator may indirectly control dispensing from the first dispensing outlet, such as by toggling an element (e.g., a valve, solenoid, etc.) between a first position, in which actuation of the first actuator turns on and off the first dispensing outlet, and a second position, in which actuation of the first actuator turns on and off the second dispensing outlet. In other words, the second actuator controls which dispensing outlet will emit fluid and the first actuator controls when fluid is emitted.

The dispenser 1350 may be configured to include a hose/conduit 1355 or may be configured as a hand-held cordless and/or hoseless dispenser. The end of the dispenser 1350 that is opposite from the end having the first actuator (e.g., the second end) may include an inlet connector, which is configured to receive fluid (e.g., water) via an inlet hose and/or electric power via a power cord connector. For example, the dispenser 1350 may be configured having a compartment (e.g., reservoir) that holds fluid received from a fluid source fluidly connected by a hose via the inlet connector. Upon filling the compartment, the hose can be disconnected, such that the dispenser 1350 can be operated in a hoseless manner. Also, for example, the dispenser 1350 may be configured having an internal power supply (e.g., a battery) that can be recharged via an external power supply. The inlet connector may be configured to receive a power cord and plug to recharge the internal power supply. After charging the internal power supply, the power cord can be detached from the inlet connector to allow the dispenser 1350 to be operated in a cordless manner.

FIGS. 84A and 84B illustrate another exemplary embodiment of a dispenser 1450. The dispenser 1450 may be configured similar to other dispensers described in this application, such as the dispenser 1350. However, the end of the dispenser 1450 having the second dispensing outlet and the actuator (i.e., the second dispensing outlet 1362 and actuator 1352) may be configured to receive an attachment, such as the disposable end attachment 1452 shown in FIG. 84A. The attachment 1452 may be configured to selectively engage the dispenser 1450, such as the end of the housing 1451 to detachably couple the attachment 1452 to the dispenser 1450. For example, the dispenser 1450 may include a locking mechanism that is configured to secure the attachment 1452 in place to the end of the dispenser 1450 until the attachment 1452 is released. The attachment 1452 may be configured to aid in cleaning of another object, such as a toilet (e.g., a bowl), such as by redirecting the flow of fluid from a dispensing outlet 1455 or including a scrubbing element (e.g., sponge, brush, etc.). For example, the attachment 1452 may include a frusto-conical portion that redirects the flow of fluid that is emitted from a dispensing outlet. The frusto-conical portion may change the angle of the emitted fluid or focus (e.g., concentrate) the fluid into a different shape, such as to increase the force of the fluid.

The dispenser 1450 includes a first actuator 1461 that is configured to control operation of the dispenser, such as flow of fluid (e.g., water, cleaning compound) from one or more than one dispensing outlet 1455. The dispenser 1450 includes a second actuator that is configured to release the secured attachment 1452 from the locking mechanism of the dispenser 1450 (as shown in FIG. 84A with the attachment 1452' depicted using phantom lines). For example, the second actuator may be in the form of a push button 1462, which when depressed releases the locking mechanism (e.g., moves the locking mechanism from a locking position to a non-locking or unlocked position). The attachment 1452 may advantageously be configured to be disposable, such as flushable down a toilet. Thus, the attachment 1452 may be used to help clean a toilet, and then conveniently disposed of within the bowl to be flushed during a flush cycle. The dispenser 1450 may include a reservoir 1454, a chemical generator 1456, or other suitable element or component disclosed in this application for other dispensers.

Also shown in FIG. 84, the dispenser 1450 may be configured to be stored in a base structure 1470. The base structure 1470 includes an opening 1471 leading to a cavity 1472, in which the dispenser 1450 may be stored. When in the stored position, the dispenser 1450 may be recharged, if including an internal power supply, and/or refilled, such as with cleaning compound. The base structure 1470 may also be configured to house a supply of attachments 1452' that can be used by the dispenser 1450. For example, additional attachments 1452' may be stored in the cavity 1472 to allow a user to attach a new attachment when the dispenser 1450 is docked to the base structure 1470.

FIGS. 85-86B illustrate another exemplary embodiment of a dispenser 1550 that is configured to provide multiple modes of operation. As configured, the dispenser 1550 provides three modes of operation. The first mode of operation dispenses water. The second mode of operation dispenses hydrogen peroxide ($H_2O_2$). The third mode of operation dispenses a cleaning compound other than $H_2O_2$. However, the dispenser 1550, according to other configurations, may dispense other compounds in the second and third modes of operation.

As shown in FIG. 85, the dispenser 1550 includes a base 1551 and a spray head 1552 that is movable relative to the base 1551 between first, second, and third positions, corresponding to the first, second, and third modes of operation. For example, the spray head 1552 may be rotatable relative to the base 1551, such that the dispenser 1550 moves into a new position upon rotation of the spray head by 120° from another position.

The base 1551 includes a fluid inlet 1553 configured to receive water via a hose 1554, a fluid conduit 1555 fluidly connecting the fluid inlet 1553 to the spray head 1552, a valve or other element for controlling flow of fluid through the fluid conduit 1555, and an actuator 1556 configured to control the valve or other flow control device. For example, the actuator 1556 may include a first position, in which water does not flow to the spray head 1552 via the fluid conduit 1555, and a second position, in which water does flow to the spray head 1552 via the fluid conduit 1555.

The base 1551 includes a support 1557 that is configured to support the spray head and allow relative rotation between the spray head 1552 and the base 1551. The support 1557 may also allow fluid connection between an inlet of the spray head 1552 and the fluid conduit 1555, such that water can be transferred from the base to the spray head 1552. As provided, the spray head 1552 includes a first inlet 1561 associated with the first mode of operation, a second inlet associated with the second mode of operation, and a third inlet 1563 associated with the third mode of operation. Upon rotation of the spray head 1552 into one of the three positions, the respective inlet will be fluidly connected with the fluid conduit 1555 and the other two inlets will not be fluidly connected with the fluid conduit 1555.

The spray head 1552 includes a body 1560 including a first dispensing outlet 1571, a second dispensing outlet 1572, and a third dispensing outlet 1573. Each dispensing outlet 1571, 1572, 1573 is associated with (e.g., fluidly connected to) the associated inlet of the spray head 1552. Each dispensing outlet 1571, 1572, 1573 may be configured having a nozzle or a plurality of nozzles to discharge fluid as a mist, spray, stream, or in any other suitable manner. The spray head 1552 may include a mixing chamber. For example, the spray head may include a first mixing chamber associated with the second mode of operation and a second mixing chamber associated with the third mode of operation. When the spray head 1552 is in the second position and in a dispensing mode (e.g., the valve is "on"), water may be introduced into the first mixing chamber via the second inlet and $H_2O_2$ is introduced into the first mixing chamber via another inlet to form a diluted mixture of water and $H_2O_2$, which is emitted from the second dispensing outlet 1572 via an outlet of the first mixing chamber. The spray head may be configured to convert water into $H_2O_2$. When the spray head 1552 is in the third position and in a dispensing mode, water is introduced into the second mixing chamber via the third inlet and a cleaning compound is introduced into the second mixing chamber via another inlet to form a mixture of cleaning fluid, which is emitted from the third dispensing outlet 1573 via an outlet of the second mixing chamber. When the spray head 1552 is in the first position and in a dispensing mode, water is passed from the fluid conduit of the base into a fluid conduit in the spray head and emitted via the first dispensing outlet 1571.

The dispenser 1550 may include a supply of concentrated $H_2O_2$ and cleaning compound, such as in first and second compartments of the spray head, respectively. The supplies of $H_2O_2$ and cleaning compound may be from external sources, such as where the supplies are filled/refilled into the compartments. Alternatively, the dispenser 1550 may include a generating device configured to generate the supply. For example, the dispenser 1550 may include an internal hydrogen peroxide generator 1574 provided within the spray head 1552 and configured to produce $H_2O_2$. A chemical generator 1575 may be provided within the spray head 1552 for producing a chemical compound to be mixed with water to form a cleaning compound.

FIGS. 87A-87C illustrate an exemplary embodiment of a dispenser 1650 that is detachably coupled to a base 110 of the toilet and fluidly connectable to a water supply from the tank 120. FIG. 87A illustrates the dispenser 1650 in a first position and dispensing a fluid (e.g., in an "on" mode of operation). In the first position, at least a portion of the dispenser 1650 is detachably coupled to the base 110 and at least a portion of the dispenser 1650 extends downwardly (from a bottom of the base) into the bowl 111 under a rear portion of the seat 131. In the first position, the dispenser 1650 may be configured as a bidet wand, such as to clean a user seated on the seat 131 of the toilet with water discharged from the dispenser 1650, and/or as a cleaning device that discharges water and/or cleaning fluid into the bowl 111 of the toilet, such as to clean an interior surface of the bowl 111, and/or upwardly to clean the seat 131 of the toilet. The dispenser 1650 is fluidly connected to the water in the tank 120 through a fluid conduit 128, which extends through the tank 120 and into the base 110.

FIG. 87B illustrates the dispenser 1650 in a second position, in a first portion of the dispenser 1650 is detachably coupled to the base 110 of the toilet and a second portion of the dispenser 1650 extends upwardly from the base 110 through a structure 136 above the base 110. As shown, the dispensing end of the dispenser 1650 is facing upwardly, such as to dispense a cleaning compound onto the seat 131, the seat cover 132 and/or the tank 120. A controller may be used to move the portion of the dispenser between the extended position and the retracted position, such as in combination (e.g., cooperation) with a motor. Alternatively, the dispenser 1650 can be configured to be moved manually, such as by a user of the toilet.

FIG. 87C illustrates the dispenser 1650 in a third position, in which the dispenser 1650 is decoupled from the base 110, such as to operate as a cordless and/or hoseless dispenser. The dispenser 1650 (or a portion thereof) may be withdrawn through an opening in an upper surface of the structure 136 above the base 110 of the toilet. The system may include a locking mechanism that detachably couples the dispenser 1650 to the base 110 and/or the structure 136 until a release is activated to thereby release the locking mechanism and allow a user to decouple the dispenser from the base 110. The dispenser 1650 may be configured having independent first and second portions, where each portion is configured to operate as a separate dispenser. For example, the first portion may be configured to move between the extended position in the bowl and the withdrawn position into the base to provide a first dispenser that remains coupled with the toilet; and the second portion may detachably couple from the base as a handheld cordless/hoseless second dispenser.

The dispensers may be integrated with other systems (e.g., toilets) to store (e.g., hide, conceal) a portion or all of the dispensers, such as when not in use. FIGS. 88-95 illustrate exemplary embodiments of dispensers having elements stored within other elements of toilets.

FIG. 88 illustrates a dispensing system 1750 having a dispenser 1751, a hose/cord 1752 that is configured to introduce a supply of water/electricity to the dispenser 1751, and a winding mechanism 1753. The winding mechanism 1753 is configured to wind the hose/cord 1752, such as when the dispenser 1751 is not in use. The winding mechanism 1753 includes a biasing member, such as a spring 1754 (e.g., torsion spring), configured to wind the hose/cord about a pivot axis 1755 into a desired shape (e.g., roll, coil, etc.). The winding mechanism 1753 may include a housing 1757 (e.g., shell) that houses the biasing mechanism and a wound portion of the hose/cord 1752. The winding mechanism may be coupled to the toilet, such as, for example, a toilet tank 120, so that the hose/cord 1752 is fluidly connected to water in the tank 120 through an inlet 1756.

FIG. 89 illustrates a dispensing system 1850 having a dispenser 1851 configured to be stored in a housing 1852 coupled to a side wall 121 of the toilet tank. The housing 1852 may include a single part or a plurality of parts. For example, the housing 1852 may include a first part 1861 and a second part 1862 that detachably couple together, such as to house the dispenser 1851 within a cavity 1853 formed between the two parts. Each part 1861, 1862 includes an outer wall 1854, 1855, which as shown has a semi-cylindrical shape. A support may be provided to hold the dispenser 1851 in place. As shown, each part 1861, 1862 includes a support 1856, 1857 that extends inwardly from an outer wall 1854, 1855 of the part. When the first and second parts 1861, 1862 are coupled together, the supports 1856, 1857 complement one another such that an opening is provided between the supports to receive and retain a portion of the dispenser 1851, such as an outer periphery (e.g., diameter) of a body/base. The parts 1861, 1862 may be configured to be detachably coupled together, such as through fasteners, snaps, detents, or other suitable locking elements. The two parts 1861, 1862 when coupled together may hide the dispenser 1851 from view. The housing 1850 may be configured to include a cleaning system that is configured to sanitize the dispenser, such as via a cleaning compound, when the dispenser 1851 is docked in the housing 1852. The system 1850 may include a hose/conduit 1865 interconnecting the dispenser 1851 and the tank 120.

FIGS. 90-92 illustrate other dispensing systems 1950, 1980 that include dispensers 1951, 1981 that are configured to be detachably coupled to a holder 1952, 1982 (e.g., a retaining member). The holder 1952, 1982 is configured to be affixed to a tank 120 of a toilet. As shown in FIG. 90, the holder 1952 includes an arm 1953 extending from a body 1954 that is configured to hook onto the top surface of a wall of the tank 120 to allow the body 1954 to hang adjacent the side the tank. For example, the hook may have an inverted J-shape that wraps around top surface and back into the tank. A lid may be placed over at least a portion of the arm when placed on the tank to secure the holder in place, as shown in FIGS. 91 and 92.

The body 1954 of the holder 1952 includes a support 1955 configured to retain the dispenser 1951 in place. In other words, the dispenser 1951 is supported by the support 1955 when in the docked position (e.g., coupled to the holder). As shown in FIG. 90, the support 1955 has a semi-annular shape with a central notch 1956. The notch 1956 may receive a portion of the dispenser, which may include a groove (e.g., recess, channel) that receives the support therein. The body 1954 may include a front wall and a side wall that is offset from the arm on the other end of the front wall. The side wall may extend the entire height of the front wall (e.g., as shown in FIG. 90) or extend a portion of the height of the front wall, such as from a bottom of the front wall up to a height between the bottom and top of the front wall.

Also shown in FIGS. 91 and 92, a cup 1983 may be provided at, for example, a bottom of the holder 1982 to hold the dispenser 1981 (either alone or in combination with the support). The cup 1983 may be a separate element or may be integrally formed with the holder 1982, such as the front wall, side wall, or other part of the holder.

FIGS. 93A and 93B illustrate dispenser systems 2050 having dispensers 2051 integrated with a seat 2030 of a toilet. The seat 2030 includes a cavity 2033 that is accessible by moving a movable (e.g., sliding) member 2032 provided in a front portion of the seat for the system 2050 shown in FIG. 93A or in a side portion of the seat for the system 2050 shown in FIG. 93B. The movable member 2032 is configured to move (e.g., slide) relative to a base member 2031 of the seat 2030 between a closed position and a fully open position. In the closed position, the movable member 2032 closes the opening and conceals the cavity 2033 housing the dispenser 2051. Thus, in the closed position, the seat 2030 appears as a unitary solid seat. In the fully open position, the movable member 2032 moves from the opening revealing the cavity 2033 and the dispenser 2051 to allow a user to access the dispenser 2051. The movable member 2032 may be configured to have a finger that travels in a guide of the base member of the seat.

The base member 2031 of the seat 2030 includes the cavity 2033 that receives the dispenser 2051. The base member 2031 may include a conduit including a water line and/or a power line to fluidly/electrically connect the base member 2031 to a water/power supply. A hose/cord 2053 may fluidly/electrically connect the dispenser 2050 to the line (e.g., water, power, etc.) of the base member. The cavity 2033 is configured to house the hose/cord and the dispenser when they are stored in the seat cavity. A winding mechanism may be provided in the base member of the seat, such as in the cavity, to help wind the hose/cord after being withdrawn from the cavity.

The movable member 2032 and cavity 2033 may be provided at different locations than the front portion of the seat. For example, the cavity and the movable member may be provided at different locations on the seat or in other elements of the seat assembly. As noted, FIG. 93A shows the cavity 2033 provided in the front portion of the seat 2030, while FIG. 93B shows an example of an alternative placement of the cavity 2033, which is provided in a side portion of the seat 2030. The cavity 2033 may be concealed by a movable member 2032 and may be configured to house the dispenser 2051 when docked. The dispenser 2051 can be configured according to any dispenser disclosed in this application.

FIG. 94 illustrates another system 2150 having a seat assembly configured to house a dispenser 2151. The seat assembly includes a seat 2130 that is pivotally coupled to a base structure 2134 via a hinge 2135 (e.g., pivot). The base structure 2134 includes an opening 2136 to a cavity 2137 that is configured to house a dispenser 2151 and a hose/cord 2153 connected to the dispenser 2151. A movable member 2138 is configured to move between a first position, in which the movable member 2138 covers the opening 2136 and the cavity 2137 to prohibit access to the cavity 2137, and a second position, in which the movable member 2138 does not cover (e.g., is adjacent to) the opening 2136 and allows access to the cavity 2137. As shown, the opening 2136 is a notch extending into a portion of a top surface 2139 and a side surface 2140 of the base structure 2134, with the movable member 2138 configured to close off the notch in the closed position. The movable member 2138 has a base that covers the opening in the top surface 2139 (in the closed position) and also has a leg that extends away from the base and covers the opening in the side surface 2140 (in the closed position).

FIG. 95 illustrates another system 2250 having a seat assembly configured to house a dispenser 2251. The seat assembly includes a base structure 2234 having a lower portion 2235, which is fixed to a toilet (not shown), and an upper portion 2236 that moves relative to the lower portion 2235 to provide/prohibit access to a cavity 2237 in which the dispenser 2251 is stored. The upper portion 2236 may rotate about a hinge or pivot 2238 between a closed (e.g., down) position, in which the upper portion 2236 prohibits access to the cavity 2237, and an open (e.g., up) position, in which the upper portion 2236 provides access to the cavity 2237. As shown, the upper portion 2236 is configured as a door that covers the entire lower portion 2235.

FIGS. 96A and 96B illustrate additional exemplary embodiments of dispensing systems 2350, 2380 having a portable handheld cordless/hoseless dispenser 2351 configured to discharge a cleaning compound as a mist. The dispenser 2351 includes a body 2352 having a lower portion 2353 and an upper portion 2354. The lower portion 2353 is configured (e.g., as a handle) for a user to grasp or hold the portion and may be configured having a generally cylindrical shape or other suitable shape. The lower portion 2353 is hollow having a compartment 2355 that stores a volume of liquid cleaning compound. The bottom end of the lower portion 2353 includes an inlet 2356 configured to receive a supply of liquid cleaning compound for storing in the compartment. The upper portion 2354 is configured to dispense the cleaning compound stored in the lower portion 2353. As shown, the upper portion 2354 has a wedge shape, but may be configured having other suitable shapes. The upper portion 2354 has an outlet 2357 that includes one or more openings (e.g., nozzles) through which the cleaning compound is dispensed from the dispenser 2351. As shown, the outlet 2357 is a single elongated slot to dispense cleaning compound. However, one or more nozzles may be disposed in the dispenser 2351 to dispense the cleaning compound in any shape or pattern. The upper portion 2354 of the dispenser 2351 may be configured to receive an attachment, such as the first attachment 2361 or the second attachment 2362 shown in FIG. 96A. The attachments 2361, 2362 may be configured the same as or similar to any attachment disclosed in this application. The attachments 2361, 2362 may be disposable.

The dispenser 2351 may include a generator, such as a chemical generator or a mist generator disposed in the body, such as in a central location between the upper and lower portions 2354, 2353. As shown in FIG. 96A, a mist generator 2364 is provided in the body 2352 and is fluidly connected to the compartment 2355 (storing the fluid, such as the cleaning compound). The mist generator 2364 is configured to generate a mist containing particles of cleaning compound when activated by an actuator 2365 disposed on the body 2352. The mist is transferred through the upper portion 2354 a channel 2366 (e.g., a bore, a passage, etc.) to exit the outlet 2357 (e.g., a dispensing outlet) in the upper portion 2354.

As shown, the dispenser 2351 is part of the dispensing system 2350 that further includes a base unit 2371 that is configured to refill and/or recharge the dispenser 2351. The base unit 2371 includes a housing 2372 having an aperture 2373 in an upper surface that is configured to receive the lower portion of the body of the dispenser 2351. The aperture 2373 may be provided in a projection 2374 extending upwardly from the housing 2372 to hold and retain the dispenser 2351 in a docked position with the base unit 2371. The base unit 2371 may include a chemical generator 2375, such as an $H_2O_2$ generator, a water inlet 2377 configured to receive a supply of water, and a pumping mechanism 2376. The base unit 2371 receives water and generates, for example, $H_2O_2$ via the $H_2O_2$ generator, which then is transferred via the pumping mechanism 2376 (e.g., the pump or pumping mechanism generates pressure to move the fluid containing cleaning compound) from the base unit 2371 to the dispenser 2351 when the dispenser 2351 is docked with the base unit 2371. A fluid connector 2378 is configured to couple to the inlet 2356 in the dispenser 2351 in the docked position. The cleaning compound is transferred from the base unit 2371 to the dispenser 2351 through the fluid connector 2378 and inlet 2356.

The dispensing system 2350 may be configured as a standalone system as shown in FIG. 96A, or may be part of an integrated system, such as to support a toilet paper roll 105 as shown in FIG. 96B. As shown in FIG. 96B, the system 2380 includes a base unit 2381 configured basically the same as the base unit 2371 shown in FIG. 96A, except the base unit 2381 supports a holder 2382 coupled to a bottom of the base unit 2381. As shown, the holder 2382 supports the toilet paper roll 105. However, the holder 2382 can be provided for other purposes (e.g., a towel holder or rack). Further, the dispenser 2351 can be integrated as part of another suitable system, such as any other system in this application. The system 2380 may include a second fixed dispenser or an actuator/dispenser (shown in FIG. 96B using reference numeral 2385).

FIGS. 97A and 97B illustrate additional exemplary embodiments of dispensing systems 2450, 2480 having a base unit 2470 and a portable handheld cordless/hoseless dispenser 2451 configured to detachably dock to the base unit 2470. As shown, the base unit 2470 is a generally cuboidal structure that is configured to mount to a support 2440 (e.g., a wall). The base unit 2470 includes a first docking port 2471 and a second docking port 2472, where each docking port includes a retaining element 2473 that is configured to detachably couple a dispenser 2451 in place, such as to refill the dispenser 2451 with fluid from the base unit 2470. The retaining element 2473 may include a locking element that couples the dispenser 2451 to the retaining element 2473 until the locking element is released. Each docking port 2471, 2472 may include a fluid outlet 2474 that is configured to refill a dispenser 2451 in a docked position with the docking port. Each fluid outlet 2474 may be fluidly connected to a container 2475 storing a fluid (e.g., water, $H_2O_2$, another cleaning compound), such that when the dispenser 2451 is docked, fluid is transferred from the container 2475 of the base unit 2470 to a compartment in the dispenser 2451. The system 2450 having more than one docking port may be configured to refill multiple dispensers 2451 having the same or different fluids. As shown in FIG. 97A, both dispensers 2451 are configured to be refilled with the same fluid from the container 2475 in the base unit 2470. As shown in FIG. 97B, the system 2480 includes a first dispenser 2481 and a second dispenser 2482 that may be filled/refilled with the same or different fluids. The first dispenser 2481 is docked with a first docking port 2491 of the base unit 2480 and the second dispenser 2482 is docked with a second docking port 2492 of the base unit 2480. Also shown in FIG. 97B, the first docking port 2491 is fluidly connected with a first fluid tank 2493, which may hold a first fluid (e.g., water, $H_2O_2$ another cleaning compound), and the second docking portion 2492 is fluidly connected with a second fluid tank 2494, which may hold a second fluid that may be the same or different than the first fluid.

The base unit may include a chemical generator configured to generate a cleaning compound (e.g., $H_2O_2$, another cleaning compound, etc.), an inlet, and a mounting surface configured to attach the base unit to another structure (e.g., the support 2440, a wall, etc.). According to another example, the base unit 2490 is configured having a first chemical generator configured to produce a first cleaning compound (e.g., $H_2O_2$ chlorines, PAA, etc.) and a second chemical generator configured to produce a second cleaning compound that is different than the first cleaning compound. With respect to FIG. 97B, the tanks 2493, 2494 may be configured to hold water or some other fluid that is routed into the first and/or second chemical generators through an inlet (e.g., an inlet line), such that the first chemical generator supplies fluid to the first docking port 2491 and the second chemical generator supplies fluid to the second docking port 2492. The inlet is fluidly connected to a mixing chamber in which water is mixed with a compound generated by a chemical generator. The inlet may be fluidly connected to more than one mixing chamber for the embodiments having more than one chemical generator. A valve or other suitable device may be included in the base unit to control the flow of water, such as to each mixing chamber. Each mixing chamber may include an outlet that is fluidly connected to a fluid outlet.

FIGS. 98A-99B illustrate additional exemplary embodiments of portable handheld cordless/hoseless dispensers 2520, 2550, 2580. As shown in FIGS. 98A and 98B, the dispenser 2520 includes a first (e.g., lower) portion 2521 and a second (e.g., upper) portion 2522 configured to be detachably coupled to the first portion 2521, such as via mating threads, snap-fit, or other suitable connection. The first portion 2521 includes a container 2523 for housing a fluid (e.g., $H_2O$) and an inlet 2524 into the container 2523. As shown, the inlet 2524 is disposed at the top of the first portion 2521 and includes a protrusion having external threads 2525 that mate with internal threads 2526 on the second portion 2522 to allow the portions to be detachably coupled together.

As shown best in FIG. 99B, the second portion 2522 of the dispenser 2520 includes a housing 2527, an $H_2O_2$ reservoir 2528 provided within the housing 2527, an $H_2O_2$ generator 2529 provided within the housing, and an electric plug 2530 disposed on the housing 2527. The electric plug 2530 could be disposed on the first portion, but it is advantageous to provide the electric plug on the portion including electrical components to reduce the number of electrical connections required. A bore extends into a lower end of the housing and includes the internal threads. The shape of the bore may be configured to complement the shape of the upper surface of the first portion 2521.

The $H_2O_2$ generator 2529 is configured to produce (e.g., generate) $H_2O_2$ from a supply of $H_2O$. Thus, the $H_2O_2$ generator 2529 is fluidly connected to the container 2523 of the first portion 2521, such that $H_2O$ is transferred from the container to the $H_2O_2$ generator via an inlet thereof to be converted into $H_2O_2$. A fluid conduit 2531 (e.g., tube, hose, etc.) may be provided to fluidly connect the container 2523 and the $H_2O_2$ generator 2529. The $H_2O_2$ generator 2529 may be configured to operate on electric power. An internal power supply (e.g., battery) may be provided in the second portion, such as in electric connection with the $H_2O_2$ generator 2529 and/or electric plug 2530.

The electric plug 2530 is configured to engage a typical wall socket to allow electricity to flow into the dispenser 2520, such as to power the $H_2O_2$ generator. 2529 For the systems having an internal power supply, the electric plug 2530 may be used to recharge the internal power supply. As shown in FIG. 99, the electric plug 2530 is disposed on an exterior portion of the housing at a location proximate to the $H_2O_2$ generator.

The $H_2O_2$ reservoir is disposed above the $H_2O_2$ generator and is configured to store $H_2O_2$ for dispensing from the dispenser 2550. An inlet of the $H_2O_2$ reservoir is fluidly connected to an outlet of the $H_2O_2$ generator to allow the generated $H_2O_2$ to transfer to the reservoir for storage until used.

The dispenser 2520 includes a dispensing mechanism for discharging the $H_2O_2$. As shown, the dispenser 2520 includes a spray dispenser 2535, which discharges the $H_2O_2$ in a spray pattern, and a pump dispenser, which discharges the $H_2O_2$ in a liquid flow or a foam. The dispenser 2520 includes an actuator for controlling operation of the spray dispenser and the pump dispenser. For example, the dispenser 2550 may include a first actuator for controlling the spray dispenser and a second actuator for controlling the pump dispenser.

FIG. 99A illustrates a dispenser 2550 that is configured similar to the dispenser 2520. The dispenser 2550 includes a first portion 2551 and a second portion 2552 that is configured to detachably couple to the first portion 2551. The first portion 2551 contains a reservoir for holding fluid. The second portion 2552 includes a first outlet 2561 and a second outlet 2562 configured to dispense the fluid, such as a spray from the second outlet 2562 and as a foam from the first outlet 2561. The dispenser 2550 may include a chemical generator 2559.

FIG. 99B illustrates a dispenser 2580 that is configured similar to the dispenser 2520. The dispenser 2580 includes a first portion 2581 and a second portion 2582 that is configured to detachably couple to the first portion 2581, such as through mating threads 2583, 2584. The first portion 2581 contains a reservoir for holding fluid. The second portion 2582 includes an outlet 2591 to dispense the fluid, such as a spray, a foam, a stream, mist, etc. The dispenser 2580 may include a chemical generator 2589 and a reservoir 2588 for holding the compound generated by the chemical generator 2589. A fluid conduit or other device may be employed to fluid connect the chemical generator 2589 and the reservoir in the first portion 2581.

A controller may be provided to control operation of any one of the dispensers disclosed in this application. For example, a controller may include a microprocessor having a PCB that controls the mode of operation, movement (e.g., telescopic movement, rotational movement, etc.), or any other of the functions disclosed in this application. The controller may include a user interface configured to display information to a user and having controls that when manipulated by the user provide input into the controller for adjusting the system. The controller may be provided on the toilet, may be a separate element, such as a remote control, may be attached to another object (e.g., wall, countertop, sink, etc.), or may located elsewhere.

xi. Touchless

The systems (e.g., toilets, delivery systems, dispensing systems, etc.) described in this application may be configured to provide improved cleanliness utilizing touchless control (e.g., actuation). For example, the toilets may include a device (e.g., a peristaltic pump) that actuates every time the toilet is flushed. Alternatively, the toilet may include a touchless actuator that can be selectively actuated by a user with motion, proximity or in other suitable manners. Odor sensors may be employed to detect odors, which upon detection may trigger flush cycles of the toilets, dispensing of cleaning compounds, and other suitable cleaning actions. Thus, the systems described in this application may be integrated with touchless control systems/assemblies to further improve cleanliness of the overall system.

The touchless control systems/assemblies may utilize one or more sensors, such as, for example, the sensors and sensing systems that are described in more detail below. The systems may employ other forms of sensors or other suitable elements to provide touchless control.

FIGS. 128 and 129 illustrate an exemplary embodiment of a touchless dispensing system 7000. As shown, the touchless dispensing system 7000 includes a peristaltic pump, a sensor, a chemical storage device, and a dispenser. The sensor is configured to control operation of the pump, such as upon a detection activity. The sensor may include any type of sensor described in this application. The chemical storage device is configured to store (e.g., house) a chemical/cleaning compound, such as any chemical/compound disclosed in this application. The storage device may be a container (e.g., bottle) or any other suitable device, and the size (e.g., volume) of the device may be of any suitable size. The peristaltic pump is configured to pump the chemical/compound from the storage device to the dispenser. The peristaltic pump may be configured according to any known arrangement and may be of any suitable size. The dispenser is configured to dispense or discharge the chemical/compound and may be configured according to any dispenser described in this application or known elsewhere.

The touchless dispensing system 7000 may include a hose (e.g., fluid conduit, tube, etc.) connecting the peristaltic pump to another component. As shown, a first hose (e.g., supply hose) fluidly connects the storage device and the peristaltic pump, and a second hose (e.g., delivery hose) fluidly connects the peristaltic pump and the dispenser.

The touchless dispensing system 7000 may include an axel and/or a chain wheel. As shown, an axel extends from the pump through a flush chain wheel. The axel may be configured to be coupled to another element or component, such as a motor or other suitable driving device. For example, a motor may drive rotation of the pump to move the chemical/compound from the storage through the pump to the dispenser. The flush chain wheel may be connected to another element of the system, such as, for example, the flushing mechanism of the toilet (e.g., a flush valve), such that the system 7000 may initiate both flushing and cleaning of the toilet.

According to one example, the system 7000 is incorporated into a toilet to dispense an amount of the chemical/compound and initiate a touchless flush cycle of the toilet. Detection of an activity/presence by the sensor activates a touchless flush cycle of the toilet. During the flush cycle (e.g., during the first 10 milliseconds), the system 7000 dispenses (e.g., injects) an amount of chemical/compound into the toilet. According to one example, the chemical is dispensed into the flush valve with the water therein and then a mixture of the chemical and water passes into the bowl. According to another example, the chemical is dispensed into the bowl, such as while water is introduced into the bowl.

Sensing

The systems described in this application may employ sensing, such as to detect certain actions and/or to provide functionality (e.g., dispensing, flushing, etc.). Odor sensors, proximity sensors, and motion sensors are non-limiting examples of sensors that may be employed with the systems of this application. Odor sensors, such as volatile organic compound (VOC) sensors, may be employed to detect organic chemicals and compounds, both human made and naturally occurring chemicals/compounds. Proximity sensors may be employed to detect the presence of an object within a zone of detection without physical contact between the object and the sensor. Electric potential sensors (e.g., Plessey epic sensors), low capacity sensors (e.g., ultra-low capacity), capacitance sensors, projected capacitance sensors, and infrared sensors (e.g., projected infrared sensors, passive infrared sensors) are non-limiting examples of proximity sensors that may be employed with the systems of this application. Motion sensors may be employed to detect motion (e.g., a change in position of an object relative to the object's surroundings). Electric potential sensors (e.g., Plessey epic sensors), optic sensors, radio-frequency (RF) sensors, sound sensors, magnetic sensors (e.g., magnetometers), vibration sensors, and infrared sensors (e.g., projected infrared sensors, passive infrared sensors) are non-limiting examples of motion sensors that may be employed with the systems of this application.

FIGS. 109A and 109B illustrate an exemplary embodiment of a toilet 100 including sensors for controlling operation of a cleaning system (e.g., a dispensing system configured to dispense a cleaning compound). As shown, a first sensor 141 is located in a seat cover 132 of the seat assembly 130. The sensor 141 may be located generally in a central part on an underside of the seat cover 132, such as to provide a relatively larger zone of detection 142 through a central opening 133 in the seat 131 of the seat assembly 130. As shown in FIG. 109A, this location also positions the zone of detection 142 to detect the presence of a user on the seat 131 when the seat cover 132 is in the up position.

The sensor 141 may be configured to provide one or more functions to provide one or more modes of cleaning. As shown, the sensor 141 is configured to detect both presence of a user (not shown) of the toilet 100 and presence of waste (e.g., urine, feces) in the bowl 111 of the toilet 100. The sensor 141 may detect and differentiate between when a user is using the toilet 100 from a seated position on the seat 131 and from a standing position. The sensor 141 may detect and differentiate between when only liquid waste (i.e., urine) is in the bowl 111 and when solid waste (e.g., feces) is in the bowl, either alone or in combination with liquid waste. By detecting and differentiating between these different situations, the sensor 141 may advantageously allow the toilet 100 to provide different modes of cleaning to address the different situations. For example, the toilet 100 may be configured to provide a first flush cycle in which a first volume of water is used upon detection of solid waste in the bowl 111, and may provide a second flush cycle in which a second volume of water (that is less than the first volume) is used upon detection of only liquid waste in the bowl 111. Thus, the toilet 100 can be configured to conserve on water and energy through the sensor 141 by reducing the volume of water used in particular situations.

The toilet 100 may include a dispensing system 145 that dispenses a cleaning compound into the bowl or into the air, such as for odor abatement, when the presence of waste (solid and/or liquid) is detected in the bowl. Also, for example, the toilet 100 may include a dispensing system 145 that dispenses a cleaning compound onto the seat following detection of a user seated on the seat. Also, for example, the toilet 100 may include a dispensing system 145 that dispenses a cleaning compound onto the rim of the base of the toilet (e.g., the rim of the bowl), onto other locations of the base of the toilet, and/or onto the floor adjacent the toilet upon detection of a standing user, either alone or in combination with detecting only liquid waste in the bowl. Thus, the toilet 100 may provide multiple cleaning modes, where each cleaning mode is tailored to the specific use of the toilet. The dispensing system 145 may include another sensor located with the dispenser or may be associated with only the first sensor 141. The dispensing system 145 may include a dispenser, which may be configured according to any dispenser disclosed in this application.

The toilet 100 may include a controller in communication with the sensor 141 and/or the dispensing system 145. For example, the sensor 141 may be configured to emit a signal (e.g., wireless) upon detection of an object/activity to the controller. The signal may indicate to the controller the type of object/activity, such as, for example, any one of or combination of the examples noted above. The controller may then control other systems of the toilet 100, such as the dispensing system 145, based on the indicated objects/activities by the signal from the sensor. For example, the controller may control a flush cycle (e.g., low volume flush, high volume flush, etc.), dispensing of one or more cleaning compounds from any number of dispensing systems (e.g., the dispensing system 145 or any other system), or other suitable systems of the toilet 100. The controller may be located in the dispensing system 145, in the seat assembly (e.g., the seat cover 132 with the sensor 141), in the tank 120, or elsewhere. The toilet 100 may perform these functions (e.g., flushing, dispensing cleaning compound, etc.) without any direct contact (e.g., manipulation) by a user. Thus, these functions are automatically performed by the toilet 100 to allow the user to avoid having to actively actuate the function(s) or touch the toilet 100. In other words, the toilet 100 may perform its functions based on sensing of specific user activities.

According to one example, the sensor 141 has a zone of detection 142 that is conical in shape moving away from the sensor 141. When the seat cover 132 is positioned in a down position (e.g., when the cover covers the seat and bowl), the zone of detection 142 of the sensor may be directed into the bowl, such as shown in FIG. 109B. The zone of detection 142 may be broken into a pattern, such as, for example, a grid pattern. By detecting objects in the grid pattern, the sensor 141 may differentiate between solid and liquid objects in a more accurate and repeatable manner. The sensor 141 may be configured to measure the relative distance from the sensor 141 to a user in the zone of detection 142. The distance may be used to determine whether the user is seated on the seat or standing in front of the toilet.

FIGS. 110A and 110B illustrate an exemplary embodiment of a sensing system 180 for controlling operation of a cleaning system, such as for a toilet (e.g., the toilet 100) and/or a standalone system. The sensing system 180 may be located on a toilet or may be remote from the toilet such as on a wall adjacent to the toilet. The system 180 includes at least one sensor. As shown, the system includes a first sensor 181 and a second sensor 182, where each sensor is configured to detect an activity and initiate a function upon detection of the activity. For example, the first sensor 181 may be configured to detect presence of a user or a specific motion by a user (e.g., a specific hand movement) to initiate a flush cycle, and the second sensor 182 may be configured to detect presence of a user or a specific motion by a user to initiate dispensing of a cleaning compound. The cleaning compound may be used to clean the toilet and/or the user (e.g., hand sanitizing compound). The sensors 181, 182 may be located at different locations on the object (e.g., toilet, standalone system, etc.) or may be co-located (e.g., located proximate to one another). A third sensor 183 and/or touch-sensitive actuator may be employed. By way of example, one sensor may be configured to actuate a first flush cycle (e.g., high volume flush), another sensor may be configured to actuate a second flush cycle (e.g., low volume flush), and yet another sensor may actuate a cleaning cycle.

FIG. 111 illustrates another exemplary embodiment of a toilet 400 having a sensing system including a sensor. As shown, a first sensor (e.g., the sensor 141, 181, etc.) is provided on a first side of the toilet 400 and a second sensor (e.g., the sensor 141, 182, etc.) is provided on a second side of the toilet 400. The first and second sides may be adjacent sides or opposite sides. The first sensor detects a first object/activity to initiate a first function and the second sensor detects a second object/activity to initiate a second function. For example, one of the sensors may be configured to detect presence of an object and upon such a detection initiate a flush cycle of the toilet 400, while the other sensor may be configured to detect a motion of an object and upon such a detection initiate a cleaning function/cycle. The cleaning function/cycle may involve one or more dispensing systems integrated with the toilet 400, with standalone systems in the same room as the toilet 400, or with other remote systems.

FIG. 112 illustrates another exemplary embodiment of a toilet 500 having a sensing system, such as the sensing system 180, including a sensor. The sensor may be located on a forward facing surface 560 of the toilet 500, such as the front wall of a tank or a lid, to detect presence and/or motion of a user 99 seated on and/or standing in front of the toilet 500. The sensing system 180 may be configured as the co-located example of the system of FIG. 110 described above, which includes a first sensor configured to detect presence of a user to initiate a flush cycle and a second sensor configured to detect a specific motion by a user to initiate dispensing of a cleaning compound. According to another example, the sensing system 180 includes a first sensor configured to detect when a user is seated on the seat and a second sensor configured to detect when a user is standing in front of the toilet 500.

The systems (e.g., toilets, standalone, etc.) described in this application may include any one or any combination of the sensors/sensing systems described in this application and the specific examples shown are not limiting. For example, a toilet may be configured to include the sensors/sensing systems (or any combination thereof) provided above and/or any sensor/sensing system discussed in any other section of this application.

Odor Abatement

The systems/assemblies (e.g., toilets) described in this application may be configured to monitor and/or control (e.g., abate) odors from the systems/assemblies. The systems/assemblies may employ chemicals/compounds (e.g., zeolite, charcoal, air hydroxyl, $H_2O_2$, etc.), ventilation devices, a combination of chemicals/compounds and ventilation devices, or other suitable elements to abate odors.

As noted above, the systems/assemblies described in this application may include sensors or other sensing devices that are configured to detect odor(s), such as to initiate a system to abate the odor(s). Odor sensors may be included on or in the toilets, on or in standalone systems, or on or in other systems that may benefit from having an odor sensor. As non-limiting examples, VOC sensors may be employed to detect organic chemicals and compounds, which may be human made or naturally occurring, within the systems/assemblies of this application. For example, a VOC sensor may be disposed in a seat assembly (e.g., at the underside of the seat) of a toilet to detect odors in and around the bowl of the toilet. Also, for example, a VOC sensor may be disposed in the bowl of the toilet to detect odors in and around the bowl of the toilet. These types of sensors may take a reactive approach in odor abatement by first detecting the presence of an odor before taking steps to counter the odor.

Other types of sensors may be provided that take a proactive approach to odor abatement. For example, a proximity sensor may be employed to detect the presence of a user and initiate dispensing of a chemical/compound to counter odor before the odor is even detectable by the user and/or sensor. The proximity sensor may be configured as any system having a sensor described in this application. Proximity sensors may also be used to provide a reactive approach to odor abatement.

As noted above, ventilation systems may be employed to help abate odors in the systems/assemblies. The ventilation systems may employ a filtering material, such as a zeolite, charcoal, hydroxyl (e.g., air hydroxyl), $H_2O_2$, or other suitable material. The ventilation systems may be used in toilets, such as within the tanks of toilets. The ventilation systems may be dual cycle systems, such as providing an odor abatement cycle and a drying cycle.

FIGS. 113A-113F illustrate an exemplary embodiment of a toilet 4000 having an in-tank ventilation system 4001 that is integrated with a flush valve of the toilet 4000. The toilet 4000 includes a tank 4003 configured to hold water, such as for use in a flush cycle of the toilet, and a bowl 4004. The tank 4003 includes a vent hole 4005 (see FIGS. 113A and 113C) to provide venting from inside the tank 4003 to outside the tank. As shown in FIG. 113A, the vent hole 4005 is provided in a rear facing surface of the tank 4003. However, the vent hole 4005 may be located elsewhere on the toilet (e.g., tank).

Also shown best in FIGS. 113E and 113F, the ventilation system 4001 includes a housing 4010, a fan 4011, a motor 4012, a filter 4013 including a filtering material, and a vent 4014. The ventilation system 4001 may operate as a flush valve and provide ventilation of the tank 4003 and bowl, such as during or between flush cycles of the toilet. The housing 4010 includes a valve body 4020 configured to seat against an outlet of the tank 4003 and to introduce water into the bowl 4004 during a flush cycle of the toilet. The housing 4010 may include a canister (e.g., a generally cylindrical buoyant member) provided above the valve body 4020, where the canister includes an internal bore 4021 for receiving other elements of the system, such as the fan 4011 and the motor 4012. The housing 4010 may include a float, which may be integrated with the canister or may be a separate element. The canister/float may, for example, be configured as disclosed elsewhere in this application.

The fan 4011 is provided in the bore 4021 of the canister and configured to move fluid (e.g., water, air, etc.), such as, for example, during a venting cycle to provide ventilation of the toilet 4000. Rotation of the fan 4011 is driven by the motor 4012, such as through a drive shaft 4022. The motor 4012 can be powered by an internal power supply (e.g., a battery) or an external power supply.

The filter 4013 is disposed in the bore 4021, such that fluid passing from the bore 4021 to the vent 4014 (or from the vent 4014 to the bore 4021) is filtered through the filtering material. According to an exemplary embodiment, zeolite is used as the filtering material. However, other materials may be used as the filtering material. A cap 4015 may be provided to close off the bore 4021 other than through a central opening 4023 in the cap 4015, which the vent 4014 and/or filter 4013 may pass through and/or occupy. According to an exemplary embodiment, the filter 4013 is disposed in (e.g., coupled to) an inlet end 4024 of the vent. The vent 4014 includes a passage through which a fluid (e.g., air) is filtered and then vented from inside the toilet 4000 (e.g., the bowl 4004) to outside the tank 4003 (or from outside the tank 4003 to inside the toilet 4000), such as through the vent hole 4005 provided in the rear (e.g., rear facing surface) of the tank 4003.

During an inside to outside vent cycle of the ventilation system 4001, air is drawn up from the bowl 4004 via the fan 4011, then filtered through the filter 4013 and passed out the tank 4003 by way of the vent 4014. During an outside to inside vent cycle, air is pulled from atmosphere into the ventilation system 4001 by way of the vent 4014, then filtered through the filter 4013 and passed into the bowl 4004 (e.g., pushed by the fan 4011). The filtering process can be configured to remove any odors, particulates (e.g., solid particles), or other undesirable elements from the air vented to outside the tank 4003. The ventilation system 4001 may also provide a drying cycle. The drying cycle may introduce air into the toilet, such as described above for an outside to inside vent cycle.

The toilet 4000 may include a sensor and the ventilation system 4001 may be configured to cooperate with the sensor for odor abatement. For example, the toilet 4000 may include a sensor (e.g., VOC sensor) that is configured to detect odor is coupled to a seat assembly or bowl, such as any of the sensors discussed in this application. The sensor detects odor in and around the bowl and seat, and upon such a detection sends a signal to a controller, which then sends a signal to the motor, initiating a vent cycle. The sensor may be configured to detect moisture of the air in and around the bowl (in addition to or in place of detecting odor). Upon detecting a moisture content in the air above a threshold, the sensor may communicate a signal to a controller, which may then initiate a drying cycle of the system.

According to one example, the activation/deactivation of the ventilation system 4001 is linked to movement of the seat of the toilet. When a user rotates the seat of the toilet from a closed (e.g., down) position toward an open (e.g., up) position, the ventilation system 4001 automatically shuts off or turns on, depending on the configuration. A switch or sensor may be employed to monitor the seat position, such that movement of the seat toward the open position either moves the switch (e.g., opens a normally closed switch, closes a normally open switch, etc.) or activates a sensor to change the mode of operation of the ventilation system (e.g., from off to on, from on to off).

As shown best in FIGS. 113B-113D, an outlet 4034 of the housing 4010 (e.g., the valve body 4020) is fluidly connected to (e.g., in fluid communication with) an inlet channel 4025 in the toilet 4000 (e.g., in the bowl 4004). The inlet channel 4025 is fluidly connected to the bowl 4004, such as through a rim channel 4026 (shown in FIGS. 113B and 113D), through a rear inlet 4027 (see FIG. 113C), a combination thereof, or any other suitable fluid connection. The rim channel 4026 may include a plurality of openings 4028 (e.g., apertures) that open into the bowl 4004. Air may flow through the openings 4028 in either direction, depending on the vent cycle of the system 4001 (e.g., inside to outside, outside to inside). The openings 4028 may also introduce cleaning compound and/or water, depending on the arrangement of the toilet 4000.

FIGS. 114 and 115 illustrate another exemplary embodiment of a toilet 4050 having an odor abatement system 4051 integrated with a seat assembly. The toilet 4050 can be configured basically the same as the toilet 100, except the inclusion of the system 4051, which is integrated into the hinge mechanism 135 and/or base structure 136 of the toilet 100. The base structure 4052 of the system 4051 is mountable to a base/bowl of the toilet. As shown in FIG. 114, the base structure 4052 includes a first inlet/outlet 4061 in a first side (e.g., lateral side) thereof and a second inlet/outlet 4062 in a second side thereof. Thus, air may flow into and out of each inlet/outlet (e.g., flow can be multi-directional). Disposed in the base structure 4052 is an odor abatement assembly 4055. FIG. 115 illustrates an example of an odor abatement assembly 4055 that includes a housing 4056 having a first opening 4057, a second opening 4058, and a cavity 4059 provided between the first and second openings 4057, 4058. Disposed in the cavity 4059 is an odor abating material 4065, such as a catalyst. For example, the odor abating material 4065 may include titanium dioxide ($TiO_2$). Also disposed in the cavity 4059 is a UV light generator 4066, which radiates UV light while air is pulled over the catalyst to clean the air and remove odors.

The odor abatement assembly 4051 may be configured as a one way system, where air passes in one direction entering the system through one of the first and second openings and exiting the system through the other of the first and second openings. As shown, the odor abatement assembly 4051 is configured as a two way system, where air can pass in two directions. In a first mode of operation, air enters the first opening and exits the second opening. In a second mode of operation, air enters the second opening and exits the first opening. The odor abatement assembly 4051 may include a fan 4067 configured to circulate air through the filter and a motor 4068 configured to power the fan 4067. The motor 4068 can be a one-way or a two-way motor to drive rotation of the fan 4067 in one direction (i.e., clockwise or counter-clockwise) or in both directions.

The toilet 4050 may be configured having a sensor configured to detect an odor or a user of the toilet. Upon detection, the sensor may communicate with a controller, such as via a signal, which in-turn may communication with the odor abatement assembly, such as via another signal. The controller signal may control operation of the odor abatement assembly, such as by initiating the motor to drive the fan in one direction. The toilet may also include a dispensing system, which may be controlled by the controller, such that a cleaning compound may be dispensed in addition to or in place of activating the fan motor. The sensor(s), controller (s), and dispensing system(s) may be configured according to any example disclosed in this application.

A toilet may have a cleaning system and/or an odor abatement system that includes a chemical that encloses a dye pack. During use, the chemical is metered and dispensed to clean the toilet, such as the bowl. Upon the chemical being used up, the dye is released into the bowl to notify the user that the chemical should be replaced. The odor abatement system includes a misting device that mists a chemical (e.g., hydrogen peroxide) to mask or neutralize odors present. The odor abatement system may include sensors, such as VOC sensors, that detect the presence of odors and initiate a cycle to release the chemical.

Improved Toilet Including Seat/Hinge Assembly

FIGS. 116-123 illustrate an exemplary embodiment of a toilet 5000 having an improved geometry, as well as an improved seat assembly. As shown best in FIGS. 116, 121 and 122, the toilet 5000 includes a base assembly 5001 and a seat assembly 5002. The toilet 5000 is configured without an external tank, such as the toilets shown in FIGS. 1 and 124. The arrangement of the toilet 5000 advantageously provides a more compact design that occupies less overall space (e.g., length in a fore and aft direction, volume, etc.) and eliminates elements/components traditionally used in toilets (e.g., tanks). The seat assembly 5002 of the toilet 5000 may also be retained on and/or contained in the bowl (e.g., a rim around the top of the bowl) and may also include a fluid delivery (e.g., irrigation) system integrated therein, such as through the hinge and/or the seat. These aspects and more are described in more detail below.

As shown best in FIG. 123, the base assembly 5001 of the toilet 5000 includes an outer wall 5010 extending around an inner wall 5011 that defines a bowl 5012. The outer and inner walls 5010, 5011 may meet at an upper rim 5013, which may be configured to support the seat assembly 5002. The outer wall 5010 may define a footprint at the bottom end, which may be coupled to a floor, such as via a fastener or other suitable connecting device. A space 5014 (e.g., cavity, open area, etc.) may be provided between the inner and outer walls 5010, 5011, such as to locate other elements of the toilet 5000 discussed below. The outer wall 5010 includes an inlet opening 5015, such as provided in a rear portion of the outer wall as shown in FIGS. 122 and 123, for receiving a line 5003 (e.g., cable, power cable, etc.) and/or a tube 5004 (e.g., hose, pipe, etc.). As shown in FIG. 123, a power cable 5003 and a water supply tube 5004 are routed through the inlet opening 5015 to provide water and power to the toilet 5000. The inner wall 5011 is configured to define the bowl 5012 extending downwardly from the rim in a narrowing manner to form a sump at the bottom of the bowl. The inner wall 5011 includes an outlet opening 5016 (e.g., outlet of the bowl) through which waste and water pass from the sump to another element, such as a passageway 5005 (e.g., a trapway, a trap, etc.) shown in FIG. 120B. The inner wall 5011 may include a support 5017 (e.g., support member) at the bottom end that is configured to contact the floor to support the inner wall 5011 and the toilet 5000. The support 5017 may have a cylindrical shape or any other suitable shape.

The toilet 5000 includes the passageway 5005 configured to carry water and waste from the bowl 5012 (e.g., the sump) to a drain pipe or other suitable element. As shown in FIG. 120, an inlet of the passageway 5005 is fluidly connected to the outlet 5016 in the inner wall 5011, and an outlet of the passageway 5005 is fluidly connected to the drain pipe. The passageway 5005 may route forwardly then upwardly to a height above the water level in the bowl to create a weir that acts as a gas trap for back gases from the drain pipe. Also shown in FIG. 120, the passageway 5005 includes a first loop, which may have a semi-annular shape, having an apex of a bottom that is provided at a height (e.g., elevation, etc.) that is above the water level. The passageway 5005 may include a straight portion extending from the first loop in a generally downward direction. The passageway 5005 may include a second loop, which have a semi-annular shape, extending from the outlet end of the straight portion to the drain pipe.

The rim 5013 of the toilet 5000 may be configured not to have a channel (e.g., a rim channel that carries fluid to the bowl during a flush cycle or cleaning cycle), or the rim 5013 may have a channel 5018 for carrying water during a flush cycle or cleaning compound during a cleaning cycle, as shown in FIG. 120C. The channel 5018 may extend around the entire profile of the rim 5013, such that the channel 5018 is continuous in nature. The channel 5018 includes an inlet opening configured to receive a water supply, such as during a flush cycle of the toilet. The inlet opening of the channel 5018 may be disposed at a rear portion of the rim. As shown in FIG. 120, the rim may include a plurality of outlet openings 5019 (e.g., orifices) that are fluidly connected to the channel 5018 and configured to transfer water from the channel into the bowl 5012 during a flush cycle. Each adjacent pair of outlet openings 5019 may be separated around the inner wall 5011, such that water is introduced into the bowl 5012 in a discontinuous manner (circumferentially). The rim 5013 may include jets (e.g., jet ways) to help transfer water from the channel to the bowl. As an example, each jet may be a cast-in silicone element.

The seat assembly 5002 may be configured to transfer water and/or cleaning compound to the bowl 5012, such as during a flush cycle and/or a cleaning cycle. Thus, the seat assembly 5002 may carry water and/or a cleaning compound during a flush cycle in addition to or in place of the rim channel 5018 discussed above.

As shown in FIG. 117, the seat assembly 5002 includes a cover 5021, a seat 5022, and a hinge assembly 5023 configured to allow the seat 5022 and cover 5021 to rotate independently about the base assembly 5001 between an open and a closed position. The cover 5021 includes a base member that is configured to conceal (e.g., cover) the seat 5022 when both the cover 5021 and the seat 5022 are in the closed position. The cover 5021 includes a pivot member 5024 configured to allow rotation of the cover 5021. As shown, the pivot member 5024 includes a pair of generally concentric and spaced apart cylindrical portions 5025 with a bore extending longitudinally through each cylindrical portion that defines a pivot axis. The bore of the first cylindrical portion is generally concentric to the bore of the second cylindrical portion to form a single coincident pivot axis. The bores of the portions may be generally concentric with the cylindrical portions. The cover 5021 may include a bridge 5026 extending between the two cylindrical portions 5025, such as bottom portions thereof. The cover 5021 may include an arm 5027 extending downwardly from an underside of the cover 5021 for supporting the pivot member 5024, such as to offset the pivot axis away from the cover 5021. Thus, the pivot member 5024 may be disposed on a distal end of the arm 5027 to move the location of the pivot away from the base member.

The seat 5022 has a generally annular shape (e.g., an oval shape with a central opening 5031, which may be oval or circular). The seat 5022 includes a recess 5032 provided in a rearward portion that extends into an underside. The recess 5032 is configured to receive a portion of the hinge assembly 5023. The seat 5022 includes a channel 5033 configured to carry water and/or cleaning compound for use during a flush cycle and/or cleaning cycle. For example, the channel 5033 may extend around the entire seat forming a generally oval shape. One or more than one opening 5034 may extend between the underside of the seat and the channel 5033 for fluid to exit the seat 5022 through each opening 5034. Thus, fluid passes through the channel 5033 and flows from the seat 5022 through each opening 5034 in the underside. The seat 5022 may include a plurality of openings 5034 that are spaced apart, such as to allow fluid to exit into the bowl at various locations corresponding to the placement of the openings to fill and/or clean the bowl. According to another example, the channel 5033 is open at the bottom so that fluid flows out of the channel.

As shown in FIG. 117, the hinge assembly 5023 includes a seat brace 5035 coupled to the seat 5022 and a hinge base 5040 coupled to the seat brace 5035. The seat brace 5035 is configured as a clevis having two spaced apart arms 5036 extending away from a body 5037. The body 5037 of the seat brace 5035 is configured to nest in the recess of the seat 5022 when the seat brace 5035 and seat are coupled together. Each arm 5036 of the seat brace has a bore extending through the arm, such as to receive a pivot. When the seat assembly is fully assembled, the seat brace 5035 is coupled to the pivot member 5024 of the cover 5021, such that the bore in each arm 5036 is aligned with a bore in a cylindrical portion 5025 of the pivot member 5024. A pivot pin or other suitable element may be used to couple the seat brace 5035 to the pivot member 5024 to pivotally couple the seat 5022 and the cover 5021. Also shown in FIG. 117, the cylindrical portions 5025 of the pivot member 5024 of the cover 5021 are configured to nest within a notch provided between the spaced apart arms 5036 of the seat brace 5035. The body 5037 of the seat brace 5035 may include an outlet 5038 that is in fluid communication with the channel 5033 in the seat 5022 when the seat brace 5035 and seat 5022 are coupled together. The seat brace 5035, such as the body 5037, may have an inlet 5039 configured to receive fluid. The inlet 5039 and each outlet 5038 of the seat brace 5035 are fluidly connected, such as through an internal passage.

Also shown in FIG. 117, the hinge base 5040 is configured as a clevis having two spaced apart arms 5041 extending away from a body 5042. The body 5042 of the hinge base 5040 includes an attachment surface configured to mount the hinge base 5040 to the base assembly. As examples, the attachment surface may be coupled to the rim, inner wall, or any other suitable member of the base assembly. Each arm 5041 of the hinge base 5040 has an opening to pivotally couple the hinge base 5040 to the seat brace 5035 and/or pivot member. As shown in FIG. 118, each arm 5041 of the hinge base 5040 is disposed between an arm 5036 of the seat brace 5035 and the pivot member 5024 (e.g., a cylindrical portion of the pivot member). The body 5042 of the hinge base 5040 also includes one or more fluid jetways 5043 through which fluid is dispensed (e.g., discharged, sprayed, etc.). As shown in FIG. 117, each of the three jetways 5043 is configured as a hollow cylindrical projection (e.g., a tubular member) extending from the body 5042 in a direction of discharge. As shown in FIG. 118, the hinge base 5040 include four jetways 5043, with each jetway 5043 configured as a bore extending into the body and configured to discharge fluid in a direction of discharge. Accordingly, the hinge base 5040 may include any number of jetways 5043 having any alignment or orientation to discharge fluid in any desired direction. As shown in FIG. 123, each jetway 5043 may be configured to discharge a fluid into the bowl 5012, such as during a flush cycle or a cleaning cycle. For example, the jetways 5043 may be configured to prime the passageway and/or rinse the interior surface of the inner wall of the bowl 5012.

The seat assembly 5002 may include a slow close damper, such as disposed in the hinge assembly 5023, to retard the closure of the seat 5022 and/or seat cover 5021. For example, the seat assembly 5002 may include a slow close damper disposed in each cylindrical portion 5025 of the pivot member 5024 of the cover 5021.

The toilet 5000 may include a pump 5051 or other suitable device configured to introduce water received from the water supply to the bowl 5012. As shown in FIG. 123, the pump 5051 is provided in a rearward space between the inner and outer walls 5011, 5010. The pump 5051 is configured to provide fluid pressure to move the water received from the water supply tube 5004 to the rim channel 5018 and/or the seat assembly 5002 (e.g., the hinge assembly 5023) located above the pump 5051. The pump 5051 may be an electric pump that is electrically connected to the power cable 5003 connected to an external power source or an internal power source.

The toilet 5000 may include a dispensing system and/or a chemical generator to clean the toilet. According to one example, a chemical generator 5053 may be included in the area housing the pump 5051 (see FIG. 123). For example, a $H_2O_2$ generator may be configured to receive water from the water supply and produce $H_2O_2$ (e.g., a diluted form of $H_2O_2$) that is pumped into the rim for introduction in the bowl. The $H_2O_2$ generator may receive a supply of air, such as from atmosphere, through an opening in the outer wall (e.g., the inlet opening) to utilize the oxygen in forming the $H_2O_2$. The advantage of locating the chemical generator 5053 proximate the pump 5051 is that both can utilize the power supplied by the power cable 5003 without excess cable routing.

The toilet 5000 may include a first fluid conduit 5055 and a second fluid conduit 5056, as shown in FIGS. 116 and 123. By having more than one fluid conduit, the toilet 5000 may advantageously allow for more than one fluid to be dispensed, such as into the bowl 5012. For example, the first fluid conduit 5055 may be configured to transfer water to the bowl during flush cycles and the second fluid conduit 5056 may be configured to transfer a cleaning compound (e.g., $H_2O_2$) to the bowl during cleaning and/or flush cycles.

As shown in FIG. 119, the seat assembly may include bumpers 5058. For example, the seat may include one or more than one bumpers 5058, such as a plurality of bumpers 5058, which are configured to dampen contact of the seat 5022 and the base assembly 5001. Each bumper 5058 may aid in channeling rim wash and/or lock into the base assembly, such as the vitreous material of the rim, such as by having an opening 5034 therethrough. Each bumper 5058 may engage a recess in the underside of the seat to retain the bumper 5058 in place. Each bumper 5058 may extend downwardly beyond a bottom surface of the seat 5022, such that the bumper 5058 contacts the base assembly 5001 prior to or without contact between the seat 5022 and the base assembly 5001.

According to one exemplary manufacturing process, the inner and outer walls 5011, 5010 of the toilet 5000 are formed separately and then coupled together. As shown in FIG. 120A, the outer wall 5010 and the inner wall 5011 are formed independently using a pressure casting method. Each wall may be made from a vitreous material, a polymer (e.g., plastic), a metal, any combination of these materials, or any suitable material. The inner wall 5011 may then be placed within and coupled to the outer wall 5010. According to another exemplary manufacturing process, the inner and outer walls 5011, 5010 of the toilet 5000 are integrally formed as a unitary structure.

FIGS. 124A-127E illustrate another exemplary embodiment of a toilet 6000 configured to provide automatic cleaning. The toilet 6000 includes a base 6001 (e.g., pedestal), a seat assembly 6002 supported by the base 6001, and a tank 6003. The seat assembly includes a cover 6020 and a seat 6021. The cover 6020 is rotatable relative to the seat 6021 and the base 6001 between an up (e.g., open) position (as shown in FIG. 124C) and a down (e.g., closed) position (as shown in FIG. 126A). The seat 6021 is rotatable relative to the cover 6020 and the base 6001 between a down (e.g., closed) position (as shown in FIG. 124C) and an up (e.g., open) position (as shown in FIG. 124B). The seat assembly 6002 may include a base structure 6022 that is mountable to the base 6001 of the toilet 6000, such as an upper surface of a rim of the base 6001.

As shown in FIG. 124C, the cover 6020 includes a base 6024 and a side wall 6025 extending from an outer periphery of the base 6024 downwardly to form a cavity for receiving the seat 6021. The base 6024 of the cover 6020 includes a plurality of ports 6026 in an underside, where each port 6026 is fluidly connected to an inlet 6027 of the cover 6020 (see FIG. 125B). The inlet 6027 is configured to receive a supply of fluid (e.g., water, cleaning compound, etc.), so that the fluid can be dispensed from the ports 6026. As shown in FIG. 125B, the inlet 6027 includes a tubular projection that is configured to engage an outlet 6028 (e.g., a bore) of the base structure 6022 when the cover 6020 is in the closed position (see FIG. 125C). Thus, the inlet 6027 of the cover 6020 is fluidly connected to the outlet 6028 of the base structure 6022 when the cover 6020 is down. As shown in FIG. 124C, the plurality of ports 6026 includes the outer ports provided proximate the outer periphery and side wall 6025 in a spaced apart manner. The outer ports may be configured to dispense a fluid, such as a cleaning compound, onto the seat 6021 to sanitize the seat 6021, such as after a user has been seated on the seat 6021. As shown in FIG. 126B, the plurality of ports 6026 includes the inner ports 6026' provided more centrally in the cover 6020. The inner ports 6026' may be configured to dispense a fluid, such as a cleaning compound, into the bowl 6012 through the opening of the seat 6021. The ports 6026 may be fluidly connected by an inner fluid channel 6038 (see FIG. 126C) that routes through the cover 6020.

The seat 6021 is configured as a generally annular member having a central opening 6029. As shown in FIGS. 126B and 126C, the seat 6021 includes a seating member 6030 configured to support the user and a side member 6031 extending away from an underside of the seating member 6030. The seat 6021 includes a plurality of outlet ports 6032 disposed in an underside of the seat 6021. As shown in the right view of FIG. 1246, the plurality of outlet ports 6032 are disposed around an inner rim 6033, which extends downwardly toward the bowl 6012 and defines the central opening 6029. As shown in FIG. 125A, the seat 6021 also includes an inlet 6034 that is fluidly connected to an outlet 6035 of the base structure 6022, such as to receive a fluid. The seat may include a plurality of inlets (e.g., inlet ports), which may be provide adjacently to one another in a spaced apart manner, (e.g., in place of a single slotted inlet 6034), and the base structure 6022 may include a plurality of outlets (e.g., in place of a single slotted outlet 6035). The base structure 6022 may include a plurality of outlets 6035 (e.g., outlet ports) that are associated with (e.g., configured to fluidly connect to) a single elongated inlet 6034, or vice versa. When the seat 6021 is in the down position, the inlet port(s) 6034 of the seat 6021 are fluidly connected to the outlet port(s) 6035 of the base structure 6022. The ports 6034 may be fluidly connected by an inner fluid channel 6036 (see FIG. 126C) that routes through the seat 6021.

The base structure 6022 of the seat assembly 6002 is fluidly connected to the water supply in the tank 6003 of the toilet. As shown in FIGS. 126A and 126D, the base structure 6022 includes an inlet 6039 that is fluidly connected to a fluid passage 6006 carrying water introduced by the valve body 6007 of the flush valve 6008 during a flush cycle. The fluid passage 6006 may also fluidly connect the rim channel 6009 of the toilet, if provided on the toilet 6000. The base structure 6022 may include fluid channels (e.g., passages, connectors, etc.) that fluidly connect the various outlet ports in the seat assembly (e.g., seat, cover) with the water introduced through the inlet of the base structure 6022 in addition to the outlets 6028, 6035. The base structure 6022 may be configured to mix the water with a cleaning compound, such that the cleaning compound is passed to the various outlet ports of the seat assembly 6002.

The base structure 6022 of the seat assembly 6002 may include a chemical generator for producing a cleaning compound. As shown best in FIG. 127A-1270, an $H_2O_2$ generator assembly 6041 includes an $H_2O_2$ generator 6042, which is disposed in a cavity 6037 in the base structure 6022 and is configured to produce $H_2O_2$ such as from the water received through the inlet 6039 of the base structure 6022. The cavity 6037 may be accessible through an opening 6040 in a side of the base structure 6022 as shown in FIG. 127B. Water (e.g., from the tank through the fluid passage 6006) may be routed into the cavity 6037 for connection with the $H_2O_2$ generator assembly 6041 (see FIG. 126D), such as when the generator 6042 is disposed in an engaged position with a receiver 6051 in the cavity 6037. The receiver 6051 may control the flow of water to the generator 6042 (e.g., the receiver 6051 may include a valve, a diaphragm or other device that controls the flow of water received from the fluid passage 6006). A container 6043 may be located in the cavity 6037. The container 6043 may store cleaning compound, such as generated by the chemical generator. As shown, the container 6043 stores $H_2O_2$ from the $H_2O_2$ generator 6042. Accordingly, the container 6043 is in fluid communication with the $H_2O_2$ generator 6042. Also shown in FIG. 127D, a second receiver 6053 may be provided for controlling the flow of a fluid (e.g., water, cleaning compound from the container 6043, etc.) to the seat assembly, such as to the inlet 6027 in the cover 6020 and/or the inlet 6034 in the seat 6021. A controller 6052 may be provided to monitor the level of cleaning compound in the container and activate the generator to produce more upon the level dropping below a predetermined threshold. The controller 6052 may also control dispensing of the cleaning compound, such as based on an actuator (e.g., any mechanical actuators or sensing based actuators disclosed in this application).

The chemical generator system of toilet 6000 may be configured as a cartridge assembly, as shown in FIG. 127A-1270. As shown, the $H_2O_2$ generator assembly 6041 is configured as a cartridge assembly that includes a carriage 6044, the chemical generator 6042 (e.g., the $H_2O_2$ generator), and the container 6043. According to another example, the container 6043 is replaced with a battery and the container 6043 is located in the cavity of the base structure 6022. The carriage 6044 is configured to receive the generator 6042 and the container 6043 in first and second pockets through opening 6046. The carriage 6044 is shaped to be moved into and out of engagement with the opening 6040 in the base structure 6022. The carriage 6044 may include a cover 6045 that is configured to complement the exterior shape of the seat assembly 6002 (e.g., the base) around the outside opening of the cavity, such that when the carriage 6044 engages the seat assembly, the cover 6045 conceals the opening 6040. The carriage 6044 may include an alignment feature to ensure proper alignment of the carriage 6044 and elements within the cavity.

The container 6043 may be configured to house generated compound (e.g., $H_2O_2$), until the compound is dispensed, such as through the various outlet ports of the seat assembly 6002. According to one example, the container 6043 includes an inlet that is fluidly connected to an outlet of the generator 6042 and an outlet that is fluidly connected to the various outlet ports of the seat assembly 6002, such as through a fluid conduit or other suitable element configured to carry fluid.

FIGS. 128 and 129 illustrate an embodiment of a peristaltic pump assembly 7000. As shown, the assembly 7000 includes a peristaltic pump 7001, a container 7002 for storing a compound (e.g., chemicals), a delivery line 7003, and a supply line 7004. The peristaltic pump 7001 includes a flush chain wheel 7010 and an axel 7011 extending from the pump 7001. The peristaltic pump 7001 can be used with any system disclosed in this application to move fluid through the system. For example, the pump can be used with dispensing systems to move the cleaning compound through the system (e.g., dispensing). The size of the peristaltic pump 7001 can be tailored to the application. The container 7002 is configured to store a fluid and, as shown, includes a base and a lid that is removable from the base to access a reservoir that holds the fluid. The supply line 7004 fluidly connects the container 7002 and the peristaltic pump 7001, such as an outlet of the container 7002 and an inlet of the peristaltic pump 7001. The delivery line 7003 fluidly connects the peristaltic pump 7001 and another device that receives the compressed or pressurized fluid from an outlet of the peristaltic pump 7001.

FIGS. 130-142 illustrate various examples of toilets configured to utilize cleaning systems. FIGS. 130 and 131 illustrate part of a toilet 6100 configured having a tank 6120, a lid 6121 covering the tank 6120, and a chemical dispensing system. The lid 6121 includes an indicator 6122 and an actuator 6123. The indicator 6122 can indicated any useful information to a user of the toilet 6100. For example, the toilet 6100 may be connected to a remote electronic device 6701 (see FIG. 142), such as a smart phone, a tablet, etc., through a wireless method (e.g., Bluetooth), and the indicator 6122 may indicate connectivity. Also, for example, the indicator 6122 may indicate any useful type of useful information regarding the cleaning system, such as whether the cleaning compound is low in level and/or in concentration. As shown in FIG. 131, the lid 6121 is movable (e.g., rotatable) from a closed position (FIG. 130) to an open position (FIG. 131) to provide access to a second indicator 6124, a second actuator 6125, a control 6126, and a cap 6127. A shroud 6128 may cover the cavity in the tank and other components below the shroud 6128 to improve the aesthetics, but the shroud 6128 is optional. The second indicator 6124 indicates the level and/or concentration of the cleaning compound in the chemical dispensing system. The second actuator 6125 allows for a user to activate the chemical dispensing system. The control 6126 may allow a user to change the concentration of the cleaning compound in the chemical dispensing system, such as by rotating the control 6126 between two or more settings, or may control any other aspect of the chemical dispensing system.

FIGS. 132 and 133 illustrate another embodiment of a control system for use with a toilet to control a chemical dispensing system. As shown in FIG. 132, the lid 6221 covering the tank 6220 includes a cover 6222 to the control system. The cover 6222 includes an indicator 6223 shown having a semi-annular shape. The indicator 6223 is illuminated (e.g., by a light source, such as an LED or other) along a length of the semi-annular shape, where the length is proportional to the level and/or concentration of the cleaning compound in the chemical dispensing system. The cover 6222 is rotatable from the closed position (FIG. 132) to an open position (FIG. 133) to reveal further controls of the system. By way of example, the controls may include one or more settings 6225 for controlling concentration of the cleaning compound (e.g., three settings labeled “S1”, “S2” and “S3” are shown in FIG. 133), lock and activate buttons 6226 to lock the chemical dispensing system from dispensing (e.g., for a toilet that otherwise might automatically dispense cleaning compound during a flush cycle) and to run a cleaning cycle, as well as other controls.

FIG. 134 illustrates a cap 6327 for a cleaning system, with the cap 6327 removed from a shroud 6328 to gain access a reservoir 6330 of a container for housing a cleaning/chemical compound. Also shown, a user is adding chemical compound in the form of pellets 6310 (e.g., tablets, discs, pucks, etc.) to reservoir 6330 through the opening thereto. An indicator 6324 alerts the user that the chemical compound is low, and upon the addition of enough pellets 6310, the indicator 6234 alert will cease (e.g., the light source will no longer illuminate).

FIGS. 135-138 show another example of a chemical dispensing system integrated with a tank 6420 of a toilet. FIG. 135 illustrates a cap 6427 for a cleaning system in a closed position to prohibit access to the container 6437 having the reservoir. The cap 6427 may be coupled/decoupled through threads, snaps, or any suitable manner. The shroud 6428 coupled to the tank 6420 is slightly different than the other examples in that an indicator 6424 is in a different location and includes two lights (e.g., one light for displaying the concentration level of the cleaning compound and another light for alerting the user when additional compound should be added) and that a rotary control 6435 has multiple positions (e.g., three positions) for controlling concentration of the cleaning compound. FIGS. 136 and 137 show the shroud 6428 lifted off of the tank 6420 to gain access to the inside of the tank, which contains a fill valve, a flush valve, and a chemical dispensing system. The cap 6427 is closed to the container 6437 of the chemical dispensing system. A connector 6433 in the form of a hook (e.g., hanging member) couples the container to a wall of the tank 6420. The rotary control 6435 may be configured to protrude through an opening 6425 in the shroud 6428 to allow access to the control 6435 with the shroud 6428 coupled in place. A light source 6434 may be located on the container 6437 to illuminate the one or more indicators. The light source 6434 may contain more than one light. FIG. 138 shows the container 6437 and the connector 6433 lifted from the tank 6420 to show that the system can be removed, such as for service.

FIGS. 139 and 140 illustrate an exemplary embodiment of a toilet 6500 having a chemical dispensing system 6503 integrated with a tank 6520 and lid 6521. The lid 6521 includes an opening that receives a cap 6532 of the system 6503. Thus, the system 6503 is shown as a shroudless system. However, the system 6503 can be used with shrouded systems. A fill valve 6510 is located in the tank and supplies water to the system 6503 through an inlet line 6511. The system 6503 includes a container 6530 having a base 6531 and the cap 6532 that detachably couples to the container 6531, such as through threads or a snap feature. The base 6531 defines a reservoir 6534 for holding a cleaning compound, which can be placed in the reservoir 6534 to mix with water (e.g., dissolve). As shown, the system 6503 includes a strainer 6543, which can be coupled to and decoupled from the cap 6532. The strainer 6543 is configured to retain solid chemical compound 6550 (e.g., pellets, tablets, discs, pucks, etc.) while allowing water to pass through to mix with the solid chemical compound. For example, the strainer 6543 may have a plurality of openings 6544 defined by structure, which is shown as interconnected members 6543*a*, 6543*b*. The strainer 6543 can be configured as a mesh or in another suitable manner. The system 6503 may include a diffuser 6535, which is configured to input water and output cleaning compound. As shown the diffuser 6535 includes a tube 6536 (e.g., a U-shaped tube) with an inlet 6537 at one end, an outlet 6537 at the other end, and a plurality of spaced apart openings 6539 between the inlet 6537 and the outlet 6538. The inlet 6537 and the outlet 6538 are located outside the container 6530, and the inlet 6537 is fluidly connected to the inlet line 6511. At least the portion of the tube 6536 having the openings 6539 is disposed in the container 6530 so that water received through the inlet 6537 can flow out the openings 6539 to mix with the cleaning compound in a mixing chamber (e.g., the reservoir, in the strainer, etc.). The cleaning compound can flow back into the openings 6539, such as during a flush cycle/cleaning cycle, and through the outlet 6538 to another component of the toilet. As shown, the system 6503 supplies cleaning compound (e.g., including a chemical compound and water) to a flush valve 6515 through an outlet line 6516, so that the cleaning compound can be used to clean the toilet 6500 such as during a flush cycle and/or a cleaning cycle. The system 6503 may include a cross tube 6540 extending between the ends of the tube 6536 proximate the inlet 6537 and outlet 6538. The cross tube 6540 may be located outside the container 6530.

FIG. 141 shows another example of a toilet 6600 having a chemical dispensing system 6603 integrated with a tank 6520 housing a fill valve 6610 and a flush valve 6615. The container 6630 is configured as an open container having an opening 6631 at the top through which chemical compound 6650 can be added. The system 6603 may include a strainer 6643 for retaining the compound 6650. The system 6603 may include a diffuser 6635, which may be a U-shaped tube with an inlet 6637 and an outlet 6638 that extend out a side, the top, and/or the bottom of the container 6630. The inlet 6637 is configured to receive water from the fill valve 6610. The outlet 6638 supplies cleaning compound to another device, such as the flush valve 6615.

FIG. 142 shows the toilet 6700 configured to connect to a remote electronic device 6701, such as a smart phone, a tablet, a computer, a remote control, or any other suitable device. The toilet 6700 and device 6701 may connect through a wireless method, such as Bluetooth or any other wireless method, to control operation of the toilet 6700 from the remote device 6701. For example, the device 6701 can receive data regarding the chemical dispensing system 6703 in the toilet. Non-limiting examples of this data include level and/or concentration of chemical compound remaining, frequency of cleaning cycles, estimated time until the chemical compound is completely used up, recommended date for next cleaning cycle, estimated remaining life (e.g., days, power, etc.) of any batteries in the system, whether any components of the system are not functioning properly, as well as any other useful information. By way of example, an app (e.g., phone app) can be used to receive this data from the toilet 6700 and send push notifications to the user regarding any of the data, such as alerts. Additionally, the device 6701 may control operation of the toilet remotely, such as to activate a cleaning cycle from a remote location. It is noted that the wireless connectivity can be employed with any toilet disclosed in this application.

FIGS. 143-147 illustrate various examples of control systems for controlling the chemical dispensing systems disclosed in this application. The systems are shown using schematics and can control the saturation (e.g., concentration) of the chemical compound in the cleaning compound. FIG. 143 shows a system 6800 having a first fluid line 6801 (e.g., an inlet), a valve 6802 for controlling flow form the first fluid line 6801 to an inlet of a second fluid line 6804 (e.g., a diffuser) passing through a container 6803 for holding a cleaning compound. FIG. 144 shows a system 6810 having a first fluid line 6811, a valve 6812 for controlling flow form the first fluid line 6811 to a second fluid line 6814 with the valve 6812 being located between the inlet and outlet of the first fluid line 6811. The second fluid line 6814 passes through a container 6813 for holding a cleaning compound. This may be used, for example, as a one flow control valve. FIG. 145 shows a system 6820 having a first fluid line 6821, a valve 6822 at the junction of the first fluid line 6821 and an inlet of a second fluid line 6824, where the second fluid line 6824 passes through a container 6823 for holding a cleaning compound. This may be used, for example, as a regulating valve. FIG. 146 shows a system 6830 having a first fluid line 6831 that splits into two lines 6831*a*, 6831*b*, a valve 6832 for controlling flow form the fluid line 6831*b* to an inlet of each of a second fluid line 6834 and a third fluid line 6835 passing through a container 6833 for holding a cleaning compound. This may be used, for example, as a three-way valve. FIG. 147 shows a system 6840 having a first fluid line 6841 and a valve 6842 for controlling flow form an outlet of each of a second fluid line 6844 and a third fluid line 6845 (each passing through a container 6843 for holding a cleaning compound) into a fourth fluid line 6846 that merges with the first fluid line 6841. This may be used, for example, as another three-way valve.

FIGS. 148-151 illustrate other control systems for toilets having chemical dispensing systems FIG. 148 shows a system 6900 having a container 6901 with a cleaning compound 6902 and a tube 6903 (e.g., diffuser). The tube 6903 has a first section 6903 with an inlet 6904 for receiving water, a second section 6905 with an outlet for supplying a cleaning compound, and a center section 6907 fluidly coupled to and movable relative to the first and second sections 6903, 6905. As shown, the center section 6907 can move to adjust the length of the tube, such as to control dose volume (e.g., concentration, ppm change, etc.). FIG. 149 shows a system 6920 having a container 6921 with a cleaning compound 6922 and a tube 6923 having an inlet 6924 and an outlet 6925. The system 6920 includes an adjuster 6927 (e.g., a rotatable member, crank, etc.) that moves a piston 6926 laterally through a linkage mechanism 6928 to change the volume in the tube 6923. FIG. 150 shows a system 6940 having a container 6941 with a cleaning compound 6942 and a tube 6943 having an inlet 6944 and an outlet 6945. The system 6940 includes an adjuster 6947 that moves a piston 6946 vertically through a linkage mechanism 6948 to change the volume in the tube 6943. FIG. 151 shows yet another system 6960 having a container 6961 with a cleaning compound 6962 and a tube 6963 having an inlet 6964 and an outlet 6965. The system 6960 includes an adjuster 6967 that moves a piston 6966 vertically through a linkage mechanism 6968 to change the volume in the tube 6963.

Numerous embodiments of toilets, dispensers, dispensing systems, and other devices are disclosed in this application. Several such embodiments will now be described, such as, for example, with reference to one or more of the above examples.

According to an exemplary embodiment, a toilet may be provided that is configured to be connected to a water supply. The toilet includes a bowl; a tank configured to retain water; a fill valve disposed in the tank and configured to receive water from the water supply; a container disposed in the tank and fluidly connected to the fill valve, the container configured to contain a chemical compound that is configured to mix with water in a mixing chamber to form a cleaning compound; and a flush valve fluidly connected to the mixing chamber. The flush valve may include a movable member and a valve body fluidly connecting the bowl and the tank. The movable member may move (e.g., translate) relative to the valve body to open the flush valve so that a volume of the cleaning compound is dispensed into the bowl through the valve body.

The toilet may include a removable shroud covering an opening in the tank to conceal the fill valve and the flush valve in the tank, the shroud including an opening for accessing the container without removing the shroud from the tank; and a removable lid covering the shroud. The toilet may include a cap that is received in the opening in the shroud and couples to the container through an attachment feature, wherein the cap provides access to the container when decoupled from the container. The lid may be rotatable relative to the tank through a hinge mechanism.

The volume of the cleaning compound according to one example may be at least 1 ml and not more than 10 ml. The concentration may be controlled by the volume in the mixing chamber, where the volume in the mixing chamber is at least 250 ml and not more than 600 ml.

The toilet may include a sensor disposed in the mixing chamber that measures the concentration of the cleaning compound and communicates the measured concentration to the controller. The controller may communicate wirelessly the concentration of the cleaning compound to a remote smart device. The toilet may include an indicator comprising a light source, where the light source is illuminated by a signal from the controller based on the concentration of the cleaning compound. The toilet may include a battery disposed in the toilet, where the battery is configured to provide electric power to the controller, sensor and the indicator. The controller may communicate wirelessly at least one of the concentration of the cleaning compound or a life of the battery to a remote smart device. The moveable member of the flush valve may be a float, where the valve body engages an opening in the tank and an opening in the bowl. The flush valve may include a guide member, which may be fixed to the valve body for guiding movement of the float relative to the valve body, where the guide member includes an internal chamber configured to receive the cleaning compound.

According to another embodiment, a toilet may be provided that is configured to be connected to a water supply. The toilet includes a dispensing system and a structure that includes at least one of a tank or a bowl. The dispensing system is coupled to the structure, and the dispensing system includes a reservoir located in the structure and configured to hold a volume of a chemical compound, and a dispenser configured to discharge a predetermined amount of the chemical compound upon activation.

The chemical compound may be a solid that dissolves in water from the water supply in the reservoir. The chemical compound may be a liquid.

The reservoir may be a sealed container comprising a base and a lid that is moveable relative to the base to provide access to the reservoir.

A controller that is configured to control activation of the dispenser may be provided. A manual actuator configured to activate the dispenser through the controller may be provided. The manual actuator may be at least one of a button, a switch or a lever. The dispensing system may include a battery that supplies electric power to the controller; and a housing for housing the reservoir, the controller and the battery. The dispensing system may include a sensor configured to activate the dispenser through the controller upon detecting a presence of an object in a detection zone. The sensor may communicate a signal to the controller upon detecting the presence of the object in the detection zone, where the signal causes the controller to activate the dispenser. A power source that provides electric power to at least the sensor and the controller may be provided. The power source may be a battery located within the toilet.

The dispensing system may include a housing for housing the reservoir; a retaining member configured to engage a wall of the structure to couple the dispensing system to the wall, wherein a first end of the retaining member is coupled to the housing and the dispenser is coupled to a second end of the retaining member; and a fluid passage fluidly connecting the mixing chamber and the dispenser. The retaining member may include a hook that is removable from the wall to decouple the dispensing system from the structure. The fluid passage may be disposed inside the retaining member. The dispensing system may include a sensor that is disposed in a body of the dispenser and is configured to activate the dispenser through the controller upon detecting a presence of an object in a detection zone of the sensor, where the body of the dispenser includes a plurality of nozzles through which the predetermined amount of the chemical compound is discharged upon activation of the dispenser.

The dispensing system may include a retaining member supporting the reservoir and configured to engage a wall of the structure to couple the dispensing system to the wall; an elongated spout extending from the retaining member, wherein the dispenser is located in an end of the spout opposite the retaining member; and a fluid passage fluidly connecting the mixing chamber and the dispenser. The spout may be flexible so that a shape of the spout is reconfigurable and moveable relative to the structure to redirect the discharge of the dispenser. The fluid passage may be located in the spout and the fluid passage is flexible so that a shape of the fluid passage generally conforms to the shape of the spout as the spout is reconfigured. The structure may be a tank, and the structure may further include a lid that is configured to cover an opening of the tank, the reservoir, and at least a portion of the retaining member in a coupled position with the tank, where the lid is moveable to an open position that allows access to an inside of the tank and the reservoir.

According to another embodiment, a toilet may include a tank configured to hold water and a dispensing system. The dispensing system may include a container located in the tank and having a reservoir configured to receive water from the tank and configured to hold a chemical compound that mixes with water in the reservoir to form a cleaning compound. The dispensing system may include a dispenser having a body extending through an aperture in a wall of the tank to fix the dispenser to the wall, where the dispenser has at least one nozzle located outside the tank and fluidly connected to the reservoir to discharge a predetermined amount of the cleaning compound upon activation.

The dispensing system may include a fluid conduit fluidly connecting the at least one nozzle and the reservoir, where the fluid conduit extends through the body of the dispenser. The body of the dispenser may include an actuator that is outside the tank and activates the dispenser to discharge the predetermined amount of the cleaning compound. The actuator may include at least one of a knob, a button, a switch, or a lever that is manually activated. The actuator may be manually actuated by rotation, where the dispenser has a plurality of settings based on a rotated position of the actuator, each setting of the plurality of settings configured to discharge a different amount of the cleaning compound. The actuator may include a sensor that activates the dispenser upon detecting a presence of an object in a detection zone. The toilet may include a bowl supporting the tank and a seat that is moveably coupled to the bowl for supporting a user of the toilet, where the detection zone includes a space in front of the tank and above the bowl that would be occupied by the user, and where the dispenser discharges the cleaning compound toward the seat after the user leaves the detection zone. The dispensing system may include an electronic controller that receives a signal from the sensor upon detecting the presence of the object and controls activation of the dispenser based on the signal. The dispensing system may include a battery located in the tank, where the battery provides electronic power to the electronic controller and the sensor. The dispensing system may include a housing that houses the controller, the battery, and the container.

The dispensing system may include an access cap that provides access for refilling the chemical compound in an open position and prevents access in a closed position. The cap may be configured to couple to and decouple from an inlet of the container inside the tank to provide/prevent access to the reservoir so that additional chemical compound can be added to the reservoir through the inlet. The cap may be configured to couple to and decouple from an inlet of the body of the dispenser to provide/prevent access to a passage extending from the inlet to the reservoir. A hinge may couple the cap to the body so that movement of the cap relative to the body about the hinge couples/decouples the cap to/from the inlet of the body. The passage may be sized to receive chemical compound configured as solid pellets that are insertable into the passage through the inlet of the body and into the reservoir from the passage.

The wall of the tank may include an external recess and the body and the at least one nozzle of the dispenser are in disposed in the external recess of the tank.

The body of the dispenser may be fixedly coupled to the wall of the tank, where the nozzle is disposed in a head that detachably couples to the body from outside the tank. The body of the dispenser may be a sleeve that defines a bore therethrough, and wherein a finger extends from the head to engage the bore to couple the head to the body. The finger may be configured to support the chemical compound configured as a solid pellet, where at least one of the finger or the solid pellet engages a diaphragm in the bore to allow water to flow across the solid pellet to form the cleaning compound. A sensor may be disposed in the head and the sensor activates the dispenser upon detecting a presence of an object in a detection zone that is forward of the tank.

According to another embodiment, a toilet may include a tank configured to hold water, a reservoir fluidly connected to the tank and configured to hold a cleaning compound that includes a chemical compound and water from the water supply, and an actuator configured to control a flush cycle of the toilet upon a first activation. The actuator may include at least one nozzle fluidly connected to the reservoir and configured to discharge an amount of the cleaning compound external to the tank upon at least one of the first activation or a second activation.

The actuator may be a trip lever having a base and at least one arm extending radially outward from the base. The base may house the reservoir. The base may include a visual indicator indicating the level of cleaning compound in the reservoir. The visual indicator may include a transparent portion so that the level of cleaning compound in the reservoir can be seen through the transparent portion. The at least one arm may include: a first arm extending radially outward from the base in a first direction; and a second arm extending radially outward from the base in a second direction; where the first arm controls the flush cycle of the toilet upon the first activation and the second arm controls discharge of the cleaning compound through the at least one nozzle upon the second activation. The first arm may be rotatable in a first rotational direction independently of the second arm, where the second arm is rotatable in a second rotational direction independently of the first arm. The first arm may control the discharge of the cleaning compound through the at least one nozzle upon the first activation. The first activation may be achieved by rotating the first arm a first angular travel, and wherein the second activation is achieved by rotating the second arm a second angular travel.

A visual indicator including a light source that illuminates to indicate the level of cleaning compound in the reservoir may be provided. The light source may be configured to illuminate upon the level of the cleaning compound dropping below a threshold level. A size of an illumination from the light source may be proportional to the level of the cleaning compound. The toilet may include a level sensor that detects the level of the cleaning compound and a controller that receives a signal from the level sensor and controls illumination of the light source based on the signal. The toilet may include a concentration sensor that measures a concentration of the cleaning compound and communicates the measured concentration to the controller; where the light source of the visual indicator is a first light source and the visual indicator includes a second light source that is illuminated upon the concentration of the cleaning compound falling below a threshold concentration.

The toilet may include a bowl supporting the tank and a seat that is moveably coupled to the bowl for supporting a user of the toilet, where the at least one nozzle includes a first nozzle and a second nozzle, and where the first nozzle is configured to discharge a first amount of the cleaning compound toward the seat and the second nozzle is configured to discharge a second amount of the cleaning compound toward the actuator. The first amount of the cleaning compound may be discharged upon rotation of the actuator in a first rotation direction, and wherein the actuator activates the flush cycle and discharges the second amount of the cleaning compound upon rotation of the actuator in a second rotational direction. The flush cycle may be activated and the first amount of the cleaning compound is discharged upon rotation of the actuator in a first rotation direction, and wherein the actuator discharges the second amount of the cleaning compound upon rotation of the actuator in a second rotational direction. The actuator may include a first arm extending radially outward from the base in a first direction and a second arm extending radially outward from the base in a second direction, where rotation of the first arm discharges the first amount of the cleaning compound toward the seat and where rotation of the second arm discharges discharge the second amount of the cleaning compound toward the actuator. The first arm may be rotatable in a first rotational direction independently of the second arm, and wherein the second arm is rotatable in a second rotational direction independently of the first arm. Rotation of at least one of the first arm or the second arm may activate the flush cycle of the toilet.

According to another embodiment, a toilet may be provided, which is connected to a water supply. The toilet may include a tank having a chamber configured to hold water from the water supply; a lid that is moveable relative to the tank to provide access to the chamber; and a dispensing system. The dispensing system may include a container located in the chamber and having a reservoir configured to hold a cleaning compound; and a body coupled to the lid and extending through an aperture in the lid, wherein the body is coupled to the container and includes a dispenser that is configured to discharge an amount of the cleaning compound external to the lid and the tank upon activation.

An actuator may be configured to activate the dispenser. The actuator may include at least one of a knob, a button, a switch, or a lever that is manually activated. The actuator may be coupled to the lid remote from the dispensing system. The actuator may be coupled to the body. The actuator may include a sensor that is disposed on or in the body, and wherein the sensor activates the dispenser upon detecting a presence of an object in a detection zone that is above the lid.

A light source may be provided along with a concentration sensor that measures a concentration of the cleaning compound in the reservoir, wherein the light source is illuminated upon the concentration of the cleaning compound falling below a threshold concentration. The light source may be located on the body. The light source may be located on the lid.

A controller may be located in the body for controlling the sensor and the light source.

The actuator may include a manual actuator that is coupled to the lid remote from the body; and a sensor that is disposed on or in the body and configured to activate the dispenser upon detecting a presence of an object in a detection zone that is above the lid; wherein the dispenser is also activated by the manual actuator. The body may be configured to decouple from the lid, and the container is configured to decouple from the body to provide access to the reservoir to refill the reservoir with the cleaning compound. The body may include external threads that thread to internal threads in the lid to couple and decouple the body and lid. The body may be coupled to and decoupled from the container through a threaded connection.

A fill valve may be located in the tank and configured to meter water into the tank from the water supply, wherein an outlet of the fill valve is coupled to an inlet of the container, and wherein the cleaning compound comprises water from the fill valve and a chemical compound.

A strainer may be disposed in the container and configured to contain at least one pellet of a chemical compound that mixes with water to form the cleaning compound, wherein the strainer includes at least one hole to fluidly communicate with the water in the reservoir. The strainer may be configured to contain a plurality of pellets of the chemical compound, and wherein the strainer is removable from the container with the container decoupled from the body.

A fill valve may be located in the tank and configured to meter water to an inlet of the container.

A diffusing tube may be fluidly connecting the inlet of the container and the dispenser, the diffusing tube comprising a plurality of spaced apart openings fluidly connecting an inside of the tube to the reservoir.

A light source and a concentration sensor may be located in the reservoir and configured to measure a concentration of the cleaning compound in the reservoir, wherein the light source is illuminated upon the concentration of the cleaning compound falling below a threshold concentration.

According to another embodiment, a toilet may include a tank for holding water; a lid for covering the tank; and a chemical dispensing system. The chemical dispensing system may include a base that is coupled to or integrated into a top of the lid and a handheld dispenser that detachably docks to the base. The handheld dispenser may include a container having a reservoir configured to hold a cleaning compound comprising a chemical compound and water; a dispenser fluidly connected to the reservoir and having at least one nozzle through which an amount of the cleaning compound is discharged upon activation; and an actuator configured to activate the dispenser.

The container may have a generally cylindrical shape that is sized to fit inside and support a roll of paper, and wherein the base of the container has a pivot that engages the base so that the container is rotatable relative to the base to allow paper to be withdrawn from the roll of paper.

The chemical dispensing system may include a chemical generator, wherein the chemical generator generates the chemical compound. The chemical dispensing may include a power source disposed within the chemical dispensing system, wherein the chemical generator is an electrochemical generator that generates H2O2 using oxygen from air external to the handheld dispenser, the water from the tank, and an electrical current generated by the power source. Each of the chemical generator and the power source is disposed within one of the container or the dispenser.

According to another example, a chemical dispensing may include a base unit configured to receive electric power from a power supply; and an electric powered handheld dispenser comprising: a container having a reservoir configured to hold a cleaning compound including a chemical compound and water; at least one dispenser fluidly connected to the reservoir and having at least one nozzle through which the amount of the cleaning compound is discharged; at least one actuator configured to activate the at least one dispenser to discharge an amount of the cleaning compound; and a battery for supplying electric power to the handheld dispenser; wherein the battery of the handheld dispenser is configured to be recharged by the base unit in a docked position with the base unit.

The base unit may include a structure that includes a plurality of walls that define a compartment configured to retain a paper product, and an opening through which the paper product is configured to be withdrawn. The base unit may include a door that is movable relative to the structure so that the compartment is accessible to resupply the paper product, where the opening may be in the door.

The at least one dispenser may include a spray dispenser located on a first side of the handheld dispenser and configured to dispense the cleaning compound as a spray; and a pump dispenser located on a second side of the handheld dispenser and configured to dispenser the cleaning compound as a foam. The first side and the second side may be opposite sides. The reservoir may be located between the spray dispenser and the pump dispenser, where a first outlet fluidly connects the reservoir and the spray dispenser, and where a second outlet fluidly connects the reservoir and the pump dispenser.

The handheld dispenser may include an electrochemical generator that generates the chemical compound, and wherein the battery supplies electric power to the chemical generator. The chemical compound may be H2O2 that is generated using oxygen from air external to the dispensing system, water, and an electrical current from the battery. The base may include a dehumidifier that is powered by the power supply, wherein the dehumidifier extracts water from air external to the dispensing system; and a water storage compartment in which the water extracted by the dehumidifier is stored in. The reservoir of the handheld dispenser may be fluidly connected with the water storage compartment in the docked position to refill the reservoir with water. The handheld dispenser may include a valve or a diaphragm that is open in the docked position to allow water to flow into the handheld dispenser from the water storage compartment, where the valve or the diaphragm is closed in an undocked position of the handheld dispenser to the base unit to prevent the flow of water from the handheld dispenser. The base unit may include a valve or a diaphragm that is open in the docked position to allow water to flow into the handheld dispenser from the water storage compartment, where the valve or the diaphragm is closed in an undocked position of the handheld dispenser to the base unit to prevent the flow of water from the water storage compartment of the base unit.

The base unit may include a rear wall having a mounting feature that is configured to mount the base unit to a wall; a top wall that is configured to act as a shelf; and a bottom wall that includes a docking feature that receives and retains the handheld dispenser in the docked position.

According to another example, a food sanitizing may include a container configured to hold food therein; a cover for covering the container, and a handheld dispenser. The cover may include a docking feature on a top side of the cover, and a dispensing aperture proximate the docking feature. The handheld dispenser may include a container having a reservoir configured to hold a sanitizing mixture comprising a sanitizer and water; an actuator configured to discharge an amount of the sanitizing mixture upon activation; and a dispenser fluidly connected to the reservoir and having at least one nozzle through which the amount of the sanitizing mixture is discharged. The dispenser may engage the dispensing aperture in the docked position of the handheld dispenser so that the at least one nozzle directs the sanitizing mixture toward the container.

The handheld dispenser may include an electrochemical generator that generates the sanitizer; a dehumidifier configured to extract water from air external to the handheld dispenser, wherein the extracted water is supplied to the container; and a battery for supplying electric power to the electrochemical generator and the dehumidifier.

According to another example, a paper and chemical dispensing system that is configured to mount to a support wall may be provided. The dispensing system may include a housing, a first dispenser, a second dispenser, and an actuator. The housing may have a plurality of walls one of which is configured to mount to the support wall. The housing may have a first compartment configured to store a paper product. The first dispenser may be configured to dispense the paper product from the housing, while the second dispenser may be configured to dispense a cleaning compound external to the housing, where the cleaning compound is stored in the housing. The actuator is configured to activate the second dispenser.

The cleaning compound may be stored in a second compartment of the housing that is separated from the first compartment by one wall of the plurality of walls, where the second compartment is accessible through an opening in the housing to allow the cleaning compound to be refilled. The actuator may include at least one of a knob, a button, a switch, or a lever that is manually activated, and wherein the actuator is located on the housing. The actuator may be manually actuated by rotation, where the second dispenser has a plurality of settings based on a rotated position of the actuator, each setting of the plurality of settings configured to discharge a different amount of the cleaning compound from the second dispenser. The actuator may include a sensor that activates the second dispenser upon detecting a presence of an object in a detection zone. The actuator may activate the first dispenser so that the paper product is dispensed and the cleaning compound is dispensed upon the sensor detecting the presence of the object in the detection zone. The second dispenser may include a first nozzle that is configured to direct a first portion of the cleaning compound toward a portion of the paper product that is dispensed from the housing by the first dispenser, and a second nozzle that is configured to direct a second portion of the cleaning compound away from the portion of the paper product that is dispensed from the housing.

The paper product may be configured as a roll of paper and the second dispenser is configured having a generally cylindrical shaped container that is sized to fit inside and support the roll of paper, and wherein the base of the container has a pivot that engages the housing so that the container and the roll of paper are rotatable relative to the housing to allow sheets of paper of the roll of paper to be withdrawn from the housing through the first dispenser. The housing may have a second compartment that is adjacent the first compartment, wherein the second compartment is configured to house one or more additional rolls of paper. The second dispenser may include a first nozzle that is configured to dispense a first portion of the cleaning compound onto the sheets of paper that being withdrawn from the housing through the first dispenser. The first dispenser may be an aperture, which the sheets of paper are configured to pass through. The second dispenser may include a second nozzle that is configured to dispense a second portion of the cleaning compound in a direction away from the paper product and outside the housing. The second dispenser may include a chemical generator that generates the cleaning compound.

A frame surrounding the housing that is configured to mount directly to the support wall may be provided, where the housing is moveable relative to the frame and is indirectly mounted to the support wall through the frame. The housing may pivot relative to the frame about two pivots between a recessed position and an exposed position, where the two pivots are on opposite sides of the housing proximate the bottom of the housing, where the first compartment is concealed in the recessed position and the first compartment is exposed in the exposed position. The housing may be open on the top so that the first compartment is accessible in the exposed position.

A container having a reservoir configured to hold the cleaning compound may be provided, where the housing includes a second compartment that holds the container and the second compartment is accessible in the exposed position. The container may include a chemical generator that generates the cleaning compound and supplies the reservoir with the cleaning compound. The container may be a sealed container having a base and a lid that is moveable relative to the base to provide access to the reservoir so that the cleaning compound can be refilled into the reservoir.

The dispensing system may include a visual indicator indicating a level of cleaning compound in the reservoir; and a level sensor configured to measure the level of the cleaning compound in the reservoir and communicate the measured level of the cleaning compound to the visual indicator.

According to another example, a paper and chemical dispensing system that is configured to mount to a support wall may be provided. The dispensing system may include a housing having a cavity for housing a roll of paper, a chemical dispenser, and an actuator. The housing may include a mounting member configured to mount to the support wall, a support member configured to support the roll of paper, a moveable member that is moveable relative to the mounting member and the support member to provide access to the cavity to replace the roll of paper, and a dispensing aperture through which the roll of paper is withdrawn from the housing. The chemical dispenser may be configured to dispense a chemical compound; and an actuator may be configured to activate the chemical dispenser.

The support member may include a semi-cylindrical portion and an end portion, where the semi-cylindrical portion is coupled to the mounting member, and where the end portion is coupled to the semi-cylindrical portion opposite the mounting member. The dispensing aperture may be disposed in the end portion of the support member, where the moveable member is generally symmetrically opposite to the support member, such that the moveable member and the support member form two halves of a clam-shell, and where the moveable member rotates relative to the support member about a pivot.

The chemical dispenser may include a dispensing member having at least one nozzle through which the chemical compound is dispensed, where the dispensing member defines the dispensing aperture. The actuator may include a motion sensor configured to detect motion within a zone, so that the chemical dispenser is activated upon detection of motion within the zone. The motion sensor may be located in the dispensing member and detects motion of the paper being withdrawn through the dispensing aperture, where the chemical compound is dispensed onto the paper being withdrawn upon activation of the chemical dispenser. The dispensing member may be annular in shape thereby defining a substantially circular shaped dispensing aperture. Each nozzle of the least one nozzle may be disposed on or in an inner surface of the annular dispensing member with each nozzle configured to direct a portion of the chemical compound inwardly toward a portion of the roll of paper that is being withdrawn through the dispensing aperture. The at least one nozzle may include a plurality of nozzles, where each nozzle of the plurality of nozzles is configured to direct the portion of the chemical compound in a radial direction toward the portion of the roll of paper being withdrawn. The chemical dispenser may include a container having a reservoir for storing the chemical compound therein and the container is fluidly connected to the dispensing member. The container may be disposed in a generally cylindrical holder, which is sized to fit inside the roll of paper, and wherein the holder is detachable from the chemical dispenser and the housing. The chemical dispenser may include a chemical generator for generating the chemical compound, and wherein the chemical generator is located in the holder adjacent to the container. The dispensing system may include a visual indicator indicating a level of chemical compound in the reservoir, and a level sensor configured to measure the level of the chemical compound in the reservoir and communicate the measured level of the chemical compound to the visual indicator. The actuator may include a motion sensor configured to detect motion within a zone, so that the chemical dispenser is activated upon detection of motion within the zone. The motion sensor may be located in the dispensing member and detects motion of the paper being withdrawn through the dispensing aperture, where the chemical compound is dispensed onto the paper being withdrawn upon activation of the chemical dispenser.

The chemical dispenser may include a dispensing member having at least one nozzle on or in an exterior facing surface through which the chemical compound is dispensed, the dispensing member defining the dispensing aperture; and a container having a reservoir for storing the chemical compound therein and the container is fluidly connected to the dispensing member. The chemical dispenser may include a fluid conduit extending through the support member and fluidly connecting the container and the dispensing member. The container may be a sealed container comprising a base and a lid that is removable from the base to provide access to the reservoir so that the reservoir can be refilled with additional chemical compound. The dispensing system may include a visual indicator indicating a level of chemical compound in the reservoir; and a level sensor configured to measure the level of the chemical compound in the reservoir and communicate the measured level of the chemical compound to the visual indicator. The actuator may include a sensor that is disposed on or in the housing, and wherein the sensor activates the chemical dispenser upon detecting a presence of an object in a detection zone that is forward of and above the dispensing aperture.

According to another example, a paper and chemical dispensing system that is configured to mount to a support member may be provided. The dispensing system may include a housing having a cavity for housing a unit of paper, a first dispensing aperture, a container for housing a chemical compound, and a chemical dispenser configured to dispense an amount of the chemical compound upon activation. The housing may include a fixed member and a panel. The fixed member has a base and spaced apart first and second side members extending from opposite sides of the base, where the base is configured to mount to the support member. The panel is moveable relative to the fixed member between an open position, in which the cavity is fully accessible, and a closed position, in which the cavity is inaccessible. The first dispensing aperture is defined by the panel and the fixed member, where a first end of the unit of paper is configured to extend through the first dispensing aperture.

A second dispensing aperture extending through one of the first and second side members may be provided, where a second end of the unit of paper is configured to extend through the second dispensing aperture. The unit of paper may be a roll of paper, such that the first end of the roll of paper is one of an inner end and an outer end and the second end is the other of the inner end and the outer end. The chemical dispenser may be associated with the second dispensing aperture so that the chemical compound is dispensed on the second end of the unit of paper upon activation. The side member having the second dispensing aperture may include an inner surface defining a bore extending through the respective side member to the cavity, where the chemical dispenser is located in or one the inner surface and the unit of paper is configured to extend through the bore. The at least one end of the bore may have a diameter that is greater than a diameter of a central portion of the bore. A motion sensor configured to detect motion within a zone may be provided, so that the chemical dispenser is activated upon detection of motion within the zone. The motion sensor may be located in or on the inner surface and detects motion of the paper being withdrawn through at least one of the bore and the dispensing aperture, where the chemical compound is dispensed onto the paper being drawn through the bore upon activation. The chemical dispenser may include at least two nozzles disposed radially around the inner surface.

The container may include a lid and a body defining a reservoir for holding the chemical compound, where the lid is moveable relative to the body to provide access to the reservoir to refill the reservoir with the chemical compound. The container may be located in or coupled to the base of the fixed member. The container may be removable from the base of the fixed member. The container may be located in or coupled to one of the side members of the fixed member. The container may be removable from the associated side member of the fixed member.

The panel may be configured to move in a clockwise direction relative to the fixed member toward the open position and the panel is configured to move in a counterclockwise direction relative to the fixed member toward the closed position. The panel may include a first side edge that rides in a recessed groove in an interior facing surface of the first side member; and a second side edge that rides in a recessed groove in an interior facing surface of the second side member; where the second side edge is opposite the first side edge. The panel may be semi-cylindrical in shape and each recessed groove of the first and second side edges is semi-annular in shape, such that each recessed groove guides movement of the panel.

A mechanical actuator that is configured to activate the chemical dispenser may be provided, where the mechanical actuator comprises at least one of a knob, a button, a switch, or a lever that is manually activated by a user.

A sensor that is disposed on or in the housing may be provided, where the sensor activates the chemical dispenser upon detecting a presence of an object in a detection zone external to the housing.

A motion sensor that is disposed on or in the housing may be provided, where the sensor is configured to activate the chemical dispenser upon detecting a motion of the paper within a zone internal to the housing.

According to another embodiment, a standalone paper and chemical dispensing system may be provided, which is configured to mount to a support member. The dispensing system may include a housing having a base and a chute extending laterally from the base, the base having a closed bottom and an open top leading to a cavity for housing a unit of paper; a first dispensing aperture in the bottom of the base, wherein a first end of the unit of paper is configured to extend through the first dispensing aperture; a second dispensing aperture in the chute, wherein a second end of the unit of paper is configured to extend through the second dispensing aperture; a container for housing a cleaning compound; and a chemical dispenser configured to dispense an amount of the cleaning compound upon activation.

The dispensing system may include the unit of paper, where the unit of paper is a roll of paper, such that the first end of the roll of paper is one of an inner end and an outer end and the second end is the other of the inner end and the outer end; and a lid configured to detachably couple to the housing to close the top of the base and conceal the unit of paper in the cavity.

The chemical dispenser may be associated with the first dispensing aperture to dispense the amount of cleaning compound onto the first end of the unit of paper. The chemical dispenser may include at least one nozzle on or in at least one of an inner surface defining the first dispensing aperture or an exterior surface facing away from the bottom.

The dispensing system may include at least one of: a mechanical actuator that is configured to activate the chemical dispenser, wherein the mechanical actuator comprises at least one of a knob, a button, a switch, or a lever that is manually activated by a user; a sensor that is configured to activate the chemical dispenser upon detecting a presence of an object in a detection zone external to the housing; and/or a sensor that is configured to activate the chemical dispenser upon detecting a motion of the paper within a zone internal to the housing. The container may be located in the base of the housing between the bottom of the base and a support member that defines the cavity for housing the unit of paper and supports the unit of paper.

The chemical dispenser may be associated with the second dispensing aperture to dispense the amount of cleaning compound onto the second end of the unit of paper. The chemical dispenser may include at least one nozzle on or in at least one of an inner surface defining the second dispensing aperture or an exterior surface facing away from the chute. The dispensing system may include at least one of: a mechanical actuator that is configured to activate the chemical dispenser, wherein the mechanical actuator comprises at least one of a knob, a button, a switch, or a lever that is manually activated by a user; a sensor that is configured to activate the chemical dispenser upon detecting a presence of an object in a detection zone external to the housing; and/or a sensor that is configured to activate the chemical dispenser upon detecting a motion of the paper within a zone internal to the housing. The chute may have a generally rectangular tubular shape and a fluid conduit fluidly connects the at least one nozzle with the container.

According to another embodiment, a chemical dispensing system may be provided, which is configured to mount to a support member. The dispensing system may include an elongated structural member, a container, a chemical dispenser, and a flexible fluid conduit. The elongated structural member may include and a hollow portion and a first end configured to mount to the support member. The container has a reservoir for housing a cleaning compound. The chemical dispenser may be configured to detachably dock with the structural member and dispense an amount of the cleaning compound upon activation, wherein the chemical dispenser is movable relative to the structural member. The flexible fluid conduit may fluidly connect to the reservoir and the chemical dispenser.

The hollow portion may be located at a second end that is opposite the first end, such that a base of the chemical dispenser docks with the second end, where the structural member may be configured to support a roll of paper. The fluid conduit may be coupled to the base of the chemical dispenser and extends through the hollow portion. The chemical dispenser may include at least one nozzle located in an end opposite the base; and a mechanical actuator that is configured to activate the chemical dispenser, wherein the mechanical actuator comprises at least one of a knob, a button, a switch, or a lever that is manually activated by a user. The container may be located in the first end of the structural member and comprises a lid and a body defining the reservoir, where the lid is removable from the body to provide access to the reservoir to refill the reservoir with the cleaning compound.

The structural member may include a second end that is configured to mount to the support member at a location that is different than the first end, where the hollow portion is located between the first and second ends. The structural member may be configured as one of a grab bar or a towel bar that includes a central portion that extends transverse to and between the first and second ends. The central portion may include a missing section, such that the chemical dispenser fills the missing section in a docked position with the structural member. The fluid conduit may be coupled to a first side of the chemical dispenser and extends through the hollow portion, and wherein at least one nozzle located in a second side of the chemical dispenser opposite the first side, the at least one nozzle may be concealed by the structural member in the docked position, and the chemical dispenser may include a mechanical actuator that is configured to activate the chemical dispenser. The structural member may include an aperture located at a transition between the central portion and an end, where the chemical dispenser may be disposed in the aperture in a docked position, and where the chemical dispenser may include a mechanical actuator that is configured to activate the chemical dispenser.

According to another embodiment, a toilet may be fluidly connected to a water supply. The toilet may include a bowl; an inlet line that is fluidly connected to the water supply to receive water; a seat that is moveably coupled to the bowl for supporting a user; and a dispensing system. The dispensing system may include a container having a reservoir that is configured to receive water from the inlet line and mix with a chemical compound that mixes with water in a mixing chamber to form a liquid cleaning compound; a retaining structure coupled to the seat and retaining the container; and a dispenser configured to discharge an amount of the liquid cleaning compound upon activation.

The container may include a base and a lid that is removable from the base to provide access to the reservoir to refill the chemical compound. The chemical compound may be a liquid. The chemical compound may be a solid.

A motor may be provided that is configured to move the dispenser relative to the seat and retaining structure. The motor may also pump the liquid cleaning compound to the dispenser upon activation. A manual actuator may configured to activate the dispenser through the controller. The manual actuator may be at least one of a knob, a button, a switch or a lever. A battery may be provided to supply electric power to the motor. The battery and the motor may be retained to the seat by the retaining structure. The toilet may include a sensor configured to activate the dispenser upon detecting a presence of an object in a detection zone. The sensor may detect the presence of a user seated on the seat and the sensor activates the dispenser after the user no longer is seated on the seat.

The dispenser may discharge the liquid cleaning compound onto an inner surface of the bowl. The dispenser may include a fixed portion, an outer portion and an inner portion nested with the outer portion, where the inner and outer portions are moveable relative to the fixed portion and relative to one another. The outer portion may include a base and a pair of spaced apart legs extending away from the base, where the inner portion is disposed between the legs and supported by the base. The outer portion may include a first foot extending inwardly from one leg of the pair of legs and a second foot extending inwardly toward the first foot from the other leg of the pair of legs, where the first foot and the second foot retain the inner portion. The inner portion may include at least one nozzle configured to discharge the cleaning compound having a first spray pattern, where the outer portion includes at least one nozzle configured to discharge the cleaning compound having a second spray pattern. The dispenser may be operable in: a first mode in which the inner portion is extended relative to the fixed portion and the outer portion and the cleaning compound is discharged in the first spray pattern; and a second mode in which the outer portion is extended relative to the fixed portion and the inner portion and the cleaning compound is discharged in the second spray pattern. The dispenser may be operable in a third mode in which both the inner portion and the outer portion are extended relative to the fixed portion and the cleaning compound is discharged in both the first spray pattern and the second spray pattern.

The dispenser may include a base fixed to at least one of the seat and the bowl; and a body having a proximate end that is rotatably coupled to the base so that the body is rotatable relative to the base about a longitudinal axis, where the body includes a plurality of nozzles disposed on or in a distal end and configured to discharge the cleaning compound. The body may be configured to move along the longitudinal axis relative to the base between an extended position, in which a portion of the body is telescopically extends beyond an end of the base proximate the body, and a retracted position, in which at least the portion of the body is telescopically withdrawn within the base. The body may include a generally planar spray face at the distal end and having the plurality of nozzles. The body may include a first spray face on a first side of the distal end and a second spray face on a second side of the distal end, wherein the first spray face includes the plurality of nozzles that direct the cleaning compound into a first spray pattern, where the second spray face includes one or more additional nozzles that direct water into a second spray pattern. At least one of the first spray face or the second spray face may include a first surface having at least one nozzle and a second surface that is at an oblique angle relative to the first surface and includes at least one nozzle. The body may include an upper surface having the plurality of nozzles configured to discharge the cleaning compound as a first spray pattern away from the upper surface and transverse to the longitudinal axis; and an end surface having a spray opening that directs at least one of the cleaning compound and water as a second spray pattern along the longitudinal axis. The first spray pattern may be a mist and the second spray pattern is a stream. The body may be telescopically coupled to the base so that the body is extendable/retractable relative to the base. The body may include a first surface including the plurality of nozzles; and a second surface configured at an angle relative to the first surface; where a first nozzle or a first set of nozzles of the plurality of nozzles is configured to direct the cleaning compound toward the second surface such that the cleaning compound from the first nozzle or the first set of nozzles deflects off the second surface. A second nozzle or a second set of nozzles of the plurality of nozzles may be configured to direct the cleaning compound without contacting the second surface of the body. The second surface may be an atomizing plate that is configured to vibrate.

According to another embodiment, a toilet may include a bowl; a seat that is moveably coupled to the bowl for supporting a user; a container comprising a base and a lid that is removable from the base to provide access to a reservoir that is configured to house a liquid cleaning compound comprising water and a chemical compound; a retaining structure coupled to the seat and retaining the container; and a dispenser configured to discharge an amount of the liquid cleaning compound upon activation; wherein the container is removable from the retaining structure.

The seat includes an aperture through which the container is accessible to remove the container from the retaining structure and the seat, and the toilet further comprises a cap that detachably couples to the seat to conceal the aperture and the container. The toilet may include an inlet line that fluidly connects the container to a water supply; and an outlet line that fluidly connects the reservoir and the dispenser. The dispenser may discharge the liquid cleaning compound into at least one of water housed in the bowl and onto an inner surface of the bowl. The toilet may include a pump contained in the seat and configured to move the liquid cleaning compound from the reservoir to the dispenser; and a power supply that supplies electric power to the pump.

According to another embodiment, a toilet may be provided, which is configured to receive a supply of water. The toilet may include a structure comprising a bowl; a seat that is moveably coupled to the bowl for supporting a user; a container having a reservoir that is configured to house a liquid cleaning compound comprising water and a chemical compound; a wand-type dispenser that is moveable relative to the structure and is configured to discharge an amount of the liquid cleaning compound upon activation; and a flexible conduit connecting the dispenser to the structure.

The container may be located within the dispenser. The flexible conduit may supply the water to the dispenser for the liquid cleaning compound. The dispenser may include an electrochemical generator that generates the chemical compound and supplies the chemical compound to the container. The dispenser may include a power supply for supplying electric power to the electrochemical generator. The dispenser may include an inlet and a lid that detachably couples to the inlet to provide access to a reservoir of the container to refill the chemical compound.

The container may be located in the structure outside of the dispenser, where the flexible conduit supplies the cleaning compound to the dispenser. A disposable attachment having a first end and a second end may be provided, where the first end of the disposable attachment is configured to be held by a retaining element of the dispenser, and where the cleaning compound is discharged through the second end of the disposable attachment. The dispenser may include a first actuator that moves the retaining element between a locking position, in which the retaining element retains the attachment to the dispenser, and a non-locking position, in which the attachment is released from the dispenser. The second end of the attachment may include a scrubbing element. The dispenser may include a second actuator for controlling operation of the dispenser. The dispenser may include an electrochemical generator that generates the chemical compound supplied to the container. The dispenser may include a flow control that is controlled by the second actuator that regulates the flow of the cleaning compound from the container to an outlet in the dispenser.

The dispenser may include a base coupled to the flexible conduit; and a housing having a first end and a second end, wherein the housing is rotatably coupled to the base at a location between the first and second ends so that the housing can rotate relative to the base, where the first end includes at least one nozzle that is configured to discharge the cleaning compound in a first mode of operation, and where the second end includes at least one nozzle that is configured to discharge water in a second mode of operation. The base may be a clevis such that the housing rotates about a pivot axis defined by two concentric pivots. The flexible conduit may supply the water to the dispenser for the liquid cleaning compound and the water is routed through at least one of the two pivots. The container may be located within the dispenser. The dispenser may include an electrochemical generator that generates the chemical compound supplied to the container. The structure may include a tank that is configured to hold a volume of water that is filled by the supply of water, where the flexible conduit is coupled to the tank to supply water from the tank to the dispenser. An actuator may be provided that activates the dispenser in the first mode of operation when the first end is distal the base and the second end is proximate the base, and wherein the actuator activates the dispenser in the second mode of operation when the second end is distal the base and the first end is proximate the base. The actuator may be a mechanical actuator that includes at least one of a knob, a button, a switch, or a lever that is manually activated by a user. The actuator may be an electronic actuator comprising at least one of a touchpad or a sensor.

The structure may include a tank that is configured to hold a volume of water provided by the supply of water, wherein the flexible conduit comprises a hose that is coupled to the tank to supply water from the tank to the dispenser; and a housing coupled to an outside of a wall of the tank and configured to house the dispenser. The housing may include a first half, a second half coupled to the first half forming a cavity therebetween, and a support extending between the first half and the second half, the support being configured to retain the dispenser in place. One of the first half and the second half may be fixedly coupled to the tank and the other of the first half and the second half is detachably coupled to the fixedly coupled half. The support may form a cup with the first half and the second half to hold the dispenser.

The dispenser may include a housing comprising a first end and a second end, wherein the second end is coupled to the flexible conduit and the container is housed in the housing; a head recessed into a bore in the first end of the housing in a retracted position and extending beyond the first end in an extend position to reveal a first set of nozzles configured to discharge the amount of the liquid cleaning compound. The dispenser may include a locking mechanism that retains the head in the retraced position relative to the housing. The locking mechanism may include a tab disposed on a base of the head that is configured to engage an annular channel in the housing, where the channel is located between a top wall and a bottom wall of the housing. The top wall may include a longitudinal groove extending into the channel, where the groove is sized to complement the tab so that the tab can pass into the channel through the groove, then upon relative rotation of the head relative to the housing, the tab is rotated into a locking position to be retained by the top wall and the bottom wall. The dispenser may include a biasing member that biases the head in a longitudinal direction away from the bottom wall of the housing. The housing may include a second set of nozzles that are configured to discharge water.

The dispenser may include a housing that houses the container, the housing comprising a first end and a second end, which is coupled to the flexible conduit; a first outlet in the housing that is configured to discharge the cleaning compound in a first pattern; and an actuator disposed on the first end of the housing for controlling discharge of the cleaning compound through the first outlet. The first pattern may be cylindrical in shape. The dispenser may include a second outlet in the housing that is configured to discharge the cleaning compound in a second pattern. The first pattern may be a cylindrical in shape, where the second pattern is semi-cylindrical in shape. The dispenser may include a second actuator that controls the discharge of the cleaning compound through the second outlet. The actuator may be a button that is depressible and upon being depressed actuates discharge of the cleaning compound through the first outlet.

The dispenser may include a base that is coupled to the flexible conduit, the base having an outlet; and a spray head rotatably coupled to the base, wherein the spray head includes a first outlet, which is in fluid communication with the outlet of the base in a first position of the spray head to discharge water in a first spray pattern, and a second outlet, which is in fluid communication with the outlet of the base in a second position of the spray head to discharge the amount of the liquid cleaning compound in a second spray pattern. The dispenser may include a valve for controlling the flow of water in the first position and the cleaning compound in the second position; and an actuator for controlling opening/closing of the valve. An H2O2 generator may be located in the dispenser and is configured to produce H2O2 using oxygen from air external to the dispenser, water supplied through the flexible conduit, and an electrical current generated by a power source. The spray head may include a third outlet, which is in fluid communication with the outlet of the base to discharge the H2O2 in a third position of the spray head. The dispenser may control an actuator for controlling the flow of at least one of water in the first position, the cleaning compound in the second position, or the H2O2 in the third position. The dispenser may include a valve for controlling the flow of at least one of water in the first position, the cleaning compound in the second position, or the H2O2 in the third position, where the actuator opens/closes the valve. The dispenser may include an electrochemical generator that generates the chemical compound and supplies the chemical compound to the container; and a power supply for supplying electric power to the electrochemical generator.

According to another embodiment, a toilet may be provided, which is configured to receive a supply of water. The toilet may include a structure that includes a bowl, a seat assembly, a container, and a wand-type dispenser. The seat assembly may include a support coupled to the structure and a seat that is rotatably coupled to the support for supporting a user. The container has a reservoir that is configured to house a cleaning compound comprising water and a chemical compound. The wand-type dispenser may be configured to dock within and undock from the seat assembly such that the dispenser is moveable relative to the structure and the seat assembly in an undocked position, where the dispenser is configured to discharge an amount of the cleaning compound upon activation.

The dispenser may be cordless and may be configured to dock with the support of the seat assembly in a docked position. The support may include a bore that is configured to receive the dispenser in the docked position, where the support includes an actuator that is configured to release the dispenser to undock the dispenser. The bore may be substantially cylindrical in shape and is in a side of the support, where the dispenser has a complementary shape so that the dispenser fits in the bore with an end of the dispenser being generally flush with the side of the support. The actuator may be a button or a switch. The toilet may include a locking mechanism configured to retain the dispenser in the bore in the docked position and a spring configured to bias the dispenser out of the bore so that when the dispenser is released by the actuator, where the dispenser is moved by a force of the spring such that a portion of the dispenser is outside of the bore. The dispenser may include a first outlet that dispense the cleaning compound and a second outlet that is configured to dispense water, where the dispenser includes a water reservoir. The first outlet may be disposed in a first end of the dispenser, where a second end of the dispenser includes an inlet that is configured to receive water from the support when in the docked position, wherein the support receives water from the supply of water. The support may be fluidly connected with the tank through a fluid channel. The side of the support may be a top side of the support that faces upwardly, such that the dispenser can be withdrawn from the top side and the first outlet is directed above the bowl and support, where one of the structure and the support include a second bore that receives the dispenser in a second position, in which the first outlet is directed into the bowl.

A conduit may couple the dispenser to the seat assembly. The conduit may include a hose configured to fluidly connect the dispenser to water from the supply of water. The conduit may include an electrical cord that electrically connects the dispenser to a power supply. The seat may include a base member having an upper surface for supporting the user and a cavity that is configured to receive the dispenser in the docked position; and a cover member that moves relative to the base between a closed position, in which the cavity is concealed, and an open position, in which the cavity is accessible. The cavity may be in a front side of the base member that is opposite a rear side of the base member, where the rear side is rotatably hinged to the support of the seat assembly through a hinge assembly. The seat may include a fluid passage that is routed inside the base member and is fluidly connected to the water through a hinge assembly rotatably coupling the seat and the support, where the conduit routes into the cavity and is fluidly connected to the fluid passage. The support may include a base that is coupled to the bowl and includes a cavity that is configured to receive the dispenser in the docked position;

and a cover that moves relative to the base between a closed position, in which the cavity is concealed, and an open position, in which the cavity is accessible; where the conduit is routed through the cavity. The cover may form all of a top surface of the support in the closed position. The cavity may be a notch in a top surface of the base so that the cover forms only a portion of a top of the support in the closed position. The base may include a fluid passage that is fluidly connected to the water, and a hinge assembly rotatably coupling the seat and the support.

According to another embodiment, a toilet may be provided, which is configured to receive a supply of water from an inlet line. The toilet may include a structure comprising a bowl, a housing, and an outline line. The housing may include an inlet configured to directly couple to the inlet line to fluidly connect the inlet to the inlet line, a reservoir for housing a chemical compound that mixes with water from the inlet to form a cleaning compound, and an outlet configured to output the cleaning compound, and an outlet line fluidly connecting the outlet of the housing and the structure to introduce the cleaning compound into the structure.

The housing may be located external the structure. A container may be provided that is housed in and removable from the housing, where the container is configured to hold the chemical compound and includes a base and a lid that is removable from the base to provide access to an inside of the container to refill the chemical compound. The base may include one or more holes therein to allow water to mix with the chemical compound through the one or more holes. The lid may be rotatably coupled to the base through a hinge or a pivot. A flush mechanism may be provided, where the outlet line fluidly connects the outlet of the housing and the flush mechanism, such that the flush mechanism receives the cleaning compound and uses the cleaning compound to flush the contents of the bowl from the toilet. The structure may include a tank for holding a volume of water therein for use during a flush cycle, where the outlet line is directly connected to the outlet of the housing and an inlet of the tank. A fill valve may be disposed in the tank, where the inlet of the tank is an inlet of the fill valve so that the cleaning compound is introduced into the tank through the fill valve.

The inlet line may be detachably connected to the inlet of the housing, and the outlet line may be detachably connected to the outlet of the housing. A lid may be provided that detachably couples to the housing to close an open top of the housing to seal the cleaning compound in the sealed lid and housing. The reservoir may be defined by a compartment of the housing that is moveable relative to a base of the housing, wherein the base includes the inlet and the outlet. The compartment may be configured to pivot relative to the base of the housing between a closed position and an open position, in which the reservoir is accessible. The housing may be generally cylindrical in shape with a semi-cylindrical opening that receives a generally cylindrical compartment in the closed position.

The inlet of the housing may include an inlet connector that is configured to detachably couple to the inlet line, and the outlet of the housing includes an outlet connector that is configured to detachably couple to the outlet line. The inlet connector may include a sleeve having an internal passage and external threads that is configured to thread to threads of the inlet line, and wherein the outlet connector includes an internally threaded bore that is configured to thread to threads of the outlet line.

A dispenser may be configured to dispense an amount of cleaning compound onto the structure, where the outlet may include a first outlet that fluidly connects the dispenser with cleaning compound from the housing. The structure may include a tank, and where the outlet may include a second outlet that fluidly connects the tank with cleaning compound form the housing. The dispenser may be configured to discharge an amount of the cleaning compound onto the seat after detecting presence of a user on the seat and detecting that the user is no longer seated on the seat.

The chemical compound may be a solid. The solid chemical compound may include one or more flow beads.

According to another embodiment, a toilet may be provided, which is configured to receive a supply of water. The toilet may include a tank configured to hold the water, the tank having a vent hole; a bowl fluidly connected to the tank through a fluid channel; and an integrated flush valve and ventilation system that includes a valve body, a housing, a fan, a motor, and a vent. The valve body fluidly connects the tank and the fluid channel. The housing may be disposed in the tank and moveable relative to the valve body during a flush cycle to pass the water from the tank into the bowl through the fluid channel, the housing having a bore that is in fluid communication with the fluid channel at a first end. The fan is disposed in the bore and operable in at least one of a first mode or a second mode. The motor is disposed in the bore and configured to rotate the fan in at least one of the first mode or the second mode. The vent may have an inlet coupled to a second end of the housing and the vent may be in fluid communication with the bore. The vent has an outlet that is in fluid communication with the vent hole in the tank. In the first mode, the fan moves air from the bowl to the vent through the bore and the fluid channel to be vented through the vent hole in the tank. In the second mode, the fan moves air from outside the tank through the vent hole to the bowl through the bore and the fluid channel.

The fan may be operable in both the first mode and the second mode. A filter comprising a filtering material may be provided in the system, where the filter is disposed in either the bore or the vent to filter fluid moving across the filter between the vent and the bowl. The filtering material may include at least one of a zeolite, a charcoal, or a hydroxyl. The filtering material includes the zeolite according to one example. The filter may be disposed in the inlet of the vent and the filter is sized to occupy the entire cross-section of a vent passage extending between the inlet of the vent and the outlet of the vent. A cap may be provided to couple to the second end of the housing, where the vent couples directly to the cap to seal the flow of fluid between the vent and the housing. The filter may be disposed in the bore of the housing.

The housing may include a buoyant element. A power source may be provided to supply electric power to the motor. The power source may be a battery that is located in the tank above a water line of the water housed in the tank. A sensing system may be provided having a VOC sensor that is located in or around the bowl that detects organics, where at least one of the first mode or the second mode is activated based on a detection by the VOC sensor. The VOC sensor may be located in or on a rim of the toilet that is above the bowl. A seat assembly may be provided having a seat and a seat cover each of which is independently rotatable relative to the bowl, where the VOC sensor is located in or on the seat assembly. The VOC sensor may be located in or on the seat cover in a central portion such that the VOC sensor detects organics in the bowl through an opening in the seat in a closed position of the seat and the seat cover. The sensing system may include a user detection sensor that is configured to detect the presence of a user seated on the seat, and wherein the user detection sensor activates at least one of a flush cycle of the toilet or the fan to operate in the first mode or the second mode after the user is no longer seated on the seat. The user detection sensor may be located in or on the seat cover to detect the user seated on the seat in an open position of the seat cover. The user detection sensor may be located on or in a side of the tank facing laterally outward, so that that a zone of detection of the user detection zone is beside the tank. The sensing system may include a remote actuator that is located remotely from the toilet, and the remote actuator may include, for example, a first sensor that is configured to activate a flush cycle of the toilet based on a detected presence or a detected motion within a first zone of detection, and a second sensor that is configured to activate the fan to operate in one of the first mode or the second mode based on a detected presence or a detected motion within a second zone of detection. The remote actuator may include a third sensor that is configured to activate the fan in the other of the first mode or the second mode based on a detected presence or a detected motion within a third zone of detection.

According to yet another embodiment, a tankless toilet may be provided, which is configured to receive water from a water line. The tankless toilet may include a base, a seat assembly, and a hinge assembly. The base may include a bowl and a rim above the bowl. The seat assembly may include a seat configured to support a user of the toilet in a down position, wherein the seat includes a fluid channel and a plurality of holes in the underside fluidly connected to the fluid channel. The hinge assembly allows for rotation of the seat and includes a seat brace and a hinge base. The seat brace is coupled to the seat and has a fluid inlet and a fluid outlet, which is configured to direct fluid to the fluid channel of the seat. The hinge base is coupled to the base and has an inlet configured to receive water from the water line. The hinge base may also have a first outlet fluidly connected to the inlet and configured to deliver water to the fluid inlet of the seat brace. Water may be configured to be discharged from the fluid channel into or onto the bowl in a flush cycle.

The seat assembly may include a seat cover pivotally coupled to the hinge assembly to allow rotation of the seat cover relative to the seat, wherein the seat cover includes a pivot member that is pivotally coupled to the seat brace of the hinge assembly. The seat brace may include a body and two spaced apart arms extending from the body, wherein the pivot member includes two spaced apart cylindrical portions, and wherein each arm is pivotally coupled to an associated cylindrical portion of the pivot member.

The hinge base may include a body having the inlet and the first outlet; a first arm that extends from the body and is configured to pivotally couple to the seat brace through a first pivot member; and a second arm that is spaced apart from the first arm, extends from the body and is configured to pivotally couple to the seat brace through a second pivot member. At least one of the first pivot member or the second pivot member may fluidly couple the first outlet of the hinge base to the fluid inlet of the seat brace. A flexible conduit may fluidly connect the first outlet of the hinge base to the fluid inlet of the seat brace. The hinge base may include a second outlet in the body, wherein the second outlet is configured as a jetway that directs water onto or in a rear portion of the bowl. The hinge base may include a third outlet in the body and a fourth outlet in the body, wherein each of the third and fourth outlets is configured as a jetway that directs water onto or in a rear portion of the bowl, and wherein each jetway is configured to do at least one of priming the passageway or rinsing an interior surface of the bowl.

The base may include an inner wall that defines the bowl; and an outer wall extending around the inner wall, so that the inner wall and outer wall meet at the rim, wherein a cavity is located between the inner and outer walls. The bowl may have a sump in a bottom of the bowl and an outlet facing forward from the sump. A trapway may be located at least in part in a forward portion of the cavity and having an inlet that is fluidly connected to the outlet of the bowl, wherein the trapway may include a semi-circular portion and a down leg, the semi-circular portion extending above a water line in the sump. The down leg may be configured to be fluidly connected to a drain and is located in a side portion of the cavity. A pump may be provided having an inlet that is fluidly connected to the inlet line and an outlet that is fluidly connected to the inlet of the hinge base through a fluid conduit, wherein the pump is configured to increase the pressure of the water received from the inlet line so that the water delivered to the hinge base has a higher pressure than the water from the inlet line. The pump may be an electric pump that is located in a rear portion of the cavity, and wherein the electric pump is connected to a power supply. A dispensing system may be provided having a container that is configured to house a cleaning compound including a chemical compound and water. The water may be received from the inlet line. The container may include an inlet that receives water from the inlet line and an outlet through which the cleaning compound passes to the pump, which pumps the cleaning compound to the inlet of the hinge base. The container may include a portion fixedly coupled to the base and a lid that is removable from the fixed portion to provide access to a reservoir in the container housing the chemical compound. An electrochemical generator may be provided that generates the chemical compound and supplies the chemical compound to the container. A power supply may be provided for supplying electric power to the electrochemical generator and the pump. The chemical generator may include an H2O2 generator that is configured to produce H2O2 using oxygen from air external to the dispenser, water supplied through the flexible conduit, and an electrical current generated by the power supply.

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms “coupled,” “connected,” and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the cleaning systems, dispensing systems, toilets, standalone systems, etc. as shown in the numerous exemplary embodiments of this application are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., dispenser, generator, container, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A toilet bowl cleaning system comprising:
- a toilet seat assembly including a cavity;
- a cleaning compound dispenser configured for insertion into the cavity of the toilet seat assembly;
- a cover configured to conceal the cavity; and
- an actuator configured to remove the cleaning compound dispenser from the cavity.

2. The toilet bowl cleaning system of claim 1, wherein the actuator includes a button.

3. The toilet bowl cleaning system of claim 1, wherein the actuator activates a spring mechanism that pushes the cleaning compound dispenser in a direction opposite of the insertion of the cleaning compound dispenser.

4. A toilet bowl cleaning system comprising:
- a toilet seat assembly including a cavity;
- a cleaning compound dispenser configured for insertion into the cavity of the toilet seat assembly;
- a cover configured to conceal the cavity; and
- a locking mechanism configured to secure the cleaning compound dispenser in the cavity of the toilet seat.

5. A toilet bowl cleaning system comprising:
- a toilet seat assembly including a cavity;
- a cleaning compound dispenser configured for insertion into the cavity of the toilet seat assembly;
- a cover configured to conceal the cavity; and
- a fluid passage from a toilet tank to the cleaning compound dispenser.

6. The toilet bowl cleaning system of claim 5, further comprising:
- a receiver configured to control a flow of water from the fluid passage to the cleaning compound dispenser.

7. A toilet bowl cleaning system comprising:
- a toilet seat assembly including a cavity;
- a cleaning compound dispenser configured for insertion into the cavity of the toilet seat assembly;
- a cover configured to conceal the cavity; and
- a container configured to store a cleaning compound.

8. The toilet bowl cleaning system of claim 7, further comprising:
- a generator configured to generate the cleaning compound.

9. The toilet bowl cleaning system of claim 8, further comprising:
- a controller configured to monitor a level of the cleaning compound and activate the generator when the level of the cleaning compound is below a predetermined threshold.

10. A toilet comprising:
- a tank configured to hold water;
- a toilet seat assembly including a cavity;
  - a cleaning compound dispenser configured for insertion into the cavity of the toilet seat assembly; and
  - a fluid passage between the tank and the cleaning compound dispenser.

11. The toilet of claim 10, further comprising:
- a cover configured to conceal the cavity.

12. The toilet of claim 10, further comprising:
- a toilet bowl; and
- a second fluid passage between the cleaning compound dispenser at the toilet bowl.

13. The toilet of claim 10, further comprising:
- an actuator configured to remove the cleaning compound dispenser from the cavity.

14. The toilet of claim 13, wherein the actuator activates a spring mechanism that pushes the cleaning compound dispenser in a direction opposite of the insertion of the cleaning compound dispenser.

15. The toilet of claim 10, further comprising:
- a locking mechanism configured to secure the cleaning compound dispenser in the cavity of the toilet seat.

16. The toilet of claim 15, further comprising:
- a receiver configured to control a flow of water from the fluid passage to the cleaning compound dispenser.

17. The toilet of claim 10, further comprising:
- a container configured to store a cleaning compound.

18. The toilet of claim 10 further comprising:

a generator configured to generate the cleaning compound; and a controller configured to activate the generator.

* * * * *